US012667115B2

(12) United States Patent
Baker et al.

(10) Patent No.: US 12,667,115 B2
(45) Date of Patent: \*Jun. 30, 2026

(54) COFFEE REPLICAS PRODUCED FROM INDIVIDUAL COMPONENTS

(71) Applicant: Voyage Foods, Inc., Oakland, CA (US)

(72) Inventors: Lucas Baker, San Francisco, CA (US);
Adam Jacob Maxwell, San Francisco, CA (US); Jillian Angela Jastrzembski, San Francisco, CA (US); Taylor Shulman, Berkeley, CA (US); Alec Kremonic Lee, San Francisco, CA (US); Mardonn Carl Chua, Ann Arbor, MI (US); Daniel Assad Saad, Dallas, TX (US); Ethan Charles Beswick, San Francisco, CA (US)

(73) Assignee: Voyage Foods, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/891,374

(22) Filed: Sep. 20, 2024

(65) Prior Publication Data

US 2025/0008978 A1 Jan. 9, 2025

Related U.S. Application Data

(62) Division of application No. 17/434,824, filed as application No. PCT/US2020/020537 on Feb. 28, 2020.

(60) Provisional application No. 62/812,946, filed on Mar. 1, 2019.

(51) Int. Cl.
| | |
|---|---|
| *A23F 5/44* | (2006.01) |
| *A23L 2/38* | (2021.01) |
| *A23L 27/20* | (2016.01) |
| *A23L 27/28* | (2016.01) |

(52) U.S. Cl.
CPC ................. *A23F 5/44* (2013.01); *A23L 2/38* (2013.01); *A23L 27/20* (2016.08); *A23L 27/28* (2016.08)

(58) Field of Classification Search
CPC ... A23F 5/44; A23L 2/38; A23L 27/20; A23L 27/28
USPC .................................................. 426/592–597
See application file for complete search history.

(56) References Cited

U.S. PATENT DOCUMENTS

| | | | | |
|---|---|---|---|---|
| 1,117,855 | A | * | 11/1914 | Martin ...................... A23G 3/50 |
| | | | | 426/104 |
| 1,696,419 | A | * | 12/1928 | Staudinger .............. A23L 27/28 |
| | | | | 426/534 |
| 2,380,092 | A | * | 7/1945 | Weisberg .................. A23F 5/44 |
| | | | | 426/594 |
| 2,560,531 | A | | 7/1951 | Kipnis et al. |
| 2,594,379 | A | | 4/1952 | Barch |
| 3,474,113 | A | | 10/1969 | Schleppnik |
| 3,617,310 | A | | 11/1971 | Rizzi |
| 3,619,210 | A | | 11/1971 | Nakel et al. |
| 3,931,166 | A | | 1/1976 | Winter et al. |
| 3,931,246 | A | | 1/1976 | Winter et al. |
| 4,045,491 | A | | 8/1977 | Evers et al. |
| 4,092,333 | A | | 5/1978 | Mookherjee et al. |
| 4,119,740 | A | | 10/1978 | Crespo |
| 4,130,562 | A | | 12/1978 | Dubs et al. |
| 4,191,785 | A | | 3/1980 | Mookherjee et al. |
| 4,356,209 | A | | 10/1982 | Bryan et al. |
| 4,378,380 | A | | 3/1983 | Scarpellino et al. |
| 4,520,033 | A | | 5/1985 | Tuot |
| 4,564,525 | A | | 1/1986 | Mitchell et al. |
| 4,701,548 | A | | 10/1987 | Pittet et al. |
| 5,322,704 | A | | 6/1994 | Gaonkar |
| 5,882,716 | A | | 3/1999 | Munz-Schaerer et al. |
| 6,090,431 | A | * | 7/2000 | Franklin ................. A23P 10/25 |
| | | | | 426/597 |
| 6,149,957 | A | | 11/2000 | Mandralis et al. |
| 6,171,635 | B1 | | 1/2001 | Zhao |
| 6,277,428 | B1 | | 8/2001 | Franklin et al. |
| 6,521,273 | B1 | | 2/2003 | Miller |
| 7,081,264 | B2 | | 7/2006 | Akashe et al. |
| 7,794,771 | B2 | | 9/2010 | Kessler |

(Continued)

FOREIGN PATENT DOCUMENTS

| | | | | |
|---|---|---|---|---|
| AT | | 112131 | B | * | 1/1929 |
| AU | | 2016365338 | A1 | | 6/2018 |

(Continued)

OTHER PUBLICATIONS

Shanmugam [Granulation techniques and technologies: recent progresses, 2015], Abstract and Introduction. Web retrieved on May 3, 2024: https://www.ncbi.nlm.nih.gov/pmc/articles/PMC4401168/pdf/BI-5-55.pdf (Year: 2015).*

Barbosa-Cánovas et al., Encapsulation Processes. In: Food Powders. Food Engineering Series. Springer, Boston, MA. Chapter 8, Introduction, p. 199, (2005). https://doi.org/10.1007/0-387-27613-0_8 (Year: 2005).*

2,5-Dimethylphenol _ 2,5-XYLENOL_ Cid 7267—PubChem known as 2,5 xylenol, p. 1 (Year: 2005).*

2-Ethylpyrazine _ C6H8N2 _ CID 26331—PubChem known as ethylpyrazine, p. 1 (Year: 2005).*

(Continued)

*Primary Examiner* — Erik Kashnikow
*Assistant Examiner* — Luis Eugenio Diou Berdecia
(74) *Attorney, Agent, or Firm* — Fish & Richardson P.C.

(57) ABSTRACT

Materials and methods for producing coffee replicas from individual components are provided herein. Such coffee replicas can comprise one or more volatile organic compounds (VOCs) and one or more non-volatile compounds. In some embodiments, the coffee replicas provided herein can have the form of a solution, a suspension, an emulsion, or a solid. For example, the coffee replica can be a coffee bean replica, a coffee grounds replica, a coffee granule replica, a coffee beverage replica (e.g., a ready-to-drink beverage) or a coffee concentrate replica.

11 Claims, No Drawings

(56) References Cited

U.S. PATENT DOCUMENTS

| | | | |
|---|---|---|---|
| 8,329,242 B2 | 12/2012 | Rumbaut et al. | |
| 8,367,142 B2 | 2/2013 | Karwowski et al. | |
| 9,771,552 B2 | 9/2017 | Marcq | |
| 10,645,958 B2 | 5/2020 | Reh et al. | |
| 11,832,632 B2 | 12/2023 | Tenney et al. | |
| 12,369,598 B2 | 7/2025 | Tenney et al. | |
| 12,369,599 B2 | 7/2025 | Tenney et al. | |
| 2001/0002269 A1* | 5/2001 | Zhao | A23L 33/10 426/810 |
| 2001/0026830 A1 | 10/2001 | Barahona | |
| 2002/0119235 A1* | 8/2002 | Zeller | A23F 5/40 426/594 |
| 2002/0127302 A1* | 9/2002 | Zeller | A23L 2/56 426/89 |
| 2002/0155210 A1 | 10/2002 | Hardesty | |
| 2003/0203088 A1 | 10/2003 | Akashe et al. | |
| 2004/0202767 A1* | 10/2004 | Kindel | A23L 27/28 426/594 |
| 2005/0112265 A1* | 5/2005 | Ceriali | A23L 2/64 426/594 |
| 2006/0204613 A1* | 9/2006 | Castro | A23G 4/06 426/3 |
| 2006/0286200 A1* | 12/2006 | Castro | A23G 3/34 426/3 |
| 2009/0155446 A1 | 6/2009 | Reiss et al. | |
| 2009/0208426 A1 | 8/2009 | Gatfield et al. | |
| 2009/0258109 A1* | 10/2009 | Ortiz De Zarate | A23G 4/20 426/103 |
| 2010/0040733 A1 | 2/2010 | Blank et al. | |
| 2010/0323083 A1 | 12/2010 | Rubinstenn et al. | |
| 2010/0330241 A1 | 12/2010 | Gretsch et al. | |
| 2011/0027448 A1 | 2/2011 | Miller | |
| 2011/0274643 A1* | 11/2011 | Yontz | A61K 47/22 44/275 |
| 2011/0318459 A1* | 12/2011 | George | A23L 27/20 426/534 |
| 2012/0107482 A1 | 5/2012 | Hayakawa et al. | |
| 2012/0178828 A1 | 7/2012 | Reiss et al. | |
| 2012/0321772 A1 | 12/2012 | Fujiwara et al. | |
| 2013/0129893 A1 | 5/2013 | Campanile et al. | |
| 2013/0136839 A1* | 5/2013 | Putter | A23L 27/84 426/442 |
| 2013/0323377 A1* | 12/2013 | Kowalczyk | A23G 3/54 426/302 |
| 2015/0342214 A1 | 12/2015 | Van Ommeren et al. | |
| 2016/0376263 A1* | 12/2016 | Patron | A61K 8/4973 514/784 |
| 2017/0000153 A1 | 1/2017 | Borland et al. | |
| 2017/0183613 A1 | 6/2017 | Nakamura et al. | |
| 2017/0339985 A1 | 11/2017 | Fu et al. | |
| 2018/0125107 A1 | 5/2018 | Moragne et al. | |
| 2019/0313661 A1 | 10/2019 | Murai et al. | |
| 2020/0352202 A1 | 11/2020 | Johnson et al. | |
| 2021/0015117 A1 | 1/2021 | Giunti De Oliveira et al. | |
| 2023/0033131 A1 | 2/2023 | Tenney et al. | |
| 2024/0041062 A1 | 2/2024 | Tenney et al. | |
| 2024/0049741 A1 | 2/2024 | Tenney et al. | |
| 2024/0065285 A1 | 2/2024 | Tenney et al. | |
| 2024/0251817 A1 | 8/2024 | Baker et al. | |
| 2024/0260600 A1 | 8/2024 | Baker et al. | |
| 2025/0072446 A1 | 3/2025 | Tenney et al. | |
| 2025/0081984 A1 | 3/2025 | Tenney et al. | |
| 2026/0007144 A1 | 1/2026 | Tenney et al. | |

FOREIGN PATENT DOCUMENTS

| | | | |
|---|---|---|---|
| BR | 102013019333 A2 | 8/2015 | |
| CA | 3092072 | 8/2019 | |
| CA | 3132085 A1 | 9/2020 | |
| CN | 1296385 A | 5/2001 | |
| CN | 1487795 A | 4/2004 | |
| CN | 101005765 A | 7/2007 | |
| CN | 101068476 A * | 11/2007 | A23L 1/22083 |
| CN | 101518292 A | 9/2009 | |
| CN | 102421300 A | 4/2012 | |
| CN | 102753031 A | 10/2012 | |
| CN | 105053432 A | 11/2015 | |
| CN | 105828625 A | 8/2016 | |
| CN | 105995111 A | 10/2016 | |
| CN | 106998762 A | 8/2017 | |
| CN | 108096391 A | 6/2018 | |
| CN | 108289471 A | 7/2018 | |
| CN | 109874999 A | 6/2019 | |
| DE | 489613 C * | 1/1930 | A23L 27/28 |
| DE | 2110837 A1 | 9/1971 | |
| DE | 2110837 C3 * | 10/1980 | A23L 27/28 |
| DE | 102006019241 B4 * | 4/2009 | A23D 7/005 |
| DE | 102007057258 A1 * | 6/2009 | A23D 7/0053 |
| DE | 102009048534 A1 * | 4/2011 | A23L 2/60 |
| DE | 102013002873 A1 * | 8/2014 | A23L 25/30 |
| EP | 0006646 A1 | 1/1980 | |
| EP | 0392608 A2 | 10/1990 | |
| EP | 1084622 A2 | 3/2001 | |
| EP | 2127533 A1 | 12/2009 | |
| EP | 2178389 A2 | 4/2010 | |
| EP | 2730178 A1 | 5/2014 | |
| EP | 3114940 A1 | 1/2017 | |
| EP | 3114941 A1 | 1/2017 | |
| EP | 2227094 B1 | 10/2017 | |
| EP | 3383192 B1 | 9/2019 | |
| EP | 4256968 A2 | 10/2023 | |
| EP | 4256968 B1 | 12/2024 | |
| GB | 260960 A | 2/1928 | |
| GB | 1156476 A | 6/1969 | |
| GB | 1156480 A | 6/1969 | |
| GB | 1182572 A | 2/1970 | |
| GB | 1277387 A | 6/1972 | |
| JP | S64-13978 A | 1/1989 | |
| JP | H03-175932 A | 7/1991 | |
| JP | 2006020526 A * | 1/2006 | |
| JP | 2006-121958 A | 5/2006 | |
| JP | 2012-135215 A | 7/2012 | |
| JP | 2018-016743 A | 2/2018 | |
| KR | 10-2008-0067036 A | 7/2008 | |
| KR | 10-2014-0058304 A | 5/2014 | |
| KR | 101616287 B1 * | 4/2016 | |
| RU | 25825 U1 | 10/2002 | |
| RU | 2524153 C1 | 7/2014 | |
| RU | 2760191 C1 | 11/2021 | |
| TR | 201602859 A2 | 10/2016 | |
| WO | WO 1980/002636 A1 | 12/1980 | |
| WO | WO 2007/116429 A1 | 10/2007 | |
| WO | WO 2009/068999 A2 | 6/2009 | |
| WO | WO 2009/137838 A1 | 11/2009 | |
| WO | WO 2010/143120 A1 | 12/2010 | |
| WO | WO 2012/084624 A1 | 6/2012 | |
| WO | WO 2013/011148 A1 | 1/2013 | |
| WO | WO 2013/079187 A2 | 6/2013 | |
| WO | WO 2014/130539 A1 | 8/2014 | |
| WO | WO 2015/091069 A1 | 6/2015 | |
| WO | WO 2017/096077 A1 | 6/2017 | |
| WO | WO-2018110587 A1 * | 6/2018 | A23F 5/48 |
| WO | WO 2019/165323 A1 | 8/2019 | |
| WO | WO 2021/069804 A1 | 4/2021 | |
| WO | WO 2021/202989 A1 | 10/2021 | |
| WO | WO 2022/251529 A1 | 12/2022 | |
| WO | WO 2023/285547 A1 | 1/2023 | |
| WO | WO 2023/288050 A2 | 1/2023 | |

OTHER PUBLICATIONS

2-Methoxy-4-methylphenol _ Creosol_C8H1002 _ CID 7144—PubChem, known as Creosol, p. 1 (Year: 2005).*
2-Methoxy-4-vinylphenol _ 4-vinylguaiacol_C9H1002 _ CID 332—PubChem, known as 4-vinylguaiacol, p. 1 (Year: 2005).*
2-Methylpyrazine _ methylpyrazine_C5H6N2 _ CID 7976—PubChem, known as methylpyrazine, p. 1 (Year: 2005).*
3-methylbutyric acid_3-methylbutanoic acid_ Isovaleric acid _C5H1002 _ CID 10430—PubChem, known as 3-methylbutanoic acid, p. 1 (Year: 2005).*
2-Methyltetrahydrofuran-3-one _ coffee furanone_C5H802 _ CID 18522—PubChem, known as coffee furanone, p. 1 (Year: 2005).*

(56) References Cited

OTHER PUBLICATIONS

Atomo Announces Development of Bean-less Molecular Coffee _ Nosh.com Feb. 19, 2019, p. 1-3 (Year: 2019).*
Ferulic acid _ C10H1004 _ CID 445858 - PubChem, known as trans-ferulic acid (Year: 2004).*
CiteSeerX, Chemical Summary for Vanillin, 1996, p. 1-8. Web retrieved: https://citeseerx.ist.psu.edu/document?repid=rep1&type=pdf&doi=0ae64b30658e119bdce20f8cbb6402f87459341a (Year: 1996).*
Mayer et al. Sensory study of the character impact aroma compounds of a coffee beverage, Eur. Food Res Technol. 2000, 211, 272-276. (Year: 2000).*
Ferulic Acid Synonyms_ C10H1004 _ CID 445858 - PubChem_ 2004, p. 1-13. (Year: 2004).*
Extended European Search Report in European Appln. No. 20766954.0, dated Oct. 7, 2022, 15 pages.
Office Action in European Appln. No. 20766954.0, mailed on Apr. 29, 2024, 3 pages.
Office Action in European Appln. No. 20766954.0, mailed on Oct. 25, 2022, 1 page.
International Preliminary Report on Patentability in International Appln. No. PCT/US2023/027719, mailed on Jan. 30, 2025, 9 pages.
Office Action in European Appln. No. 24199128, mailed on Apr. 10, 2025, 12 pages.
Powderbulksolids.com [online], "What is Agglomeration?," Feb. 26, 2008, retrieved on Dec. 26, 2024, retrieved from URL<https://www.powderbulksolids.com/particle-enlargers-formers/what-is-agglomeration->, 4 pages.
Alba et al., "Dietary fibre from berry-processing waste and its impact on bread structure: A review," Journal of the Science of Food and Agriculture, Jul. 2019, 99(9):4189-4199.
Extended European Search Report in European Appln. No. 22842920.5, dated Apr. 30, 2024, 11 pages.
Extended European Search Report in European Appln. No. 23193950.5, dated Dec. 8, 2023, 8 pages.
HMDB.ca [online], "Showing metabocard for 2,5-Dimethylphenol (HMDB0030540)," Feb. 26, 2018, retrieved on May 6, 2024, retrieved from URL<https://hmdb.ca/metabolites/HMDB0030540/>, 7 pages.
International Preliminary Report on Patentability in International Appln. No. PCT/US2020/020537, dated Sep. 16, 2021, 12 pages.
International Preliminary Report on Patentability in International Appln. No. PCT/US2022/037270, dated Jan. 25, 2024, 11 pages.
International Search Report and Written Opinion in International Appln. No. PCT/US2020/020537, dated Jun. 11, 2020, 14 pages.
International Search Report and Written Opinion in International Appln. No. PCT/US2022/037270, dated Dec. 16, 2022, 13 pages.
International Search Report and Written Opinion in International Appln. No. PCT/US2023/027719, dated Oct. 27, 2023, 13 pages.
ISO.org [online], ISO 6564, "Sensory analysis—Methodology—Flavour Profile Methods," Oct. 15, 1985, retrieved on Aug. 13, 2023, retrieved from URL<https://www.iso.org/standard/12966.html>, 8 pages.
ISO.org [online], ISO 6658, "Sensory analysis—Methodology—General guidance," Jul. 2017, retrieved on Aug. 13, 2023, retrieved from URL<https://www.iso.org/standard/65519.html>, 34 pages.
Katz et al., "Cocoa and chocolate in human health and disease," Antioxidants & redox signaling, Nov. 15, 2011, 15(10):2779-2811.
Ma et al., "Phytochemical constituents, health benefits, and industrial applications of grape seeds: A mini-review," Antioxidants, Sep. 15, 2017, 6(3): 11 pages.
Medium [online], "Coffee, Chicory, and Chicanery," Jan. 20, 2018, retrieved on Oct. 18, 2024, retrieved from URL<https://medium.com/@.aravindiyer/coffee- chicory-and-chicanery-625295c00c3d>, 11 pages.
Newfoodmagazine.com [online], "Researchers combine chocolate with waste products to boost health profile," Aug. 18, 2020, retrieved on Sep. 7, 2022, retrieved from URL<https://www.newfoodmagazine.com/news/116077/combining-chocolate-with-waste-products-to-boost-health-profile/>, 6 pages.

Office Action in European Appln. No. 22842920.5, mailed on May 17, 2024, 1 page.
Office Action in European Appln. No. 22842920.5, mailed on Sep. 26, 2024, 8 pages.
Office Action in European Appln. No. 23193950.5, mailed on Jan. 15, 2024, 2 pages.
Office Action in European Appln. No. 23193950.5, mailed on Sep. 26, 2024, 7 pages.
PubChem CID 11747, "2,3-Pentanedione," National Library of Medicine, retrieved on Aug. 14, 2024, retrieved from URL <https://pubchem.ncbi.nlm.nih.gov/compound/2 3-Pentanedione>, 11 pages.
PubChem CID 5810, "Hydroxyproline," National Library of Medicine, retrieved on Aug. 15, 2024, retrieved from URL <https://pubchem.ncbi.nlm.nih.gov/compound/Hydroxyproline>, 13 pages.
PubChem CID 6083, "Adenosine Phosphate," National Library of Medicine, retrieved on Aug. 16, 2024, retrieved from URL <https://pubchem.ncbi.nlm.nih.gov/compound/Adenosine-Phosphate>, 13 pages.
PubChem CID 62453, "4-Vinylphenol," National Library of Medicine, retrieved on Aug. 16, 2024, retrieved from URL <https://pubchem.ncbi.nlm.nih.gov/compound/4-Vinylphenol>, 11 pages.
PubChem CID 7041, "2,6-Dimethoxyphenol," National Library of Medicine, retrieved on Jun. 5, 2024, retrieved from URL <https://pubchem.ncbi.nlm.nih.gov/compound/7041>, 1 page.
Smeds et al., "Content, composition, and stereochemical characterisation of lignans in berries and seeds," Food chemistry, Oct. 15, 2012, 134(4):1991-1998.
Wang et al., "Food Flavor Preparation and Application Manual," Beijing: China Light Industry Press, May 31, 2000, Edition 1, 9 pages (with English translation).
Wen et al., "Food Additives," Beijing: China Quality Inspection Press Mar. 31, 2013, Edition 2, 6 pages (with English translation).
Zaini et al., "Microanalysis of Cocoa Beans for Determination of Tannin Content Contributed to Cocoa Flavor," Malaysian Cocoa Journal, 2020, 12(1): 154-161.
Zeng, "Coffee Flavor Chemistry," Guangzhou: Jinan University Press, Oct. 31, 2014, Edition 1, 6 pages (with English translation).
[No. Author Listed], "Directive 2004/42/CE of the European Parliament and of the Council of Apr. 21, 2004 on the limitation of emissions of volatile organic compounds due to the use of organic solvents in certain paints and varnishes and vehicle refinishing products and amending Directive 1999/13/EC," Official Journal of the European Union, Apr. 30, 2004, 143:87-96.
Blank et al., "Potent odorants of the roasted powder and brew of Arabica coffee, " Z Lebensm Unters Forsch, Apr. 15, 1992, 239-245.
Bowden et al., "Solubility of the proteinogenic α-amino acids in water, ethanol, and ethanol—water mixtures," Journal of Chemical & Engineering Data, Feb. 5, 2018, 63(3):488-97.
Buffo et al., "Coffee flavour: an overview," Flavour and Fragrance Journal, Mar. 1, 2004, 19(2):99-104.
Caporaso et al., "Variability of single bean coffee volatile compounds of Arabica and robusta roasted coffees analysed by SPME-GC-MS," Food Research International, Jun. 1, 2018, 108:628-640.
CEN.ACS.org [online], "What's that stuff? Instant Coffee, The popular drink's less popular, highly processed relative," Sep. 29, 2008, retrieved on Jun. 18, 2025, retrieved from URL <https://cen.acs.org/articles/86/139/Instant-Coffee.html>, 3 pages.
Chu, "Coffee: emerging health effects and disease prevention," John Wiley & Sons, Jan. 24, 2012, 14 pages.
Czerny et al., "Sensory study on the character impact odorants of roasted Arabica coffee," Journal of Agricultural and Food Chemistry, Feb. 15, 1999, 47(2):695-699.
Declaration re Chocolate Samples, dated Apr. 7, 2023, 3 pages.
EPA.gov [online], "Technical Overview of Volatile Organic Compounds," last updated Sep. 8, 2025, available on or before Jan. 28, 2016 via Internet Archive: Wayback Machine URL<https://web.archive.org/web/20160128002542/https://www.epa.gov/indoor-air-quality-iaq/technical-overview-volatile-organic-compounds>, retrieved on Sep. 29, 2025, retrieved from URL<https://www.epa.gov/indoor-air-quality-iaq/technical-overview-volatile-organic-compounds#classifications>, 8 pages.
Fadel et al., "Quality and flavour stability of coffee substitute prepared by extrusion of wheat germ and chicory roots," Amino Acids, Feb. 2008, 34:307-314.

(56)                    References Cited

OTHER PUBLICATIONS

Farah, "Coffee constituents," Coffee: Emerging health effects and disease prevention, Jan. 24, 2012;1:22-58.

Farah, "Coffee: Production, quality and chemistry," Royal Society of Chemistry, Jan. 14, 2019 (Abstract only).

Mayer et al., "Sensory study of the character impact aroma compounds of a coffee beverage," European Food Research and Technology, Sep. 2000, 211(4):272-276.

Merriam-Webster.com [online], "Coffee Bean Definition & Meaning," May 27, 2025, retrieved on Jun. 18, 2025, retrieved from URL <https://www.merriam-webster.com/dictionary/coffee%20bean>, 6 pages.

Merriam-Webster.com [online], "Coffee Definition & Meaning," Jun. 18, 2025, retrieved on Jun. 18, 2025, retrieved from URL <https://www.merriam-webster.com/dictionary/coffee>, 8 pages.

Merriam-webster.com [online], "Replica," Apr. 21, 2009, retrieved on Jun. 30, 2025, retrieved from URL <https://www.merriam-webster.com/dictionary/replica>, 1 page.

Office Action in European Appln. No. 24222767.6, mailed on Jun. 3, 2025, 11 pages.

Olsen et al., "Predicting Vapour Pressures of Organic Compounds from Their Chemical Structure for Classification According to the VOCDirective and Risk Assessment in General," Molecules, Mar. 31, 2001, 6(4):370-389.

Poisson et al., "The Chemistry of Roasting—Decoding Flavor Formation," Academic Press, Jan. 1, 2017, Chapter 12, pp. 273-309.

Rodriguez-Campos et al., "Dynamics of volatile and non-volatile compounds in cocoa (*Theobroma cacao* L.) during fermentation and drying processes using principal components analysis," Food Research International, Jan. 1, 2011, 44(1):250-258.

Semmelroch et al., "Studies on Character Impact Odorants of Coffee Brews," Journal of Agricultural and Food Chemistry, Feb. 19, 1996, 44(2):537-543.

Sunarharum et al., "Complexity of coffee flavor: A compositional and sensory perspective," Food Research International, Aug. 1, 2014, 62:315-325.

Tan, "Physical Chemistry in Flavor Products Preparation: An Overview," Flavor Technology, ACS Publications, 1995, Chapter 1, 17 pages.

Teranishi et al., "Flavor research; recent advances," Marcel Dekker, Inc, 1981, 35 pages.

Thermofisher.com [online], "Pierce™ Pyridine, LC-MS Grade, " Mar. 7, 2021, retrieved on Jun. 27, 2025, retrieved from URL <https://www.thermofisher.com/order/catalog/product/25104>, 4 pages.

Tuenter et al., "Non-volatile and volatile composition of West African bulk and Ecuadorian fine-flavor cocoa liquor and chocolate," Food Research International, Apr. 1, 2020, 130:108943, 11 pages.

Whetstine et al., "Characterization of dried whey protein concentrate and isolate flavor," Journal of Dairy Science, Nov. 1, 2005, 88(11):3826-3839.

Wu, "Identification and quantitation of predominant odorants in roasted chicory," Thesis for the degree of Master of Science in Food Science and Human Nutrition, University of Illinois at Urbana-Champaign, 2017, 85 pages.

Yeretzian et al., "Coffee Volatile and Aroma Compounds—From the Green Bean to the Cup," Coffee: Production, Quality and Chemistry, Jan. 11, 2019, Chapter 33, 726-770.

abc.net.au [online], "Taking carob from 'daggy' to trendy as life in retirement doesn't slow down," Feb. 12, 2016, retrieved on Sep. 4, 2025, retrieved from URL <https://www.abc.net.au/news/rural/2016-02-12/rural-sa-carob-farming-in-port-elliot/7162958>, 5 pages.

Afoakwa et al., "Flavor formation and character in cocoa and chocolate: a critical review," Critical Reviews in Food Science and Nutrition, Sep. 10, 2008, 48(9):840-57.

Aprotosoaie et al., "Flavor chemistry of cocoa and cocoa products—an overview," Comprehensive Reviews in Food Science and Food Safety, Jan. 2016, 15(1):73-91.

Bolenz et al., European Food Research and Technology, 2021, 247:623-636.

Cantalejo, "Effects of roasting temperature on the aroma components of carob (*Ceratonia siliqua* L.)," Journal of Agricultural and Food Chemistry, Apr. 16, 1997, 45(4):1345-50.

Chen et al., "Identification of key aroma-active compounds in commercial coffee using GC-O/AEDA and OAV analysis, " Foods, Sep. 13, 2025, 14(18):3192.

chocolatetastinginstitute.org [online], "Chocolate and Cacao Flavour Profile Map" available on or before Sep. 30, 2020, via Internet Archive: Wayback Machine URL <https://web.archive.org/web/20200930064517/http://www.chocolatetastinginstitute.org/chocolate-and-cacao-flavor-profile-map/>, retrieved on Sep. 22, 2025, retrieved from URL <https://web.archive.org/web/20250908000000*/http://www.chocolatetastinginstitute.org/chocolate-and-cacao-flavor-profile-map/>, 2 pages.

Codex Alimentarius, "Standard for Chocolate and Chocolate Products," CXS 87-1981, Dec. 2022, 9 pages.

Counet et al., "Use of gas chromatography—olfactometry to identify key odorant compounds in dark chocolate. Comparison of samples before and after conching," Journal of Agricultural and Food Chemistry, Mar. 15, 2002, 50(8):2385-91.

eatforhealth.gov [online], "How to understand food labels," Jun. 26, 2020, retrieved on Sep. 5, 2025, retrieved from URL <https://web.archive.org/web/20210417125323/https://www.eatforhealth.gov.au>, 6 pages.

Extended European Search Report in European Appln. No. 25181111.3, dated Oct. 17, 2025, 14 pages.

Fadel et al., "Cocoa substitute: Evaluation of sensory qualities and flavour stability," European Food Research and Technology, Jan. 20, 2006, 223(1):125-31.

Fidan et al., "Evaluation of chemical composition, antioxidant potential and functional properties of carob (*Ceratonia siliqua* L.) seeds," Journal of Food Science and Technology, Jul. 2020, 57(7):2404-13.

Foodstandards.gov [online], "Ingredient lists and percentage labelling," Jan. 25, 2022, retrieved on Sep. 5, 2025, retrieved from URL <https://www.foodstandards.gov.au/consumer/labelling/ingredients>, 2 pages.

Frauendorfer et al. Identification of the Key Aroma Compounds in Cocoa Powder Based on Molecular Sensory Correlations.

Fricke et al., "Characterization of the key aroma compounds in a commercial milk chocolate by application of the sensomics approach," Journal of Agricultural and Food Chemistry, Oct. 16, 2020, 68(43):12086-95.

FSSAI-Food Safety and Standards Authority of India, "Chocolate," Compendium on Food Safety and Standard, 2023, Chapter 2.7.4, 5 pages.

Gorodyska et al., "Investigation of the safety grapeseed powder as an alternative to cocoa-powder in a confectionery glaze," Food Science and Technology, Mar. 2018, 12(3):64-70 (Abstract Only).

HedgePointGlobal.com [online], "Coffee sensory notes: an explanatory guide to the Flavor Wheel," Dec. 12, 2025, retrieved on Dec. 30, 2025, retrieved from URL <https://hedgepointglobal.com/en/blog/coffee-aromas-and-their-attributes-a-guide-to-the-flavor-wheel>.

Liu et al., "A comparative study of aroma-active compounds between dark and milk chocolate: relationship to sensory perception,".

Mortzfeld et al., "Pyrazines: Synthesis and industrial application of these valuable flavor and fragrance compounds," Biotechnology Journal, Nov. 2020, 15(11):2000064.

Official Journal of the community "Richtlinie 2000/36/EG des Europaischen Parlaments und des Rates vom 23.06.00 Ober Kakao-und Schokoladeerzeugnisse fur die menschliche Ernahrung," 7 pages.

Ohtani et al., "Spray-drying instant coffee product at low temperature," Paper, Presented at ASIC 16th International Conference on Coffee Science, Kyoto, Japan, Jan. 1995; 16:447-456.

Papageorgiou et al., "Cake perception, texture and aroma profile as affected by wheat flour and cocoa replacement with carob flour," Foods, Nov. 2, 2020, 9(1586):1-18.

Powerhungry.com [online], "Easy Homemade Pumpkin Seed Butter powerhungry," Aug. 25, 2020, retrieved on , retrieved from URL <https://www.powerhungry.com/2020/08/25/pumpkin-seed-butter/>, 33 pages.

(56)     References Cited

OTHER PUBLICATIONS

Power Hungry, 1 Ingredient Pepita Butter, First published Aug. 25, 2020, Obtained on Oct. 31, 2025 from URL: https://www.powerhungry.com/2020/08/25/1-ingredient-pepita-butter/.

Procida ett al., "Characterization of Arabica and Robusta volatile coffees composition by reverse carrier gas headspace gas chromatography-mass spectrometry based on a statistical approach," Food Science and Biotechnology, Oct. 2020, 29(10):1319-30.

Sanz et al., "Comparison of potent odorants in a filtered coffee brew and in an instant coffee beverage by aroma extract dilution analysis (AEDA)," European food research and technology, Apr. 2002, 214(4):299-302.

sca.coffee [online], "The Coffee Taster's Flavor Wheel," Poster, 2016, retrieved on Sep. 23, 2025, retrieved from URL <https://sca.coffee/store/the-coffee-tasters-flavor-wheel-poster-german>, 2 pages.

Schnermann et al., "Evaluation of key odorants in milk chocolate and cocoa mass by aroma extract dilution analyses," Journal of Agricultural and Food Chemistry, Mar. 17, 1997, 45(3):867-72.

Seninde et al., "Coffee Flavor: A Review," Beverages, Jul. 8, 2020, 6(44):1-25.

Seyfried et al., "Characterization of the key aroma compounds in two commercial dark chocolates with high cocoa contents by means of the sensomics approach," Journal of agricultural and food chemistry, May 8, 2019, 67(20):5827-37.

Sinrod, Unlocking the health enhancing potential of grape marc through chemical and microbial analysis of its oligosaccharides and phenolic compounds, MS thesis. University of California, Davis, 2021.

Spada et al., "Characterisation of the chocolate aroma in roast jackfruit seeds," Food Chemistry, Mar. 11, 2021, 354(129537):1-12.

Spruce Eats. Types of Table Grapes. Linnea Covington. First published Aug. 19, 2021. Obtained on Oct. 30, 2025 from URL :<https://web.archive.org/web/20210919054744/https://www.thespruceeats.com/types-of-grapes-5192789.

Stavrou et al., "Polyphenols in carobs: A review on their composition, antioxidant capacity and cytotoxic effects, and health impact," Food Chemistry, Jul. 2, 2018, 269:355-74.

thecarobkitchen.com.au [online], "All Products," available on or before Mar. 13, 2021, via Internet Archive: Wayback Machine URL <http://web.archive.org/web/20210313194731/https://thecarobkitchen.com.au/collections/all-products>, 3 pages.

thecarobkitchen.com.au [online], "Carob Milk Bar," available on or before Mar. 13, 2021, via Internet Archive: Wayback Machine URL <https://web.archive.org/web/20210313194710/https://thecarobkitchen.com.au>, 4 pages.

Toker et al., "Chocolate aroma: Factors, importance and analysis," Trends in Food Science & Technology, May 1, 2020, 99:580-92.

Wikipedia.org [online], "Buttersaure," retrieved on Sep. 5, 2025, retrieved from URL https://de.wikipedia.org/w/index.php?title=Butters%C3%A4ure%oldid, 7 pages, Machine translation.

Wikipedia.org [online], "Cocoa solids," retrieved on Sep. 5, 2025, retrieved from URL <https://en.wikipedia.org/wiki/Cocoa_solids>, 4 pages.

Wikipedia.org [online], "Propionsaure", retrieved on Sep. 22, 2025, retrieved from URL <https://de.wikipedia.org/w/index.php?title=Propions%C3%A4ure&oldi>, 9 pages, Machine translation.

Wikipedia.org [online], "Pyridin," retrieved on Sep. 5, 2025, retrieved from URL https://de.wikipedia.org/w/index.php?title=Pyridin&oldid=212659347, 24 pages, Machine translation.

Wikipedia.org [online], "Valeriansaure," retrieved on Sep. 5, 2025, retrieved from URL <https ://de.wikipedia.org/w /index.php?title=Valerians%C3%A4ure&old>, 3 pages, Machine translation.

Wikipedia.org [online], "Vanillin", retrieved on Sep. 5, 2025, retrieved from URL<https://de.wikipedia.org/w/index.php?title=Vanillin&oldid=212229124>, 10 pages, Machine translation.

WorldCoffeeResearch.org [online], "Sensory Lexicon," 2017, retrieved on Dec. 30, 2025, retrieved from URL <https://worldcoffeeresearch.org/resources/sensory-lexicon>, 54 pages.

* cited by examiner

1

COFFEE REPLICAS PRODUCED FROM INDIVIDUAL COMPONENTS

CROSS-REFERENCE TO RELATED APPLICATIONS

This application is a divisional of U.S. application Ser. No. 17/434,824, filed on Aug. 30, 2021, which is a National Stage application under 35 U.S.C. § 371 of International Application No. PCT/US2020/020537 having an International Filing Date of Feb. 28, 2020, which claims benefit of priority from U.S. Provisional Application Ser. No. 62/812, 946, filed on Mar. 1, 2019, which are incorporated herein by reference in its entirety.

TECHNICAL FIELD

This document relates to materials and methods for producing coffee-like products from individual components.

BACKGROUND

Traditional methods for producing coffee are often lengthy and costly, involving the harvesting of fastidious crops, followed by processing, drying, and milling (e.g., hulling, polishing, grading, and/or sorting) steps. Each component of the traditional, geographically constrained process has an inherent variability and risk, including changeable climate, crop disease, and contamination, which can render such methods and their resulting products inconsistent from batch to batch and year to year. Traditional coffee production methods require imprecise practices, and it can be difficult to account for all inconsistencies, often involving adulteration of the final product with ingredients to mask imperfections.

SUMMARY

This document is based, at least in part, on the identification of compounds that contribute to the flavor and aroma of coffees, and on the development of methods for combining those compounds to yield coffee replicas (e.g., as solids such as bean replicas, grounds replicas, or granule replicas, or liquids) that have the taste, aroma, and other characteristics of traditionally generated coffees. Because each ingredient is added individually, the methods disclosed herein can reduce many of the risks and variability associated with traditional coffee production, which can vary by region, farm, or year. In some cases, one or more ingredients (e.g., at least 50%, 60%, 70%, 80%, 90%, 95%, 99%, or 100% of the ingredients) can be highly defined (e.g., by lot analysis). In some cases, one or more ingredients (e.g., at least 50%, 60%, 70%, 80%, 90%, 95%, 99%, or 100% of the ingredients) can be highly pure (e.g., at least 90%, 95%, 96%, 97%, 98%, 99%, 99.5%, or 99.9% pure). The methods also provide infinite reproducibility of a recipe, which is not possible with traditional production methods. Further, the methods described herein allow for unique flexibility in optimization of the flavors, aromas, and textures of coffee, and greatly reduce or even eliminate the possibility that the resulting coffee will contain detrimental or undesired components. Moreover, the methods disclosed herein differ from currently existing methods in that they are rapid, reproducible, and cost-effective.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

In one aspect, provided herein is a coffee replica including one or more volatile organic compounds (VOCs) and one or more non-volatile compounds, wherein a) the VOCs include at least 50 compounds selected from the group consisting of 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, coffee furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether, and b) the non-volatile compounds include at least 10 compounds selected from the group consisting of 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin. In some embodiments, the coffee replica can be a coffee beverage replica. In some embodiments, the coffee replica can include the compounds as shown in the second column of TABLE F1 ("Range (mg/L)").

In another aspect, provided herein is a coffee replica including one or more volatile organic compounds (VOCs) and one or more non-volatile compounds, wherein a) the one or more VOCs include at least one VOC that is not present in a corresponding reference coffee, b) the one or more VOCs lack at least one VOC that is present in a corresponding reference coffee, c) the one or more VOCs are present in the coffee replica in a total amount of at least 100 mg/L, d) the one or more non-volatile compounds include at least one non-volatile compound that is not present in a corresponding reference coffee, or e) the one or more non-volatile compounds lack at least one non-volatile compound that is present in a corresponding reference coffee.

Implementations can include one or more of the following features. The one or more VOCs can be present in the coffee replica in a total amount of at least 500 mg/L. The one or more VOCs can lack at least one compound selected from the group consisting of 1-heptanol, 1-octanol, 1-octen-3-ol, 2,3-diethylpyrazine, 2,5-dimethylpyrazine, 2-acetyl-1-methylpyrrole, 2-acetylpyridine, 2-acetylpyrrole, 2-ethyl-1-hexanol, 2-ethylfuran, 2-furfuryl acetate, 2-heptanol, 2-heptanone, 2-methylbutyl isovalerate, 2-methylbutyraldehyde, 2-methylbutyric acid, 2-nonanol, 2-nonanone, 2-octanone, 2-pentylfuran, 2-phenyl-2-butenal, 2-phenylethanol, 2-undecanone, 3-ethylpyridine, 3-hexanone, 3-octanol, 4-carvomenthenol, 4-ethyl guaiacol, 4-ethyl phenol, 4-methyl-2-phenyl-2-pentenal, 4'-methylacetophenone, 4-vinylphenol, 5-methyl-2-phenyl-2-hexenal, benzaldehyde, benzyl acetate, butyl alcohol, damascenone, decanal, diethyl disulfide, dimethyl sulfide, dimethyl sulfoxide, ethyl acetate, ethyl butanoate, ethyl heptanoate, ethyl hexanoate, ethyl lactate, ethyl octanoate, ethyl phenylacetate, ethyl tiglate, furfuryl propionate, geraniol, hexanal, hexanol, hexyl acetate, isoamyl acetate, isobutyric acid, limonene, linalool, methyl benzoate, methyl hexanoate, methyl nicotinate, methyl phenylacetate, methyl salicylate, myrcene, nonanal, octanal, p-cresol, phenethyl acetate, phenylacetaldehyde, propionaldehyde, propionic acid, and valeric acid. The one or more VOCs can include at least one compound selected from the group consisting of 2-pentanol, beta-ionone, ethyl benzoate, geranyl acetate, isoamyl alcohol, maltol, massoia lactone, and methyl anthranilate. The VOCs can include at least 30 compounds selected from the group consisting of 1-heptanol, 1-octanol, 1-octen-3-ol, 2,3-butanediol, 2,3-butanedione, 2,3-diethyl-5-methylpyrazine, 2,3-diethylpyrazine, 2,3-Hexanedione, 2,3-pentadione, 2,5-dimethylphenol, 2,5-dimethylpyrazine, 2,6-dimethylpyrazine, 2-acetyl-1-methylpyrrole, 2-acetyl-5-methylfuran, 2-acetylpyridine, 2-acetylpyrrole, 2-ethoxy-3-methylpyrazine, 2-ethyl-1-hexanol, 2-ethyl-4-hydroxy-5-methyl-3(2H)-furanone, 2-ethylfuran, 2-ethylpyrazine, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylbutyl isovalerate, 2-methylbutyraldehyde, 2-methylbutyric acid, 2-methylpyrazine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 3-ethylpyridine, 3-hexanone, 3-methylbutyric acid, 3-octanol, 3-octanone, 4-carvomenthenol, 4-ethyl guaiacol, 4-ethyl phenol, 4-ethylguaiacol, 4-hydroxy-5-methyl-3-furanone, 4-methyl-2-phenyl-2-pentenal, 4'-methylacetophenone, 4-vinylphenol, 5-methyl-2-phenyl-2-hexenal, 5-methylfurfural, acetoin acetate, amyl acetate, amyl alcohol, benzaldehyde, benzyl acetate, benzyl alcohol, benzyl isovalerate, beta-damascenone, beta-ionone, butyl acetate, butyl alcohol, butyric acid, coffee furanone, damascenone, decanal, delta-decalactone, delta-octalactone, diethyl disulfide, diethyl succinate, difurfuryl ether, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, eugenol, furaneol, furfural, furfuryl alcohol, furfuryl propionate, gamma decalactone, gamma-decalactone, gamma-nonalactone, gamma-valerolactone, geraniol, geranyl acetate, guaiacol, hexanal, hexanol, hexyl acetate, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, myrcene, nonanal, octanal, p-anisaldehyde, p-cresol, phenethyl acetate, phenylacetaldehyde, propanol, propionaldehyde, propionic acid, propyl propionate, pyrrole, sotolone, syringol, trans,trans-2,4-decadienal, trans-2-nonenal, valeraldehyde, valeric acid, vanillin erythro and/or threo-butan-2,3-diol acetal, and vanillyl ethyl ether. The VOCs can include at least 30 compounds selected from the group consisting of 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, coffee furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether. The one or more non-volatile compounds can lack at least one compound selected from the group consisting of 2(5H)-furanone, 2,3,5,6-tetramethylpyrazine, 2-ethyl-2-hydroxybutyric acid, 2-furoic acid, 2-isopropylmalic acid, 3,4-dihydroxybenzoic acid, 4-methoxycinnamic acid, 5-ethyl-4-hydroxy-2-methyl-3(2H)-furanone, adenine, arabitol, betaine, caffeic acid, cytidine, D-gluconic acid, D-glucuronic acid, fructose, galactose, glucose, glutamic acid, hydroxymethylfurfural, malic acid, mannitol, methyl-2-pyrrolyl ketone, inositol, pyruvic acid, quinic acid, sorbitol, syringic acid, tartaric acid, tryptamine, and uracil. The one or more non-volatile compounds can include at least one compound selected from the group consisting of acetovanillone, adipic acid, AMP, arginine, carnosine, cinnamic acid, citrulline, CMP, coumaric acid, cysteine, cystine, epicatechin, epicatechin gallate, GABA, glucosamine, glutamine, guanine, hesperetin, histidine, isoleucine, kynurenic acid, leucine, lysine, mannose, methionine, methyl gallate, ornithine, pantothenic acid, pipecolinic acid, piperine, polydatin, pyridoxine, quercetin, resveratrol, rutin, sinapinic acid, sorbic acid, syringaldehyde, threonine, trans-4-hydroxyproline, tryptophan, tyramine, and tyrosine. The one or more non-volatile compounds can include at least 10 compounds selected from the group consisting of 2(5H)-furanone, 2,3,5,6-tetramethylpyrazine, 2,3,5-trimethylpyrazine, 2,3-dimethylpyrazine, 2-ethyl-2-hydroxybutyric acid, 2-furoic acid, 2-isopropylmalic acid, 3,4-dihydroxybenzoic acid, 4-guanidinobutyric acid, 4-methoxycinnamic acid, 5-ethyl-4-hydroxy-2-methyl-3(2H)-furanone, acetovanillone, adenine, adipic acid, AMP, arabitol, arginine, asparagine, aspartic acid, beta-alanine, betaine, caffeic acid, caffeine, carnitine, carnosine, catechin, choline, cinnamic acid, citric acid, citrulline, CMP, coumaric acid, cysteine, cystine, cytidine, cytosine, D-gluconic acid, D-glucuronic acid, DL-hydroxystearic acid, ellagic acid, epicatechin, epicatechin gallate, fructose, fumaric acid, GABA, galactose, gallic acid, glucosamine, glucose, glutamic acid, glutamine, glycine, guanine, hesperetin, histidine, homoserine, hydroxymethylfurfural, isoleucine, kynurenic acid, lactic acid, leucine, lysine, malic acid, mannitol, mannose, methionine, methyl gallate, methyl-2-pyrrolyl ketone, inositol, ornithine, pantothenic acid, phenylalanine, pipecolinic acid, piperine, polydatin, proline, propyl gallate, pyridine, pyridoxine, pyruvic acid, quercetin, quinic acid, resveratrol, rhamnose, ribose, rutin, salicylic acid, serine, sinapinic acid, sorbic acid, sorbitol, sotolon, succinic acid, syringaldehyde, syringic acid, tartaric acid, threonine, trans-4-hydroxyproline, trans-ferulic acid, tryptamine, tryptophan, tyramine, tyrosine, uracil, valine, vanillic acid, vanillin, and xylose. The one or more non-volatile compounds can include at least 5 compounds selected from the group consisting of 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin. The coffee replica can be a solution, suspension, or emulsion. The solution, suspension, or emulsion can be a ready-to-drink beverage. The solution, suspension, or emulsion can be a coffee concentrate. The coffee replica can be a solid. The coffee replica can be a coffee granule replica. The coffee replica can be a coffee grounds replica. The coffee replica can include a solid substrate. The solid substrate can include processed or unprocessed grains or grain products, legumes or legume seeds, oil plants or seeds, fruits or fruit products, roots, tubers, or root or tuber products, sugar processing by-products, or other plant by-products. The solid substrate can include grape seeds.

In another aspect, provided herein is a method of preparing a coffee replica, the method including forming an aqueous solution including water, one or more VOCs that are water-soluble, and one or more non-volatile compounds that are water-soluble; forming an emulsion including an oil, one or more VOCs that are fat-soluble, and one or more non-volatile compounds that are fat-soluble; and mixing the aqueous solution and the emulsion to form a flavor mixture.

Implementations can include one or more of the following features. The method further can further include processing the flavor mixture to commercial sterility. The coffee replica can be a coffee granule replica. The method can further include agglomerating the flavor mixture. The coffee replica can be a coffee bean replica or a coffee grounds replica and can include a solid substrate. The method can further include applying the flavor mixture to the solid substrate to form a coated solid substrate. The one or more VOCs can lack at least one compound selected from the group consisting of 1-heptanol, 1-octanol, 1-octen-3-ol, 2,3-diethylpyrazine, 2,5-dimethylpyrazine, 2-acetyl-1-methylpyrrole, 2-acetylpyridine, 2-acetylpyrrole, 2-ethyl-1-hexanol, 2-ethylfuran, 2-furfuryl acetate, 2-heptanol, 2-heptanone, 2-methylbutyl isovalerate, 2-methylbutyraldehyde, 2-methylbutyric acid, 2-nonanol, 2-nonanone, 2-octanone, 2-pentylfuran, 2-phenyl-2-butenal, 2-phenylethanol, 2-undecanone, 3-ethylpyridine, 3-hexanone, 3-octanol, 4-carvomenthenol, 4-ethyl guaiacol, 4-ethyl phenol, 4-methyl-2-phenyl-2-pentenal, 4'-methylacetophenone, 4-vinylphenol, 5-methyl-2-phenyl-2-hexenal, benzaldehyde, benzyl acetate, butyl alcohol, damascenone, decanal, diethyl disulfide, dimethyl sulfide, dimethyl sulfoxide, ethyl acetate, ethyl butanoate, ethyl heptanoate, ethyl hexanoate, ethyl lactate, ethyl octanoate, ethyl phenylacetate, ethyl tiglate, furfuryl propionate, geraniol, hexanal, hexanol, hexyl acetate, isoamyl acetate, isobutyric acid, limonene, linalool, methyl benzoate, methyl hexanoate, methyl nicotinate, methyl phenylacetate, methyl salicylate, myrcene, nonanal, octanal, p-cresol, phenethyl acetate, phenylacetaldehyde, propionaldehyde, propionic acid, and valeric acid. The one or more VOCs can include at least one compound selected from the group consisting of 2-pentanol, beta-ionone, ethyl benzoate, geranyl acetate, isoamyl alcohol, maltol, massoia lactone, and methyl anthranilate. The one or more VOCs can include at least 30 compounds selected from the group consisting of 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, coffee furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether. The one or more non-volatile compounds can lack at least one compound selected from the group consisting of 2(5H)-furanone, 2,3,5,6-tetramethylpyrazine, 2-ethyl-2-hydroxybutyric acid, 2-furoic acid, 2-isopropylmalic acid, 3,4-dihydroxybenzoic acid, 4-methoxycinnamic acid, 5-ethyl-4-hydroxy-2-methyl-3(2H)-furanone, adenine, arabitol, betaine, caffeic acid, cytidine, D-gluconic acid, D-glucuronic acid, fructose, galactose, glucose, glutamic acid, hydroxymethylfurfural, malic acid, mannitol, methyl-2-pyrrolyl ketone, inositol, pyruvic acid, quinic acid, sorbitol, syringic acid, tartaric acid, tryptamine, and uracil. The one or more non-volatile compounds can include at least one compound selected from the group consisting of acetovanillone, adipic acid, AMP, arginine, carnosine, cinnamic acid, citrulline, CMP, coumaric acid, cysteine, cystine, epicatechin, epicatechin gallate, GABA, glucosamine, glutamine, guanine, hesperetin, histidine, isoleucine, kynurenic acid, leucine, lysine, mannose, methionine, methyl gallate, ornithine, pantothenic acid, pipecolinic acid, piperine, polydatin, pyridoxine, quercetin, resveratrol, rutin, sinapinic acid, sorbic acid, syringaldehyde, threonine, trans-4-hydroxyproline, tryptophan, tyramine, and tyrosine. The one or more non-volatile compounds can include at least 10 compounds selected from the group consisting of 2(5H)-furanone, 2,3,5,6-tetramethylpyrazine, 2,3,5-trimethylpyrazine, 2,3-dimethylpyrazine, 2-ethyl-2-hydroxybutyric acid, 2-furoic acid, 2-isopropylmalic acid, 3,4-dihydroxybenzoic acid, 4-guanidinobutyric acid, 4-methoxycinnamic acid, 5-ethyl-4-hydroxy-2-methyl-3(2H)-furanone, acetovanillone, adenine, adipic acid, AMP, arabitol, arginine, asparagine, aspartic acid, beta-alanine, betaine, caffeic acid, caffeine, carnitine, carnosine, catechin, choline, cinnamic acid, citric acid, citrulline, CMP, coumaric acid, cysteine, cystine, cytidine, cytosine, D-gluconic acid, D-glucuronic acid, DL-hydroxystearic acid, ellagic acid, epicatechin, epicatechin gallate, fructose, fumaric acid, GABA, galactose, gallic acid, glucosamine, glucose, glutamic acid, glutamine, glycine, guanine, hesperetin, histidine, homoserine, hydroxymethylfurfural, isoleucine, kynurenic acid, lactic acid, leucine, lysine, malic acid, mannitol, mannose, methionine, methyl gallate, methyl-2-pyrrolyl ketone, inositol, ornithine, pantothenic acid, phenylalanine, pipecolinic acid, piperine, polydatin, proline, propyl gallate, pyridine, pyridoxine, pyruvic acid, quercetin, quinic acid, resveratrol, rhamnose, ribose, rutin, salicylic acid, serine, sinapinic acid, sorbic acid, sorbitol, sotolon, succinic acid, syringaldehyde, syringic acid, tartaric acid, threonine, trans-4-hydroxyproline, trans-ferulic acid, tryptamine, tryptophan, tyramine, tyrosine, uracil, valine, vanillic acid, vanillin, and xylose. The one or more non-volatile compounds can include at least 5 compounds selected from the group consisting of 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin.

The details of one or more embodiments of the invention are set forth in the description below. Other features, objects, and advantages of the invention will be apparent from the description and from the claims.

DETAILED DESCRIPTION

This document provides coffee-like products (e.g., solids and liquids) as well as methods for making coffee-like products by combining individual volatile organic compounds (VOCs) and non-volatile organic compounds, with or without other components. Compounds designated as "VOCs" herein can be measured using GCMS. Compounds designated as "non-volatile compounds" herein can be measured using LCMS. Although some compounds could be measured using either GCMS or LCMS, for the purposes of this disclosure, a compound is either a VOC or a non-volatile compound. For a compound not specifically described herein, the compound can be considered either a VOC or a non-volatile compound, based on factors such as similarity to compounds described herein and the method (GCMS or LCMS) that the ordinary artisan would select for its analysis.

Generally, these products can be called "coffee-like products" or "coffee replicas." Examples of coffee solids include beans, grounds, and granules (e.g., as used in ready-to-mix or instant coffee, for granules). Accordingly, this document provides replicas of these solids, which can be termed "coffee-like beans" or "coffee bean replicas," "coffee-like grounds" or "coffee ground replicas," or "coffee-like granules" or "coffee granule replicas," respectively. Examples of coffee liquids (e.g., solutions, suspensions, or emulsions) include coffee beverages (e.g., a ready-to-drink beverage) or coffee concentrates. Accordingly, this document provides replicas of these liquids, which can be termed "coffee-like beverages" or "coffee beverage replicas" or "coffee-like concentrates" or "coffee concentrate replicas," respectively. It will be understood that, while solid in form, coffee granule replicas are dehydrated versions of coffee beverage replicas or coffee concentrate replicas. The coffee-like products described herein can have characteristics—including taste, aroma, mouthfeel, and appearance—of traditionally generated coffees, and are meant to be consumed and enjoyed in the same manner as traditional coffees.

As used herein, the terms "traditional" and "reference" coffee refer to coffee products produced through standard coffee making processes, which include the farming, drying, and milling of coffee beans. "Traditionally-produced coffee" is coffee that was generated using standard coffee making process.

Traditional coffees are complex mixtures on a chemical level. In some aspects, this document provides coffee replicas that are less complex than a traditional coffee. It is surprising that the replicas disclosed herein, do not need to have the complexity of a traditional coffee in order to be perceived as such. It is also surprising that some compounds, which by themselves have an unpleasant taste and/or smell, can enhance the taste and/or smell of the coffee replicas disclosed herein. It is further surprising that the exclusion of some compounds found in all tested traditional coffees was not detrimental to the coffee replicas described herein. Similarly, it is surprising that some compounds that were not found in any tested traditional coffee could be beneficial to the coffee replicas described herein. It is also surprising that coffee replicas described herein containing some compounds in amounts greater than the highest measured amount in any tested traditional coffee or lower than the lowest measured amount in any tested traditional coffee are superior to replicas that contained the same compounds in amounts within the measured range of traditional coffee. Therefore, in another aspect, this document provides coffee replicas that are not mere replicas of existing products, but instead provide a similar sensory experience with a different chemical composition.

In some embodiments, a coffee replica can consist of the ingredients included in a particular list, or can have a VOC content (or non-volatile compound content) that consists of the VOCs or non-volatile compounds included in a particular list. Further, a coffee replica can consist essentially of the ingredients included in a particular list, or can have a VOC content (or non-volatile compound content) that consists essentially of the VOCs or non-volatile compounds that are included in a particular list. By "consisting essentially of" is meant that a coffee replica contains specified ingredients/VOCs/non-volatile compounds, and can contain additional ingredients/VOCs/non-volatile compounds that do not materially affect the basic and novel characteristics of the coffee.

In general, the coffee replicas include the following components, or classes of components:

a) one or more VOCs; and b) one or more non-volatile compounds.

In some cases, coffee beverage replicas or coffee concentrate replicas can include the following components, or classes of components:

a) one or more VOCs;

b) one or more non-volatile compounds; and c) water, either pure or with mineral content present to improve flavor.

In some cases, coffee bean replicas or coffee ground replicas can include the following components, or classes of components:

a) one or more VOCs;

b) one or more non-volatile compounds; and c) a solid substrate.

The VOCs can provide both aroma and flavor, including fruity, floral, green, earthy, herbaceous, roasted/burnt, sour/fermented, creamy, spice, and/or mineral aromas and flavors. The non-volatile components (and solid substrate) can provide acidity and much of the flavor, sweetness, aftertaste, physical structure, and mouthfeel perception of the coffee replicas.

In some embodiments, a coffee replica can include (a) one or more VOCs, where at least one of the one or more VOCs are not present in a corresponding reference coffee; (b) one or more VOCs, where the one or more VOCs do not include at least one VOC that is present in a corresponding reference coffee; (c) one or more non-volatile compounds, where the at least one of the one or more non-volatile compounds are not present in a corresponding reference coffee; (d) one or more non-volatile compounds, where the one or more non-volatile compounds do not include at least one non-volatile compound that is present in a corresponding reference coffee; or (e) any combination of (a), (b), (c), and (d) [(a) and (b); (a) and (c); (a) and (d); (b) and (c); (b) and (d); (c) and (d); (a), (b), and (c); (a), (b), and (d); (a), (c), and (d); (b), (c), and (d); or (a), (b), (c), and (d)]. In some embodiments, a liquid coffee replica can be characterized by (f) one or more VOCs, where the one or more VOCs are present in the coffee replica in a total amount of at least 100 mg/L. Characteristic (f) can be combined with any combination of (a)-(d) as described above.

Amounts of VOCs and non-volatile compounds as described in the Round 1 assays in the Examples are based on coffee made from 75±10 g of beans (subsequently ground), made to a total volume of 1740 mL with water.

Amounts of VOCs and non-volatile compounds as described in the Round 2 assays in the Examples are based on coffee made from 80 g of beans (ground), and 1120 g (1120 mL) of water.

It will be appreciated that any and all stereoisomers can be used when no stereochemistry is specified.

Hereinbelow, amounts of some VOCs and non-volatile compounds are expressed in mg/L, as for a liquid coffee replica. For solid coffee replicas, these same numbers can be expressed as a percent by weight of total VOCs and non-volatile compounds when a total weight of VOCs and non-volatile compounds is specified. In some cases when a total weight of VOCs and non-volatile compounds is not specified, an estimate of about 1.7 g of total VOCs and non-volatile compounds can be used, plus or minus about 10%. For example, a VOC present in an amount of 100 mg/L could also be expressed as about 5.9%±0.6% of the total VOCs and non-volatile compounds in a coffee replica (e.g., a coffee granule replica).

Volatile Organic Compounds (VOCs)

The coffee replicas described herein can, in some cases, include at least one VOC that is not present in a corresponding reference coffee. Non-limiting examples of VOCs that are not present in a corresponding reference coffee include 2,3-butanediol, 2-octanol, 2-pentanol, 2-phenylpropionaldehyde, 2-tridecanone, 3-octanone, amyl acetate, benzyl alcohol, benzyl isovalerate, beta-ionone, butyl acetate, ethyl 3-phenylpropionate, ethyl benzoate, ethyl cinnamate, ethyl isobutyrate, ethyl myristate, ethyl oleate, ethyl salicylate, ethyl valerate, gamma-decalactone, gamma-valerolactone, geranyl acetate, isoamyl alcohol, isoamyl benzoate, isoamyl butyrate, isoamyl isobutyrate, isobutyl acetate, isobutyl alcohol, maltol, massoia lactone, methional, methyl 2-methylbutyrate, methyl anthranilate, methyl cinnamate, propanol, propyl propionate, and trans,trans-2,4-decadienal. Therefore, in some embodiments, a coffee replica can include one or more (e.g., at least 2, 3, 4, 5, 10, 15, 20, 25, or 30) compounds selected from the group consisting of 2,3-butanediol, 2-octanol, 2-pentanol, 2-phenylpropionaldehyde, 2-tridecanone, 3-octanone, amyl acetate, benzyl alcohol, benzyl isovalerate, beta-ionone, butyl acetate, ethyl 3-phenylpropionate, ethyl benzoate, ethyl cinnamate, ethyl isobutyrate, ethyl myristate, ethyl oleate, ethyl salicylate, ethyl valerate, gamma-decalactone, gamma-valerolactone, geranyl acetate, isoamyl alcohol, isoamyl benzoate, isoamyl butyrate, isoamyl isobutyrate, isobutyl acetate, isobutyl alcohol, maltol, massoia lactone, methional, methyl 2-methylbutyrate, methyl anthranilate, methyl cinnamate, propanol, propyl propionate, and trans,trans-2,4-decadienal. In some embodiments, a coffee replica can include one or more (e.g., at least 2, 3, 4, 5, 6, 7, or 8) compounds selected from the group consisting of 2-pentanol, beta-ionone, ethyl benzoate, geranyl acetate, isoamyl alcohol, maltol, massoia lactone, and methyl anthranilate.

The coffee replicas described herein can, in some cases, exclude at least one VOC that is present in a corresponding reference coffee. Non-limiting examples of VOCs that are present in reference coffees include 1-heptanol, 1-octanol, 1-octen-3-ol, 2,3-diethyl-5-methylpyrazine, 2,3-diethylpyrazine, 2,3-pentadione, 2,5-dimethylphenol, 2,5-dimethylpyrazine, 2,6-dimethylpyrazine, 2-acetyl-1-methylpyrrole, 2-acetyl-5-methylfuran, 2-acetylpyridine, 2-acetylpyrrole, 2-ethyl-1-hexanol, 2-ethylfuran, 2-ethylpyrazine, 2-furfuryl acetate, 2-heptanol, 2-heptanone, 2-isopropyl-3-methoxypyrazine, 2-methoxy-4-methylphenol, 2-methoxy-4-vinylphenol, 2-methylbutyl isovalerate, 2-methylbutyraldehyde, 2-methylbutyric acid, 2-methylpyrazine, 2-nonanol, 2-nonanone, 2-octanone, 2-pentylfuran, 2-phenyl-2-butenal, 2-phenylethanol, 2-undecanone, 3-ethylpyridine, 3-hexanone, 3-octanol, 4-carvomenthenol, 4-ethyl guaiacol, 4-ethyl phenol, 4-methyl-2-phenyl-2-pentenal, 4'-methylacetophenone, 4-vinylphenol, 5-methyl-2-phenyl-2-hexenal, 5-methylfurfural, amyl alcohol, benzaldehyde, benzyl acetate, butyl alcohol, butyric acid, coffee furanone, damascenone, decanal, diethyl disulfide, diethyl succinate, difurfuryl ether, dimethyl sulfide, dimethyl sulfoxide, dimethyl trisulfide, ethyl 2-methylbutyrate, ethyl acetate, ethyl butanoate, ethyl decanoate, ethyl heptanoate, ethyl hexanoate, ethyl isovalerate, ethyl lactate, ethyl laurate, ethyl octanoate, ethyl phenylacetate, ethyl tiglate, furfural, furfuryl propionate, gamma-nonalactone, geraniol, guaiacol, hexanal, hexanol, hexyl acetate, isoamyl acetate, isobutyraldehyde, isobutyric acid, isovaleraldehyde, isovaleric acid, limonene, linalool, methyl benzoate, methyl hexanoate, methyl nicotinate, methyl phenylacetate, methyl salicylate, myrcene, nonanal, octanal, p-anisaldehyde, p-cresol, phenethyl acetate, phenylacetaldehyde, propionaldehyde, propionic acid, pyrrole, syringol, valeraldehyde, and valeric acid. Therefore, in some embodiments, a coffee replica can lack one or more (e.g., at least 2, 3, 4, 5, 10, 15, 20, 30, 40, or 50) compounds selected from the group consisting of 1-heptanol, 1-octanol, 1-octen-3-ol, 2,3-diethyl-5-methylpyrazine, 2,3-diethylpyrazine, 2,3-pentadione, 2,5-dimethylphenol, 2,5-dimethylpyrazine, 2,6-dimethylpyrazine, 2-acetyl-1-methylpyrrole, 2-acetyl-5-methylfuran, 2-acetylpyridine, 2-acetylpyrrole, 2-ethyl-1-hexanol, 2-ethylfuran, 2-ethylpyrazine, 2-furfuryl acetate, 2-heptanol, 2-heptanone, 2-isopropyl-3-methoxypyrazine, 2-methoxy-4-methylphenol, 2-methoxy-4-vinylphenol, 2-methylbutyl isovalerate, 2-methylbutyraldehyde, 2-methylbutyric acid, 2-methylpyrazine, 2-nonanol, 2-nonanone, 2-octanone, 2-pentylfuran, 2-phenyl-2-butenal, 2-phenylethanol, 2-undecanone, 3-ethylpyridine, 3-hexanone, 3-octanol, 4-carvomenthenol, 4-ethyl guaiacol, 4-ethyl phenol, 4-methyl-2-phenyl-2-pentenal, 4'-methylacetophenone, 4-vinylphenol, 5-methyl-2-phenyl-2-hexenal, 5-methylfurfural, amyl alcohol, benzaldehyde, benzyl acetate, butyl alcohol, butyric acid, coffee furanone, damascenone, decanal, diethyl disulfide, diethyl succinate, difurfuryl ether, dimethyl sulfide, dimethyl sulfoxide, dimethyl trisulfide, ethyl 2-methylbutyrate, ethyl acetate, ethyl butanoate, ethyl decanoate, ethyl heptanoate, ethyl hexanoate, ethyl isovalerate, ethyl lactate, ethyl laurate, ethyl octanoate, ethyl phenylacetate, ethyl tiglate, furfural, furfuryl propionate, gamma-nonalactone, geraniol, guaiacol, hexanal, hexanol, hexyl acetate, isoamyl acetate, isobutyraldehyde, isobutyric acid, isovaleraldehyde, isovaleric acid, limonene, linalool, methyl benzoate, methyl hexanoate, methyl nicotinate, methyl phenylacetate, methyl salicylate, myrcene, nonanal, octanal, p-anisaldehyde, p-cresol, phenethyl acetate, phenylacetaldehyde, propionaldehyde, propionic acid, pyrrole, syringol, valeraldehyde, and valeric acid. In some embodiments, a coffee replica can lack on or more compounds (e.g., at least 2, 3, 4, 5, 10, 15, 20, 30, or 40) compounds selected from the group consisting of 1-heptanol, 1-octanol, 1-octen-3-ol, 2,3-diethylpyrazine, 2,5-dimethylpyrazine, 2-acetyl-1-methylpyrrole, 2-acetylpyridine, 2-acetylpyrrole, 2-ethyl-1-hexanol, 2-ethylfuran, 2-furfuryl acetate, 2-heptanol, 2-heptanone, 2-methylbutyl isovalerate, 2-methylbutyralde-hyde, 2-methylbutyric acid, 2-nonanol, 2-nonanone, 2-oc-tanone, 2-pentylfuran, 2-phenyl-2-butenal, 2-phenylethanol, 2-undecanone, 3-ethylpyridine, 3-hexanone, 3-octanol, 4-carvomenthenol, 4-ethyl guaiacol, 4-ethyl phenol, 4-methyl-2-phenyl-2-pentenal, 4'-methylacetophenone, 4-vinylphenol, 5-methyl-2-phenyl-2-hexenal, benzalde-hyde, benzyl acetate, butyl alcohol, damascenone, decanal, diethyl disulfide, dimethyl sulfide, dimethyl sulfoxide, ethyl acetate, ethyl butanoate, ethyl heptanoate, ethyl hexanoate, ethyl lactate, ethyl octanoate, ethyl phenylacetate, ethyl tiglate, furfuryl propionate, geraniol, hexanal, hexanol, hexyl acetate, isoamyl acetate, isobutyric acid, limonene, linalool, methyl benzoate, methyl hexanoate, methyl nico-tinate, methyl phenylacetate, methyl salicylate, myrcene, nonanal, octanal, p-cresol, phenethyl acetate, phenylacetal-dehyde, propionaldehyde, propionic acid, and valeric acid.

The VOCs present in a coffee replica can include com-pounds as classified by a first set of categories, including hydrocarbons (e.g., alkanes, alkenes, terpenes, isoprenoids, or aromatic hydrocarbons), alcohols, aldehydes, ketones, acids, esters, lactones, phenols, furans, thiophenes, pyrroles, oxazoles, thiazoles, pyridines, pyrazines, amines, sulfur compounds (e.g., alkyl sulfides), and other VOCs (e.g., VOCs that do not belong to any of the above categories). In some embodiments, a coffee replica can include a hydro-carbon, an alcohol, an aldehyde, a ketone, an acid, an ester, a phenol, a furan, a thiophene, a pyrrole, a pyridine, a pyrazine, an amine, and a sulfur compound. In some embodiments, a coffee replica can further include a VOC that does not belong to any of the preceding categories. In some embodiments, a coffee replica can include at least one VOC that belongs to each of at least 3 (e.g., at least 4, at least 5, at least 5, at least 7, at least 8, at least 9, at least 10, 3 to 14, 3 to 10, 3 to 5, 5 to 14, 5 to 10, or 10 to 14) of the following categories: hydrocarbon, an alcohol, an aldehyde, a ketone, an acid, an ester, a phenol, a furan, a thiophene, a pyrrole, a pyridine, a pyrazine, an amine, and a sulfur compound.

The VOCs present in a coffee replica can include com-pounds as classified by a second set of categories, including acids, alcohols, aldehydes, amines, benzenes, esters, furans, ketones, lactones, phenols, pyrazines, pyridines, pyrroles, sugars or sugar alcohols, sulfur compounds, terpenes, or thiophenes. In some embodiments, a coffee replica can include one or more of: an acid, an alcohol, an aldehyde, an ester, a furan, a ketone, a lactone, a phenol, a pyrazine, a pyridine, a pyrrole, a sugar or sugar alcohol, a sulfur compound, a terpene, or a combination thereof. In some embodiments, a coffee replica can include an acid, an alcohol, an aldehyde, an ester, a furan, a ketone, a lactone, a phenol, a pyrazine, a pyrrole, a sugar or sugar alcohol, a sulfur compound, or a combination thereof. In some embodiments, a coffee replica can include at least one VOC that belongs to each of at least 3 (e.g., at least 4, at least 5, at least 5, at least 7, at least 8, at least 9, at least 10, at least 15, 3 to 15, 3 to 10, 3 to 5, 5 to 14, 5 to 10, 10 to 15, or 10 to 17) of the following categories: acids, alcohols, alde-hydes, amines, benzenes, esters, furans, ketones, lactones, phenols, pyrazines, pyridines, pyrroles, sugars or sugar alcohols, sulfur compounds, terpenes, or thiophenes. In some embodiments, a coffee replica can include an acid, an alcohol, an aldehyde, an ester, a furan, a ketone, a lactone, a phenol, a pyrazine, a pyrrole, a sugar or sugar alcohol, a sulfur compound.

Hydrocarbons can provide flavors and/or aromas that are important to the general character of coffee (e.g., alkanes, alkenes, terpenes, isoprenoids, or aromatic hydrocarbons). For example, terpenes and isoprenoids can contribute floral and green characteristics to coffee. Non-limiting examples of hydrocarbons that may be used in coffee replicas provided herein include beta-myrcene, styrene, toluene, and mixtures thereof. The hydrocarbon(s) can be present in any suitable amount. The hydrocarbon(s) can make up any suitable proportion of the overall VOC content. Any suitable number of hydrocarbons can be used, for example, 1 to 3, 1 to 2, at least 1, or at least 2 hydrocarbons can be used.

Terpenes can contribute floral and green characteristics to coffee. Non-limiting examples of terpenes that may be used in coffee replicas provided herein include alpha-methyl-alpha-[4-methyl-3-pentenyl]oxiranemethanol, beta-myrcene, limonene, linalool, myrcene, and mixtures thereof. In some embodiments, a coffee replica can include one or more (e.g., at least 2 or 3) terpene selected from the group consisting of limonene, linalool, and myrcene. The terpene (s) can be present in any suitable amount. In some embodi-ments, the terpene(s) can be present in an amount of about 0.01 to about 0.04 mg/L (e.g., about 0.01 to about 0.02 mg/L, about 0.02 to about 0.03 mg/L, about 0.04 to about 0.04 mg/L, about 0.01 to about 0.03 mg/L, or about 0.02 to about 0.04 mg/L). The terpene(s) can make up any suitable pro-portion of the overall VOC content. Any suitable number of terpenes can be used, for example, 1 to 3, 1 to 2, at least 1, or at least 2 terpenes can be used. In some embodiments, a coffee replica can include no terpenes.

Benzenes can provide flavors and/or aromas that are important to the general character of coffees. Non-limiting examples of benzenes that may be used in coffee replicas provided herein include styrene, toluene, and mixtures thereof. The benzene(s) can be present in any suitable amount. The benzene(s) can make up any suitable propor-tion of the overall VOC content. Any suitable number of benzenes can be used, for example, 1 to 3, 1 to 2, at least 1, or at least 2 benzenes can be used. In some embodiments, a coffee replica can include no benzenes. Alcohols can provide various flavor and/or aroma components to coffee, including banana, spice, grassiness, and oxidized characteristics. Alco-hols also can be important for adding roundness to the general aroma of coffee, as well as some weight on the palate. Non-limiting examples of alcohols that can be pres-ent in the coffee replicas provided herein include 1-heptanol, 1-octanol, 1-octen-3-ol, 2,3-butanediol, 2-ethyl-1-hexanol, 2-heptanol, 2-nonanol, 2-octanol, 2-pentanol, 2-phenyletha-nol, 3-octanol, 4-carvomenthenol, amyl alcohol, benzyl alcohol, butyl alcohol, geraniol, hexanol, isoamyl alcohol, isobutyl alcohol, propanol, and mixtures thereof. In some embodiments, a coffee replica as provided herein can include one or more (e.g., at least 2, 3, 4, 5, 10, or 15) alcohols selected from the group consisting of the group consisting of 1-heptanol, 1-octanol, 1-octen-3-ol, 2,3-bu-tanediol, 2-ethyl-1-hexanol, 2-heptanol, 2-nonanol, 2-octa-nol, 2-pentanol, 2-phenylethanol, 3-octanol, 4-carvomenthe-nol, amyl alcohol, benzyl alcohol, butyl alcohol, geraniol, hexanol, isoamyl alcohol, isobutyl alcohol, and propanol. In some embodiments, a coffee replica as provided herein can include one or more (e.g., at least 2 or 3) alcohols selected from the group consisting of 2-pentanol, amyl alcohol, and isoamyl alcohol. The alcohol(s) can be present in any suitable amount. In some embodiments, the alcohol(s) can be present in an amount of about 0.002 to about 0.8 mg/L (e.g., about 0.002 to about 0.005 mg/L, about 0.005 to about 0.01 mg/L, about 0.01 to about 0.05 mg/L, about 0.05 to about 0.1 mg/L, about 0.1 to about 0.5 mg/L, about 0.1 to about 0.8 mg/L, or about 0.5 to about 0.8 mg/L). The alcohol(s) can make up any suitable proportion of the overall VOC content. Any suitable number of alcohols can be used, for example, at least one alcohol can be used. In some embodiments, a coffee replica can include no alcohols.

Aldehydes can provide flavors and/or aromas that are important to the general character of coffee. Non-limiting examples of aldehydes that may be used in coffee replicas provided herein include, 2-methyl-butanal, 2-methylbutyr-aldehyde, 2-phenyl-2-butenal, 2-phenylpropionaldehyde, 3-furaldehyde, 3-methyl-butanal, 4-methyl-2-phenyl-2-pen-tenal, 5-methyl-2-furancarboxaldehyde, 5-methyl-2-phenyl-2-hexenal, benzaldehyde, decanal, hexanal, isobutyralde-hyde, isovaleraldehyde, nonanal, octanal, p-anisaldehyde, phenylacetaldehyde, propionaldehyde, trans,trans-2,4-deca-dienal, trans-2-nonenal, and valeraldehyde, and mixtures thereof. In some embodiments, a coffee replica as provided herein can include one or more (e.g, at least 2, 3, 4, 5, 10, or 15) aldehydes selected from the group consisting of 2-methylbutyraldehyde, 2-phenyl-2-butenal, 2-phenylpropi-onaldehyde, 4-methyl-2-phenyl-2-pentenal, 5-methyl-2-phenyl-2-hexenal, benzaldehyde, decanal, hexanal, isobu-tyraldehyde, isovaleraldehyde, nonanal, octanal, p-anisaldehyde, phenylacetaldehyde, propionaldehyde, trans,trans-2,4-decadienal, trans-2-nonenal, valeraldehyde. In some embodiments, a coffee replica as provided herein can include one or more (e.g., at least 2, 3, or 4) aldehydes selected from the group consisting of isobutyraldehyde, isovaleraldehyde, p-anisaldehyde, and valeraldehyde. The aldehyde(s) can be present in any suitable amount. In some embodiments, the aldehyde(s) can be present in an amount of about 1 to about 7 mg/L (e.g., about 1 to about 5 mg/L, about 1 to about 3 mg/L, about 3 to about 5 mg/L, or about 5 to about 7 mg/L). The aldehyde(s) can make up any suitable proportion of the overall VOC content. Any suitable number of aldehydes can be used, for example, 1 to 5, 1 to 3, 3 to 5, at least 1, at least 2, at least 3, or at least 4 aldehydes can be used. In some embodiments, a coffee replica can include no aldehydes.

Ketones can provide flavors and/or aromas that are impor-tant to the general character of coffee. Non-limiting examples of ketones that may be used in coffee replicas provided herein include 1-hydroxy-2-propanone, 2,3-bu-tanedione, 2,3-dimethyl-2-cyclopenten-1-one, 2,3-Hexane-dione, 2,3-pentadione, 2-butanone, 2-ethyl-4-hydroxy-5-methyl-3(2H)-furanone, 2-heptanone, 2-methyl-2-cyclopenten-1-one, 2-nonanone, 2-octanone, 2-tridecanone, 2-undecanone, 3-ethyl-2-hydroxy-2-cyclopenten-1-one, 3-hexanone, 3-octanone, 4-hydroxy-5-methyl-3-furanone, 4'-methylacetophenone, acetone, beta-damascenone, beta-ionone, coffee furanone, damascenone, and dihydro-2-methyl-3(2H)-furanone, and mixtures thereof. In some embodiments, a coffee replica can include one or more (e.g., at least 2, 3, 4, 5, 10, or 15) one ketones selected from the group consisting of 2,3-butanedione, 2,3-Hexanedione, 2,3-pentadione, 2-ethyl-4-hydroxy-5-methyl-3(2H)-furanone, 2-heptanone, 2-nonanone, 2-octanone, 2-tridecanone, 2-un-decanone, 3-hexanone, 3-octanone, 4-hydroxy-5-methyl-3-furanone, 4'-methylacetophenone, beta-damascenone, beta-ionone, coffee furanone, and damascenone. In some embodiments, a coffee replica can include one or more (e.g., 2, 3, 4, 5, 6, 7, or 8) ketones selected from the group consisting of 2,3-butanedione, 2,3-Hexanedione, 2,3-penta-dione, 2-ethyl-4-hydroxy-5-methyl-3(2H)-furanone, 4-hy-droxy-5-methyl-3-furanone, beta-damascenone, beta-ion-one, and coffee furanone. The ketone(s) can be present in any suitable amount. In some embodiments, the ketone(s) can be present in an amount of about 0.004 to about 160 mg/L (e.g., about 0.004 to about 0.01 mg/L, about 0.005 to about 0.01 mg/L, about 0.01 to about 0.05 mg/L, about 0.05 to about 0.1 mg/L, about 0.1 to about 0.5 mg/L, about 0.5 to about 1 mg/L, about 1 to about 5 mg/L, about 5 to about 10 mg/L, about 10 to about 50 mg/L, about 50 to about 100 mg/L, about 50 to about 150 mg/L, about 50 to about 160 mg/L, about 100 to about 160 mg/L, or about 60 to about 160 mg/L). In some embodiments, the ketone(s) can be present in an amount of at least about 53 mg/L (e.g., at least about 55 mg/L, 60 mg/L, 70 mg/L, 80 mg/L, 90 mg/L, 100 mg/L, 110 mg/L, 120 mg/L, 130 mg/L, 140 mg/L, or 150 mg/L). The ketone(s) can make up any suitable proportion of the overall VOC content. Any suitable number of ketones can be used, for example, 1 to 8, 1 to 5, 1 to 3, 3 to 8, 3 to 5, 5 to 8, at least 1 at least 2, at least 3, at least 4, or at least 5 ketones can be used. In some embodiments, a coffee replica can include no ketones.

Acids may contribute to "sour" aromas and/or flavors, which can be important to the general character of coffee. Acids that may be included in a coffee replica include, without limitation, 2-methylbutyric acid, 3-methylbutyric acid, 4-hydroxy-butanoic acid, acetic acid, butyric acid, isobutyric acid, isovaleric acid, propionic acid, and valeric acid, and mixtures thereof. In some embodiments, a coffee replica can include one or more (e.g., at least 2, 3, 4, 5, 6, or 7) acids selected from the group consisting of 2-methyl-butyric acid, 3-methylbutyric acid, butyric acid, isobutyric acid, isovaleric acid, propionic acid, and valeric acid. In some embodiments, a coffee replica can include at one or more (e.g., 2 or 3) acids selected from the group consisting of 3-methylbutyric acid, butyric acid, and isovaleric acid. The acid(s) can be present in any suitable amount. In some embodiments, the acid(s) can be present in an amount of about 3.2 to about 7 mg/L (e.g., about 3.2 to about 5 mg/L, about 4 to about 7 mg/L, about 5 to about 7 mg/L, or about 4 to about 6 mg/L). The acid(s) can make up any suitable proportion of the overall VOC content. Any suitable number of acids can be used, for example, 1 to 2, at least 1, or at least 2 acids can be used. In some embodiments, a coffee replica can include no acids.

Esters, including ethyl, methyl, and acetate esters, can contribute to the fruity and floral characteristics of a coffee. Esters that may be used in a coffee replica include, without limitation 2-furanmethanol acetate, 2-furanmethanol pro-panoate, 2-methylbutyl isovalerate, acetic acid, 2-(dimeth-ylamino)ethyl ester, acetic acid, methyl ester, acetoin acetate, amyl acetate, benzyl acetate, benzyl isovalerate, butyl acetate, delta-decalactone, delta-octalactone, diethyl succinate, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl myristate, ethyl octanoate, ethyl oleate, ethyl phenylacetate, ethyl salicylate, ethyl tiglate, ethyl valerate, furfuryl formate, gamma-decalactone, gamma-nonalactone, gamma-valerolactone, geranyl acetate, hexyl acetate, isoamyl acetate, isoamyl benzoate, isoamyl butyrate, isoamyl isobutyrate, isobutyl acetate, methyl 2-methylbutyrate, methyl anthranilate, methyl benzoate, methyl cinnamate, methyl hexanoate, methyl phenylacetate, methyl salicylate, phenethyl acetate, propyl propionate and mixtures thereof. In some embodiments, a coffee replica can include one or more (e.g., at least 2, 3, 4, 5, 10, 15, 20, 25, 30, 35, or 40) esters selected from the group consisting of 2-methylbutyl isovalerate, acetoin acetate, amyl acetate, benzyl acetate, benzyl isovalerate, butyl acetate, delta-decalactone, delta-octalactone, diethyl succinate, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl myristate, ethyl octanoate, ethyl oleate, ethyl phenylacetate, ethyl salicylate, ethyl tiglate, ethyl valerate, gamma-decalactone, gamma-nonalactone, gamma-valerolactone, geranyl acetate, hexyl acetate, isoamyl acetate, isoamyl benzoate, isoamyl butyrate, isoamyl isobutyrate, isobutyl acetate, methyl 2-methylbutyrate, methyl anthranilate, methyl benzoate, methyl cinnamate, methyl hexanoate, methyl phenylacetate, methyl salicylate, phenethyl acetate, and propyl propionate. In some embodiments, a coffee replica can include one or more (e.g., at least 2, 3, 4, 5, 7, 9, 10, 11, or 13) esters selected from the group consisting of acetoin acetate, delta-decalactone, delta-octalactone, diethyl succinate, ethyl 2-methylbutyrate, ethyl benzoate, ethyl butyrate, ethyl decanoate, ethyl isovalerate, ethyl laurate, gamma-nonalactone, geranyl acetate, and methyl anthranilate. The ester(s) can be present in any suitable amount. In some embodiments, the ester(s) can be present in an amount of about 0.001 to about 450 mg/L (e.g., about 0.001 to about 0.005 mg/L, about 0.005 to about 0.01 mg/L, about 0.01 to about 0.05 mg/L, about 0.05 to about 0.1 mg/L, about 0.1 to about 0.5 mg/L, about 0.5 to about 1 mg/L, about 1 to about 5 mg/L, about 5 to about 10 mg/L, about 10 to about 50 mg/L, about 50 to about 100 mg/L, about 100 to about 450 mg/L, about 100 to about 300 mg/L, or about 200 to about 400 mg/L). In some embodiments, the ester(s) can be present in an amount of at least about 0.6 mg/L (e.g., at least about 0.7 mg/L, 0.8 mg/L, 0.9 mg/L, 1 mg/L, 2 mg/L, 3 mg/L, 4 mg/L, 5 mg/L, 10 mg/L, 20 mg/L, 30 mg/L, 40 mg/L, 50 mg/L, 75 mg/L, 100 mg/L, 150 mg/L, 200 mg/L, 250 mg/L, 300 mg/L, 350 mg/L, or 400 mg/L). The ester(s) can make up any suitable proportion of the overall VOC content. Any suitable number of esters can be used, for example, 1 to 5, 1 to 3, 3 to 5, at least 1, at least 2, at least 3, or at least 4 esters can be used. In some embodiments, a coffee replica can include no esters.

Lactones can provide flavors and/or aromas that are important to the general character of coffee. Non-limiting examples of lactones that may be used in coffee replicas provided herein include 4,5-dimethyl-3-hydroxy-2,5-dihydro-furan-2-one, gamma decalactone, massoia lactone, sotolone, and mixtures thereof. In some embodiments, a coffee replica can include one or more (e.g., 2 or 3) lactones selected from the group consisting of gamma decalactone, massoia lactone, and sotolone. The lactone(s) can be present in any suitable amount. In some embodiments, the lactone(s) can be present in an amount of about 25 to about 50 mg/L (e.g., about 25 to about 35 mg/L, about 35 to about 45 mg/L, about 30 to about 40 mg/L, or about 40 to about 50 mg/L). The lactone(s) can make up any suitable proportion of the overall VOC content. Any suitable number of lactones can be used, for example 1 to 3, or at least 2 lactones can be used. In some embodiments, a coffee replica can include no lactones.

Phenols can provide flavors and/or aromas that are important to the general character of coffee, for example, phenols can contribute earthy characteristics. Non-limiting examples of phenols that may be used in coffee replicas provided herein include 1-(2-hydroxy-5-methylphenyl)-ethanone, 2,5-dimethylphenol, 2-methoxy-4-methylphenol, 2-methoxy-4-vinylphenol, 2-methoxy-phenol, 2-methylphenol, 4-ethyl guaiacol, 4-ethyl phenol, 4-ethyl-2-methoxy-phenol, 4-vinylphenol, eugenol, guaiacol, isoeugenol, p-cresol, phenol, syringol (2,6-dimethoxyphenol), vanillin erythro and/or threo-butan-2,3-diol acetal, vanillyl ethyl ether, and mixtures thereof. In some embodiments, a coffee replica can include one or more (e.g., at least 2, 3, 4, 5, 7, 9, 10, 11, or 13) phenols selected from the group consisting of 2,5-dimethylphenol, 2-methoxy-4-methylphenol, 2-methoxy-4-vinylphenol, 4-ethyl guaiacol, 4-ethyl phenol, 4-vinylphenol, eugenol, guaiacol, isoeugenol, p-cresol, syringol, vanillin erythro and/or threo-butan-2,3-diol acetal, and vanillyl ethyl ether. In some embodiments, a coffee replica can include one or more (e.g., 2, 3, 4, 5, 6, 7, 8, 9, or 10) phenols selected from the group consisting of 2,5-dimethylphenol, 2-methoxy-4-methylphenol, 2-methoxy-4-vinylphenol, 4-ethylguaiacol, eugenol, guaiacol, isoeugenol, syringol, vanillin erythro and/or threo-butan-2,3-diol acetal, and vanillyl ethyl ether. The phenol(s) can be present in any suitable amount. In some embodiments, the phenol(s) can be present in an amount of about 0.3 to about 145 mg/L (e.g., about 0.3 to about 0.5 mg/L, about 0.5 to about 1 mg/L, about 1 to about 5 mg/L, about 5 to about 10 mg/L, about 10 to about 50 mg/L, about 50 to about 100 mg/L, about 50 to about 145 mg/L, or about 100 to about 145 mg/L). In some embodiments, the phenol(s) can be present in an amount of at least about 4.6 mg/L (e.g., at least about 5 mg/L, 10 mg/L, 20 mg/L, 30 mg/L, 40 mg/L, 50 mg/L, 60 mg/L, 70 mg/L, 80 mg/L, 90 mg/L, 100 mg/L, 110 mg/L, 120 mg/L, 130 mg/L, or 140 mg/L). The phenol (s) can make up any suitable proportion of the overall VOC content. Any suitable number of phenols can be used, for example, 1 to 6, 1 to 5, 1 to 3, 3 to 6, 3 to 5, at least 1, at least 2, at least 3, at least 4, or at least 6 phenols can be used. In some embodiments, a coffee replica can include no phenols.

Furans can provide flavors and/or aromas that are important to the general character of coffee. Non-limiting examples of furans that may be used in coffee replicas provided herein include 1-(2-furanyl)-ethanone, 2-(2-furanylmethyl)-5-methyl-furan, 2-(2-propenyl)-furan, 2-(methoxymethyl)-furan, 2,2'-methylenebis-furan, 2,5-dimethyl-furan, 2-[(methylthio)methyl]-furan, 2-acetyl-5-methylfuran, 2-ethylfuran, 2-furfuryl acetate, 2-furfuryl furan, 2-pentylfuran, 2-vinylfuran, 3-furanmethanol, 3-methyl-furan, 5-methylfurfural, difurfuryl ether, furan, furaneol, furfural, furfuryl alcohol, furfuryl propionate, and mixtures thereof. In some embodiments, a coffee replica can include one or more (e.g., at least 2, 3, 4, 5, 6, 7, 8, 9, or 10) furans selected from the group consisting of 2-acetyl-5-methylfuran, 2-ethylfuran, 2-furfuryl acetate, 2-pentylfuran, 5-methylfurfural, difurfuryl ether, furaneol, furfural, furfuryl alcohol, furfuryl propionate. In some embodiments, a coffee replica can include one or more (e.g., at least 2, 3, 4, 5, or 6) furan selected from the group consisting of 2-acetyl-5-methylfuran, 5-methylfurfural, difurfuryl ether, furaneol, furfural, and furfuryl alcohol. The furan(s) can be present in any suitable amount. In some embodiments, the furan(s) can be present in an amount of about 4 to about 18 mg/L (e.g., about 4 to about 10 mg/L, about 5 to about 10 mg/L, about 10 to about 15 mg/L, about 5 to about 15 mg/L, or about 10 to about 18 mg/L). The furan(s) can make up any suitable proportion of the overall VOC content. Any suitable number of furans can be used, for example, 1 to 12, 1 to 10, 1 to 5, 1 to 3, 3 to 12, 3 to 10, 3 to 5, 5 to 12, 5 to 10, 10 to 12, at least 1, at least 2, at least 3, at least 4, at least 5, at least 6, at least 7, at least 8, at least 9, or at least 10 furans can be used. In some embodiments, a coffee replica can include no furans.

Thiophenes can provide flavors and/or aromas that are important to the general character of coffee. A non-limiting examples of a thiophene that may be used in coffee replicas provided herein is thiophene. The thiophene(s) can be present in any suitable amount. The thiophene(s) can make up any suitable proportion of the overall VOC content. Any suitable number of thiophenes can be used, for example, at least one thiophene can be used. In some embodiments, a coffee replica can include no thiophenes.

Pyrroles can provide flavors and/or aromas that are important to the general character of coffee. Non-limiting examples of pyrroles that may be used in coffee replicas provided herein include 1-(1H-pyrrol-2-yl)-ethanone, 1-(2-furanylmethyl)-1H-pyrrole, 1-ethyl-1H-pyrrole, 1-methyl-1H-pyrrole, 1-methyl-1H-pyrrole-2-carboxaldehyde, 2-acetyl-1-methylpyrrole, 2-acetylpyrrole, indole, pyrrole, and mixtures thereof. In some embodiments, a coffee replica can include one or more (e.g., 2 or 3) pyrroles selected from the group consisting of 2-acetyl-1-methylpyrrole, 2-acetylpyrrole, and pyrrole. In some embodiments, a coffee replica can include pyrrole. The pyrrole(s) can be present in any suitable amount. In some embodiments, the pyrrole(s) can be present in an amount of about 0.0001 to about 3 mg/L (e.g., about 0.0001 to about 0.0005 mg/L, about 0.0005 to about 0.001 mg/L, about 0.001 to about 0.01 mg/L, about 0.01 to about 0.05 mg/L, about 0.05 to about 0.1 mg/L, about 0.1 to about 0.5 mg/L, about 0.5 to about 1 mg/L, about 1 to about 2 mg/L, about 2 to about 3 mg/L, or about 1 to about 3 mg/L). The pyrrole(s) can make up any suitable proportion of the overall VOC content. Any suitable number of pyrroles can be used, for example, 1 to 6, 1 to 5, 1 to 3, 3 to 6, 3 to 5, at least 1, at least 2, at least 3, at least 4, or at least 5 pyrroles can be used. In some embodiments, a coffee replica can include no pyrroles.

Oxazoles can provide flavors and/or aromas that are important to the general character of coffee. The oxazole(s) can be present in any suitable amount. The oxazole(s) can make up any suitable proportion of the overall VOC content. Any suitable number of oxazoles can be used. In some embodiments, a coffee replica can include no oxazoles.

Thiazoles can provide flavors and/or aromas that are important to the general character of coffee. The thiazole(s) can be present in any suitable amount. The thiazole(s) can make up any suitable proportion of the overall VOC content. Any suitable number of thiazoles can be used. In some embodiments, a coffee replica can include no thiazoles.

Pyridines can provide flavors and/or aromas that are important to the general character of coffee. Non-limiting examples of pyridines that may be used in coffee replicas provided herein include 1-methyl-1,2,3,6-tetrahydropyridine, 1-methyl-piperidine, 2-acetylpyridine, 2-methyl-pyridine, 3-ethylpyridine, 3-ethyl-pyridine, 3-methyl-pyridine, 3-propyl-pyridine, 3-pyridinol, methyl nicotinate, and mixtures thereof. In some embodiments, a coffee replica can include at least one (e.g., 2 or 3) pyridines selected from the group consisting of 2-acetylpyridine, 3-ethylpyridine, and methyl nicotinate. In some embodiments, a coffee replica can include no 1-methyl-1,2,3,6-tetrahydropyridine. The pyridine(s) can be present in any suitable amount. In some embodiments, the pyridine(s) can be present in an amount of about 0.08 to about 0.2 mg/L (e.g., about 0.08 to about 0.1 mg/L or about 0.1 to about 0.2 mg/L). The pyridine(s) can make up any suitable proportion of the overall VOC content. Any suitable number of pyridines can be used, for example, 1 to 8, 1 to 5, 1 to 3, 3 to 8, 3 to 5, 5 to 8, at least 1, at least 2, at least 3, at least 4, or at least 6 pyridines can be used. In some embodiments a coffee replica can include no pyridines.

Pyrazines can provide flavors and/or aromas that are important to the general character of coffee. Non-limiting examples of pyrazines that may be used in coffee replicas provided herein include 2-(n-propyl)-pyrazine, 2,3-diethyl-5-methylpyrazine, 2,3-diethylpyrazine, 2,5-dimethylpyrazine, 2,5-dimethyl-pyrazine, 2,6-diethyl-pyrazine, 2,6-dimethylpyrazine, 2,6-dimethyl-pyrazine, 2-ethoxy-3-methylpyrazine, 2-ethyl-3-methyl-pyrazine, 2-ethyl-6-methyl-pyrazine, 2-ethylpyrazine, 2-isobutyl-3-methoxypyrazine (IBMP), 2-isobutyl-3-methyl pyrazine, 2-isopropyl-3-methoxypyrazine, 2-methylpyrazine, 3,5-diethyl-2-methyl-pyrazine, 3-ethyl-2,5-dimethyl-pyrazine, ethyl-pyrazine, isopropenyl pyrazine, methyl-pyrazine, pyrazine, and mixtures thereof. In some embodiments, a coffee replica can include one or more (e.g., at least 2, 3, 4, 5, 7, 9, or 11) pyrazines selected from the group consisting of 2,3-diethyl-5-methylpyrazine, 2,3-diethylpyrazine, 2,5-dimethylpyrazine, 2,6-dimethylpyrazine, 2-ethoxy-3-methylpyrazine, 2-ethylpyrazine, 2-isobutyl-3-methoxypyrazine (IBMP), 2-isobutyl-3-methyl pyrazine, 2-isopropyl-3-methoxypyrazine, 2-methylpyrazine, and isopropenyl pyrazine. In some embodiments, a coffee replica can include one or more (e.g., at least 2, 3, 4, 5, 6, 7, 8, or 9) pyrazine selected from the group consisting of 2,3-diethyl-5-methylpyrazine, 2,6-dimethylpyrazine, 2-ethoxy-3-methylpyrazine, 2-ethylpyrazine, 2-isobutyl-3-methoxypyrazine (IBMP), 2-isobutyl-3-methyl pyrazine, 2-isopropyl-3-methoxypyrazine, 2-methylpyrazine, and isopropenyl pyrazine. The pyrazine(s) can be present in any suitable amount. The pyrazine(s) can make up any suitable proportion of the overall VOC content. In some embodiments, the pyrazine(s) can be present in an amount of about 2 to about 22 mg/L (e.g., about 2 to about 5 mg/L, about 5 to about 10 mg/L, about 10 to about 20 mg/L, about 10 to about 22 mg/L, about 10 to about 15 mg/L, about 15 to about 20 mg/L, or about 15 to about 22 mg/L). Any suitable number of pyrazines can be used, for example, 1 to 12, 1 to 10, 1 to 5, 1 to 3, 3 to 12, 3 to 10, 3 to 5, 5 to 12, 5 to 10, 10 to 12, at least 1, at least 2, at least 3, at least 4, at least 5, at least 6, at least 7, at least 8, at least 9, or at least 10 pyrazines can be used. In some embodiments, coffee replicas as described herein can have a greater amount (e.g., in a coffee replica beverage, in mg/L) (e.g., at least 1.5-fold, at least 2-fold, at least 2.5-fold, at least 3-fold, at least 4-fold, at least 5-fold, at least 8-fold, at least 10-fold, at least 15-fold, or at least 20-fold) of pyrazines than a corresponding traditional coffee product. In some embodiments, a coffee replica can include no pyrazines.

Amines can provide flavors and/or aromas that are important to the general character of coffee. Non-limiting examples of amines that may be used in coffee replicas provided herein include 2-amino-1-naphthalenol, 2-methoxy-benzenamine, 5-amino-1-naphthol, N,N-dimethyl-ethanamine, and N,N-dimethyl-methylamine, and mixtures thereof. The amine(s) can be present in any suitable amount. The amine(s) can make up any suitable proportion of the overall VOC content. Any suitable number of amines can be used, for example, 1 to 2, at least 1, or at least 2 amines can be used. In some embodiments, a coffee replica can include no amines.

Sulfur compounds (e.g., alkyl sulfides) can provide flavors and/or aromas that are important to the general character of coffee. Non-limiting examples of sulfur compounds that may be used in coffee replicas provided are diethyl disulfide, dimethyl disulfide, dimethyl sulfide, dimethyl sulfoxide, dimethyl trisulfide, methanethiol, and methional, and mixtures thereof. In some embodiments, a coffee replica can include one or more (e.g., at least 2, 3, 4, 5, or 6) sulfur compounds selected from the group consisting of diethyl disulfide, dimethyl sulfide, dimethyl sulfoxide, dimethyl trisulfide, methanethiol, and methional. In some embodiments, a coffee replica can include one or both of dimethyl trisulfide and methanethiol. The sulfur compound(s) can be present in any suitable amount. In some embodiments, the sulfur compound(s) can be present in an amount of about 0.0000007 to about 0.03 mg/L (e.g., about 0.0000007 to about 0.000001 mg/L, about 0.000001 to about 0.000005 mg/L, about 0.000005 to about 0.00001 mg/L, about 0.00001 to about 0.00005 mg/L, about 0.00005 to about 0.0001 mg/L, about 0.0001 to about 0.0005 mg/L, about 0.0005 to about 0.001 mg/L, about 0.001 to about 0.005 mg/L, about 0.005 to about 0.01 mg/L, or about 0.01 to about 0.03 mg/L). The sulfur compound(s) can make up any suitable proportion of the overall VOC content. Any suitable number of sulfur compounds can be used, for example, at least 1 sulfur compound can be used. In some embodiments, a coffee replica can include no sulfur compounds.

Sugars and sugar alcohols can provide flavors and/or aromas that are important to the general character of coffee. Non-limiting examples of a sugars or sugar alcohols that may be used in coffee replicas provided is are ethyl maltol, maltol, and mixtures thereof. In some embodiments, a coffee replica can include one or both of ethyl maltol and maltol. The sugar or sugar alcohol(s) can be present in any suitable amount. In some embodiments, the sugar or sugar alcohol(s) can be present in an amount of about 85 to about 170 mg/L (e.g., about 85 to about 100 mg/L, about 100 to about 150 mg/L, or about 100 to about 170 mg/L). The sugar or sugar alcohol(s) can make up any suitable proportion of the overall VOC content. Any suitable number of sugar or sugar alcohols can be used, for example, at least 1 sugar or sugar alcohol can be used. In some embodiments, a coffee replica can include no sugar or sugar alcohols.

Other VOCs not belonging to the classes above can provide flavors and/or aromas that are important to the general character of coffee. A non-limiting example of an other VOCs that may be used in coffee replicas provided herein is 2,7-dimethyl-oxepine. The other VOC(s) can be present in any suitable amount. The other VOC(s) can make up any suitable proportion of the overall VOC content. Any suitable number of other VOCs can be used, for example, at least 1 other VOC can be used.

In some cases, the total amount (e.g., in mg/L of a coffee replica beverage) of VOCs in a coffee replica can be greater than the total amount of VOCs in a reference coffee.

Further, the amount of any particular VOC in a coffee replica may be different than the amount of that VOC in a corresponding reference coffee. In some cases, the amount of a VOC in a coffee replica can be 75% or less (e.g., 70% or less, 60% or less, 50% or less, 40% or less, 30% or less, 20% or less, or 10% or less), by concentration or percent mass, than the amount of the same VOC in a corresponding reference coffee. In some cases, the amount of a VOC in a coffee replica can be 125% or more (e.g., 150% or more, 200% or more, or 300% or more), by concentration or percent mass, than the amount of the same VOC in a corresponding reference coffee.

In some embodiments, VOCs can be placed in various groupings, and a coffee replica can include certain VOCs according to their groupings.

In certain cases, for example, "Group A" can include 1-heptanol, 1-(1H-pyrrol-2-yl)-ethanone, 1-(2-furanyl)-ethanone, 1-(2-furanylmethyl)-1H-pyrrole, 1-(2-hydroxy-5-methylphenyl)-ethanone, 1-ethyl-1H-pyrrole, 1-hydroxy-2-propanone, 1-methyl-1,2,3,6-tetrahydropyridine, 1-methyl-1H-pyrrole, 1-methyl-1H-pyrrole-2-carboxaldehyde, 1-methyl-piperidine, 1-octanol, 1-octen-3-ol, 2-(2-furanyl-methyl)-5-methyl-furan, 2-(2-propenyl)-furan, 2-(methoxymethyl)-furan, 2-(n-propyl)-pyrazine, 2,2'-methylenebis-furan, 2,3-butanediol, 2,3-butanedione, 2,3-diethyl-5-methylpyrazine, 2,3-diethylpyrazine, 2,3-dimethyl-2-cyclopenten-1-one, 2,3-dimethylpyrazine, 2,3-Hexanedione, 2,3-pentadione, 2,5-dimethyl-furan, 2,5-dimethylphenol, 2,5-dimethylpyrazine, 2,6-diethyl-pyrazine, 2,6-dimethylpyrazine, 2,7-dimethyl-oxepine, 2-[(methylthio)methyl]-furan, 2-acetyl-1-methylpyrrole, 2-acetyl-5-methylfuran, 2-acetylpyridine, 2-acetylpyrrole, 2-amino-1-naphthalenol, 2-butanone, 2-ethoxy-3-meth-ylpyrazine, 2-ethyl-1-hexanol, 2-ethyl-3-methyl-pyrazine, 2-ethyl-4-hydroxy-5-methyl-3(2H)-furanone, 2-ethyl-6-methyl-pyrazine, 2-ethylfuran, 2-ethylpyrazine, 2-furan-methanol acetate, 2-furanmethanol propanoate, 2-furfuryl acetate, 2-heptanol, 2-heptanone, 2-isobutyl-3-methoxy-pyrazine (IBMIP), 2-isobutyl-3-methyl pyrazine, 2-isopro-pyl-3-methoxypyrazine, 2-methoxy-4-methylphenol, 2-methoxy-4-vinylphenol, 2-methoxy-benzenamine, 2-methoxy-phenol, 2-methyl-2-cyclopenten-1-one, 2-methyl-butanal, 2-methylbutyl isovalerate, 2-methylbu-tyraldehyde, 2-methylbutyric acid, 2-methyl-furan, 2-methyl-phenol, 2-methylpyrazine, 2-methylpyrazine, 2-methyl-pyridine, 2-nonanol, 2-nonanone, 2-octanol, 2-oc-tanone, 2-pentanol, 2-pentylfuran, 2-phenyl-2-butenal, 2-phenylethanol, 2-phenylpropionaldehyde, 2-tridecanone, 2-undecanone, 2-vinylfuran, 3,5-diethyl-2-methyl-pyrazine, 3-ethyl-2,5-dimethyl-pyrazine, 3-ethyl-2-hydroxy-2-cyclo-penten-1-one, 3-ethylpyridine, 3-ethyl-pyridine, 3-furalde-hyde, 3-furanmethanol, 3-hexanone, 3-methyl-butanal, 3-methylbutyric acid, 3-methyl-furan, 3-methyl-pyridine, 3-octanol, 3-octanone, 3-propyl-pyridine, 3-pyridinol, 4,5-dimethyl-3-hydroxy-2,5-dihydro-furan-2-one, 4-carvomen-thenol, 4-ethyl guaiacol, 4-ethyl phenol, 4-ethyl-2-methoxy-phenol, 4-ethylguaiacol, 4-hydroxy-5-methyl-3-furanone, 4-hydroxy-butanoic acid, 4-methyl-2-phenyl-2-pentenal, 4'-methylacetophenone, 4-vinylphenol, 5-amino-1-naph-thol, 5-methyl-2-furancarboxaldehyde, 5-methyl-2-phenyl-2-hexenal, 5-methylfurfural, acetic acid, acetic acid, 2-(di-methylamino)ethyl ester, acetic acid, methyl ester, acetoin acetate, acetone, alpha-methyl-alpha-[4-methyl-3-pentenyl] oxiranemethanol, amyl acetate, amyl alcohol, benzaldehyde, benzyl acetate, benzyl alcohol, benzyl isovalerate, beta-damascenone, beta-ionone, beta-myrcene, butyl acetate, butyl alcohol, butyric acid, coffee furanone, damascenone, decanal, delta-decalactone, delta-octalactone, diethyl disul-fide, diethyl succinate, difurfuryl ether, dihydro-2-methyl-3 (2H)-furanone, dimethyl disulfide, dimethyl sulfide, dim-ethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobu-tyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, ethyl-pyrazine, eugenol, furan, furaneol, furfural, furfuryl alcohol, furfuryl formate, furfuryl propionate, gamma deca-lactone, gamma-decalactone, gamma-nonalactone, gamma-valerolactone, geraniol, geranyl acetate, guaiacol, hexanal, hexanol, hexyl acetate, indole, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, methyl-pyrazine, myrcene, N,N-dimethyl-ethanamine, N,N-dimethyl-methylamine, nonanal, octanal, p-anisaldehyde, p-cresol, phenethyl acetate, phenol, phenylacetaldehyde, propanol, propionaldehyde, propionic acid, propyl propionate, pyrazine, pyridine, pyrrole, sotolone, styrene, syringol, thiophene, toluene, trans,trans-2,4-decadienal, trans-2-nonenal, valeraldehyde, valeric acid, vanillin erythro and/or threo-butan-2,3-diol acetal, and vanillyl ethyl ether. Therefore, in some embodiments, a coffee replica can include at least 20 (e.g., at least 25, 30, 35, 40, 45, or 50) compounds from Group A.

In some cases, "Group B" can include 1-heptanol, 1-octanol, 1-octen-3-ol, 2,3-butanediol, 2,3-butanedione, 2,3-diethyl-5-methylpyrazine, 2,3-diethylpyrazine, 2,3-Hexanedione, 2,3-pentadione, 2,5-dimethylphenol, 2,5-dimethylpyrazine, 2,6-dimethylpyrazine, 2-acetyl-1-methylpyrrole, 2-acetyl-5-methylfuran, 2-acetylpyridine, 2-acetylpyrrole, 2-ethoxy-3-methylpyrazine, 2-ethyl-1-hexanol, 2-ethyl-4-hydroxy-5-methyl-3(2H)-furanone, 2-ethylfuran, 2-ethylpyrazine, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylbutyl isovalerate, 2-methylbutyraldehyde, 2-methylbutyric acid, 2-methylpyrazine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 3-ethylpyridine, 3-hexanone, 3-methylbutyric acid, 3-octanol, 3-octanone, 4-carvomenthenol, 4-ethyl guaiacol, 4-ethyl phenol, 4-ethylguaiacol, 4-hydroxy-5-methyl-3-furanone, 4-methyl-2-phenyl-2-pentenal, 4'-methylacetophenone, 4-vinylphenol, 5-methyl-2-phenyl-2-hexenal, 5-methylfurfural, acetoin acetate, amyl acetate, amyl alcohol, benzaldehyde, benzyl acetate, benzyl alcohol, benzyl isovalerate, beta-damascenone, beta-ionone, butyl acetate, butyl alcohol, butyric acid, coffee furanone, damascenone, decanal, delta-decalactone, delta-octalactone, diethyl disulfide, diethyl succinate, difurfuryl ether, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, eugenol, furaneol, furfural, furfuryl alcohol, furfuryl propionate, gamma decalactone, gamma-decalactone, gamma-nonalactone, gamma-valerolactone, geraniol, geranyl acetate, guaiacol, hexanal, hexanol, hexyl acetate, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, myrcene, nonanal, octanal, p-anisaldehyde, p-cresol, phenethyl acetate, phenylacetaldehyde, propanol, propionaldehyde, propionic acid, propyl propionate, pyrrole, sotolone, syringol, trans,trans-2,4-decadienal, trans-2-nonenal, valeraldehyde, valeric acid, vanillin erythro and/or threo-butan-2,3-diol acetal, and vanillyl ethyl ether. Therefore, in some embodiments, a coffee replica can include at least 20 (e.g., at least 25, 30, 35, 40, 45, or 50) compounds from Group B.

In some cases, "Group C" can include 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, coffee furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether. Therefore, some embodiments, a coffee replica can include at least 20 (e.g., at least 25, 30, 35, or 40) compounds from Group C. In some embodiments, a coffee replica can include the compounds in Group C.

A coffee replica can include any appropriate number of VOCs. For example, a coffee replica can include 1 to 100 (e.g., at least 5, at least 10, at least 20, at least 30, at least 40, at least 50, 1 to 90, 1 to 80, 1 to 70, 1 to 60, 1 to 50, 1 to 40, 1 to 30, 1 to 20, 1 to 10, 1 to 5, 5 to 100, 5 to 90, 5 to 80, 5 to 70, 5 to 60, 5 to 40, 5 to 30, 5 to 20, 5 to 10, 10 to 100, 10 to 90, 10 to 90, 10 to 70, 10 to 60, 10 to 50, 10 to 40, 10 to 30, 10 to 20, 20 to 100, 20 to 90, 20 to 80, 20 to 70, 20 to 60, 20 to 50, 20 to 40, 20 to 30, 30 to 100, 30 to 90, 30 to 80, 30 to 70, 30 to 60, 30 to 50, 30 to 40, 40 to 100, 40 to 90, 40 to 80, 40 to 70, 40 to 60, 40 to 50, 50 to 100, 50 to 90, 50 to 80, 50 to 70, or 50 to 60) VOCs. In some cases, the number of VOCs in a coffee replica can be less than the number of VOCs in a single reference coffee.

In some cases, the overall population of VOCs in a coffee can have less than 95% identity to the VOCs in a corresponding reference coffee (e.g., from a single region, in a single variety, cultivar, species of plant (e.g., *C. arabica* or *C. robusta*), batch conditions (e.g., a degree of roast and/or roast conditions), or packaging unit (e.g., a bag)). For example, the VOCs in a coffee replica can have less than 95%, less than 90%, less than 85%, less than 80%, less than 70%, less than 60%, less than 50%, or less than 40% identity to the population of VOCs in a corresponding reference coffee. Some coffee replicas may contain at least 10 (e.g., at least 15, at least 20, at least 25, at least 30, at least 35, at least 40, at least 45, or at least 50) VOCs that are not found in a single reference coffee. Moreover, some coffee replicas may contain no more than 55 (e.g., no more than 54, 53, 52, 51, 50, 45, 40, 35, 30, 25, 20, 15, or 10) VOCs that are present in a single reference coffee. For example, in some embodiments, a coffee replica can have at least n VOCs and wherein less than n (e.g., n−1, n−2, n−3, n−4, n−5, n−6, n−7, n−8, n−9, n−10, n−15, n−20, and the like, as applicable) of the VOCs are found in a single reference coffee; in some embodiments, n can be equal to 5, 6, 7, 8, 9, 10, 11, 12, 13, 14, 15, 16, 17, 18, 19, 20, 25, 30, 35, 40, 41, 42, 43, 44, 45, 50, or 55.

In some embodiments, the amount of a particular VOC in a coffee replica can be an amount, based on concentration or percent composition that is within a range 30% higher and lower than the amount disclosed for that VOC. For example, a VOC can be present in a coffee replica in an amount that is 70 to 90%, 80 to 100%, 90 to 110%, 100 to 120%, 110 to 130%, 70 to 100%, 80 to 110%, 90 to 120%, or 100 to 130% of an amount for that VOC as disclosed herein.

The one or more VOCs in a coffee replica can include 1-heptanol. In some embodiments, the 1-heptanol can be present in an amount of about 0.0004 mg/L to about 0.0009 mg/L (e.g., about 0.0004 to about 0.0005 mg/L, about 0.0005 to about 0.0006 mg/L, about 0.0006 to about 0.0007 mg/L, about 0.0007 to about 0.0008 mg/L, or about 0.0008 to about 0.0009 mg/L). In some embodiments, a coffee replica can include no 1-heptanol.

The one or more VOCs in a coffee replica can include 1-octanol. In some embodiments, the 1-octanol can be present in an amount of about 0.0003 mg/L to about 0.0006 mg/L (e.g., about 0.0003 to about 0.0004 mg/L, about 0.0004 to about 0.0005 mg/L, or about 0.0005 to about 0.0006 mg/L). In some embodiments, a coffee replica can include no 1-octanol.

The one or more VOCs in a coffee replica can include 1-octen-3-ol. In some embodiments, the 1-octen-3-ol can be present in an amount of about 0.001 mg/L to about 0.004 mg/L (e.g., about 0.001 to about 0.002 mg/L, about 0.002 to about 0.003 mg/L, or about 0.003 to about 0.004 mg/L). In some embodiments, a coffee replica can include no 1-octen-3-ol.

The one or more VOCs in a coffee replica can include 2,3-diethyl-5-methylpyrazine. In some embodiments, the 2,3-diethyl-5-methylpyrazine can be present in an amount of about 0.001 mg/L to about 0.02 mg/L (e.g., about 0.001 to about 0.005 mg/L, about 0.005 to about 0.01 mg/L, about 0.01 to about 0.0125 mg/L, about 0.01 to about 0.02 mg/L, about 0.0125 to about 0.015 mg/L, about 0.015 to about 0.0175 mg/L, or about 0.0175 to about 0.02 mg/L). In some embodiments, the 2,3-diethyl-5-methylpyrazine can be present in an amount of less than about 0.0065 mg/L (e.g., less than about 0.006 mg/L, 0.005 mg/L, 0.004 mg/L, 0.003 mg/L, or 0.002 mg/L). In some embodiments, a coffee replica can include no 2,3-diethyl-5-methylpyrazine.

The one or more VOCs in a coffee replica can include 2,3-diethylpyrazine. In some embodiments, the 2,3-diethylpyrazine can be present in an amount of about 0.001 mg/L to about 0.002 mg/L (e.g., about 0.001 to about 0.0012 mg/L, about 0.0012 to about 0.0014 mg/L, about 0.0014 to about 0.0016 mg/L, about 0.0016 to about 0.0018 mg/L, or about 0.0018 to about 0.002 mg/L). In some embodiments, a coffee replica can include no 2,3-diethylpyrazine.

The one or more VOCs in a coffee replica can include 2,3-pentadione. In some embodiments, the 2,3-pentadione can be present in an amount of about 0.7 mg/L to about 1.7 mg/L (e.g., about 0.7 to about 0.9 mg/L, about 0.9 to about 1.1 mg/L, about 1.1 to about 1.3 mg/L, about 1.3 to about 1.5 mg/L, or about 1.5 to about 1.7 mg/L). In some embodiments, a coffee replica can include no 2,3-pentadione.

The one or more VOCs in a coffee replica can include 2,5-dimethylphenol. In some embodiments, the 2,5-dimethylphenol can be present in an amount of about 0.001 mg/L to about 0.01 mg/L (e.g., about 0.001 to about 0.0025 mg/L, about 0.0025 to about 0.005 mg/L, about 0.005 to about 0.0075 mg/L, or about 0.0075 to about 0.01 mg/L). In some embodiments, the 2,5-dimethylphenol can be present in an amount of at least about 0.004 mg/L (e.g., at least about 0.005 mg/L, 0.006 mg/L, 0.007 mg/L, 0.008 mg/L, or 0.009 mg/L). In some embodiments, a coffee replica can include no 2,5-dimethylphenol.

The one or more VOCs in a coffee replica can include 2,5-dimethylpyrazine. In some embodiments, the 2,5-dimethylpyrazine can be present in an amount of about 4.5 mg/L to about 9 mg/L (e.g., about 4.5 to about 5 mg/L, about 5 to about 6 mg/L, about 6 to about 7 mg/L, about 7 to about 8 mg/L, or about 8 to about 9 mg/L). In some embodiments, a coffee replica can include no 2,5-dimethylpyrazine.

The one or more VOCs in a coffee replica can include 2,6-dimethylpyrazine. In some embodiments, the 2,6-dimethylpyrazine can be present in an amount of about 1.5 mg/L to about 4.2 mg/L (e.g., about 1.5 to about 2 mg/L, about 2 to about 2.5 mg/L, about 2.5 to about 3 mg/L, about 3 to about 3.5 mg/L, about 3.5 to about 4 mg/L, or about 4 to about 4.2 mg/L). In some embodiments, a coffee replica can include no 2,6-dimethylpyrazine.

The one or more VOCs in a coffee replica can include 2-acetyl-1-methylpyrrole. In some embodiments, the 2-acetyl-1-methylpyrrole can be present in an amount of about 0.7 mg/L to about 1.4 mg/L (e.g., about 0.7 to about 0.8 mg/L, about 0.8 to about 0.9 mg/L, about 0.9 to about 1 mg/L, about 1 to about 1.1 mg/L, about 1.1 to about 1.2 mg/L, about 1.2 to about 1.3 mg/L, or about 1.3 to about 1.4 mg/L). In some embodiments, a coffee replica can include no 2-acetyl-1-methylpyrrole.

The one or more VOCs in a coffee replica can include 2-acetyl-5-methylfuran. In some embodiments, the 2-acetyl-5-methylfuran can be present in an amount of about 0.1 mg/L to about 2.8 mg/L (e.g., about 0.1 to about 0.5 mg/L, about 0.5 to about 1 mg/L, about 1 to about 1.5 mg/L, about 1.5 to about 2 mg/L, about 2 to about 2.5 mg/L, or about 2.5 to about 2.8 mg/L). In some embodiments, the 2-acetyl-5-methylfuran can be present in an amount of at least about 0.5 mg/L (e.g., at least about 0.5 mg/L, 0.6 mg/L, 0.7 mg/L, 0.8 mg/L, 0.9 mg/L, 1.0 mg/L, 1.2 mg/L, 1.4 mg/L, 1.6 mg/L, 1.8 mg/L, 2.0 mg/L, 2.2 mg/L, 2.4 mg/L, or 2.6 mg/L). In some embodiments, a coffee replica can include no 2-acetyl-5-methylfuran.

The one or more VOCs in a coffee replica can include 2-acetylpyridine. In some embodiments, the 2-acetylpyridine can be present in an amount of about 0.05 mg/L to about 0.1 mg/L (e.g., about 0.05 to about 0.06 mg/L, about 0.06 to about 0.07 mg/L, about 0.07 to about 0.08 mg/L, about 0.08 to about 0.09 mg/L, or about 0.09 to about 0.1 mg/L). In some embodiments, a coffee replica can include no 2-acetylpyridine.

The one or more VOCs in a coffee replica can include 2-acetylpyrrole. In some embodiments, the 2-acetylpyrrole can be present in an amount of about 0.9 mg/L to about 1.7 mg/L (e.g., about 0.9 to about 1.1 mg/L, about 1.1 to about 1.3 mg/L, about 1.3 to about 1.5 mg/L, or about 1.5 to about 1.7 mg/L). In some embodiments, a coffee replica can include no 2-acetylpyrrole.

The one or more VOCs in a coffee replica can include 2-ethyl-1-hexanol. In some embodiments, the 2-ethyl-1-hexanol can be present in an amount of about 0.001 mg/L to about 0.003 mg/L (e.g., about 0.001 to about 0.0015 mg/L, about 0.0015 to about 0.002 mg/L, about 0.002 to about 0.0025 mg/L, or about 0.0025 to about 0.003 mg/L). In some embodiments, a coffee replica can include no 2-ethyl-1-hexanol.

The one or more VOCs in a coffee replica can include 2-ethylfuran. In some embodiments, the 2-ethylfuran can be present in an amount of about 0.007 mg/L to about 0.015 mg/L (e.g., about 0.007 to about 0.0085 mg/L, about 0.0085 to about 0.01 mg/L, about 0.01 to about 0.0125 mg/L, or about 0.0125 to about 0.015 mg/L). In some embodiments, a coffee replica can include no 2-ethylfuran.

The one or more VOCs in a coffee replica can include 2-ethylpyrazine. In some embodiments, the 2-ethylpyrazine can be present in an amount of about 0.04 mg/L to about 1.2 mg/L (e.g., about 0.04 to about 0.1 mg/L, about 0.05 to about 0.1 mg/L, about 0.1 mg/L to about 0.5 mg/L, about 0.5 to about 1.0 mg/L, about 0.5 to about 1.2 mg/L, about 0.1 to about 0.2 mg/L, about 0.2 to about 0.4 mg/L, about 0.4 to about 0.6 mg/L, about 0.6 to about 0.8 mg/L, about 0.8 to about 1 mg/L, about 1 to about 1.1 mg/L, or about 1.1 to about 1.2 mg/L). In some embodiments, the 2-ethylpyrazine can be present in an amount of less than about 0.44 mg/L (e.g., less than about 0.4 mg/L, 0.3 mg/L, 0.2 mg/L, 0.1 mg/L, 0.09 mg/L, 0.08 mg/L, 0.07 mg/L, 0.06 mg/L, or 0.05 mg/L). In some embodiments, a coffee replica can include no 2-ethylpyrazine.

The one or more VOCs in a coffee replica can include 2-furfuryl acetate. In some embodiments, the 2-furfuryl acetate can be present in an amount of about 0.6 mg/L to about 1.3 mg/L (e.g., about 0.6 to about 0.7 mg/L, about 0.7 to about 0.8 mg/L, about 0.8 to about 0.9 mg/L, about 0.9 to about 1 mg/L, about 1 to about 1.1 mg/L, about 1.1 to about 1.2 mg/L, or about 1.2 to about 1.3 mg/L). In some embodiments, a coffee replica can include no 2-furfuryl acetate.

The one or more VOCs in a coffee replica can include 2-heptanol. In some embodiments, the 2-heptanol can be present in an amount of about 0.008 mg/L to about 0.02 mg/L (e.g., about 0.008 to about 0.009 mg/L, about 0.009 to about 0.01 mg/L, about 0.01 to about 0.02 mg/L, about 0.01 to about 0.0125 mg/L, about 0.0125 to about 0.015 mg/L, about 0.015 to about 0.0175 mg/L, or about 0.0175 to about 0.02 mg/L). In some embodiments, a coffee replica can include no 2-heptanol.

The one or more VOCs in a coffee replica can include 2-heptanone. In some embodiments, the 2-heptanone can be present in an amount of about 0.002 mg/L to about 0.004 mg/L (e.g., about 0.002 to about 0.0025 mg/L, about 0.0025 to about 0.003 mg/L, about 0.003 to about 0.0035 mg/L, or about 0.0035 to about 0.004 mg/L). In some embodiments, a coffee replica can include no 2-heptanone.

The one or more VOCs in a coffee replica can include 2-isopropyl-3-methoxypyrazine. In some embodiments, the 2-isopropyl-3-methoxypyrazine can be present in an amount of about 0.0001 mg/L to about 0.0013 mg/L (e.g., about 0.0001 to about 0.0003 mg/L, about 0.0003 to about 0.0005 mg/L, about 0.0005 to about 0.001 mg/L, about 0.0005 to about 0.0007 mg/L, about 0.0007 to about 0.0009 mg/L, about 0.0009 to about 0.0011 mg/L, or about 0.0011 to about 0.0013 mg/L). In some embodiments, the 2-isopropyl-3-methoxypyrazine can be present in an amount of less than about 0.0005 mg/L (e.g., less than about 0.0004 mg/L, 0.0003 mg/L, or 0.0002 mg/L). In some embodiments, a coffee replica can include no 2-isopropyl-3-methoxypyrazine.

The one or more VOCs in a coffee replica can include 2-methoxy-4-methylphenol. In some embodiments, the 2-methoxy-4-methylphenol can be present in an amount of about 0.00004 mg/L to about 0.0005 mg/L (e.g., about 0.00004 to about 0.00007 mg/L, about 0.00007 to about 0.0001 mg/L, about 0.0001 to about 0.0002 mg/L, about 0.0002 to about 0.0003 mg/L, about 0.0003 to about 0.0004 mg/L, or about 0.0004 to about 0.0005 mg/L). In some embodiments, the 2-methoxy-4-methylphenol can be present in an amount of at least about 0.00012 mg/L, (e.g., about 0.00015 mg/L, 0.0002 mg/L, 0.0003 mg/L, or 0.0004 mg/L). In some embodiments, a coffee replica can include no 2-methoxy-4-methylphenol.

The one or more VOCs in a coffee replica can include 2-methoxy-4-vinylphenol. In some embodiments, the 2-methoxy-4-vinylphenol can be present in an amount of about 0.0007 mg/L to about 0.6 mg/L (e.g., about 0.0007 to about 0.001 mg/L, about 0.001 to about 0.005 mg/L, about 0.005 to about 0.01 mg/L, about 0.01 to about 0.05 mg/L, about 0.05 to about 0.1 mg/L, about 0.1 to about 0.3 mg/L, or about 0.3 to about 0.6 mg/L). In some embodiments, the 2-methoxy-4-vinylphenol can be present in an amount of less than about 0.22 mg/L (e.g., less than about 0.2 mg/L, 0.1 mg/L, 0.09 mg/L, 0.07 mg/L, 0.05 mg/L, 0.03 mg/L, 0.01 mg/L, 0.009 mg/L, 0.007 mg/L, 0.005 mg/L, 0.003 mg/L, 0.001 mg/L, or 0.0009 mg/L). In some embodiments, a coffee replica can include no 2-methoxy-4-vinylphenol.

The one or more VOCs in a coffee replica can include 2-methylbutyl isovalerate. In some embodiments, the 2-methylbutyl isovalerate can be present in an amount of about 0.001 mg/L to about 0.003 mg/L (e.g., about 0.001 to about 0.0015 mg/L, about 0.0015 to about 0.002 mg/L, about 0.002 to about 0.0025 mg/L, or about 0.0025 to about 0.003 mg/L). In some embodiments, a coffee replica can include no 2-methylbutyl isovalerate.

The one or more VOCs in a coffee replica can include 2-methylbutyraldehyde. In some embodiments, the 2-methylbutyraldehyde can be present in an amount of about 1.2 mg/L to about 2.4 mg/L (e.g., about 1.2 to about 1.4 mg/L, about 1.4 to about 1.6 mg/L, about 1.6 to about 1.8 mg/L, about 1.8 to about 2 mg/L, about 2 to about 2.2 mg/L, or about 2.2 to about 2.4 mg/L). In some embodiments, a coffee replica can include no 2-methylbutyraldehyde.

The one or more VOCs in a coffee replica can include 2-methylbutyric acid. In some embodiments, the 2-methylbutyric acid can be present in an amount of about 0.1 mg/L to about 0.2 mg/L (e.g., about 0.1 to about 0.12 mg/L, about 0.12 to about 0.14 mg/L, about 0.14 to about 0.16 mg/L, about 0.16 to about 0.18 mg/L, or about 0.18 to about 0.2 mg/L). In some embodiments, a coffee replica can include no 2-methylbutyric acid.

The one or more VOCs in a coffee replica can include 2-methylpyrazine. In some embodiments, the 2-methylpyrazine can be present in an amount of about 0.006 mg/L to about 13.5 mg/L (e.g., about 0.006 to about 0.01 mg/L, about 0.01 to about 0.05 mg/L, about 0.05 to about 0.1 mg/L, about 0.1 to about 0.5 mg/L, about 0.5 to about 1 mg/L, about 1 to about 2 mg/L, about 1 to about 5 mg/L, about 5 to about 10 mg/L, about 10 to about 13.5 mg/L, or about 5 to about 13.5 mg/L). In some embodiments, the 2-methylpyrazine can be present in an amount of less than about 5.1 mg/L (e.g., less than about 5 mg/L, 4 mg/L, 3 mg/L, 2 mg/L, 1 mg/L, 0.9 mg/L, 0.7 mg/L, 0.5 mg/L, 0.3 mg/L, 0.1 mg/L, 0.09 mg/L, 0.07 mg/L, 0.05 mg/L, 0.03 mg/L, 0.01 mg/L, 0.009 mg/L, or 0.007 mg/L). In some embodiments, a coffee replica can include no 2-methylpyrazine.

The one or more VOCs in a coffee replica can include 2-nonanol. In some embodiments, the 2-nonanol can be present in an amount of about 0.0003 mg/L to about 0.0007 mg/L (e.g., about 0.0003 to about 0.0004 mg/L, about 0.0004 to about 0.0005 mg/L, about 0.0005 to about 0.0006 mg/L, or about 0.0006 to about 0.0007 mg/L). In some embodiments, a coffee replica can include no 2-nonanol.

The one or more VOCs in a coffee replica can include 2-nonanone. In some embodiments, the 2-nonanone can be present in an amount of about 0.0003 mg/L to about 0.0007 mg/L (e.g., about 0.0003 to about 0.0004 mg/L, about 0.0004 to about 0.0005 mg/L, about 0.0005 to about 0.0006 mg/L, or about 0.0006 to about 0.0007 mg/L). In some embodiments, a coffee replica can include no 2-nonanone.

The one or more VOCs in a coffee replica can include 2-octanone. In some embodiments, the 2-octanone can be present in an amount of about 0.0005 mg/L to about 0.001 mg/L (e.g., about 0.0005 to about 0.0006 mg/L, about 0.0006 to about 0.0007 mg/L, about 0.0007 to about 0.0008 mg/L, about 0.0008 to about 0.0009 mg/L, or about 0.0009 to about 0.001 mg/L). In some embodiments, a coffee replica can include no 2-octanone.

The one or more VOCs in a coffee replica can include 2-pentanol. In some embodiments, the 2-pentanol can be present in an amount of about 0.005 mg/L to about 0.01 mg/L (e.g., about 0.005 to about 0.006 mg/L, about 0.006 to about 0.007 mg/L, about 0.007 to about 0.008 mg/L, about 0.008 to about 0.009 mg/L, or about 0.009 to about 0.01 mg/L). In some embodiments, a coffee replica can include no 2-pentanol.

The one or more VOCs in a coffee replica can include 2-pentylfuran. In some embodiments, the 2-pentylfuran can be present in an amount of about 0.001 mg/L to about 0.003 mg/L (e.g., about 0.001 to about 0.0015 mg/L, about 0.0015 to about 0.002 mg/L, about 0.002 to about 0.0025 mg/L, or about 0.0025 to about 0.003 mg/L). In some embodiments, a coffee replica can include no 2-pentylfuran.

The one or more VOCs in a coffee replica can include 2-phenyl-2-butenal. In some embodiments, the 2-phenyl-2-butenal can be present in an amount of about 0.01 mg/L to about 0.03 mg/L (e.g., about 0.01 to about 0.015 mg/L, about 0.015 to about 0.02 mg/L, about 0.02 to about 0.025 mg/L, or about 0.025 to about 0.03 mg/L). In some embodiments, a coffee replica can include no 2-phenyl-2-butenal.

The one or more VOCs in a coffee replica can include 2-phenylethanol. In some embodiments, the 2-phenylethanol can be present in an amount of about 0.09 mg/L to about 0.2 mg/L (e.g., about 0.09 to about 0.1 mg/L, about 0.1 to about 0.12 mg/L, about 0.12 to about 0.14 mg/L, about 0.14 to about 0.16 mg/L, about 0.16 to about 0.18 mg/L, or about 0.18 to about 0.2 mg/L). In some embodiments, a coffee replica can include no 2-phenylethanol.

The one or more VOCs in a coffee replica can include 2-undecanone. In some embodiments, the 2-undecanone can be present in an amount of about 0.0002 mg/L to about 0.0005 mg/L (e.g., about 0.0002 to about 0.00025 mg/L, about 0.00025 to about 0.0003 mg/L, about 0.0003 to about 0.00035 mg/L, about 0.00035 to about 0.0004 mg/L, about 0.0004 to about 0.00045 mg/L, or about 0.00045 to about 0.0005 mg/L). In some embodiments, a coffee replica can include no 2-undecanone.

The one or more VOCs in a coffee replica can include 3-ethylpyridine. In some embodiments, the 3-ethylpyridine can be present in an amount of about 0.01 mg/L to about 0.03 mg/L (e.g., about 0.01 to about 0.015 mg/L, about 0.015 to about 0.02 mg/L, about 0.02 to about 0.025 mg/L, or about 0.025 to about 0.03 mg/L). In some embodiments, a coffee replica can include no 3-ethylpyridine.

The one or more VOCs in a coffee replica can include 3-hexanone. In some embodiments, the 3-hexanone can be present in an amount of about 0.02 mg/L to about 0.04 mg/L (e.g., about 0.02 to about 0.025 mg/L, about 0.025 to about 0.03 mg/L, about 0.03 to about 0.035 mg/L, or about 0.035 to about 0.04 mg/L). In some embodiments, a coffee replica can include no 3-hexanone.

The one or more VOCs in a coffee replica can include 3-octanol. In some embodiments, the 3-octanol can be present in an amount of about 0.0004 mg/L to about 0.0008 mg/L (e.g., about 0.0004 to about 0.0005 mg/L, about 0.0005 to about 0.0006 m/L, about 0.0006 to about 0.0007 mg/L, or about 0.0007 to about 0.0008 mg/L). In some embodiments, a coffee replica can include no 3-octanol.

The one or more VOCs in a coffee replica can include 4-carvomenthenol. In some embodiments, the 4-carvomenthenol can be present in an amount of about 0.0003 mg/L to about 0.0007 mg/L (e.g., about 0.0003 to about 0.0004 mg/L, about 0.0004 to about 0.0005 mg/L, about 0.0005 to about 0.0006 m/L, or about 0.0006 to about 0.0007 mg/L). In some embodiments, a coffee replica can include no 4-carvomenthenol.

The one or more VOCs in a coffee replica can include 4-ethyl guaiacol. In some embodiments, the 4-ethyl guaiacol can be present in an amount of about 0.02 mg/L to about 0.04 mg/L (e.g., about 0.02 to about 0.025 mg/L, about 0.025 to about 0.03 mg/L, about 0.03 to about 0.035 mg/L, or about 0.035 to about 0.04 mg/L). In some embodiments, a coffee replica can include no 4-ethyl guaiacol.

The one or more VOCs in a coffee replica can include 4-ethyl phenol. In some embodiments, the 4-ethyl phenol can be present in an amount of about 0.01 mg/L to about 0.03 mg/L (e.g., about 0.01 to about 0.015 mg/L, about 0.015 to about 0.02 mg/L, about 0.02 to about 0.025 mg/L, or about 0.025 to about 0.03 mg/L). In some embodiments, a coffee replica can include no 4-ethyl phenol.

The one or more VOCs in a coffee replica can include 4-methyl-2-phenyl-2-pentenal. In some embodiments, the 4-methyl-2-phenyl-2-pentenal can be present in an amount of about 0.0002 mg/L to about 0.0005 mg/L (e.g., about 0.0002 to about 0.00025 mg/L, about 0.00025 to about 0.0003 mg/L, about 0.0003 to about 0.00035 mg/L, about 0.00035 to about 0.0004 mg/L, about 0.0004 to about 0.00045 mg/L, or about 0.00045 to about 0.0005 mg/L). In some embodiments, a coffee replica can include no 4-methyl-2-phenyl-2-pentenal.

The one or more VOCs in a coffee replica can include 4'-methylacetophenone. In some embodiments, the 4'-methylacetophenone can be present in an amount of about 0.005 mg/L to about 0.01 mg/L (e.g., about 0.005 to about 0.006 mg/L, about 0.006 to about 0.007 mg/L, about 0.007 to about 0.008 mg/L, about 0.008 to about 0.009 mg/L, or about 0.009 to about 0.01 mg/L). In some embodiments, a coffee replica can include no 4'-methylacetophenone.

The one or more VOCs in a coffee replica can include 4-vinylphenol. In some embodiments, the 4-vinylphenol can be present in an amount of about 0.1 mg/L to about 0.2 mg/L (e.g., about 0.1 to about 0.12 mg/L, about 0.12 to about 0.14 mg/L, about 0.14 to about 0.16 mg/L, about 0.16 to about 0.18 mg/L, or about 0.18 to about 0.2 mg/L). In some embodiments, a coffee replica can include no 4-vinylphenol.

The one or more VOCs in a coffee replica can include 5-methyl-2-phenyl-2-hexenal. In some embodiments, the 5-methyl-2-phenyl-2-hexenal can be present in an amount of about 0.0001 mg/L to about 0.0003 mg/L (e.g., about 0.0001 to about 0.00015 mg/L, about 0.00015 to about 0.0002 mg/L, about 0.0002 to about 0.00025 mg/L, or about 0.00025 to about 0.0003 mg/L). In some embodiments, a coffee replica can include no 5-methyl-2-phenyl-2-hexenal.

The one or more VOCs in a coffee replica can include 5-methylfurfural. In some embodiments, the 5-methylfurfural can be present in an amount of about 0.01 mg/L to about 8.5 mg/L (e.g., about 0.01 to about 0.1 mg/L, about 0.1 to about 0.5 mg/L, about 0.5 to about 1 mg/L, about 1 to about 2 mg/L, about 2 to about 4 mg/L, about 4 to about 6 mg/L, about 1 to about 5 mg/L, about 5 to about 8.5 mg/L, about 5 to about 7 mg/L, or about 7 to about 8.5 mg/L). In some embodiments, the 5-methylfurfural can be present in an amount of less than about 3.2 mg/L (e.g., less than about 3 mg/L, 2 mg/L, 1 mg/L, 0.9 mg/L, 0.7 mg/L, 0.5 mg/L, 0.3 mg/L, 0.1 mg/L, 0.09 mg/L, 0.07 mg/L, 0.05 mg/L, or 0.03 mg/L). In some embodiments, a coffee replica can include no 5-methylfurfural.

The one or more VOCs in a coffee replica can include amyl alcohol. In some embodiments, the amyl alcohol can be present in an amount of about 0.003 mg/L to about 0.02 mg/L (e.g., 0.003 to about 0.005 mg/L, about 0.005 to about 0.007 mg/L, about 0.007 to about 0.01 mg/L, about 0.005 to about 0.01 mg/L, about 0.01 to about 0.2 mg/L, about 0.01 to about 0.013 mg/L, about 0.013 to about 0.017 mg/L, or about 0.017 to about 0.02 mg/L). In some embodiments, the amyl alcohol can be present in an amount of less than about 0.008 mg/L (e.g., less than about 0.007 mg/L, 0.006 mg/L, 0.005 mg/L, or 0.004 mg/L). In some embodiments, a coffee replica can include no amyl alcohol.

The one or more VOCs in a coffee replica can include benzaldehyde. In some embodiments, the benzaldehyde can be present in an amount of about 0.03 mg/L to about 0.06 mg/L (e.g., about 0.03 to about 0.035 mg/L, about 0.035 to about 0.04 mg/L, about 0.04 to about 0.045 mg/L, about 0.045 to about 0.05 mg/L, about 0.05 to about 0.055 mg/L, or about 0.055 to about 0.06 mg/L). In some embodiments, a coffee replica can include no benzaldehyde.

The one or more VOCs in a coffee replica can include benzyl acetate. In some embodiments, the benzyl acetate can be present in an amount of about 0.0002 mg/L to about 0.0005 mg/L (e.g., about 0.0002 to about 0.00025 mg/L, about 0.00025 to about 0.0003 mg/L, about 0.0003 to about 0.00035 mg/L, about 0.00035 to about 0.0004 mg/L, about 0.0004 to about 0.00045 mg/L, or about 0.00045 to about 0.0005 mg/L). In some embodiments, a coffee replica can include no benzyl acetate.

The one or more VOCs in a coffee replica can include beta-ionone. In some embodiments, the beta-ionone can be present in an amount of about 1.7 mg/L to about 3.2 mg/L (e.g., about 1.7 to about 2 mg/L, about 2 to about 2.2 mg/L, about 2.2 to about 2.4 mg/L, about 2.4 to about 2.6 mg/L, about 2.6 to about 2.8 mg/L, about 2 to about 3 mg/L, about 2.8 to about 3 mg/L, or about 3 to about 3.2 mg/L). In some embodiments, a coffee replica can include no beta-ionone.

The one or more VOCs in a coffee replica can include butyl alcohol. In some embodiments, the butyl alcohol can be present in an amount of about 0.1 mg/L to about 0.3 mg/L (e.g., about 0.1 to about 0.15 mg/L, about 0.15 to about 0.2 mg/L, about 0.2 to about 0.25 mg/L, or about 0.25 to about 0.3 mg/L). In some embodiments, a coffee replica can include no butyl alcohol.

The one or more VOCs in a coffee replica can include butyric acid. In some embodiments, the butyric acid can be present in an amount of about 0.002 mg/L to about 3.2 mg/L (e.g., about 0.002 to about 0.01 mg/L, about 0.01 to about 0.05 mg/L, about 0.05 to about 0.1 mg/L, about 0.1 to about 0.5 mg/L, about 0.5 to about 1 mg/L, about 1 to about 1.5 mg/L, about 1.5 to about 2 mg/L, about 2 to about 2.5 mg/L, about 2.5 to about 3 mg/L, about 1 to about 2 mg/L, about 2 to about 3 mg/L, about 1 to about 3 mg/L, or about 3 to about 3.2 mg/L). In some embodiments, the butyric acid can be present in an amount of less than about 1.2 mg/L (e.g., less than about 1.1 mg/L, 1.0 mg/L, 0.9 mg/L, 0.7 mg/L, 0.5 mg/L, 0.3 mg/L, 0.1 mg/L, 0.09 mg/L, 0.07 mg/L, 0.05 mg/L, 0.03 mg/L, 0.01 mg/L, 0.009 mg/L, 0.007 mg/L, 0.005 mg/L, or 0.003 mg/L). In some embodiments, a coffee replica can include no butyric acid.

The one or more VOCs in a coffee replica can include coffee furanone. In some embodiments, the coffee furanone can be present in an amount of about 17 mg/L to about 135 mg/L (e.g., about 17 to about 25 mg/L, about 25 to about 50 mg/L, about 50 to about 75 mg/L, about 75 to about 100 mg/L, or about 100 to about 135 mg/L). In some embodiments, the coffee furanone can be present in an amount of at least about 50 mg/L (e.g., at least about 55 mg/L, 60 mg/L, 65 mg/L, 70 mg/L, 80 mg/L, 90 mg/L, 100 mg/L, 110 mg/L, 120 mg/L, or 130 mg/L). In some embodiments, a coffee replica can include no coffee furanone.

The one or more VOCs in a coffee replica can include damascenone. In some embodiments, the damascenone can be present in an amount of about 0.001 mg/L to about 0.003 mg/L (e.g., about 0.001 to about 0.0015 mg/L, about 0.0015 to about 0.002 mg/L, about 0.002 to about 0.0025 mg/L, or about 0.0025 to about 0.003 mg/L). In some embodiments, a coffee replica can include no damascenone.

The one or more VOCs in a coffee replica can include decanal. In some embodiments, the decanal can be present in an amount of about 0.0004 mg/L to about 0.0009 mg/L (e.g., about 0.0004 to about 0.0005 mg/L, about 0.0005 to about 0.0006 mg/L, about 0.0006 to about 0.0007 mg/L, about 0.0007 to about 0.0008 mg/L, or about 0.0008 to about 0.0009 mg/L). In some embodiments, a coffee replica can include no decanal.

The one or more VOCs in a coffee replica can include diethyl disulfide. In some embodiments, the diethyl disulfide can be present in an amount of about 0.0002 mg/L to about 0.0005 mg/L (e.g., about 0.0002 to about 0.00025 mg/L, about 0.00025 to about 0.0003 mg/L, about 0.0003 to about 0.00035 mg/L, about 0.00035 to about 0.0004 mg/L, about 0.0004 to about 0.00045 mg/L, or about 0.00045 to about 0.0005 mg/L). In some embodiments, a coffee replica can include no diethyl disulfide.

The one or more VOCs in a coffee replica can include diethyl succinate. In some embodiments, the diethyl succinate can be present in an amount of about 0.00001 mg/L to about 280 mg/L (e.g., about 0.00001 to about 0.0001 mg/L, about 0.0001 to about 0.001 mg/L, about 0.001 to about 0.01 mg/L, about 0.01 to about 0.1 mg/L, about 0.1 to about 1 mg/L, about 1 to about 10 mg/L, about 10 to about 50 mg/L, about 50 to about 100 mg/L, about 100 to about 200 mg/L, or about 200 to about 280 mg/L). In some embodiments, the diethyl succinate can be present in an amount of at least about 0.0004 mg/L (e.g., at least about 0.0005 mg/L, 0.001 mg/L, 0.01 mg/L, 0.1 mg/L, 1 mg/L, 5 mg/L, 10 mg/L, 20 mg/L, 25 mg/L, 50 mg/L, 75 mg/L, 100 mg/L, 125 mg/L, 150 mg/L, 175 mg/L, 200 mg/L, 225 mg/L, 250 mg/L, or 275 mg/L). In some embodiments, a coffee replica can include no diethyl succinate.

The one or more VOCs in a coffee replica can include difurfuryl ether. In some embodiments, the difurfuryl ether can be present in an amount of about 0.0001 mg/L to about 0.08 mg/L (e.g., about 0.0001 to about 0.0005 mg/L, about 0.0005 to about 0.001 mg/L, about 0.001 to about 0.005 mg/L, about 0.005 to about 0.01 mg/L, about 0.01 to about 0.02 mg/L, about 0.02 to about 0.04 mg/L, about 0.04 to about 0.06 mg/L, or about 0.06 to about 0.08 mg/L). In some embodiments, the difurfuryl ether can be present in an amount of less than about 0.027 mg/L (e.g., less than about 0.025 mg/L, 0.02 mg/L, 0.01 mg/L, 0.009 mg/L, 0.007 mg/L, 0.005 mg/L, 0.003 mg/L, 0.001 mg/L, 0.0009 mg/L, 0.0007 mg/L, 0.0005 mg/L, or 0.0003 mg/L). In some embodiments, a coffee replica can include no difurfuryl ether.

The one or more VOCs in a coffee replica can include dimethyl sulfide. In some embodiments, the dimethyl sulfide can be present in an amount of about 0.007 mg/L to about 0.013 mg/L (e.g., about 0.007 to about 0.008 mg/L, about 0.008 to about 0.009 mg/L, about 0.009 to about 0.01 mg/L, about 0.01 to about 0.011 mg/L, about 0.011 to about 0.012 mg/L, or about 0.012 to about 0.013 mg/L). In some embodiments, a coffee replica can include no dimethyl sulfide.

The one or more VOCs in a coffee replica can include dimethyl sulfoxide. In some embodiments, the dimethyl sulfoxide can be present in an amount of about 0.006 mg/L to about 0.01 mg/L (e.g., about 0.006 to about 0.007 mg/L, about 0.007 to about 0.008 mg/L, about 0.008 to about 0.009 mg/L, or about 0.009 to about 0.01 mg/L). In some embodiments, a coffee replica can include no dimethyl sulfoxide.

The one or more VOCs in a coffee replica can include dimethyl trisulfide. In some embodiments, the dimethyl trisulfide can be present in an amount of about 0.00000003 mg/L to about 0.002 mg/L (e.g., about 0.00000003 to about 0.0000001 mg/L, about 0.0000001 to about 0.000001 mg/L, about 0.000001 to about 0.00001 mg/L, about 0.00001 to about 0.0001 mg/L, about 0.0001 to about 0.001 mg/L, or about 0.001 to about 0.002 mg/L). In some embodiments, the dimethyltrisulfide can be present in an amount of less than about 0.0007 mg/L (e.g., less than about 0.0005 mg/L, 0.0003 mg/L, 0.0001 mg/L, 0.00005 mg/L, 0.00001 mg/L, 0.0000005 mg/L, 0.000001 mg/L, 0.0000005, 0.0000001 mg/L, or 0.00000005 mg/L). In some embodiments, a coffee replica can include no dimethyl trisulfide.

The one or more VOCs in a coffee replica can include ethyl 2-methylbutyrate. In some embodiments, the ethyl 2-methylbutyrate can be present in an amount of about 0.0006 mg/L to about 5 mg/L (e.g., about 0.0006 to about 0.001 mg/L, about 0.001 to about 0.01 mg/L, about 0.01 to about 0.1 mg/L, about 0.1 to about 1 mg/L, about 1 to about 2.5 mg/L, about 1 to about 5 mg/L, or about 2.5 to about 5 mg/L). In some embodiments, the ethyl 2-methylbutyrate can be present in an amount of at least 0.002 mg/L (e.g., at least about 0.003 mg/L, 0.004 mg/L, 0.005 mg/L, 0.01 mg/L, 0.05 mg/L, 0.1 mg/L, 0.5 mg/L, 1 mg/L, 2 mg/L, 3 mg/L, or 4 mg/L). In some embodiments, a coffee replica can include no ethyl 2-methylbutyrate.

The one or more VOCs in a coffee replica can include ethyl acetate. In some embodiments, the ethyl acetate can be present in an amount of about 0.06 mg/L to about 0.2 mg/L (e.g., about 0.06 to about 0.08 mg/L, about 0.08 to about 0.1 mg/L, about 0.1 to about 0.2 mg/L, about 0.1 to about 0.12 mg/L, about 0.12 to about 0.14 mg/L, about 0.14 to about 0.16 mg/L, about 0.16 to about 0.18 mg/L, or about 0.18 to about 0.2 mg/L). In some embodiments, a coffee replica can include no ethyl acetate.

The one or more VOCs in a coffee replica can include ethyl benzoate. In some embodiments, the ethyl benzoate can be present in an amount of about 0.001 mg/L to about 0.004 mg/L (e.g., about 0.001 to about 0.002 mg/L, about 0.002 to about 0.003 mg/L, or about 0.003 to about 0.004 mg/L). In some embodiments, a coffee replica can include no ethyl benzoate.

The one or more VOCs in a coffee replica can include ethyl butanoate. In some embodiments, the ethyl butanoate can be present in an amount of about 0.002 mg/L to about 0.005 mg/L (e.g., about 0.002 to about 0.003 mg/L, or about 0.003 to about 0.004 mg/L, or about 0.004 to about 0.005 mg/L). In some embodiments, a coffee replica can include no ethyl butanoate.

The one or more VOCs in a coffee replica can include ethyl decanoate. In some embodiments, the ethyl decanoate can be present in an amount of about 0.0006 mg/L to about 0.06 mg/L (e.g., about 0.0006 to about 0.001 mg/L, about 0.001 to about 0.005 mg/L, about 0.005 to about 0.01 mg/L, about 0.01 to about 0.03 mg/L, about 0.01 to about 0.05 mg/L, about 0.01 to about 0.06 mg/L, or about 0.03 to about 0.06 mg/L). In some embodiments, the ethyl decanoate can be present in an amount of at least about 0.002 mg/L (e.g., at least about 0.003 mg/L, 0.004 mg/L, 0.005 mg/L, 0.006 mg/L, 0.007 mg/L, 0.008 mg/L, 0.009 mg/L, 0.01 mg/L, 0.02 mg/L, 0.03 mg/L, 0.04 mg/L, or 0.05 mg/L). In some embodiments, a coffee replica can include no ethyl decanoate.

The one or more VOCs in a coffee replica can include ethyl heptanoate. In some embodiments, the ethyl heptanoate can be present in an amount of about 0.0008 mg/L to about 0.002 mg/L (e.g., about 0.0008 to about 0.001 mg/L, about 0.001 to about 0.002 mg/L, about 0.0012 to about 0.0014 mg/L, about 0.0014 to about 0.0016 mg/L, about 0.0016 to about 0.0018 mg/L, or about 0.0018 to about 0.002 mg/L). In some embodiments, a coffee replica can include no ethyl heptanoate.

The one or more VOCs in a coffee replica can include ethyl hexanoate. In some embodiments, the ethyl hexanoate can be present in an amount of about 0.0005 mg/L to about 0.001 mg/L (e.g., 0.0005 to about 0.0006 mg/L, about 0.0006 to about 0.0007 mg/L, about 0.0007 to about 0.0008 mg/L, about 0.0008 to about 0.0009 mg/L, or about 0.0009 to about 0.001 mg/L). In some embodiments, a coffee replica can include no ethyl hexanoate.

The one or more VOCs in a coffee replica can include ethyl isovalerate. In some embodiments, the ethyl isovalerate can be present in an amount of about 0.002 mg/L to about 0.006 mg/L (e.g., about 0.002 to about 0.003 mg/L, about 0.003 to about 0.004 mg/L, about 0.004 to about 0.005 mg/L, or about 0.005 to about 0.006 mg/L). In some embodiments, a coffee replica can include no ethyl isovalerate.

The one or more VOCs in a coffee replica can include ethyl lactate. In some embodiments, the ethyl lactate can be present in an amount of about 0.1 mg/L to about 0.3 mg/L (e.g., about 0.1 to about 0.15 mg/L, about 0.15 to about 0.2 mg/L, about 0.2 to about 0.25 mg/L, or about 0.25 to about 0.3 mg/L). In some embodiments, a coffee replica can include no ethyl lactate.

The one or more VOCs in a coffee replica can include ethyl laurate. In some embodiments, the ethyl laurate can be present in an amount of about 0.0002 mg/L to about 0.007 mg/L (e.g., about 0.0002 to about 0.0006 mg/L, about 0.0006 to about 0.001 mg/L, about 0.001 to about 0.003 mg/L, about 0.001 to about 0.005 mg/L, about 0.001 to about 0.007 mg/L, about 0.003 to about 0.005 mg/L, or about 0.005 to about 0.007 mg/L). In some embodiments, the ethyl laurate can be present in an amount of at least about 0.0007 mg/L (e.g., at least about 0.0008 mg/L, 0.0009 mg/L, 0.001 mg/L, 0.002 mg/L, 0.003 mg/L, 0.004 mg/L, 0.005 mg/L, or 0.006 mg/L). In some embodiments, a coffee replica can include no ethyl laurate.

The one or more VOCs in a coffee replica can include ethyl octanoate. In some embodiments, the ethyl octanoate can be present in an amount of about 0.0007 mg/L to about 0.002 mg/L (e.g., about 0.0007 to about 0.001 mg/L, about 0.001 to about 0.002 mg/L, about 0.001 to about 0.0012 mg/L, about 0.0012 to about 0.0014 mg/L, about 0.0014 to about 0.0016 mg/L, about 0.0016 to about 0.0018 mg/L, or about 0.0018 to about 0.002 mg/L). In some embodiments, a coffee replica can include no ethyl octanoate.

The one or more VOCs in a coffee replica can include ethyl phenylacetate. In some embodiments, the ethyl phenylacetate can be present in an amount of about 0.00003 mg/L to about 0.00007 mg/L (e.g., about 0.00003 to about 0.00004 mg/L, about 0.00004 to about 0.00005 mg/L, about 0.00005 to about 0.00006 mg/L, or about 0.00006 to about 0.00007 mg/L). In some embodiments, a coffee replica can include no ethyl phenylacetate.

The one or more VOCs in a coffee replica can include ethyl tiglate. In some embodiments, the ethyl tiglate can be present in an amount of about 0.0008 mg/L to about 0.002 mg/L (e.g., about 0.0008 to about 0.001 mg/L, about 0.001 to about 0.002 mg/L, about 0.001 to about 0.0012 mg/L, about 0.0012 to about 0.0014 mg/L, about 0.0014 to about 0.0016 mg/L, about 0.0016 to about 0.0018 mg/L, or about 0.0018 to about 0.002 mg/L). In some embodiments, a coffee replica can include no ethyl tiglate.

The one or more VOCs in a coffee replica can include furfural. In some embodiments, the furfural can be present in an amount of about 0.003 mg/L to about 16 mg/L (e.g., about 0.003 to about 0.01 mg/L, about 0.01 to about 0.1 mg/L, about 0.1 to about 1 mg/L, about 1 to about 2 mg/L, about 2 to about 4 mg/L, about 4 to about 6 mg/L, about 1 to about 5 mg/L, about 5 to about 10 mg/L, about 5 to about 15 mg/L, about 5 to about 16 mg/L, about 10 to about 15 mg/L, about 10 to about 16 mg/L, about 6 to about 8 mg/L, about 8 to about 10 mg/L, about 10 to about 13 mg/L, or about 13 to about 16 mg/L). In some embodiments, the furfural can be present in an amount of less than about 6 mg/L (e.g., less than about 5 mg/L, 4 mg/L, 3 mg/L, 2 mg/L, 1 mg/L, 0.5 mg/L, 0.1 mg/L, 0.05 mg/L, 0.01 mg/L, or 0.005 mg/L). In some embodiments, a coffee replica can include no furfural.

The one or more VOCs in a coffee replica can include furfuryl propionate. In some embodiments, the furfuryl propionate can be present in an amount of about 0.03 mg/L to about 0.07 mg/L (e.g., about 0.03 to about 0.04 mg/L, about 0.04 to about 0.05 mg/L, about 0.05 to about 0.06 mg/L, or about 0.06 to about 0.07 mg/L). In some embodiments, a coffee replica can include no furfuryl propionate.

The one or more VOCs in a coffee replica can include gamma-nonalactone. In some embodiments, the gamma-nonalactone can be present in an amount of about 0.001 mg/L to about 9 mg/L (e.g., about 0.001 to about 0.01 mg/L, about 0.01 to about 0.1 mg/L, about 0.1 to about 1 mg/L, about 1 to about 3 mg/L, about 1 to about 5 mg/L, about 1 to about 9 mg/L, about 5 to about 9 mg/L, about 3 to about 5 mg/L, about 5 to about 7 mg/L, or about 7 to about 9 mg/L). In some embodiments, the gamma-nonalactone can be present in an amount of at least about 0.005 mg/L (e.g., at least about 0.01 mg/L, 0.03 mg/L, 0.05 mg/L, 0.07 mg/L, 0.09 mg/L, 0.1 mg/L, 0.3 mg/L, 0.5 mg/L, 0.7 mg/L, 0.9 mg/L, 1 mg/L, 2 mg/L, 3 mg/L, 4 mg/L, 5 mg/L, 6 mg/L, 7 mg/L, or 8 mg/L). In some embodiments, a coffee replica can include no gamma-nonalactone.

The one or more VOCs in a coffee replica can include geraniol. In some embodiments, the geraniol can be present in an amount of about 0.007 mg/L to about 0.02 mg/L (e.g., about 0.007 to about 0.01 mg/L, about 0.01 to about 0.02 mg/L, about 0.01 to about 0.012 mg/L, about 0.012 to about 0.014 mg/L, about 0.014 to about 0.016 mg/L, about 0.016 to about 0.018 mg/L, or about 0.018 to about 0.02 mg/L). In some embodiments, a coffee replica can include no geraniol.

The one or more VOCs in a coffee replica can include geranyl acetate. In some embodiments, the geranyl acetate can be present in an amount of about 0.05 mg/L to about 0.1 mg/L (e.g., about 0.05 to about 0.06 mg/L, about 0.06 to about 0.07 mg/L, about 0.07 to about 0.08 mg/L, about 0.08 to about 0.09 mg/L, or about 0.09 to about 0.1 mg/L). In some embodiments, a coffee replica can include no geranyl acetate.

The one or more VOCs in a coffee replica can include guaiacol. In some embodiments, the guaiacol can be present in an amount of about 0.0007 mg/L to about 0.6 mg/L (e.g., about 0.0007 to about 0.001 mg/L, about 0.001 to about 0.01 mg/L, about 0.01 to about 0.05 mg/L, about 0.05 to about 0.1 mg/L, about 0.1 to about 0.5 mg/L, about 0.1 to about 0.6 mg/L, about 0.1 to about 0.2 mg/L, about 0.2 to about 0.4 mg/L, or about 0.4 to about 0.6 mg/L). In some embodiments, the guaiacol can be present in an amount of less than about 0.22 mg/L (e.g., less than about 0.2 mg/L, 0.1 mg/L, 0.05 mg/L, 0.01 mg/L, 0.005 mg/L, or 0.001 mg/L). In some embodiments, a coffee replica can include no guaiacol.

The one or more VOCs in a coffee replica can include hexanal. In some embodiments, the hexanal can be present in an amount of about 0.008 mg/L to about 0.02 mg/L (e.g., about 0.008 to about 0.01 mg/L, about 0.01 to about 0.02 mg/L, about 0.01 to about 0.012 mg/L, about 0.012 to about 0.014 mg/L, about 0.014 to about 0.016 mg/L, about 0.016 to about 0.018 mg/L, or about 0.018 to about 0.02 mg/L). In some embodiments, a coffee replica can include no hexanal.

The one or more VOCs in a coffee replica can include hexanol. In some embodiments, the hexanol can be present in an amount of about 0.1 mg/L to about 0.3 mg/L (e.g., about 0.1 to about 0.15 mg/L, about 0.15 to about 0.2 mg/L, about 0.2 to about 0.25 mg/L, or about 0.25 to about 0.3 mg/L). In some embodiments, a coffee replica can include no hexanol.

The one or more VOCs in a coffee replica can include hexyl acetate. In some embodiments, the hexyl acetate can be present in an amount of about 0.0005 mg/L to about 0.001 mg/L (e.g., about 0.0005 to about 0.0006 mg/L, about 0.0006 to about 0.0007, about 0.0007 to about 0.0008 mg/L, about 0.0008 to about 0.0009 mg/L, or about 0.0009 to about 0.001 mg/L). In some embodiments, a coffee replica can include no hexyl acetate.

The one or more VOCs in a coffee replica can include isoamyl acetate. In some embodiments, the isoamyl acetate can be present in an amount of about 0.0008 mg/L to about 0.002 mg/L (e.g., about 0.0008 to about 0.001 mg/L, about 0.001 to about 0.002 mg/L, about 0.001 to about 0.0012 mg/L, about 0.0012 to about 0.0014 mg/L, about 0.0014 to about 0.0016 mg/L, about 0.0016 to about 0.0018 mg/L, or about 0.0018 to about 0.002 mg/L). In some embodiments, a coffee replica can include no isoamyl acetate.

The one or more VOCs in a coffee replica can include isoamyl alcohol. In some embodiments, the isoamyl alcohol can be present in an amount of about 0.01 mg/L to about 0.03 mg/L (e.g., about 0.01 to about 0.015 mg/L, about 0.015 to about 0.02 mg/L, about 0.02 to about 0.025 mg/L, or about 0.025 to about 0.03 mg/L). In some embodiments, a coffee replica can include no isoamyl alcohol.

The one or more VOCs in a coffee replica can include isobutyraldehyde. In some embodiments, the isobutyraldehyde can be present in an amount of about 0.00003 mg/L to about 0.2 mg/L (e.g., about 0.00003 to about 0.0001 mg/L, about 0.0001 to about 0.001 mg/L, about 0.001 to about 0.01 mg/L, about 0.01 to about 0.1 mg/L, or about 0.1 to about 0.2 mg/L). In some embodiments, the isobutyraldehyde can be present in an amount of less than about 0.075 mg/L (e.g., less than about 0.07 mg/L, 0.05 mg/L, 0.03 mg/L, 0.01 mg/L, 0.005 mg/L, 0.001 mg/L, 0.0005 mg/L, 0.0001 mg/L, or 0.00005 mg/L). In some embodiments, a coffee replica can include no isobutyraldehyde.

The one or more VOCs in a coffee replica can include isobutyric acid. In some embodiments, the isobutyric acid can be present in an amount of about 0.02 mg/L to about 0.05 mg/L (e.g., about 0.02 to about 0.025 mg/L, about 0.025 to about 0.03 mg/L, about 0.03 to about 0.035 mg/L, about 0.035 to about 0.04 mg/L, about 0.04 to about 0.045 mg/L, or about 0.045 to about 0.05 mg/L). In some embodiments, a coffee replica can include no isobutyric acid.

The one or more VOCs in a coffee replica can include isovaleraldehyde. In some embodiments, the isovaleraldehyde can be present in an amount of about 0.0002 mg/L to about 0.2 mg/L (e.g., about 0.0002 to about 0.002 mg/L, about 0.002 to about 0.007 mg/L, about 0.007 to about 0.01 mg/L, about 0.01 to about 0.02 mg/L, about 0.02 to about 0.07 mg/L, about 0.07 to about 0.1 mg/L, or about 0.1 to about 0.2 mg/L). In some embodiments, the isovaleraldehyde can be present in an amount of less than about 0.05 mg/L (e.g., less than about 0.04 mg/L, 0.03 mg/L, 0.02 mg/L, 0.01 mg/L, 0.005 mg/L, 0.001 mg/L, or 0.0005 mg/L). In some embodiments, a coffee replica can include no isovaleraldehyde.

The one or more VOCs in a coffee replica can include isovaleric acid. In some embodiments, the isovaleric acid can be present in an amount of about 0.3 mg/L to about 7 mg/L (e.g., about 0.3 to about 0.7 mg/L, about 0.7 to about 1 mg/L, about 1 to about 3 mg/L, about 1 to about 5 mg/L, about 1 to about 7 mg/L, about 3 to about 5 mg/L, or about 5 to about 7 mg/L). In some embodiments, the isovaleric acid can be present in an amount of at least about 1 mg/L (e.g., at least about 2 mg/L, 3 mg/L, 4 mg/L, 5 mg/L, or 6 mg/L). In some embodiments, a coffee replica can include no isovaleric acid.

The one or more VOCs in a coffee replica can include limonene. In some embodiments, the limonene can be present in an amount of about 0.001 mg/L to about 0.002 mg/L (e.g., about 0.001 to about 0.0012 mg/L, about 0.0012 to about 0.0014 mg/L, about 0.0014 to about 0.0016 mg/L, about 0.0016 to about 0.0018 mg/L, or about 0.0018 to about 0.002 mg/L). In some embodiments, a coffee replica can include no limonene.

The one or more VOCs in a coffee replica can include linalool. In some embodiments, the linalool can be present in an amount of about 0.01 mg/L to about 0.03 mg/L (e.g., about 0.01 to about 0.015 mg/L, about 0.015 to about 0.02 mg/L, about 0.02 to about 0.025 mg/L, or about 0.025 to about 0.03 mg/L). In some embodiments, a coffee replica can include no linalool.

The one or more VOCs in a coffee replica can include maltol. In some embodiments, the maltol can be present in an amount of about 55 mg/L to about 105 mg/L (e.g., about 55 to about 65 mg/L, about 65 to about 75 mg/L, about 75 to about 85 mg/L, about 85 to about 95 mg/L, or about 95 to about 105 mg/L). In some embodiments, a coffee replica can include no maltol.

The one or more VOCs in a coffee replica can include massoia lactone. In some embodiments, the massoia lactone can be present in an amount of about 24 mg/L to about 45 mg/L (e.g., about 24 to about 30 mg/L, about 30 to about 35 mg/L, about 35 to about 40 mg/L, or about 40 to about 45 mg/L). In some embodiments, a coffee replica can include no massoia lactone.

The one or more VOCs in a coffee replica can include methyl anthranilate. In some embodiments, the methyl anthranilate can be present in an amount of about 0.02 mg/L to about 0.04 mg/L (e.g., about 0.02 to about 0.025 mg/L, about 0.025 to about 0.03 mg/L, about 0.03 to about 0.035 mg/L, or about 0035 to about 0.04 mg/L). In some embodiments, a coffee replica can include no methyl anthranilate.

The one or more VOCs in a coffee replica can include methyl benzoate. In some embodiments, the methyl benzoate can be present in an amount of about 0.0002 mg/L to about 0.0005 mg/L (e.g., about 0.0002 to about 0.00025 mg/L, about 0.00025 to about 0.0003 mg/L, about 0.0003 to about 0.00035 mg/L, about 0.00035 to about 0.0004 mg/L, about 0.0004 to about 0.00045 mg/L, or about 0.00045 to about 0.0005 mg/L). In some embodiments, a coffee replica can include no methyl benzoate.

The one or more VOCs in a coffee replica can include methyl hexanoate. In some embodiments, the methyl hexanoate can be present in an amount of about 0.0008 mg/L to about 0.002 mg/L (e.g., about 0.0008 to about 0.001 mg/L, about 0.001 to about 0.002 mg/L, about 0.001 to about 0.0012 mg/L, about 0.0012 to about 0.0014 mg/L, about 0.0014 to about 0.0016 mg/L, about 0.0016 to about 0.0018 mg/L, or about 0.0018 to about 0.002 mg/L). In some embodiments, a coffee replica can include no methyl hexanoate.

The one or more VOCs in a coffee replica can include methyl nicotinate. In some embodiments, the methyl nicotinate can be present in an amount of about 0.009 mg/L to about 0.02 mg/L (e.g., about 0.009 to about 0.01 mg/L, about 0.01 to about 0.02 mg/L, about 0.01 to about 0.012 mg/L, about 0.012 to about 0.014 mg/L, about 0.014 to about 0.016 mg/L, about 0.016 to about 0.018 mg/L, or about 0.018 to about 0.02 mg/L). In some embodiments, a coffee replica can include no methyl nicotinate.

The one or more VOCs in a coffee replica can include methyl phenylacetate. In some embodiments, the methyl phenylacetate can be present in an amount of about 0.0008 mg/L to about 0.002 mg/L (e.g., about 0.0008 to about 0.001 mg/L, about 0.001 to about 0.002 mg/L, about 0.001 to about 0.0012 mg/L, about 0.0012 to about 0.0014 mg/L, about 0.0014 to about 0.0016 mg/L, about 0.0016 to about 0.0018 mg/L, or about 0.0018 to about 0.002 mg/L). In some embodiments, a coffee replica can include no methyl phenylacetate.

The one or more VOCs in a coffee replica can include methyl salicylate. In some embodiments, the methyl salicylate can be present in an amount of about 0.005 mg/L to about 0.01 mg/L (e.g., about 0.005 to about 0.006 mg/L, about 0.006 to about 0.007 mg/L, about 0.007 to about 0.008 mg/L, about 0.008 to about 0.009 mg/L, or about 0.009 to about 0.01 mg/L). In some embodiments, a coffee replica can include no methyl salicylate.

The one or more VOCs in a coffee replica can include myrcene. In some embodiments, the myrcene can be present in an amount of about 0.001 mg/L to about 0.003 mg/L (e.g., about 0.001 to about 0.0015 mg/L, about 0.0015 to about 0.002 mg/L, about 0.002 to about 0.0025 mg/L, or about 0.0025 to about 0.003 mg/L). In some embodiments, a coffee replica can include no myrcene.

The one or more VOCs in a coffee replica can include nonanal. In some embodiments, the nonanal can be present in an amount of about 0.001 mg/L to about 0.003 mg/L (e.g., about 0.001 to about 0.0015 mg/L, about 0.0015 to about 0.002 mg/L, about 0.002 to about 0.0025 mg/L, or about 0.0025 to about 0.003 mg/L). In some embodiments, a coffee replica can include no nonanal.

The one or more VOCs in a coffee replica can include octanal. In some embodiments, the octanal can be present in an amount of about 0.0004 mg/L to about 0.0009 mg/L (e.g., about 0.0004 to about 0.0005 mg/L, about 0.0005 to about 0.0006 mg/L, about 0.0006 to about 0.0007 mg/L, about 0.0007 to about 0.0008 mg/L, or about 0.0008 to about 0.0009 mg/L). In some embodiments, a coffee replica can include no octanal.

The one or more VOCs in a coffee replica can include p-anisaldehyde. In some embodiments, the p-anisaldehyde can be present in an amount of about 0.01 mg/L to about 0.03 mg/L (e.g., about 0.01 to about 0.015 mg/L, about 0.015 to about 0.02 mg/L, about 0.02 to about 0.025 mg/L, or about 0.025 to about 0.03 mg/L). In some embodiments, a coffee replica can include no p-anisaldehyde.

The one or more VOCs in a coffee replica can include p-cresol. In some embodiments, the p-cresol can be present in an amount of about 1.1 mg/L to about 2.2 mg/L (e.g., about 1.1 to about 1.3 mg/L, about 1.3 to about 1.5 mg/L, about 1.5 to about 1.7 mg/L, about 1.7 to about 2 mg/L, or about 2 to about 2.2 mg/L). In some embodiments, a coffee replica can include no p-cresol.

The one or more VOCs in a coffee replica can include phenethyl acetate. In some embodiments, the phenethyl acetate can be present in an amount of about 0.00008 mg/L to about 0.0002 mg/L (e.g., about 0.00008 to about 0.0001 mg/L, about 0.0001 to about 0.0002 mg/L, about 0.0001 to about 0.00012 mg/L, about 0.00012 to about 0.00014 mg/L, about 0.00014 to about 0.00016 mg/L, about 0.00016 to about 0.00018 mg/L, or about 0.00018 to about 0.0002 mg/L). In some embodiments, a coffee replica can include no phenethyl acetate.

The one or more VOCs in a coffee replica can include phenylacetaldehyde. In some embodiments, the phenylacetaldehyde can be present in an amount of about 0.3 mg/L to about 0.6 mg/L (e.g., about 0.3 to about 0.4 mg/L, about 0.4 to about 0.5 mg/L, or about 0.5 to about 0.6 mg/L). In some embodiments, a coffee replica can include no phenylacetaldehyde.

The one or more VOCs in a coffee replica can include propionaldehyde. In some embodiments, the propionaldehyde can be present in an amount of about 1 mg/L to about 2 mg/L (e.g., about 1 to about 1.2 mg/L, about 1.2 to about 1.4 mg/L, about 1.4 to about 1.6 mg/L, about 1.6 to about 1.8 mg/L, or about 1.8 to about 2 mg/L). In some embodiments, a coffee replica can include no propionaldehyde.

The one or more VOCs in a coffee replica can include propionic acid. In some embodiments, the propionic acid can be present in an amount of about 1 mg/L to about 1.9 mg/L (e.g., about 1 to about 1.2 mg/L, about 1.2 to about 1.4 mg/L, about 1.4 to about 1.7 mg/L, or about 1.7 to about 1.9 mg/L). In some embodiments, a coffee replica can include no propionic acid.

The one or more VOCs in a coffee replica can include pyrrole. In some embodiments, the pyrrole can be present in an amount of about 0.0001 mg/L to about 0.02 mg/L (e.g., 0.0001 to about 0.0005 mg/L, about 0.0005 to about 0.001 mg/L, about 0.001 to about 0.005 mg/L, about 0.005 to about 0.01 mg/L, about 0.01 to about 0.02 mg/L, about 0.01 to about 0.015 mg/L, or about 0.015 to about 0.02 mg/L). In some embodiments, the pyrrole can be present in an amount of less than about 0.005 mg/L (e.g., less than about 0.004 mg/L, 0.003 mg/L, 0.002 mg/L, 0.001 mg/L, 0.0009 mg/L, 0.0007 mg/L, 0.0005 mg/L, or 0.0003 mg/L). In some embodiments, a coffee replica can include no pyrrole.

The one or more VOCs in a coffee replica can include syringol. In some embodiments, the syringol can be present in an amount of about 0.03 mg/L to about 6 mg/L (e.g., about 0.03 to about 0.05 mg/L, about 0.05 to about 0.1 mg/L, about 0.1 to about 0.5 mg/L, about 0.5 to about 1 mg/L, about 1 to about 5 mg/L, or about 1 to about 6 mg/L). In some embodiments, the syringol can be present in an amount of at least about 0.1 mg/L (e.g., at least about 0.2 mg/L, 0.3 mg/L, 0.4 mg/L, 0.5 mg/L, 1 mg/L, 2 mg/L, 3 mg/L, 4 mg/L, or 5 mg/L). In some embodiments, a coffee replica can include no syringol.

The one or more VOCs in a coffee replica can include valeraldehyde. In some embodiments, the valeraldehyde can be present in an amount of about 0.2 mg/L to about 6.5 mg/L (e.g., about 0.2 to about 0.5 mg/L, about 0.5 to about 1 mg/L, about 1 to about 2 mg/L, about 1 to about 5 mg/L, about 1 to about 6 mg/L, about 1 to about 6.5 mg/L, about 2 to about 4 mg/L, or about 4 to about 6.5 mg/L). In some embodiments, the valeraldehyde can be present in an amount of at least about 0.6 mg/L (e.g., at least about 0.7 mg/L, 0.8 mg/L, 0.9 mg/L, 1 mg/L, 2 mg/L, 3 mg/L, 4 mg/L, 5 mg/L, or 6 mg/L). In some embodiments, a coffee replica can include no valeraldehyde.

The one or more VOCs in a coffee replica can include valeric acid. In some embodiments, the valeric acid can be present in an amount of about 0.08 mg/L to about 0.2 mg/L (e.g., about 0.08 to about 0.1 mg/L, about 0.1 to about 0.2 mg/L, about 0.1 to about 0.12 mg/L, about 0.12 to about 0.14 mg/L, about 0.14 to about 0.16 mg/L, about 0.16 to about 0.18 mg/L, or about 0.18 to about 0.2 mg/L). In some embodiments, a coffee replica can include no valeric acid.

The one or more VOCs in a coffee replica can include 2,3-butanedione. In some embodiments, the 2,3-butanedione can be present in an amount of about 0.0002 mg/L to about 0.0005 mg/L (e.g., about 0.0002 to about 0.00025 mg/L, about 0.00025 to about 0.0003 mg/L, about 0.0003 to about 0.00035 mg/L, about 0.00035 to about 0.0004 mg/L, about 0.0004 mg/L, to about 0.00045 mg/L, or about 0.00045 to about 0.0005 mg/L). In some embodiments, a coffee replica can include no 2,3-butanedione.

The one or more VOCs in a coffee replica can include 2,3-hexanedione. In some embodiments, the 2,3-hexanedione can be present in an amount of about 7.5 mg/L to about 14 mg/L (e.g., about 7.5 to about 9 mg/L, about 9 to about 10 mg/L, about 10 to about 11 mg/L, about 11 to about 12 mg/L, about 12 to about 13 mg/L, or about 13 to about 14 mg/L). In some embodiments, a coffee replica can include no 2,3-hexanedione.

The one or more VOCs in a coffee replica can include 2-ethoxy-3-methylpyrazine. In some embodiments, the 2-ethoxy-3-methylpyrazine can be present in an amount of about 0.4 mg/L to about 0.9 mg/L (e.g., about 0.4 to about 0.5 mg/L, about 0.5 to about 0.6 mg/L, about 0.6 to about 0.7 mg/L, about 0.7 to about 0.8 mg/L, or about 0.8 to about 0.9 mg/L). In some embodiments, a coffee replica can include no 2-ethoxy-3-methylpyrazine.

The one or more VOCs in a coffee replica can include 2-ethyl-4-hydroxy-5-methyl-3(2H)-furanone. In some embodiments, the 2-ethyl-4-hydroxy-5-methyl-3(2H)-furanone can be present in an amount of about 0.6 mg/L to about 1.2 mg/L (e.g., about 0.6 to about 0.7 mg/L, about 0.7 to about 0.8 mg/L, about 0.8 to about 0.9 mg/L, about 0.9 to about 1 mg/L, about 1 to about 1.1 mg/L, or about 1.1 to about 1.2 mg/L). In some embodiments, a coffee replica can include no 2-ethyl-4-hydroxy-5-methyl-3(2H)-furanone.

The one or more VOCs in a coffee replica can include 2-isobutyl-3-methoxypyrazine (IBMP). In some embodiments, the IBMP can be present in an amount of about 0.0005 mg/L to about 0.001 mg/L (e.g., about 0.0005 to about 0.0006 mg/L, about 0.0006 to about 0.0007 mg/L, about 0.0007 to about 0.0008 mg/L, about 0.0008 to about 0.0009 mg/L, or about 0.0009 to about 0.001 mg/L). In some embodiments, a coffee replica can include no IBMP.

The one or more VOCs in a coffee replica can include 2-isobutyl-3-methyl pyrazine. In some embodiments, the 2-isobutyl-3-methyl pyrazine can be present in an amount of about 0.0002 mg/L to about 0.0005 mg/L (e.g., about 0.0002 to about 0.00025 mg/L, about 0.00025 to about 0.0003 mg/L, about 0.0003 to about 0.00035 mg/L, about 0.00035 to about 0.0004 mg/L, about 0.0004 to about 0.00045 mg/L, or about 0.00045 to about 0.0005 mg/L). In some embodiments, a coffee replica can include no 2-isobutyl-3-methyl pyrazine.

The one or more VOCs in a coffee replica can include 3-methylbutyric acid. In some embodiments, the 3-methylbutyric acid can be present in an amount of about 0.01 mg/L to about 0.03 mg/L (e.g., about 0.01 to about 0.015 mg/L, about 0.015 to about 0.02 mg/L, about 0.02 to about 0.025 mg/L, or about 0.025 to about 0.03 mg/L). In some embodiments, a coffee replica can include no 3-methylbutyric acid.

The one or more VOCs in a coffee replica can include 4-ethylguaiacol. In some embodiments, the 4-ethylguaiacol can be present in an amount of about 0.001 mg/L to about 0.002 mg/L (e.g., about 0.001 to about 0.0012 mg/L, about 0.0012 to about 0.0014 mg/L, about 0.0014 to about 0.0016 mg/L, about 0.0016 to about 0.0018 mg/L, or about 0.0018 to about 0.002 mg/L). In some embodiments, a coffee replica can include no 4-ethylguaiacol.

The one or more VOCs in a coffee replica can include 4-hydroxy-5-methyl-3-furanone. In some embodiments, the 4-hydroxy-5-methyl-3-furanone can be present in an amount of about 3 mg/L to about 6 mg/L (e.g., about 3 to about 3.5 mg/L, about 3.5 to about 4 mg/L, about 4 to about 4.5 mg/L, about 4.5 to about 5 mg/L, about 5 to about 5.5 mg/L, or about 5.5 to about 6 mg/L). In some embodiments, a coffee replica can include no 4-hydroxy-5-methyl-3-furanone.

The one or more VOCs in a coffee replica can include acetoin acetate. In some embodiments, the acetoin acetate can be present in an amount of about 75 mg/L to about 140 mg/L (e.g., about 75 to about 90 mg/L, about 90 to about 100 mg/L, about 100 to about 110 mg/L, about 110 to about 120 mg/L, about 120 to about 130 mg/L, or about 130 to about 140 mg/L). In some embodiments, a coffee replica can include no acetoin acetate.

The one or more VOCs in a coffee replica can include beta-damascenone. In some embodiments, the beta-damascenone can be present in an amount of about 0.00003 mg/L to about 0.0007 mg/L (e.g., about 0.00003 to about 0.00007 mg/L, about 0.00007 to about 0.0001 mg/L, about 0.0001 to about 0.0003 mg/L, about 0.0001 to about 0.0005 mg/L, about 0.0003 to about 0.0005 mg/L, or about 0.0005 to about 0.0007 mg/L). In some embodiments, a coffee replica can include no beta-damascenone.

The one or more VOCs in a coffee replica can include delta-decalactone. In some embodiments, the delta-decalactone can be present in an amount of about 1.2 mg/L to about 2.3 mg/L (e.g., about 1.2 to about 1.4 mg/L, about 1.4 to about 1.6 mg/L, about 1.6 to about 1.8 mg/L, about 1.8 to about 2 mg/L, or about 2 to about 2.3 mg/L). In some embodiments, a coffee replica can include no delta-decalactone.

The one or more VOCs in a coffee replica can include delta-octalactone. In some embodiments, the delta-octalactone can be present in an amount of about 4.8 mg/L to about 9 mg/L (e.g., about 4.8 to about 6 mg/L, about 5 to about 9 mg/L, about 6 to about 7 mg/L, about 7 to about 8 mg/L, or about 8 to about 9 mg/L). In some embodiments, a coffee replica can include no delta-octalactone.

The one or more VOCs in a coffee replica can include ethyl butyrate. In some embodiments, the ethyl butyrate can be present in an amount of about 0.4 mg/L to about 0.9 mg/L (e.g., about 0.4 to about 0.5 mg/L, about 0.5 to about 0.6 mg/L, about 0.6 to about 0.7 mg/L, about 0.7 to about 0.8 mg/L, or about 0.8 to about 0.9 mg/L). In some embodiments, a coffee replica can include no ethyl butyrate.

The one or more VOCs in a coffee replica can include ethyl maltol. In some embodiments, the ethyl maltol can be present in an amount of about 30 mg/L to about 60 mg/L (e.g., about 30 to about 35 mg/L, about 35 to about 40 mg/L, about 40 to about 45 mg/L, about 45 to about 50 mg/L, about 50 to about 55 mg/L, or about 55 to about 60 mg/L). In some embodiments, a coffee replica can include no ethyl maltol.

The one or more VOCs in a coffee replica can include eugenol. In some embodiments, the eugenol can be present in an amount of about 0.01 mg/L to about 0.02 mg/L (e.g., about 0.01 to about 0.012 mg/L, about 0.012 to about 0.014 mg/L, about 0.014 to about 0.016 mg/L, about 0.016 to about 0.018 mg/L, or about 0.018 to about 0.02 mg/L). In some embodiments, a coffee replica can include no eugenol.

The one or more VOCs in a coffee replica can include furaneol. In some embodiments, the furaneol can be present in an amount of about 6 mg/L to about 11 mg/L (e.g., about 6 to about 7 mg/L, about 7 to about 8 mg/L, about 8 to about 9 mg/L, about 9 to about 10 mg/L, or about 10 to about 11 mg/L). In some embodiments, a coffee replica can include no furaneol.

The one or more VOCs in a coffee replica can include furfuryl alcohol. In some embodiments, the furfuryl alcohol can be present in an amount of about 0.000000003 mg/L to about 0.000000007 mg/L (e.g., about 0.000000003 to about 0.000000004 mg/L, about 0.000000004 to about 0.000000005 mg/L, about 0.000000005 to about 0.000000006 mg/L, or about 0.000000006 to about 0.000000007 mg/L). In some embodiments, a coffee replica can include no furfuryl alcohol.

The one or more VOCs in a coffee replica can include gamma decalactone. In some embodiments, the gamma decalactone can be present in an amount of about 1.4 mg/L to about 2.7 mg/L (e.g., about 1.4 to about 1.6 mg/L, about 1.6 to about 1.8 mg/L, about 1.8 to about 2 mg/L, about 2 to about 2.2 mg/L, about 2.2 to about 2.5 mg/L, or about 2.5 to about 2.7 mg/L). In some embodiments, a coffee replica can include no gamma decalactone.

The one or more VOCs in a coffee replica can include isoeugenol. In some embodiments, the isoeugenol can be present in an amount of about 0.01 mg/L to about 0.02 mg/L (e.g., about 0.01 to about 0.012 mg/L, about 0.012 to about 0.014 mg/L, about 0.014 to about 0.016 mg/L, about 0.016 to about 0.018 mg/L, or about 0.018 to about 0.02 mg/L). In some embodiments, a coffee replica can include no isoeugenol.

The one or more VOCs in a coffee replica can include isopropenyl pyrazine. In some embodiments, the isopropenyl pyrazine can be present in an amount of about 3 mg/L to about 6 mg/L (e.g., about 3 to about 3.5 mg/L, about 3.5 to about 4 mg/L, about 4 to about 4.5 mg/L, about 4.5 to about 5 mg/L, about 5 to about 5.5 mg/L, or about 5.5 to about 6 mg/L). In some embodiments, a coffee replica can include no isopropenyl pyrazine.

The one or more VOCs in a coffee replica can include methanethiol. In some embodiments, the methanethiol can be present in an amount of about 0.0000007 mg/L to about 0.000002 mg/L (e.g., about 0.0000007 to about 0.000001 mg/L, about 0.000001 to about 0.000002 mg/L, about 0.000001 to about 0.0000013 mg/L, about 0.0000013 to about 0.0000017 mg/L, or about 0.0000017 to about 0.000002 mg/L). In some embodiments, a coffee replica can include no methanethiol.

The one or more VOCs in a coffee replica can include sotolone. In some embodiments, the sotolone can be present in an amount of about 0.000003 mg/L to about 0.000006 mg/L (e.g., about 0.000003 to about 0.0000035 mg/L, about 0.0000035 to about 0.000004 mg/L, about 0.000004 to about 0.0000045 mg/L, about 0.0000045 to about 0.000005 mg/L, about 0.000005 to about 0.0000055 mg/L, or about 0.0000055 to about 0.000006 mg/L). In some embodiments, a coffee replica can include no sotolone.

The one or more VOCs in a coffee replica can include vanillin erythro and/or threo-butan-2,3-diol acetal. In some embodiments, the vanillin erythro and/or threo-butan-2,3-diol acetal can be present in an amount of about 60 mg/L to about 112 mg/L (e.g., about 60 to about 70 mg/L, about 70 to about 80 mg/L, about 80 to about 90 mg/L, about 90 to about 100 mg/L, about 60 to about 80 mg/L, about 80 to about 100 mg/L, about 70 to about 90 mg/L, about 90 to about 110 mg/L, or about 100 to about 112 mg/L). In some embodiments, a coffee replica can include no vanillin erythro and/or threo-butan-2,3-diol acetal.

The one or more VOCs in a coffee replica can include vanillyl ethyl ether. In some embodiments, the vanillyl ethyl ether can be present in an amount of about 14 mg/L to about 27 mg/L (e.g., about 14 to about 17 mg/L, about 15 to about 20 mg/L, about 20 to about 25 mg/L, about 20 to about 27 mg/L, about 17 to about 20 mg/L, about 20 to about 22 mg/L, about 22 to about 25 mg/L, or about 25 to about 27 mg/L). In some embodiments, a coffee replica can include no vanillyl ethyl ether.

In some embodiments, a coffee replica can exclude one or more VOCs according to their groupings. In some cases, "Group F" can include alpha-methyl-alpha-[4-methyl-3-pentenyl]oxiranemethanol; beta-myrcene; 1-(2-furanylmethyl)-1H-pyrrole; 1-ethyl-1H-pyrrole; 1-methyl-1H-pyrrole; 1-methyl-1H-pyrrole-2-carboxaldehyde; 1-methyl-1,2,3,6-tetrahydropyridine; 2-amino-1-naphthalenol; 2,3-butanedione; 2-butanone; 2,3-dimethyl-2-cyclopenten-1-one; 2-methyl-2-cyclopenten-1-one; 3-ethyl-2-hydroxy-2-cyclopenten-1-one; 5-methyl-2-furancarboxaldehyde; 2-furanmethanol acetate; 2-furanmethanol propanoate; 1-hydroxy-2-propanone; 2-vinylfuran; dihydro-2-methyl-3 (2H)-furanone; 3-furaldehyde; 3-furanmethanol; 3-pyridinol; 5-amino-1-naphthol; acetic acid; acetic acid, 2-(dimethylamino)ethyl ester; acetic acid, methyl ester; acetone; 2-methoxy-benzenamine; 2-methyl-butanal; 3-methyl-butanal; 4-hydroxy-butanoic acid; dimethyl disulfide; N,N-dimethyl-ethanamine; 1-(1H-pyrrol-2-yl)-ethanone; 1-(2-furanyl)-ethanone; 1-(2-hydroxy-5-methylphenyl)-ethanone; furan; 2-(2-furanylmethyl)-5-methyl-furan; 2-(2-propenyl)-furan; 2-(methoxymethyl)-furan; 2,2'-methylenebis-furan; 2,5-dimethyl-furan; 2-[(methylthio)methyl]-furan; 2-methyl-furan; 3-methyl-furan; furfural; furfuryl formate; indole; N,N-dimethyl-methylamine; 2,7-dimethyl-oxepine; p-cresol; phenol; 2-methoxy-phenol; 2-methyl-phenol; 4-ethyl-2-methoxy-phenol; 1-methyl-piperidine; pyrazine; 2-(n-propyl)-pyrazine; 2,3-dimethyl-pyrazine; 2,5-dimethyl-pyrazine; 2,6-diethyl-pyrazine; 2,6-dimethyl-pyrazine; 2-ethyl-3-methyl-pyrazine; 2-ethyl-6-methyl-pyrazine; 3,5-diethyl-2-methyl-pyrazine; 3-ethyl-2,5-dimethyl-pyrazine; ethyl-pyrazine; methyl-pyrazine; pyridine; 2-methyl-pyridine; 3-ethyl-pyridine; 3-methyl-pyridine; 3-propyl-pyridine; styrene; thiophene; and toluene. Accordingly, provided herein are coffee replicas that do not include at least 1 (e.g., at least 2, at least 3, at least 5, at least 10, at least 15, at least 20, at least 30, at least 40, at least 50, at least 60, at least 70, 1 to 76, 1 to 70, 1 to 60, 1 to 50, 1 to 40, 1 to 30, 1 to 20, 1 to 10, 1 to 5, 1 to 3, 3 to 76, 3 to 70, 3 to 60, 3 to 50, 3 to 40, 3 to 30, 3 to 20, 3 to 10, 3 to 5, 5 to 76, 5 to 70, 5 to 60, 5 to 50, 5 to 40, 5 to 30, 5 to 20, 5 to 10, 10 to 76, 10 to 70, 10 to 60, 10 to 50, 10 to 40, 10 to 30, 10 to 20, 20 to 76, 20 to 70, 20 to 60, 20 to 50, 20 to 30, 30 to 76, 30 to 70, 30 to 60, 30 to 50, or 30 to 40) VOCs selected from the group consisting of the compounds in Group F.

In some cases, "Group G" can include alpha-methyl-alpha-[4-methyl-3-pentenyl]oxiranemethanol; beta-myrcene; 1-(2-furanylmethyl)-1H-pyrrole; 1-ethyl-1H-pyrrole; 1-methyl-1H-pyrrole; 1-methyl-1H-pyrrole-2-carboxaldehyde; 1-methyl-1,2,3,6-tetrahydropyridine; 2-amino-1-naphthalenol; 2,3-butanedione; 2-butanone; 2,3-dimethyl-2-cyclopenten-1-one; 2-methyl-2-cyclopenten-1-one; 3-ethyl-2-hydroxy-2-cyclopenten-1-one; 5-methyl-2-furancarboxaldehyde; 1-hydroxy-2-propanone; 2-vinylfuran; dihydro-2-methyl-3(2H)-furanone; 3-furaldehyde; 3-furanmethanol; 3-pyridinol; 5-amino-1-naphthol; acetone; 2-methoxy-benzenamine; 2-methyl-butanal; 3-methyl-butanal; 4-hydroxy-butanoic acid; dimethyl disulfide; N,N-dimethyl-ethanamine; 1-(1H-pyrrol-2-yl)-ethanone; 1-(2-furanyl)-ethanone; 1-(2-hydroxy-5-methylphenyl)-ethanone; indole; N,N-dimethyl-methylamine; 2,7-dimethyl-oxepine; p-cresol; phenol; 2-methoxy-phenol; 2-methyl-phenol; 4-ethyl-2-methoxy-phenol; 1-methyl-piperidine; styrene; thiophene; and toluene. Accordingly, provided herein are coffee replicas that do not include at least 1 (e.g., at least 2, at least 3, at least 5, at least 10, at least 15, at least 20, at least 30, at least 40, 1 to 43, 1 to 40, 1 to 30, 1 to 20, 1 to 10, 1 to 5, 1 to 3, 3 to 43, 3 to 40, 3 to 30, 3 to 20, 3 to 10, 3 to 5, 5 to 43, 5 to 40, 5 to 30, 5 to 20, 5 to 10, 10 to 43, 10 to 40, 10 to 30, 10 to 20, 20 to 43, 20 to 40, 20 to 30, 30 to 43, or 30 to 40) VOCs selected from the group consisting of the compounds in Group G.

In some embodiments, a coffee replica can include no 1-Methyl-1,2,3,6-tetrahydropyridine.

In some cases, the total amount of VOCs in a coffee replica can be greater than the total amount of VOCs in a reference coffee. For example, a coffee replica can have a total VOC content that is at least 100 mg/L or more (e.g., 150, 200, 250, 300, 350, 400, 450, 500, 550, 600, 650, 700, 750, 800, 850, 900, 950, 1000 mg/L, or more). In some embodiments, a coffee replica can have a total VOC content from the VOCs in Group A that is at least 100 mg/L or more (e.g., 150, 200, 250, 300, 350, 400, 450, 500, 550, 600, 650, 700, 750, 800, 850, 900, 950, 1000 mg/L, or more). In some embodiments, a coffee replica can have a total VOC content from the VOCs in Group B that is at least 100 mg/L or more (e.g., 150, 200, 250, 300, 350, 400, 450, 500, 550, 600, 650, 700, 750, 800, 850, 900, 950, 1000 mg/L, or more). In some embodiments, a coffee replica can have a total VOC content from the VOCs in Group C that is at least 100 mg/L or more (e.g., 150, 200, 250, 300, 350, 400, 450, 500, 550, 600, 650, 700, 750, 800, 850, 900, 950, 1000 mg/L, or more).

Non-Volatile Compounds

The coffee replicas described herein can, in some cases, include at least one non-volatile compound that is not present in a corresponding reference coffee. Non-limiting examples of non-volatile compounds that may not be present in a corresponding reference coffee include acetovanillone, adipic acid, AMP, arginine, carnosine, cinnamic acid, citrulline, CMP, coumaric acid, cysteine, cystine, epicatechin, epicatechin gallate, GABA, glucosamine, glutamine, guanine, hesperetin, histidine, isoleucine, kynurenic acid, leucine, lysine, mannose, methionine, methyl gallate, ornithine, pantothenic acid, pipecolinic acid, piperine, polydatin, pyridoxine, quercetin, resveratrol, rutin, sinapinic acid, sorbic acid, syringaldehyde, threonine, trans-4-hydroxyproline, tryptophan, tyramine, tyrosine, and mixtures thereof. Therefore, in some embodiments, a coffee replica can include one or more (e.g., at least 2, 3, 4, 5, 10, 15, 20, 25, 30, 35, or 40) compounds selected from the group consisting of acetovanillone, adipic acid, AMP, arginine, carnosine, cinnamic acid, citrulline, CMP, coumaric acid, cysteine, cystine, epicatechin, epicatechin gallate, GABA, glucosamine, glutamine, guanine, hesperetin, histidine, isoleucine, kynurenic acid, leucine, lysine, mannose, methionine, methyl gallate, ornithine, pantothenic acid, pipecolinic acid, piperine, polydatin, pyridoxine, quercetin, resveratrol, rutin, sinapinic acid, sorbic acid, syringaldehyde, threonine, trans-4-hydroxyproline, tryptophan, tyramine, and tyrosine.

Coffee replicas herein can, in some cases, exclude one or more non-volatile compounds that are present in a corresponding reference coffee. Non-limiting examples of compounds present in reference coffees include 2(5H)-furanone, 2,3,5,6-tetramethylpyrazine, 2,3,5-trimethylpyrazine, 2,3-dimethylpyrazine, 2-ethyl-2-hydroxybutyric acid, 2-furoic acid, 2-isopropylmalic acid, 3,4-dihydroxybenzoic acid, 4-methoxycinnamic acid, 5-ethyl-4-hydroxy-2-methyl-3 (2H)-furanone, adenine, arabitol, betaine, caffeic acid, caffeine, choline, citric acid, cytidine, D-gluconic acid, D-glucuronic acid, fructose, galactose, glucose, glutamic acid, hydroxymethylfurfural, lactic acid, malic acid, mannitol, methyl-2-pyrrolyl ketone, inositol, pyruvic acid, quinic acid, sorbitol, sotolon, succinic acid, syringic acid, tartaric acid, tryptamine, uracil, vanillic acid, and combinations thereof. Therefore, in some embodiments, a coffee replica can lack one or more (e.g., at least 2, 3, 4, 5, 10, 15, 20, 25, 30, 35, or 40) compounds selected from the group consisting of 2(5H)-furanone, 2,3,5,6-tetramethylpyrazine, 2,3,5-trimethylpyrazine, 2,3-dimethylpyrazine, 2-ethyl-2-hydroxybutyric acid, 2-furoic acid, 2-isopropylmalic acid, 3,4-dihydroxybenzoic acid, 4-methoxycinnamic acid, 5-ethyl-4-hydroxy-2-methyl-3(2H)-furanone, adenine, arabitol, betaine, caffeic acid, caffeine, choline, citric acid, cytidine, D-gluconic acid, D-glucuronic acid, fructose, galactose, glucose, glutamic acid, hydroxymethylfurfural, lactic acid, malic acid, mannitol, methyl-2-pyrrolyl ketone, inositol, pyruvic acid, quinic acid, sorbitol, sotolon, succinic acid, syringic acid, tartaric acid, tryptamine, uracil, and vanillic acid. In some embodiments, a coffee replica can lack one or more (e.g., 2, 3, 4, 5, 10, 15, 20, 25, or 30) compounds selected from the group consisting of 2(5H)-furanone, 2,3,5,6-tetramethylpyrazine, 2-ethyl-2-hydroxybutyric acid, 2-furoic acid, 2-isopropylmalic acid, 3,4-dihydroxybenzoic acid, 4-methoxycinnamic acid, 5-ethyl-4-hydroxy-2-methyl-3(2H)-furanone, adenine, arabitol, betaine, caffeic acid, cytidine, D-gluconic acid, D-glucuronic acid, fructose, galactose, glucose, glutamic acid, hydroxymethylfurfural, malic acid, mannitol, methyl-2-pyrrolyl ketone, inositol, pyruvic acid, quinic acid, sorbitol, syringic acid, tartaric acid, tryptamine, and uracil.

The non-volatile compounds present in a coffee replica can include compounds that fall into a first set of categories, including acids; amino acids or derivatives thereof, sugars or sugar alcohols; xanthines (e.g., caffeine, or theobromine); fats or waxes; starches, fiber, gums, or polysaccharides; tannins, polyphenols, or anthocyanins; pH modifiers; coloring agents; surfactants or emulsifiers; minerals or metals; preservatives (e.g., sodium benzoate), antioxidants; or proteins or peptides. In some embodiments, a coffee replica can include an acid, an amino acid or derivative thereof, a sugar or sugar alcohol, a tannin, polyphenol, or anthocyanin, and a protein or peptide.

The non-volatile compounds present in a coffee replica can include compounds that fall into a second set of categories, including acids; aldehydes; alkaloids; amines; amino acids; furans; ketones; lactones; nucleotides, nucleotide monophosphates, or nucleobases; proteins or peptides; pyrazines; pyridines; sugars or sugar alcohols; tannins; phenols, polyphenols, or anthocyanins; or xanthines. In some embodiments, a coffee replica can include one or more of: an acid, an aldehyde, an alkaloid, an amine, an amino acid, a furan, a ketone, a lactone, a nucleotide, a nucleotide monophosphate, or nucleobase, a protein or peptide, a pyrazine, a pyridine, a sugar or sugar alcohol, a tannin, phenol, polyphenol, or anthocyanin, a xanthine, or a combination thereof. In some embodiments, a coffee replica can include at least one non-volatile compound that belongs to each of at least 3 (e.g., at least 4, at least 5, at least 5, at least 7, at least 8, at least 9, at least 10, at least 15, 3 to 15, 3 to 10, 3 to 5, 5 to 14, 5 to 10, 10 to 15, or 10 to 16) of the following categories: an acid, an aldehyde, an alkaloid, an amine, an amino acid, a furan, a ketone, a lactone, a nucleotide, a nucleotide monophosphate, or nucleobase, a protein or peptide, a pyrazine, a pyridine, a sugar or sugar alcohol, a tannin, phenol, polyphenol, or anthocyanin, or a xanthine. In some embodiments, a coffee replica can include an acid, an aldehyde, an amino acid, a lactone, a pyrazine, a tannin, phenol, polyphenol, or anthocyanin, and a xanthine.

It will be appreciated that any of these components can be provided in any appropriate form. For example, it will be appreciated that amino acids can be provided in the form of a salt (e.g., an HCl salt). It will also be appreciated that any and all stereoisomers can be used when no stereochemistry is specified.

In some embodiments, a coffee replica (e.g., a coffee beverage replica) can include no preservatives.

Amino acids (e.g., including derivatives thereof) that may be present in a coffee replica as provided herein include, without limitation, arginine, asparagine, aspartic acid, beta-alanine, betaine, carnitine, choline, citrulline, cysteine, cystine, GABA, glutamine, glycine, histidine, homoserine, isoleucine, leucine, lysine, methionine, ornithine, phenylalanine, pipecolinic acid, proline, serine, threonine, trans-4-hydroxyproline, tryptophan, tyrosine, valine, and any combination thereof. In some embodiments, a coffee replica can include one or more (e.g., 2, 3, 4, 5, 10, 15, 20, or 25) amino acids selected from the group consisting of arginine, asparagine, aspartic acid, beta-alanine, betaine, carnitine, choline, citrulline, cysteine, cystine, GABA, glutamine, glycine, histidine, homoserine, isoleucine, leucine, lysine, methionine, ornithine, phenylalanine, pipecolinic acid, proline, serine, threonine, trans-4-hydroxyproline, tryptophan, tyrosine, and valine. In some embodiments, a coffee replica can include aspartic acid, choline, or both. The amino acid(s) can be present in any suitable amount. In some embodiments, the amino acid(s) can be present in an amount of about 2 to about 90 mg/L (e.g., about 2 to about 5 mg/L, about 5 to about 10 mg/L, about 10 to about 50 mg/L, about 50 to about 90 mg/L, about 10 to about 30 mg/L, about 30 to about 50 mg/L, about 50 to about 70 mg/L, or about 70 to about 90 mg/L). The amino acid(s) can make up any suitable proportion of the overall non-volatile compound content. In some embodiments, a coffee replica can include no amino acids. In some embodiments, an amino acid can be provided as the L-stereoisomer.

Examples of acids that can be included in a coffee replica include, without limitation, 2-furoic acid, 2-isopropylmalic acid, 3,4-dihydroxybenzoic acid, 4-guanidinobutyric acid, 4-methoxycinnamic acid, adipic acid, caffeic acid, cinnamic acid, citric acid, coumaric acid, D-gluconic acid, D-glucuronic acid, DL-hydroxystearic acid, fumaric acid, glutamic acid, kynurenic acid, lactic acid, malic acid, pantothenic acid, pyruvic acid, quinic acid, sorbic acid, succinic acid, tartaric acid, and any combination thereof. In some embodiments, a coffee replica can include one or more (e.g., at least 2, 3, 4, 5, 10, 15, or 20) acids selected from the group consisting of 2-furoic acid, 2-isopropylmalic acid, 3,4-dihydroxybenzoic acid, 4-guanidinobutyric acid, 4-methoxycinnamic acid, adipic acid, caffeic acid, cinnamic acid, citric acid, coumaric acid, D-gluconic acid, D-glucuronic acid, DL-hydroxystearic acid, fumaric acid, glutamic acid, kynurenic acid, lactic acid, malic acid, pantothenic acid, pyruvic acid, quinic acid, sorbic acid, succinic acid, and tartaric acid. In some embodiments, a coffee replica can include one or more (e.g., 2 or 3) acids selected from the group consisting of citric acid, lactic acid, and succinic acid. The acid(s) can be present in any suitable amount. In some embodiments, the acid(s) can be present in an amount of about 8 mg/L to about 2.2 g/L (e.g., about 8 to about 10 mg/L, about 10 to about 50 mg/L, about 50 to about 100 mg/L, about 100 to about 500 mg/L, about 500 mg/L to about 1 g/L, about 1 g/L to about 2 g/L, or about 1.0 g/L to about 2.2 g/L). The acid(s) can make up any suitable proportion of the overall non-volatile compound content. Any suitable number of acids can be used, for example, 1 to 3, at least 2, or at least 3 acids can be used. In some embodiments, a coffee replica can include no acids.

Examples of aldehydes that can be used in a coffee replica include, without limitation, vanillin. The aldehyde(s) can be present in any suitable amount. In some embodiments, the aldehyde(s) can be present in an amount of about 0.08 mg/L to about 40 mg/L (e.g., about 0.08 to about 0.1 mg/L, about 0.1 to about 0.5 mg/L, about 0.5 to about 1 mg/L, about 1 to about 5 mg/L, about 5 to about 10 mg/L, about 10 to about 40 mg/L, about 10 to about 20 mg/L, about 20 to about 30 mg/L, about 30 to about 40 mg/L, about 10 to about 30 mg/L, or about 20 to about 40 mg/L). In some embodiments, the aldehyde(s) can be present in an amount of at least about 0.25 mg/L (e.g., at least about 0.3 mg/L, 0.4 mg/L, 0.5 mg/L, 1 mg/L, 2 mg/L, 3 mg/L, 4 mg/L, 5 mg/L, 10 mg/L, 15 mg/L, 20 mg/L, 25 mg/L, 30 mg/L, or 35 mg/L). The aldehyde(s) can make up any suitable proportion of the non-volatile compound content. Any suitable number of aldehydes can be used. In some embodiments, a coffee replica can include no aldehydes.

Examples of alkaloids that can be used in a coffee replica include, without limitation, piperine. The alkaloid(s) can be present in any suitable amount. The alkaloid(s) can make up any suitable proportion of the non-volatile compound content. Any suitable number of alkaloids can be used. In some embodiments, a coffee replica can include no alkaloids.

Examples of amines that can be used in a coffee replica include, without limitation, tryptamine. The amine(s) can be present in any suitable amount. In some embodiments, the amine(s) can be present in an amount of about 0.05 to about 0.2 mg/L (e.g., about 0.05 to about 0.1 mg/L or 0.1 to about 0.2 mg/L). The amine(s) can make up any suitable proportion of the non-volatile compound content. Any suitable number of amines can be used. In some embodiments, a coffee replica can include no amines.

Examples of furans that can be used in a coffee replica include, without limitation, hydroxymethylfurfural. The furan(s) can be present in any suitable amount. In some embodiments, the furan(s) can be present in an amount of about 10 to about 20 mg/L (e.g., about 10 to about 15 mg/L or about 15 to about 20 mg/L). The furan(s) can make up any suitable proportion of the non-volatile compound content. Any suitable number of furans can be used. In some embodiments, a coffee replica can include no furans.

Examples of ketones that can be used in a coffee replica include, without limitation, 2(5H)-furanone, 5-ethyl-4-hydroxy-2-methyl-3(2H)-furanone, acetovanillone, and methyl-2-pyrrolyl ketone. In some embodiments, a coffee replica can include one or more (e.g., at least 2, 3, or 4) ketones selected from the group consisting of 2(5H)-furanone, 5-ethyl-4-hydroxy-2-methyl-3(2H)-furanone, acetovanillone, and methyl-2-pyrrolyl ketone. The ketone(s) can be present in any suitable amount. In some embodiments, the ketone(s) can be present in an amount of about 0.008 to about 65 mg/L (e.g., about 0.008 to about 0.05 mg/L, about 0.01 to about 0.05 mg/L, about 0.05 to about 0.1 mg/L, about 0.1 to about 0.5 mg/L, about 0.5 to about 1 mg/L, about 1 to about 5 mg/L, about 5 to about 10 mg/L, about 10 to about 50 mg/L, about 10 to about 65 mg/L, about 10 to about 30 mg/L, about 30 to about 50 mg/L, about 20 to about 40 mg/L, about 40 to about 60 mg/L, or about 40 to about 65 mg/L). The ketone(s) can make up any suitable proportion of the non-volatile compound content. Any suitable number of ketones can be used. In some embodiments, a coffee replica can include no ketones.

Examples of lactones that can be used in a coffee replica include, without limitation, sotolon. The lactone(s) can be present in any suitable amount. In some embodiments, the lactone(s) can be present in an amount of about 0.1 to about 85 mg/L (e.g., about 0.1 to about 0.5 mg/L, about 0.5 to about 1 mg/L, about 0.1 to about 1 mg/L, about 1 to about 5 mg/L, about 5 to about 10 mg/L, about 10 to about 50 mg/L, about 50 to about 85 mg/L, about 10 to about 30 mg/L, about 30 to about 50 mg/L, about 50 to about 70 mg/L, about 70 to about 85 mg/L, about 20 to about 40 mg/L, about 40 to about 60 mg/L, about 60 to about 80 mg/L, or about 60 to about 85 mg/L). The lactone(s) can make up any suitable proportion of the non-volatile compound content. Any suitable number of lactones can be used. In some embodiments, a coffee replica can include no lactones.

Examples of nucleotides, nucleotide monophosphates, or nucleobases that can be used in a coffee replica include, without limitation, adenine, AMP, CMP, cytidine, cytosine, guanine, and uracil. In some embodiments, a coffee replica can include one or more (e.g., 2, 3, 4, 5, 6, or 7) nucleotide, nucleotide monophosphate, or nucleobase selected from the group consisting of adenine, AMP, CMP, cytidine, cytosine, guanine, and uracil. The nucleotides, nucleotide monophosphates, or nucleobase(s) can be present in any suitable amount. In some embodiments, the nucleotides, nucleotide monophosphates, or nucleobase(s) can be present in an amount of about 0.7 to about 5 mg/L (e.g., about 0.7 to about 1 mg/L, about 1 to about 5 mg/L, about 1 to about 3 mg/L, or about 3 to about 5 mg/L). The nucleotides, nucleotide monophosphates, or nucleobase(s) can make up any suitable proportion of the non-volatile compound content. Any suitable number of nucleotides, nucleotide monophosphates, or nucleobases can be used. In some embodiments, a coffee replica can include no nucleotides, nucleotide monophosphates, or nucleobases.

Examples of pyrazines that can be used in a coffee replica include, without limitation, 2,3,5,6-tetramethylpyrazine, 2,3,5-trimethylpyrazine, and 2,3-dimethylpyrazine. In some embodiments, a coffee replica can include one or more (e.g., 2 or 3) pyrazine selected from the group consisting of 2,3,5,6-tetramethylpyrazine, 2,3,5-trimethylpyrazine, and 2,3-dimethylpyrazine. In some embodiments, a coffee replica can include 2,3,5-trimethylpyrazine, 2,3-dimethylpyrazine, or both. The pyrazine(s) can be present in any suitable amount. In some embodiments, the pyrazine(s) can be present in an amount of about 0.000007 to about 24 mg/L (e.g., 0.000007 to about 0.00001 mg/L, about 0.00001 to about 0.0001 mg/L, about 0.0001 to about 0.001 mg/L, about 0.001 to about 0.01 mg/L, about 0.01 to about 0.1 mg/L, about 0.1 to about 0.5 mg/L, about 0.5 to about 1 mg/L, about 1 to about 5 mg/L, about 5 to about 10 mg/L, about 10 to about 20 mg/L, about 10 to about 24 mg/L, or about 15 to about 24 mg/L). The pyrazine(s) can make up any suitable proportion of the non-volatile compound content. Any suitable number of pyrazines can be used. In some embodiments, a coffee replica can include no pyrazines.

Examples of pyridines that can be used in a coffee replica include, without limitation, pyridine and pyroxidine. In some embodiments, a coffee replica can include pyridine, pyroxidine, or both. The pyridine(s) can be present in any suitable amount. In some embodiments, the pyridine(s) can be present in an amount of about 0.4 to about 60 mg/L (e.g., about 0.4 to about 1 mg/L, about 0.5 to about 1 mg/L, about 1 to about 5 mg/L, about 5 to about 10 mg/L, about 10 to about 50 mg/L, about 10 to about 60 mg/L, about 10 to about 30 mg/L, about 30 to about 50 mg/L, about 20 to about 40 mg/L, or about 40 to about 60 mg/L). The pyridine(s) can make up any suitable proportion of the non-volatile compound content. Any suitable number of pyridines can be used. In some embodiments, a coffee replica can include no pyridines.

Examples of sugars or sugar alcohols that can be used in a coffee replica include, without limitation, arabitol, fructose, galactose, glucosamine, glucose, mannitol, mannose, inositol (e.g., myo-inositol), rhamnose, ribose, sorbitol, xylose, and any combination thereof. In some embodiments, a coffee replica can include one or more (e.g., at least 2, 3, 4, 5, 6, 8, 10, or 12) sugars or sugar alcohols selected from the group consisting of arabitol, fructose, galactose, glucosamine, glucose, mannitol, mannose, inositol, rhamnose, ribose, sorbitol, and xylose. The sugars or sugar alcohol(s) can be present in any suitable amount. In some embodiments, the sugars or sugar alcohol(s) can be present in an amount of about 50 to about 550 mg/L (e.g., about 50 to about 100 mg/L, about 100 to about 500 mg/L, about 100 to about 550 mg/L, about 100 to about 300 mg/L, about 300 to about 500 mg/L, about 300 to about 550 mg/L, or about 200 to about 400 mg/L). The sugars or sugar alcohol(s) can make up any suitable proportion of the non-volatile compound content. Any suitable number of sugars or sugar alcohols can be used. In some embodiments, a coffee replica can include no sugars or sugar alcohols.

Sugars that can be used in a coffee replica include, without limitation, fructose, galactose, glucosamine, glucose, mannose, rhamnose, ribose, xylose, and any combination thereof.

Sugar alcohols that can be present in a coffee replica include, without limitation, arabitol, inositol (e.g., myo-inositol), mannitol, sorbitol, and any combination thereof.

Examples of tannins, phenols, polyphenols, or anthocyanins that can be used in a coffee replica include, without limitation, catechin, ellagic acid, epicatechin, epicatechin gallate, gallic acid, hesperetin, methyl gallate, polydatin, propyl gallate, quercetin, resveratrol, rutin, salicylic acid, sinapinic acid, syringaldehyde, syringic acid, trans-ferulic acid, tyramine, and vanillic acid. In some embodiments, the coffee replica can include one or more (e.g., 2, 3, 4, 5, 6, 8, 10, 12, 14, 16, or 18) tannins, phenols, polyphenols, or anthocyanins selected from the group consisting of catechin, ellagic acid, epicatechin, epicatechin gallate, gallic acid, hesperetin, methyl gallate, polydatin, propyl gallate, quercetin, resveratrol, rutin, salicylic acid, sinapinic acid, syringaldehyde, syringic acid, trans-ferulic acid, tyramine, and vanillic acid. In some embodiments, the coffee replica can include trans-ferulic acid, vanillic acid, or both. The tannins, phenols, polyphenols, or anthocyanin(s) can be present in any suitable amount. In some embodiments, the tannins, phenols, polyphenols, or anthocyanin(s) can be present in an amount of about 15 to about 55 mg/L (e.g., about 15 to about 20 mg/L, about 15 to about 25 mg/L, about 25 to about 50 mg/L, about 25 to about 55 mg/L, about 20 to about 40 mg/L, about 30 to about 50 mg/L, or about 30 to about 55 mg/L). The tannins, phenols, polyphenols, or anthocyanin(s) can make up any suitable proportion of the non-volatile compound content. Any suitable number of tannins, phenols, polyphenols, or anthocyanins can be used. In some embodiments, a coffee replica can include no tannins, phenols, polyphenols, or anthocyanins.

Examples of xanthines that can be used in a coffee replica include, without limitation, caffeine. The xanthine(s) can be present in any suitable amount. In some embodiments, the xanthine(s) can be present in an amount of about 100 to about 300 mg/L (e.g., about 100 to about 200 mg/L, about 150 to about 250 mg/L, or about 200 to about 300 mg/L). The xanthine(s) can make up any suitable proportion of the non-volatile compound content. Any suitable number of xanthines can be used. In some embodiments, a coffee replica can include no xanthines.

Examples of proteins or peptides that can be used in a coffee replica include, without limitation, carnosine. The proteins or peptide(s) can be present in any suitable amount. The proteins or peptide(s) can make up any suitable proportion of the non-volatile compound content. Any suitable number of proteins or peptides can be used. In some embodiments, a coffee replica can include no proteins or peptides.

Colorants that may be used in the coffee replicas provided herein include, without limitation, natural colorants derived from fruits and vegetables such as beet, carrot, and cabbage [e.g., annatto extract, beet extract, beta carotene, caramel, carmine (cochineal extract), elderberry extract, grapeskin extract (enocianina), paprika, saffron, titanium dioxide, and turmeric], as well as synthetic dyes (e.g., FD+C/synthetic colors).

In some cases, the amount of any particular non-volatile compound in a coffee replica may be different than the amount of that non-volatile compound in a corresponding reference coffee. In some cases, the amount of a non-volatile compound in a coffee replica can be 75% or less (e.g., 70% or less, 60% or less, 50% or less, 40% or less, 30% or less, 20% or less, or 10% or less), by concentration or percent mass, than the amount of the same non-volatile compound in a corresponding reference coffee. In some cases, the amount of a non-volatile compound in a coffee replica can be 125% or more (e.g., 150% or more, 200% or more, or 300% or more), by concentration or percent mass, than the amount of the same non-volatile compound in a corresponding reference coffee.

In some cases, the total amount (e.g., in mg/L of a coffee replica beverage) of non-volatile compounds in a coffee replica can be less than the total amount of non-volatile compounds in a reference coffee.

In some embodiments, non-volatile compounds can be placed in various groupings, and a coffee replica can include certain non-volatile compounds according to their groupings.

In certain cases, for example, "Group D" can include 2(5H)-furanone, 2,3,5,6-tetramethylpyrazine, 2,3,5-trimethylpyrazine, 2,3-dimethylpyrazine, 2-ethyl-2-hydroxybutyric acid, 2-furoic acid, 2-isopropylmalic acid, 3,4-dihydroxybenzoic acid, 4-guanidinobutyric acid, 4-methoxycinnamic acid, 5-ethyl-4-hydroxy-2-methyl-3(2H)-furanone, acetovanillone, adenine, adipic acid, AMP, arabitol, arginine, asparagine, aspartic acid, beta-alanine, betaine, caffeic acid, caffeine, carnitine, carnosine, catechin, choline, cinnamic acid, citric acid, citrulline, CMP, coumaric acid, cysteine, cystine, cytidine, cytosine, D-gluconic acid, D-glucuronic acid, DL-hydroxystearic acid, ellagic acid, epicatechin, epicatechin gallate, fructose, fumaric acid, GABA, galactose, gallic acid, glucosamine, glucose, glutamic acid, glutamine, glycine, guanine, hesperetin, histidine, homoserine, hydroxymethylfurfural, isoleucine, kynurenic acid, lactic acid, leucine, lysine, malic acid, mannitol, mannose, methionine, methyl gallate, methyl-2-pyrrolyl ketone, inositol, ornithine, pantothenic acid, phenylalanine, pipecolinic acid, piperine, polydatin, proline, propyl gallate, pyridine, pyridoxine, pyruvic acid, quercetin, quinic acid, resveratrol, rhamnose, ribose, rutin, salicylic acid, serine, sinapinic acid, sorbic acid, sorbitol, sotolon, succinic acid, syringaldehyde, syringic acid, tartaric acid, threonine, trans-4-hydroxyproline, trans-ferulic acid, tryptamine, tryptophan, tyramine, tyrosine, uracil, valine, vanillic acid, vanillin, and xylose. Therefore, in some embodiments, a coffee replica can include at least 5 (e.g., at least 6, 7, 8, 9, 10, 11, 12, 13, 14, 15, 15, 16, 17, 18, 19, or 20) compounds from Group D.

In certain cases, for example, "Group E" can include 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin. Therefore, in some embodiments, a coffee replica can include at least 5 (e.g., at least 6, 7, 8, 9, 10, 11, or 12) compounds from Group E. In some embodiments, a coffee replica can include the compounds from Group E.

In some cases, a coffee replica can have a total non-volatile compound content that is about 500 to about 1500 mg/L (e.g., about 500 to about 700 mg/L, about 700 to about 900 mg/L, about 900 to about 1100 mg/L, about 1100 to about 1300 mg/L, or about 1300 to about 1500 mg/L). In some embodiments, a coffee replica can have a total non-volatile compound content from the non-volatile compounds in Group D that is about 500 to about 1500 mg/L (e.g., about 500 to about 700 mg/L, about 700 to about 900 mg/L, about 900 to about 1100 mg/L, about 1100 to about 1300 mg/L, or about 1300 to about 1500 mg/L). In some embodiments, a coffee replica can have a total non-volatile compound content from the non-volatile compounds in Group E that is about 500 to about 1500 mg/L (e.g., about 500 to about 700 mg/L, about 700 to about 900 mg/L, about 900 to about 1100 mg/L, about 1100 to about 1300 mg/L, or about 1300 to about 1500 mg/L).

A coffee replica can include any appropriate number of non-volatile compounds. For example, a coffee replica can include 1 to 100 (e.g., at least 5, at least 10, at least 20, at least 30, at least 40, at least 50, 1 to 90, 1 to 80, 1 to 70, 1 to 60, 1 to 50, 1 to 40, 1 to 30, 1 to 20, 1 to 10, 1 to 5, 5 to 100, 5 to 90, 5 to 80, 5 to 70, 5 to 60, 5 to 40, 5 to 30, 5 to 20, 5 to 10, 10 to 100, 10 to 90, 10 to 90, 10 to 70, 10 to 60, 10 to 50, 10 to 40, 10 to 30, 10 to 20, 20 to 100, 20 to 90, 20 to 80, 20 to 70, 20 to 60, 20 to 50, 20 to 40, 20 to 30, 30 to 100, 30 to 90, 30 to 80, 30 to 70, 30 to 60, 30 to 50, 30 to 40, 40 to 100, 40 to 90, 40 to 80, 40 to 70, 40 to 60, 40 to 50, 50 to 100, 50 to 90, 50 to 80, 50 to 70, or 50 to 60) non-volatile compounds. In some cases, the number of non-volatile compounds in a coffee can be less than the number of non-volatile compounds in a single reference coffee.

In some cases, the overall population of non-volatile compounds in a coffee replica can have less than 95% identity to the non-volatile compounds in a corresponding reference coffee (e.g., from a single region, in a single variety, cultivar, or packaging unit (e.g., a bag)). For example, the non-volatile compounds in a coffee replica can have less than 95%, less than 90%, less than 85%, less than 80%, less than 70%, less than 60%, less than 50%, or less than 40% identity to the population of non-volatile compounds in a corresponding reference coffee. Some coffee replicas may contain at least 10 (e.g., at least 15, at least 20, at least 25, or at least 30) non-volatile compounds that are not found in a single reference coffee. For example, in some embodiments, a coffee replica can have at least m non-volatile compounds and less than m (e.g., m−1, m−2, m−3, m−4, m−5, m−6, m−7, m−8, m−9, m−10, m−15, m−20, and the like, as applicable) of the non-volatile compounds are found in a single reference coffee; in some embodiments, m can be equal to 5, 6, 7, 8, 9, 10, 11, 12, 13, 14, 15, 16, 17, 18, 19, 20, 25, 30, 35, or 40.

Example 2 sets forth amounts of non-volatile compounds that were detected in traditional coffee samples. In some embodiments, the amount of a particular non-volatile compound in a coffee replica can be an amount, based on concentration or percent composition that is within a range 30% higher and lower than the amount disclosed for that non-volatile compound. For example, a non-volatile compound can be present in a coffee replica in an amount that is 70 to 90%, 80 to 100%, 90 to 110%, 100 to 120%, 110 to 130%, 70 to 100%, 80 to 110%, 90 to 120%, or 100 to 130% of a disclosed amount for that non-volatile compound in a traditional coffee.

In some embodiments, the non-volatile compounds can include one or more (e.g., 1 to 2, 1 to 3, 1 to 5, 1 to 10, 1 to 15, 1 to 20, 1 to 25, 1 to 28, 5 to 10, 10 to 15, 10 to 20, 15 to 20, 20 to 28, 20 to 25, or 25 to 28) of 2-furoic acid, 2-isopropylmalic acid, 3,4-dihydroxybenzoic acid, arabitol, aspartic acid, betaine, citric acid, D-glucuronic acid, fructose, galactose, gallic acid, glucose, glutamic acid, lactic acid, malic acid, mannitol, inositol, phenylalanine, pyruvic acid, quinic acid, sorbitol, succinic acid, tartaric acid, valine, ribose, rhamnose, and xylose.

In some embodiments, a coffee replica can exclude one or more non-volatile compounds according to their groups. in some cases, "Group H" can include 2-furoic acid, 2-isopropylmalic acid, 3,4-dihydroxybenzoic acid, arabitol, aspartic acid, betaine, citric acid, D-glucuronic acid, fructose, galactose, gallic acid, glucose, glutamic acid, lactic acid, malic acid, mannitol, inositol, phenylalanine, pyruvic acid, quinic acid, sorbitol, succinic acid, tartaric acid, and valine. Accordingly, provided herein are coffee replicas that do not include at least 1 (e.g., at least 2, at least 3, at least 5, at least 10, at least 15, at least 20, 1 to 25, 1 to 20, 1 to 15, 1 to 10, 1 to 5, 1 to 3, 3 to 25, 3 to 15, 3 to 10, 3 to 5, 5 to 25, 5 to 20, 5 to 15, 5 to 10, 10 to 25, 10 to 20, 10 to 15, 15 to 25, 15 to 20, or 20 to 25) non-volatile compound selected from the group consisting of the compounds in Group H.

In some embodiments, a coffee replica can include one or more non-volatile according to their groups. In some cases "Group I" can include arginine, asparagine, beta-alanine, carnitine, carnosine, citrulline, cystine, fumaric acid, GABA, glucosamine, glutamine, glycine, histidine, homoserine, isoleucine, kynurenic acid, leucine, lysine, mannose, methionine, ornithine, pipecolinic acid, proline, serine, threonine, trans-4-hydroxyproline, tryptophan, and tyrosine. Accordingly, provided herein are coffee replicas that include at least 1 (e.g., at least 2, at least 3, at least 5, at least 10, at least 15, at least 20, at least 28, 1 to 28, 1 to 25, 1 to 20, 1 to 15, 1 to 10, 1 to 5, 1 to 3, 3 to 28, 3 to 25, 3 to 15, 3 to 10, 3 to 5, 5 to 28, 5 to 25, 5 to 20, 5 to 15, 5 to 10, 10 to 28, 10 to 25, 10 to 20, 10 to 15, 15 to 28, 15 to 25, 15 to 20, 20 to 28, 20 to 25, or 25 to 28) non-volatile compounds selected from the group consisting of the compounds in Group I.

The one or more non-volatile compounds in a coffee beverage replica can include 2-furoic acid. In some embodiments, the 2-furoic acid can be present in an amount of about 0.5 mg/L to about 42 mg/L (e.g., about 0.5 to about 1 mg/L, about 1 to about 5 mg/L, about 1 to about 3 mg/L, about 3 to about 5 mg/L, about 5 to about 10 mg/L, about 10 to about 20 mg/L, about 20 to about 40 mg/L, about 20 to about 42 mg/L, about 10 to about 30 mg/L, about 20 to about 30 mg/L, about 30 to about 40 mg/L, or about 30 to about 42 mg/L). In some embodiments, a coffee beverage replica can include no 2-furoic acid.

The one or more non-volatile compounds in a coffee beverage replica can include 2-isopropylmalic acid. In some embodiments, the 2-isopropylmalic acid can be present in an amount of about 0.05 mg/L to about 0.25 mg/L (e.g., about 0.05 to about 0.10 mg/L, about 0.10 to about 0.15 mg/L, about 0.15 to about 0.20 mg/L, about 0.20 to about 0.25 mg/L, about 0.05 to about 0.15 mg/L, about 0.10 to about 0.20 mg/L, or about 0.15 to about 0.25 mg/L). In some embodiments, a coffee beverage replica can include no 2-isopropylmalic acid.

The one or more non-volatile compounds in a coffee beverage replica can include 3,4-dihydroxybenzoic acid. In some embodiments, the 3,4-dihydroxybenzoic acid can be present in an amount of about 0.0003 mg/L to about 0.5 mg/L (e.g., about 0.0003 to about 0.0005 mg/L, about 0.0005 to about 0.001 mg/L, about 0.001 to about 0.005 mg/L, about 0.005 to about 0.01 mg/L, about 0.01 to about 0.05 mg/L, about 0.05 to about 0.1 mg/L, or about 0.1 to about 0.5 mg/L). In some embodiments, a coffee beverage replica can include no 3,4-dihydroxybenzoic acid.

The one or more non-volatile compounds in a coffee beverage replica can include arabitol. In some embodiments, the arabitol can be present in an amount of about 1.2 mg/L to about 9.2 mg/L (e.g., about 1.2 to about 5 mg/L, about 2 to about 5 mg/L, about 3 to about 5 mg/L, about 5 to about 7 mg/L, about 7 to about 9 mg/L, about 7.0 to about 9.2 mg/L, about 5 to about 9 mg/L, or about 5.0 to about 9.2 mg/L). In some embodiments, a coffee beverage replica can include no arabitol.

The one or more non-volatile compounds in a coffee replica can include aspartic acid. In some embodiments, the aspartic acid can be present in an amount of about 13 mg/L to about 25 mg/L (e.g., about 13 to about 15 mg/L, about 15 to about 17 mg/L, about 17 to about 19 mg/L, about 19 to about 21 mg/L, about 21 to about 23 mg/L, or about 23 to about 25 mg/L). In some embodiments, a coffee replica can include no aspartic acid.

The one or more non-volatile compounds in a coffee replica can include betaine. In some embodiments, the betaine can be present in an amount of about 0.3 mg/L to about 2.8 mg/L (e.g., about 0.3 to about 0.7 mg/L, about 0.7 to about 1 mg/L, about 1 to about 1.3 mg/L, about 1.3 to about 1.7 mg/L, about 1.7 to about 2 mg/L, about 2 to about 2.4 mg/L, or about 2.4 to about 2.8 mg/L). In some embodiments, a coffee replica can include no betaine.

The one or more non-volatile compounds in a coffee replica can include carnitine. In some embodiments, the carnitine can be present in an amount of about 0.1 mg/L to about 0.25 mg/L (e.g., about 0.1 to about 0.125 mg/L, about 0.125 to about 0.15 mg/L, about 0.15 to about 0.175 mg/L, about 0.175 to about 0.2 mg/L, about 0.2 to about 0.225 mg/L, or about 0.225 to about 0.25 mg/L). In some embodiments, a coffee replica can include no carnitine.

The one or more non-volatile compounds in a coffee beverage replica can include citric acid. In some embodiments, the citric acid can be present in an amount of about 25 mg/L to about 1.2 g/L (e.g., about 25 to about 35 mg/L, about 35 to about 45 mg/L, about 45 to about 55 mg/L, about 55 to about 65 mg/L, about 65 to about 75 mg/L, about 75 to about 85 mg/L, about 25 to about 40 mg/L, about 40 to about 80 mg/L, about 30 to about 50 mg/L, about 50 to about 80 mg/L, about 50 to about 85 mg/L, about 40 to about 85 mg/L about 25 to about 50 mg/L, about 50 to about 100 mg/L, about 100 to about 500 mg/L, about 500 mg/L to about 1 g/L, about 500 mg/L to about 1.2 g/L, about 100 to about 300 mg/L, about 300 to about 500 mg/L, about 500 to about 700 mg/L, about 700 to about 900 mg/L, about 900 mg/L to about 1.1 g/L, about 200 to about 400 mg/L, about 400 to about 600 mg/L, about 600 to about 800 mg/L, about 800 mg/L to about 1 g/L, or about 1.0 to about 1.2 g/L). In some embodiments, a coffee beverage replica can include no citric acid.

The one or more non-volatile compounds in a coffee replica can include D-glucuronic acid. In some embodiments, the D-glucuronic acid can be present in an amount of about 0.6 mg/L to about 1.8 mg/L (e.g., about 0.6 to about 0.8 mg/L, about 0.8 to about 1 mg/L, about 1 to about 1.2 mg/L, about 1.2 to about 1.4 mg/L, about 1.4 to about 1.6 mg/L, or about 1.6 to about 1.8 mg/L). In some embodiments, a coffee replica can include no D-glucuronic acid.

The one or more non-volatile compounds in a coffee beverage replica can include fructose. In some embodiments, the fructose can be present in an amount of about 4 mg/L to about 210 mg/L (e.g., about 4 to about 10 mg/L, about 5 to about 10 mg/L, about 10 to about 50 mg/L, about 50 to about 100 mg/L, about 100 to about 200 mg/L, or about 100 to about 210 mg/L). In some embodiments, a coffee beverage replica can include no fructose.

The one or more non-volatile compounds in a coffee replica can include fumaric acid. In some embodiments, the fumaric acid can be present in an amount of about 2 mg/L to about 14 mg/L (e.g., about 2 to about 4 mg/L, about 4 to about 6 mg/L, about 6 to about 8 mg/L, about 8 to about 10 mg/L, about 10 to about 12 mg/L, or about 12 to about 14 mg/L). In some embodiments, a coffee replica can include no fumaric acid.

The one or more non-volatile compounds in a coffee beverage replica can include galactose. In some embodiments, the galactose can be present in an amount of about 1 mg/L to about 120 mg/L (e.g., about 1 to about 5 mg/L, about 5 to about 10 mg/L, about 10 to about 50 mg/L, about 50 to about 100 mg/L, about 50 to about 120 mg/L, or about 100 to about 120 mg/L). In some embodiments, a coffee beverage replica can include no galactose.

The one or more non-volatile compounds in a coffee beverage replica can include glucose. In some embodiments, the glucose can be present in an amount of about 5 mg/L to about 170 mg/L (e.g., about 5 to about 10 mg/L, about 10 to about 50 mg/L, about 50 to about 100 mg/L, about 100 to about 170 mg/L, or about 50 to about 170 mg/L). In some embodiments, a coffee beverage replica can include no glucose.

The one or more non-volatile compounds in a coffee replica can include glutamic acid. In some embodiments, the glutamic acid can be present in an amount of about 0.1 mg/L to about 1.2 mg/L (e.g., about 0.1 to about 0.3 mg/L, about 0.3 to about 0.5 mg/L, about 0.5 to about 0.7 mg/L, about 0.6 to about 0.8 mg/L, about 0.8 to about 1 mg/L, or about 1 to about 1.2 mg/L). In some embodiments, a coffee replica can include no glutamic acid.

The one or more non-volatile compounds in a coffee beverage replica can include lactic acid. In some embodiments, the lactic acid can be present in an amount of about 6 mg/L to about 130 mg/L (e.g., about 6 to about 10 mg/L, about 10 to about 15 mg/L, about 15 to about 20 mg/L, about 20 to about 25 mg/L, about 20 to about 26 mg/L, about 10 to about 20 mg/L, about 15 to about 25 mg/L, about 10 to about 50 mg/L, about 50 to about 100 mg/L, about 50 to about 130 mg/L, about 10 to about 30 mg/L, about 30 to about 50 mg/L, about 50 to about 70 mg/L, about 70 to about 90 mg/L, about 90 to about 110 mg/L, or about 110 to about 130 mg/L). In some embodiments, a coffee beverage replica can include no lactic acid.

The one or more non-volatile compounds in a coffee beverage replica can include malic acid. In some embodiments, the malic acid can be present in an amount of about 30 mg/L to about 415 mg/L (e.g., about 30 to about 65 mg/L, about 65 to about 130 mg/L, about 30 to about 50 mg/L, about 50 to about 70 mg/L, about 70 to about 90 mg/L, about 40 to about 60 mg/L, about 60 to about 80 mg/L, about 80 to about 100 mg/L, about 50 to about 100 mg/L, about 100 to about 400 mg/L, about 100 to about 415 mg/L, about 100 to about 300 mg/L, about 200 to about 400 mg/L, or about 200 to about 415 mg/L). In some embodiments, a coffee beverage replica can include no malic acid.

The one or more non-volatile compounds in a coffee beverage replica can include mannitol. In some embodiments, the mannitol can be present in an amount of about 4 mg/L to about 20 mg/L (e.g., about 4 to about 10 mg/L, about 5 to about 10 mg/L, about 10 to about 15 mg/L, about 15 to about 20 mg/L, about 5 to about 15 mg/L, or about 10 to about 20 mg/L). In some embodiments, a coffee beverage replica can include no mannitol.

The one or more non-volatile compounds in a coffee beverage replica can include inositol (e.g., myo-inositol). In some embodiments, the inositol can be present in an amount of about 20 mg/L to about 55 mg/L (e.g., about 20 to about 30 mg/L, about 30 to about 40 mg/L, about 40 to about 50 mg/L, about 40 to about 55 mg/L, about 50 to about 55 mg/L, about 20 to about 40 mg/L, about 30 to about 50 mg/L, or about 30 to about 55 mg/L). In some embodiments, a coffee beverage replica can include no inositol.

The one or more non-volatile compounds in a coffee beverage replica can include phenylalanine. In some embodiments, the phenylalanine can be present in an amount of about 9 mg/L to about 30 mg/L (e.g., about 9 to about 15 mg/L, about 9 to about 20 mg/L, about 10 to about 15 mg/L, about 10 to about 20 mg/L, about 15 to about 20 mg/L, about 20 to about 25 mg/L, about 25 to about 30 mg/L, about 10 to about 20 mg/L, about 15 to about 25 mg/L, or about 20 to about 30 mg/L). In some embodiments, a coffee beverage replica can include no phenylalanine.

The one or more non-volatile compounds in a coffee beverage replica can include pyruvic acid. In some embodiments, the pyruvic acid can be present in an amount of about 1 mg/L to about 17 mg/L (e.g., about 1 to about 2 mg/L, about 2 to about 3 mg/L, about 3 to about 4 mg/L, about 1 to about 3 mg/L, about 2 to about 4 mg/L, about 1 to about 5 mg/L, about 5 to about 10 mg/L, about 10 to about 17 mg/L, about 10 to about 15 mg/L, about 5 to about 15 mg/L, or about 5 to about 17 mg/L). In some embodiments, a coffee beverage replica can include no pyruvic acid.

The one or more non-volatile compounds in a coffee replica can include quinic acid. In some embodiments, the quinic acid can be present in an amount of about 70 mg/L to about 300 mg/L (e.g., about 70 to about 100 mg/L, about 100 to about 150 mg/L, about 150 to about 200 mg/L, about 200 to about 250 mg/L, or about 250 to about 300 mg/L). In some embodiments, a coffee replica can include no quinic acid.

The one or more non-volatile compounds in a coffee beverage replica can include rhamnose. In some embodiments, the rhamnose can be present in an amount of about 12 mg/L to about 30 mg/L (e.g., about 12 to about 15 mg/L, about 12 to about 20 mg/L<about 15 to about 20 mg/L, about 20 to about 25 mg/L, about 25 to about 30 mg/L, about 15 to about 25 mg/L, or about 20 to about 30 mg/L). In some embodiments, a coffee beverage replica can include no rhamnose.

The one or more non-volatile compounds in a coffee beverage replica can include ribose. In some embodiments, the ribose can be present in an amount of about 0.4 mg/L to about 8.5 mg/L (e.g., about 0.4 to about 1 mg/L, about 0.5 to about 1 mg/L, about 1 to about 5 mg/L, about 5 to about 8 mg/L, about 5.0 to about 8.5 mg/L, about 1 to about 2 mg/L, about 2 to about 4 mg/L, about 4 to about 6 mg/L, about 6 to about 8 mg/L, or about 6.0 to about 8.5 mg/L). In some embodiments, a coffee beverage replica can include no ribose.

The one or more non-volatile compounds in a coffee beverage replica can include sorbitol. In some embodiments, the sorbitol can be present in an amount of about 7 mg/L to about 26 mg/L (e.g., about 7 to about 10 mg/L, about 10 to about 15 mg/L, about 15 to about 20 mg/L, about 20 to about 25 mg/L, about 20 to about 26 mg/L, about 10 to about 20 mg/L, about 15 to about 25 mg/L, or about 15 to about 26 mg/L). In some embodiments, a coffee beverage replica can include no sorbitol.

The one or more non-volatile compounds in a coffee beverage replica can include succinic acid. In some embodiments, the succinic acid can be present in an amount of about 1.8 mg/L to about 35 mg/L (e.g., about 1.8 to about 2.0 mg/L, about 2 to about 5 mg/L, about 2 to about 4 mg/L, about 3 to about 5 mg/L, about 2 to about 5 mg/L, about 5 to about 10 mg/L, about 5 to about 15 mg/L, about 5 to about 20 mg/L, about 10 to about 20 mg/L, about 20 to about 30 mg/L, or about 20 to about 35 mg/L). In some embodiments, a coffee beverage replica can include no succinic acid.

The one or more non-volatile compounds in a coffee beverage replica can include valine. In some embodiments, the valine can be present in an amount of about 17 mg/L to about 60 mg/L (e.g., about 17 to about 20 mg/L, about 20 to about 40 mg/L, about 30 to about 50 mg/L, or about 40 to about 60 mg/L). In some embodiments, a coffee beverage replica can include no valine.

The one or more non-volatile compounds in a coffee beverage replica can include xylose. In some embodiments, the xylose can be present in an amount of about 3.5 mg/L to about 11 mg/L (e.g., about 3.5 to about 5 mg/L, about 5 to about 10 mg/L, about 5 to about 11 mg/L, about 5 to about 7 mg/L, about 7 to about 9 mg/L, or about 9 to about 11 mg/L). In some embodiments, a coffee beverage replica can include no xylose.

The one or more non-volatile compounds in a coffee replica can include 2(5H)-furanone. In some embodiments, the 2(5H)-furanone can be present in an amount of about 0.1 mg/L to about 0.2 mg/L (e.g., about 0.1 to about 0.12 mg/L, about 0.12 to about 0.14 mg/L, about 0.14 to about 0.16 mg/L, about 0.16 to about 0.18 mg/L, or about 0.18 to about 0.2 mg/L). In some embodiments, a coffee replica can include no 2(5H)-furanone.

The one or more non-volatile compounds in a coffee replica can include 2,3,5,6-tetramethylpyrazine. In some embodiments, the 2,3,5,6-tetramethylpyrazine can be present in an amount of about 0.0009 mg/L to about 0.002 mg/L (e.g., about 0.0009 to about 0.001 mg/L, about 0.001 to about 0.0012 mg/L, about 0.0012 to about 0.0014 mg/L, about 0.0014 to about 0.0016 mg/L, about 0.016 to about 0.0018 mg/L, or about 0.0018 to about 0.002 mg/L). In some embodiments, a coffee replica can include no 2,3,5,6-tetramethylpyrazine.

The one or more non-volatile compounds in a coffee replica can include 2,3,5-trimethylpyrazine. In some embodiments, the 2,3,5-trimethylpyrazine can be present in an amount of about 0.000001 mg/L to about 0.4 mg/L (e.g., about 0.000001 to about 0.00001 mg/L, about 0.00001 to about 0.0001 mg/L, about 0.0001 to about 0.001 mg/L, about 0.001 to about 0.01 mg/L, about 0.1 to about 0.2 mg/L, about 0.2 to about 0.3 mg/L, or about 0.3 to about 0.4 mg/L). In some embodiments, the 2,3,5-trimethylpyrazine can be present in an amount less than about 0.006 mg/L (e.g., less than about 0.005 mg/L, 0.004 mg/L, 0.003 mg/L, 0.002 mg/L, 0.001 mg/L, 0.0005 mg/L, 0.0001 mg/L, 0.00005 mg/L, 0.00001 mg/L, or 0.00005 mg/L). In some embodiments, a coffee replica can include no 2,3,5-trimethylpyrazine.

The one or more non-volatile compounds in a coffee replica can include 2,3-dimethylpyrazine. In some embodiments, the 2,3-dimethylpyrazine can be present in an amount of about 0.000005 mg/L to about 23 mg/L (e.g., about 0.000005 to about 0.00005 mg/L, about 0.00005 to about 0.0005 mg/L, about 0.0005 to about 0.005 mg/L, a bout 0.005 to about 0.05 mg/L, about 0.05 to about 0.5 mg/L, about 0.5 to about 2.5 mg/L, about 2.5 to about 5 mg/L, about 5 to about 10 mg/L, or about 10 to about 23 mg/L). In some embodiments, the 2,3-dimethylpyrazine can be present in an amount of less than about 0.12 mg/L (e.g., less than about 0.1 mg/L, 0.05 mg/L, 0.01 mg/L, 0.005 mg/L, 0.001 mg/L, 0.0005 mg/L, 0.0001 mg/L, 0.00005 mg/L, or 0.00001 mg/L) In some embodiments, a coffee replica can include no 2,3-dimethylpyrazine.

The one or more non-volatile compounds in a coffee replica can include 4-methoxycinnamic acid. In some embodiments, the 4-methoxycinnamic acid can be present in an amount of about 9 mg/L to about 18 mg/L (e.g., about 9 to about 11 mg/L, about 11 to about 13 mg/L, about 13 to about 15 mg/L, about 15 to about 17 mg/L, or about 17 to about 18 mg/L). In some embodiments, a coffee replica can include no 4-methoxycinnamic acid.

The one or more non-volatile compounds in a coffee replica can include 5-ethyl-4-hydroxy-2-methyl-3(2H)-furanone. In some embodiments, the 5-ethyl-4-hydroxy-2-methyl-3(2H)-furanone can be present in an amount of about 33 mg/L to about 62 mg/L (e.g., about 33 to about 37 mg/L, about 37 to about 42 mg/L, about 42 to about 47 mg/L, about 47 to about 52 mg/L, about 52 to about 57 mg/L, or about 57 to about 62 mg/L). In some embodiments, a coffee replica can include no 5-ethyl-4-hydroxy-2-methyl-3(2H)-furanone.

The one or more non-volatile compounds in a coffee replica can include adenine. In some embodiments, the adenine can be present in an amount of about 0.3 mg/L to about 2.3 mg/L (e.g., about 0.3 to about 0.5 mg/L, about 0.5 to about 0.8 mg/L, about 0.8 to about 1.1 mg/L, about 1.1 to about 1.4 mg/L, about 1.4 to about 1.7 mg/L, about 1.7 to about 2 mg/L, or about 2 to about 2.3 mg/L). In some embodiments, a coffee replica can include no adenine.

The one or more non-volatile compounds in a coffee replica can include caffeic acid. In some embodiments, the caffeic acid can be present in an amount of about 2.8 mg/L to about 7.5 mg/L (e.g., about 2.8 to about 3.5 mg/L, about 3.5 to about 4 mg/L, about 4 to about 4.5 mg/L, about 4.5 to about 5 mg/L, about 5 to about 5.5 mg/L, about 5.5 to about 6 mg/L, about 6 to about 6.5 mg/L, about 6.5 to about 7 mg/L, or about 7 to about 7.5 mg/L). In some embodiments, a coffee replica can include no caffeic acid.

The one or more non-volatile compounds in a coffee replica can include caffeine. In some embodiments, the caffeine can be present in an amount of about 100 mg/L to about 300 mg/L (e.g., about 100 to about 150 mg/L, about 150 to about 200 mg/L, about 200 to about 250 mg/L, or about 250 to about 300 mg/L). In some embodiments, a coffee replica can include no caffeine.

The one or more non-volatile compounds in a coffee replica can include choline. In some embodiments, the choline can be present in an amount of about 2 mg/L to about 50 mg/L (e.g., about 2 to about 10 mg/L, about 10 to about 20 mg/L, about 20 to about 30 mg/L, about 03 to about 40 mg/L, or about 40 to about 50 mg/L). In some embodiments, a coffee replica can include no choline.

The one or more non-volatile compounds in a coffee replica can include cytidine. In some embodiments, the cytidine can be present in an amount of about 0.3 mg/L to about 1.8 mg/L (e.g., about 0.3 to about 0.6 mg/L, about 0.6 to about 0.9 mg/L, about 0.9 to about 1.2 mg/L, about 1.2 to about 1.5 mg/L, or about 1.5 to about 1.8 mg/L). In some embodiments, a coffee replica can include no cytidine.

The one or more non-volatile compounds in a coffee replica can include D-gluconic acid. In some embodiments, the D-gluconic acid can be present in an amount of about 0.3 mg/L to about 1.2 mg/L (e.g., about 0.3 to about 0.5 mg/L, about 0.5 to about 0.7 mg/L, about 0.7 to about 1 mg/L, or about 1 to about 1.2 mg/L). In some embodiments, a coffee replica can include no D-gluconic acid.

The one or more non-volatile compounds in a coffee replica can include hydroxymethylfurfural. In some embodiments, the hydroxymethylfurfural can be present in an amount of about 10 mg/L to about 20 mg/L (e.g., about 10 to about 12 mg/L, about 12 to about 14 mg/L, about 14 to about 16 mg/L, about 16 to about 18 mg/L, or about 18 to about 20 mg/L). In some embodiments, a coffee replica can include no hydroxymethylfurfural.

The one or more non-volatile compounds in a coffee replica can include methyl-2-pyrrolyl ketone. In some embodiments, the methyl-2-pyrrolyl ketone can be present in an amount of about 0.008 mg/L to about 1.3 mg/L (e.g., about 0.008 to about 0.08 mg/L, about 0.08 to about 0.3 mg/L, about 0.3 to about 0.8 mg/L, about 0.8 to about 1 mg/L, or about 1 to about 1.3 mg/L). In some embodiments, a coffee replica can include no methyl-2-pyrrolyl ketone.

The one or more non-volatile compounds in a coffee replica can include pyridine. In some embodiments, the pyridine can be present in an amount of about 0.4 mg/L to about 60 mg/L (e.g., about 0.4 to about 1 mg/L, about 1 to about 5 mg/L, about 5 to about 10 mg/L, about 10 to about 20 mg/L, about 20 to about 30 mg/L, about 30 to about 40 mg/L, or about 40 to about 60 mg/L). In some embodiments, a coffee replica can include no pyridine.

The one or more non-volatile compounds in a coffee replica can include sotolon. In some embodiments, the sotolon can be present in an amount of about 0.15 mg/L to about 85 mg/L (e.g., about 0.15 to about 0.5 mg/L, about 0.5 to about 1 mg/L, about 1 to about 5 mg/L, about 5 to about 10 mg/L, about 10 to about 20 mg/L, about 20 to about 40 mg/L, about 40 to about 60 mg/L, or about 60 to about 85 mg/L). In some embodiments, the sotolon can be present in an amount of less than about 31 mg/L (e.g., less than about 30 mg/L, 29 mg/L, 28 mg/L, 27 mg/L, 26 mg/L, 25 mg/L, 20 mg/L, 15 mg/L, 10 mg/L, 5 mg/L, 2 mg/L, 1 mg/L, 0.5 mg/L, 0.4 mg/L, 0.3 mg/L, or 0.2 mg/L) In some embodiments, a coffee replica can include no sotolon.

The one or more non-volatile compounds in a coffee replica can include syringic acid. In some embodiments, the syringic acid can be present in an amount of about 3 mg/L to about 11 mg/L (e.g., about 3 to about 5 mg/L, about 5 to about 7 mg/L, about 7 to about 9 mg/L, or about 9 to about 11 mg/L). In some embodiments, a coffee replica can include no syringic acid.

The one or more non-volatile compounds in a coffee replica can include trans-ferulic acid. In some embodiments, the trans-ferulic acid can be present in an amount of about 10 mg/L to about 20 mg/L (e.g., about 10 to about 12 mg/L, about 12 to about 14 mg/L, about 14 to about 16 mg/L, about 16 to about 18 mg/L, or about 18 to about 20 mg/L). In some embodiments, a coffee replica can include no trans-Ferulic acid.

The one or more non-volatile compounds in a coffee replica can include tryptamine. In some embodiments, the tryptamine can be present in an amount of about 0.05 mg/L to about 0.2 mg/L (e.g., about 0.05 to about 0.08 mg/L, about 0.08 to about 0.1 mg/L, about 0.1 to about 0.12 mg/L, about 0.12 to about 0.14 mg/L, about 0.14 to about 0.16 mg/L, about 0.16 to about 0.18 mg/L, or about 0.18 to about 0.2 mg/L). In some embodiments, a coffee replica can include no tryptamine.

The one or more non-volatile compounds in a coffee replica can include uracil. In some embodiments, the uracil can be present in an amount of about 0.1 mg/L to about 0.7 mg/L (e.g., about 0.1 to about 0.2 mg/L, about 0.2 to about 0.3 mg/L, about 0.3 to about 0.4 mg/L, about 0.4 to about 0.5 mg/L, about 0.5 to about 0.6 mg/L, or about 0.6 to about 0.7 mg/L). In some embodiments, a coffee replica can include no uracil.

The one or more non-volatile compounds in a coffee replica can include vanillic acid. In some embodiments, the vanillic acid can be present in an amount of about 12 mg/L to about 35 mg/L (e.g., about 12 to about 15 mg/L, about 15 to about 20 mg/L, about 20 to about 25 mg/L, about 25 to about 30 mg/L, or about 30 to about 35 mg/L). In some embodiments, a coffee replica can include no vanillic acid.

The one or more non-volatile compounds in a coffee replica can include vanillin. In some embodiments, the vanillin can be present in an amount of about 0.08 mg/L to about 40 mg/L (e.g., about 0.08 to about 0.4 mg/L, about 0.4 to about 0.8 mg/L, about 0.8 to about 2 mg/L, about 2 to about 10 mg/L, about 10 to about 20 mg/L, about 20 to about 30 mg/L, or about 30 to about 40 mg/L). In some embodiments, the vanillin can be present in an amount of at least about 0.23 mg/L (e.g., at least about 0.5 mg/L, at least about 0.7 mg/L, at least about 1 mg/L, at least about 3 mg/L, at least about 5 mg/L, or at least about 10 mg/L). In some embodiments, a coffee replica can include no vanillin.

Some particular exemplary coffee replicas are also provided herein. In some embodiments, a coffee replica can include at least 50 (e.g., at least 50, 55, 60, or 64) VOCs selected from the group consisting of 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, coffee furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether, at least 10 (e.g., at least 11 or 12) non-volatile compounds selected from the group consisting of 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin.

Exemplarily amounts of each of these compounds are shown in TABLE F1, by mg/L (e.g., for a coffee beverage replica), mg/g substrate (e.g., for a coffee grounds replica or a coffee bean replica), or percent by weight of total VOCs and nonvolatile compounds (e.g., for a coffee granule replica).

TABLE F1

| | Exemplary coffee formulations | |
|---|---|---|
| | Range (mg/L) | Range (Percent by weight of total VOCs and non-volatile compounds) |
| 2,3,5-trimethylpyrazine | 1.75E−06-3.25E−06 | 1.44E−07 ± 4.31E−08 |
| 2,3-butanedione | 2.80E−04-5.20E−04 | 2.30E−05 ± 6.89E−06 |
| 2,3-diethyl-5-methyl pyrazine | 1.58E−03-2.93E−03 | 1.29E−04 ± 3.88E−05 |
| 2,3-dimethylpyrazine | 5.25E−06-9.75E−06 | 4.31E−07 ± 1.29E−07 |
| 2,3-Hexanedione | 7.54E+00-1.40E+01 | 6.19E−01 ± 1.86E−01 |
| 2,3-pentadione | 9.05E−01-1.68E+00 | 7.43E−02 ± 2.23E−02 |
| 2,5-dimethylphenol | 5.25E−03-9.75E−03 | 4.31E−04 ± 1.29E−04 |
| 2,6-dimethylpyrazine | 1.66E+00-3.08E+00 | 1.36E−01 ± 4.09E−02 |
| 2-acetyl-5-methylfuran | 1.51E+00-2.80E+00 | 1.24E−01 ± 3.72E−02 |

TABLE F1-continued

Exemplary coffee formulations

| | Range (mg/L) | Range (Percent by weight of total VOCs and non-volatile compounds) |
|---|---|---|
| 2-ethoxy-3-methylpyrazine | 4.53E−01-8.41E−01 | 3.72E−02 ± 1.12E−02 |
| 2-ethyl-4-hydroxy-5-methyl-3(2H)-furanone | 6.03E−01-1.12E+00 | 4.95E−02 ± 1.49E−02 |
| 2-ethylpyrazine | 3.68E−02-6.83E−02 | 3.02E−03 ± 9.05E−04 |
| 2-isobutyl-3-methoxypyrazine (IBMP) | 5.25E−04-9.75E−04 | 4.31E−05 ± 1.29E−05 |
| 2-isobutyl-3-methyl pyrazine | 2.63E−04-4.88E−04 | 2.15E−05 ± 6.46E−06 |
| 2-isopropyl-3 -methoxypyrazine | 1.58E−04-2.93E−04 | 1.29E−05 ± 3.88E−06 |
| 2-methoxy-4-methylphenol | 2.30E−04-4.27E−04 | 1.89E−05 ± 5.66E−06 |
| 2-methoxy-4-vinylphenol | 7.33E−04-1.36E−03 | 6.02E−05 ± 1.81E−05 |
| 2-methylpyrazine | 6.71E−03-1.25E−02 | 5.51E−04 ± 1.65E−04 |
| 2-pentanol | 5.25E−03-9.75E−03 | 4.31E−04 ± 1.29E−04 |
| 3-methylbutyric acid | 1.23E−02-2.28E−02 | 1.01E−03 ± 3.02E−04 |
| 4,5-dimethyl-3-hydroxy-2,5-dihydro-furan-2-one (sotolon) | 1.51E−01-2.80E−01 | 1.24E−02 ± 3.71E−03 |
| 4-ethylguaiacol | 1.05E−03-1.95E−03 | 8.62E−05 ± 2.59E−05 |
| 4-hydroxy-5-methyl-3-furanone | 3.02E+00-5.60E+00 | 2.48E−01 ± 7.43E−02 |
| 5-methylfurfural | 1.10E−02-2.05E−02 | 9.05E−04 ± 2.71E−04 |
| acetoin acetate | 7.54E+01-1.40E+02 | 6.19E+00 ± 1.86E+00 |
| amyl alcohol | 3.50E−03-6.50E−03 | 2.87E−04 ± 8.62E−05 |
| vanillin erythro and/or threo-butan-2,3-diol | 6.03E+01-1.12E+02 | 4.95E+00 ± 1.49E+00 |
| Aspartic_Acid | 1.34E+01-2.49E+01 | 1.10E+00 ± 3.30E−01 |
| beta-damascenone | 3.68E−05-6.83E−05 | 3.02E−06 ± 9.05E−07 |
| beta-ionone | 1.73E+00-3.21E+00 | 1.42E−01 ± 4.25E−02 |
| butyric acid | 2.80E−03-5.20E−03 | 2.30E−04 ± 6.89E−05 |
| Caffeine | 1.20E+02-2.23E+02 | 9.87E+00 ± 2.96E+00 |
| Choline | 1.74E+01-3.23E+01 | 1.43E+00 ± 4.29E−01 |
| Citric_Acid | 4.47E+02-8.30E+02 | 3.67E+01 ± 1.10E+01 |
| coffee furanone | 7.24E+01-1.34E+02 | 5.94E+00 ± 1.78E+00 |
| delta-decalactone | 1.20E+00-2.23E+00 | 9.87E−02 ± 2.96E−02 |
| delta-octalactone | 4.81E+00-8.93E+00 | 3.95E−01 ± 1.18E−01 |
| diethyl succinate | 1.51E+02-2.80E+02 | 1.24E+01 ± 3.72E+00 |
| difurfuryl ether | 1.75E−04-3.25E−04 | 1.44E−05 ± 4.31E−06 |
| dimethyl trisulfide | 3.50E−08-6.50E−08 | 2.87E−09 ± 8.62E−10 |
| ethyl 2-methylbutyrate | 2.76E+00-5.13E+00 | 2.27E−01 ± 6.81E−02 |
| ethyl benzoate | 1.75E−03-3.25E−03 | 1.44E−04 ± 4.31E−05 |
| ethyl butyrate | 4.61E−01-8.56E−01 | 3.78E−02 ± 1.13E−02 |
| ethyl decanoate | 3.15E−02-5.85E−02 | 2.59E−03 ± 7.76E−04 |
| ethyl isovalerate | 2.10E−03-3.90E−03 | 1.72E−04 ± 5.17E−05 |
| ethyl laurate | 3.50E−03-6.50E−03 | 2.87E−04 ± 8.62E−05 |
| ethyl maltol | 3.02E+01-5.60E+01 | 2.48E+00 ± 7.43E−01 |
| eugenol | 1.10E−02-2.05E−02 | 9.05E−04 ± 2.71E−04 |
| furaneol | 6.03E+00-1.12E+01 | 4.95E−01 ± 1.49E−01 |
| furfural | 3.50E−03-6.50E−03 | 2.87E−04 ± 8.62E−05 |
| furfuryl alcohol | 3.50E−09-6.50E−09 | 2.87E−10 ± 8.62E−11 |
| gamma decalactone | 1.44E+00-2.68E+00 | 1.18E−01 ± 3.55E−02 |
| gamma-nonalactone | 4.81E+00-8.93E+00 | 3.95E−01 ± 1.18E−01 |
| geranyl acetate | 5.25E−02-9.75E−02 | 4.31E−03 ± 1.29E−03 |
| guaiacol | 7.00E−04-1.30E−03 | 5.75E−05 ± 1.72E−05 |
| isoamyl alcohol | 1.40E−02-2.60E−02 | 1.15E−03 ± 3.45E−04 |
| isobutyraldehyde | 3.15E−05-5.85E−05 | 2.59E−06 ± 7.76E−07 |
| isoeugenol | 1.10E−02-2.05E−02 | 9.05E−04 ± 2.71E−04 |
| isopropenyl pyrazine | 3.02E+00-5.61E+00 | 2.48E−01 ± 7.43E−02 |
| Isovaleraldehyde | 2.10E−04-3.90E−04 | 1.72E−05 ± 5.17E−06 |
| isovaleric acid | 3.69E+00-6.85E+00 | 3.03E−01 ± 9.08E−02 |
| Lactic_Acid | 2.91E+01-5.40E+01 | 2.39E+00 ± 7.16E−01 |
| maltol | 5.66E+01-1.05E+02 | 4.64E+00 ± 1.39E+00 |
| massoia lactone | 2.41E+01-4.47E+01 | 1.97E+00 ± 5.92E−01 |
| methanethiol | 7.00E−07-1.30E−06 | 5.75E−08 ± 1.72E−08 |
| methyl anthranilate | 2.22E−02-4.11E−02 | 1.82E−03 ± 5.45E−04 |
| p-anisaldehyde | 1.10E−02-2.05E−02 | 9.05E−04 ± 2.71E−04 |
| pyrrole | 1.75E−04-3.25E−04 | 1.44E−05 ± 4.31E−06 |
| sotolone | 3.15E−06-5.85E−06 | 2.59E−07 ± 7.76E−08 |
| Succinic_Acid | 7.34E+00-1.36E+01 | 6.02E−01 ± 1.81E−01 |
| syringol (2,6-dimethoxyphenol) | 2.85E+00-5.30E+00 | 2.34E−01 ± 7.03E−02 |
| Trans-Ferulic_Acid | 1.08E+01-2.00E+01 | 8.84E−01 ± 2.65E−01 |
| valeraldehyde | 3.46E+00-6.42E+00 | 2.84E−01 ± 8.51E−02 |
| Vanillic_Acid | 1.52E+01-2.82E+01 | 1.25E+00 ± 3.74E−01 |
| vanillin | 2.14E+01-3.97E+01 | 1.76E+00 ± 5.27E−01 |
| vanillyl ethyl ether | 1.43E+01-2.65E+01 | 1.17E+00 ± 3.51E−01 |
| substrate | optional, 02.50E+04-7.50E+04 | optional, 2.87E+03 ± 8.62E+02 |
| Liquid (e.g., water, milk, plant-based milk, or a combination thereof) | 1 L | optional |

It will be appreciated that while the amounts (in mg/L) of some non-volatile compounds are described for coffee beverage replicas, the same compounds in increased concentrations can be present in coffee bean replicas, coffee ground replicas, coffee granule replicas, and coffee beverage concentrate replicas.

Coffee bean replicas and/or coffee ground replicas can include components in addition to VOCs and non-volatile compounds.

In some embodiments, a coffee bean replica or a coffee ground replica can include a coating (e.g., shellac, zein protein, gum arabic, or waxes). It is believed that a coating can, in some cases, increase shelf life.

In some embodiments, a coffee bean replica or a coffee ground replica can include a solid substrate. A solid substrate can be a food stream waste product. In some embodiments, a solid substrate can be processed or unprocessed grains. Processing of grains can result in the removal or partial removal of one or more of: starch, protein, sugar, fat-soluble components, and flavors. In some embodiments, a solid substrate can be any waste product where most of the starch, protein, sugar, fat-soluble components, and flavor is removed leaving behind cellulose, hemicellulose, lignin, and other insoluble fibers. In some embodiments, a solid substrate can include processed or unprocessed grains or grain products, legumes or legume seeds, oil plants or seeds, fruits or fruit products, roots, tubers, or root or tuber products, sugar processing by-products, or other plant by-products.

Non-limiting examples of grains or grain products that can be used in a solid substrate include atella, barley distillery by-products, broken rice or polished rice, barley grain, brown rice, brewers grains, cockspur grass (*Echinochloa crusgalli*) grain, corn gluten feed, corn distillers grain, corn gluten meal, ear maize, finger millet (*Eleusine coracana*) grain, foxtail millet (*Setaria italica*) grain, fonio (*Digitaria exilis*) grain, maize bran or hominy feed, maize green forage, maize cobs, maize stover, maize germ meal or maize germ, malt culms, maize grain, millet hulls, oat hulls or oat mill feed, oats, pearl millet (*Pennisetum glaucum*) grain, proso millet (*Panicum miliaceum*) grain, quinoa (*Chenopodium quinoa*), red oat (*Avena sativa*) grain, rice protein concentrate, rice bran or other rice by-products, rough rice (paddy rice), rice hulls, rye grain or by-products, sorghum by-products, starches, sorghum grain, tef (*Eragrostis tef*) grain, triticale, Venezuela grass (*Paspalum fasciculatum*), wheat (general), wheat germ, wheat bran, wheat grain, wheat distillers grain, wheat shorts, wheat middlings, feed flour, and mixtures thereof.

Non-limiting examples of legumes or legume seeds that can be used in a solid substrate include african locust bean (*Parkia biglobosa* or *Parkia filicoidea*), African yam bean (*Sphenostylis stenocarpa*), bambara groundnut (*Vigna subterranea*) crop residue and straw, black gram (*Vigna mungo*), bambara groundnut (*Vigna subterranea*) pods, shells and offals, blue lupin (*Lupinus angustifolius*) seeds, bambara groundnut (*Vigna subterranea*) seeds, butterfly pea (*Clitoria ternatea*), carob (*Ceratonia siliqua*), common bean (*Phaseolus vulgaris*), centro (*Centrosema molle*), common vetch (*Vicia sativa*), chickpea (*Cicer arietinum*), cowpea (*Vigna unguiculata*) seeds, faba bean (*Vicia faba*), grass pea (*Lathyrus sativus*), guar (*Cyamopsis tetragonoloba*) forage, seed and meal, guanacaste (*Enterolobium cyclocarpum*), hairy vetch (*Vicia villosa*), horse gram (*Macrotyloma uniflorum*), jack bean (*Canavalia ensiformis*), lablab (*Lablab purpureus*), lima bean (*Phaseolus lunatus*), lentil (*Lens culinaris*), mat bean (*Vigna aconitifolia*), mung bean (*Vigna radiata*), narbon vetch (*Vicia narbonensis*), pea by-products, peanut seeds, pea protein concentrate, peanut skins, pea seeds, pigeon pea (*Cajanus cajan*) seeds, peanut forage, prickly *sesban* (*Sesbania bispinosa*), peanut hulls, purple vetch (*Vicia benghalensis*), peanut meal, rain tree (*Albizia saman*), rice bean (*Vigna umbellata*), sesban (*Sesbania sesban*), soybean seeds, soybean (general), sword bean (*Canavalia gladiata*), soybean forage, syrian mesquite (*Prosopis farcta*), soybean meal, tamarind (*Tamarindus indica*), tamarugo (*Prosopis tamarugo*), velvet bean (*Mucuna pruriens*), white lupin (*Lupinus albus*) seeds, winged bean (*Psophocarpus tetragonolobus*), yellow lupin (*Lupinus luteus*) seeds, and mixtures thereof.

Non-limiting examples of oil plants or seeds than can be used in a solid substrate include Almond kernels and by-products, argan (*Argania spinosa*), babassu (*Attalea speciosa*), borneo tallow nut (*Shorea stenoptera*) oil meal, bactris (*Bactris gasipaes*), camelina (*Camelina sativa*) seeds and oil meal, cotton (general), cashew (*Anacardium occidentale*) nuts and by-products, castor (*Ricinus communis*) seeds, oil meal and by-products, cotton straw and cotton crop residues, ceylon ironwood (*Mesua ferrea*), cottonseed hulls, cottonseed meal, copra meal and coconut by-products, crambe (*Crambe abyssinica*), corozo (*Attalea cohune*) seed and oil meal, doum palm (*Hyphaene thebaica*), dragon's head (*Lallemantia iberica*), flax straw and flax crop by-products, grape seeds and grape seed oil meal, hemp, jatropha (Jatropha sp.) kernel meal and other jatropha products, jojoba (*Simmondsia chinensis*), kapok (*Ceiba pentandra*), kenaf (*Hibiscus cannabinus*), karanja (*Millettia pinnata*), kusum (*Schleichera oleosa*), linseed meal, luffa (*Luffa aegyptiaca*), linseeds, macadamia (*Macadamia integrifolia*), moringa (*Moringa oleifera*), mahua (*Madhuca longifolia*), mustard oil meal and mustard bran, maize germ meal and maize germ, neem (*Azadirachta indica*), niger (*Guizotia abyssinica*), oil palm fronds and oil palm crop residues, olive oil cake and by-products, oil palm kernels, palm kernel meal, peanut seeds, palm oil mill effluent, peanut skins, palm press fibre, pinto peanut (*Arachis pintoi*), peanut forage, poppy (*Papaver somnferum*), peanut hulls, pumpkin, squash, gourd and other *Cucurbita* species, peanut meal, rapeseed forage, rapeseed hulls, rapeseed meal, rapeseeds, rubber (*Hevea brasiliensis*), safflower (*Carthamus tinctorius*) seeds and oil meal, sal (*Shorea robusta*) seeds and oil meal, soybean meal, soybean seeds, seje (*Oenocarpus bataua*), sunflower (general), sesame (*Sesamum indicum*) seeds and oil meal, sunflower forage and crop residues, sunflower hulls and sunflower screenings, sunflower meal, sunflower seeds, soybean (general), soybean forage, soybean hulls, tung tree (*Aleurites fordii*), tomato seed cake, walnut (*Juglans regia*), watermelon (*Citrullus lanatus*) seeds and oil meal, and mixtures thereof.

Non-limiting examples of fruits or fruit products that can be used in a solid substrate include apple pomace and culled apples, banana (general), banana peels, banana fruits, banana leaves and pseudostems, breadfruit (*Artocarpus altilis*), breadnut (*Brosimum alicastrum*), cashew (*Anacardium occidentale*) nuts and by-products, citrus pulp, fresh, citrus fruits, citrus seed meal, citrus molasses, citrus pulp, dried, colocynth (*Citrullus colocynthis*), date molasses, date palm leaves and date pedicels, date palm fruits, grape pomace, guava (*Psidium guajava*), grape seeds and/or grape seed oil meal, jackfruit (*Artocarpus heterophyllus*), kokum (*Garcinia indica*), luffa (*Luffa aegyptiaca*), mango (*Mangifera indica*) fruit and by-products, moringa (*Moringa oleifera*), melon (*Cucumis melo*), olive oil cake and by-products, papaya (*Carica papaya*) fruits, leaves and by-products, pineapple by-products, pineapple leaves, pineapple mill juice, pumpkin, squash, gourd and other *Cucurbita* species, sapucaia (*Lecythis pisonis*), spanish lime (*Melicoccus bijugatus*), seje (*Oenocarpus bataua*), tomato fruits, tomato pomace, tomato skins and tomato seeds, tomato leaves and crop residues, tomato seed cake, walnut (*Juglans regia*), watermelon (*Citrullus lanatus*) forage and fruit, watermelon (*Citrullus lanatus*) seeds and oil meal, and mixtures thereof. In some embodiments, the solid substrate comprises grape seeds.

Non-limiting examples of roots, tubers, or root or tuber products that can be used in a solid substrate include arrowroot (*Maranta arundinacea*), beet molasses, *canna* (*Canna indica*), carrot (*Daucus carota*), cassava leaves and foliage, cassava peels, cassava pomace and other cassava by-products, cassava roots, chinese yam (*Dioscorea esculenta*), enset (*Ensete ventricosum*) corms and pseudostems, fodder beet roots, Jerusalem artichoke (*Helianthus tuberosus*), malanga (*Xanthosoma sagittifolium*), potato (*Solanum tuberosum*) by-products, potato (*Solanum tuberosum*) tubers, sugar beet pulp, dehydrated, sugar beet pulp, pressed or wet, sugar beet roots, sugar beet tops, sweet potato (*Ipomoea batatas*) by-products, sweet potato (*Ipomoea batatas*) forage, sweet potato (*Ipomoea batatas*) tubers, taro (*Colocasia esculenta*), white yam (*Dioscorea rotundata*), winged yam (*Dioscorea alata*), whitespot giant *arum* (*Amorphophallus campanulatus*), yacon (*Smallanthus sonchifolius*), yellow yam (*Dioscorea cayenensis*), and mixtures thereof.

Non-limiting examples of sugar processing by-products that can be used in a solid substrate include beet molasses, sugar, molasses, sugar beet pulp, pressed or wet, sugarcane bagasse, sugarcane forage, whole plant, sugarcane juice, sugarcane molasses, sugarcane press mud, sugarcane tops, and mixtures thereof.

Non-limiting examples of other plant by-products that can be used in a solid substrate include carob (*Ceratonia siliqua*), citrus molasses, date molasses, date palm leaves and date pedicels, date palm seeds, enset (*Ensete ventricosum*) corms and pseudostems, leaf protein concentrate and grass juice, mexican marigold (*Tagetes erecta*), mushrooms and spent mushroom substrate, molasses/urea blocks, potato (*Solanum tuberosum*) tubers, pyrethrum marc, spent hops, straws, sugarcane juice, sugarcane molasses, sugarcane press mud, vinasses, wood, wood sugar or wood molasses, and mixtures thereof.

In some embodiments, a solid substrate can have a composition (e.g., ratio of fats, proteins, and fibers) that is different from a traditional coffee bean or traditional coffee grounds.

In some embodiments, coffee bean replicas or coffee ground replicas as described herein can also include an emulsifier.

In some embodiments, coffee bean replicas can also include a shellac or a bulking agent (e.g., a grain meal) In some embodiments, coffee bean replicas as described herein can have a higher concentration of cellulose than a traditional coffee bean. In some embodiments, coffee bean replicas as described herein can have a lower concentration of cellulose than a traditional coffee bean. In some embodiments, coffee bean replicas as described herein can have a higher concentration of hemicellulose than a traditional coffee bean. In some embodiments, coffee bean replicas as described herein can have a lower concentration of hemicellulose than a traditional coffee bean.

In some embodiments, coffee bean replicas can have a different physical structure than a traditional coffee bean. For example, some traditional coffee beans have a continuous granular structure, while, in some embodiments, coffee bean replicas as described herein can have a homogeneous structure.

In some embodiments, coffee bean replicas can display a different fracture pattern than traditional coffee beans when subjected to the same fracturing assay.

Because of the methods by which they are made, the coffee replicas provided herein typically lack contaminants and other detrimental compounds that sometimes are encountered in traditional coffees. These include, without limitation, organisms such as *Escherichia coli, Salmonella* sp., *Brettanomyces* sp., *Lactobacillales, Aspergillus* (e.g., *A. ochraceus, A. carbonarius*), *Penicillium* (e.g., *P. verrucosum*), *Saccharomyces* sp. (which are often used by distillers and brewers), *Acremonium strictum, Chrysonilia sitophila, Cladosporium oxysporum, Fusarium oxysporum, Mortierella alpina, Mucor plumbeus, Paecilomyces viridis, Penicillium chrysogenum, Penicillium citreonigrum, Penicillium decumbens, Penicillium purpurogenum, Trichoderma longibrachiatum, Trichoderma viride,* and *Verticillium psalliotae*, as well as mold, mildew, rot, insects, insect eggs, insect filth, rodent filth, mammalian excreta, insect lecithins, hydrogen sulfide, hydrogen disulfide, 2,4,6-trichloranisole, 2,4,6,-tribromoanisole, aflatoxin, aldrin, dieldrin, benzene hexachloride, chlordane, dichlorodiphenyltrichloroethane (DDT), dichlorodiphenyldichloroethylene (DDE), dichlorodiphenyldichloroethane (TDE), dimethylnitrosamine (nitrosodimethylamine), ethylene dibromide (EDB), heptachlor, heptachlor epoxide, lindane, mercury, methanol, ethylene glycol, dichloromethane, aluminum, antimony, arsenic, cadmium, chromium, cobalt, copper, lead, manganese, nickel, tin, acrylamide, ochratoxins, mycotoxins, and polycyclic aromatic hydrocarbons.

It is noted that while coffee replicas can include volatile and non-volatile compounds as listed herein, the added compounds may react with one another to generate additional compounds, or to change the effective amount of one or more of the added compounds within the coffee replica formulations.

This document also provides methods for generating concentrated versions of coffee replicas (e.g., coffee concentrate replicas), where the concentrated versions include all of the VOCs and non-volatile components of the final product, but without the bulk of water. Such concentrates can be manufactured and then shipped to a second location, where a diluent (e.g., water, or an aqueous solution (e.g., including a sugar, a sugar alcohol, a milk (e.g., animal milk or a plant-based milk), and/or one or more flavorants)) can be added volume to create a finished coffee beverage replica.

Any suitable concentration of VOCs and non-volatile compounds can be used. For example, a concentrated beverage replica can include VOCs and non-volatile components in a concentration of at least about 1.1-fold (e.g., 1.1-fold, 1.2-fold, 1.3-fold, 1.5-fold, 1.6-fold, 1.7-fold, 1.8-fold, 1.9-fold, 2-fold, 3-fold, 5-fold, 8-fold, 10-fold, 15-fold, 20-fold, 50-fold, 100-fold, 200-fold, 500-fold, 1000-fold, 1500-fold, or 2000-fold) concentrations, as compared to their concentrations in the final product, such that they can be diluted by at least about 1.1-fold (e.g., 1.2-fold, 1.3-fold, 1.5-fold, 1.6-fold, 1.7-fold, 1.8-fold, 1.9-fold, 2-fold, 3-fold, 5-fold, 8-fold, 10-fold, 15-fold, or 20-fold, 50-fold, 100-fold, 200-fold, 500-fold, 1000-fold, 1500-fold, or 2000-fold), respectively, with a diluent to yield the final product. The concentrates provided herein can contain all of the formulaic flavor, acid, and other components that are present in the final product. In general, such concentrates can be prepared in much the same way as a non-concentrated beverage replica, by combining the desired amounts of VOCs and non-volatile components but omitting the bulk of the water.

Any of the liquid coffee replicas described herein can be made as a concentrate, e.g., using the methods disclosed herein. It will be appreciated that the amount of any component (e.g., VOC or non-volatile) disclosed herein as an amount for an beverage replica (e.g., a 1× beverage replica) can be multiplied by the concentration factor (e.g., 1.1-fold, 1.2-fold, 1.3-fold, 1.5-fold, 1.6-fold, 1.7-fold, 1.8-fold, 1.9-fold 2-fold, 3-fold, 5-fold, 8-fold, 10-fold, 15-fold, or 20-fold, 50-fold, 100-fold, 200-fold, 500-fold, 1000-fold, 1500-fold, or 2000-fold) for the appropriate concentrated amount.

Also provided herein are methods of generating a coffee replica. In some embodiments, the method can include a) forming an aqueous solution comprising:
      water,
      VOCs that are water-soluble, and
      non-volatile compounds that are water-soluble;
    b) forming an emulsion comprising:
      an oil,
      VOCs that are fat-soluble, and
      non-volatile compounds that are fat-soluble; and
    c) mixing the aqueous solution and the emulsion to form a flavor mixture.

The VOCs can be any appropriate VOCs. In some embodiments, the VOCs can be any of the VOCs described herein. The VOCs can be present in any appropriate amount.

The non-volatile compounds can be any appropriate non-volatile compounds. In some embodiments, the non-volatile compounds can be any of the non-volatile compounds described herein. The non-volatile compounds can be present in any appropriate amount.

In some embodiments, the VOCs and non-volatile compounds can include (a) one or more VOCs, where at least one of the one or more VOCs are not present in a corresponding reference coffee; (b) one or more VOCs, where the one or more VOCs do not include one or more at least one VOCs that are is present in a corresponding reference coffee; (c) one or more non-volatile compounds, where the at least one of the one or more non-volatile compounds are not present in a corresponding reference coffee; (d) one or more non-volatile compounds, where the one or more non-volatile compounds do not include one or more at least one non-volatile compound s that are is present in a corresponding reference coffee; or (e) any combination of (a), (b), (c), and (d) [(a) and (b); (a) and (c); (a) and (d); (b) and (c); (b) and (d); (c) and (d); (a), (b), and (c); (a), (b), and (d); (a), (c), and (d); (b), (c), and (d); or (a), (b), (c), and (d)]. In some embodiments, a liquid coffee replica can be characterized by (f) one or more VOCs, where the one or more VOCs are present in the coffee replica in a total amount of at least 100 mg/L. Characteristic (f) can be combined with any combination of (a)-(d) as described above.

An aqueous solution can be made by any appropriate method. In some embodiments, forming an aqueous solution can comprise using low shear blending.

An emulsion can be made by any appropriate method. In some embodiments, forming an emulsion comprises homogenizing. In some embodiments, forming an emulsion comprises using a rotator stator high shear homogenizer. In some embodiments, forming an emulsion comprises using a high pressure inline recirculating homogenizer. In some embodiments, forming an emulsion can include the addition of an emulsifier, a starch, a gum, a polysaccharide, or a combination thereof.

An oil can be any appropriate oil. In some embodiments, an oil is a neutral oil. In some embodiments, an oil is a fully deodorized oil. In some embodiments, an oil includes corn oil, sunflower oil, or coconut oil.

In some embodiments, a coffee replica is a coffee concentrate replica or a coffee beverage replica. In some such embodiments, the method can further include processing the flavor mixture to commercial sterility. Processing the flavor mixture to commercial sterility can be achieved by any appropriate method. In some embodiments, processing the flavor mixture to commercial sterility can include packaging the coffee replica (e.g., in a bottle).

In some embodiments, the coffee replica is a coffee concentrate replica, and processing the flavor mixture to commercial sterility can include one or more of:

a) ultra clean processing,
    b) UHT aseptic processing,
    c) HTST inline processing with sterile filling,
    d) hot fill packaging, or
    e) cold fill tunnel pasteurization.

In some embodiments, the coffee replica is a coffee beverage replica, and processing the flavor mixture to commercial sterility can include one or more of:

a) ultra clean processing,
    b) UHT aseptic processing,
    c) fill and retort processing,
    d) fill then Ohmic sterilization, or
    e) UV/PEF inline sterilization and aseptic filling.

In some embodiments, the coffee replica is a coffee granule replica. In some such embodiments, the method can further comprise agglomeration of particles.

Agglomeration of particles can be achieved through any suitable method. In some embodiments, agglomeration of particles can be achieved through one or more of: pneumatic mixing, steam-jet, fluid-bed, pan, or spray drying, drum, mixer, roller, or extrusion agglomeration. In some embodiments, agglomeration of particles can be achieved through foam mat drying. In some embodiments, the method can further comprise packaging the coffee granule replica (e.g., filling a jar, or filling single-serving pouches).

In some embodiments, the coffee replica is a coffee bean replica or a coffee grounds replica. In some such embodiments, a solid substrate can be mixed in a mixer (e.g., a V blender). In some such embodiments, the method can further include applying the flavor mixture to a solid substrate to form a coated solid substrate. The flavor mixture can be applied to a solid substrate using any suitable method. In some embodiments, applying the flavor mixture comprises spray applying the flavor mixture.

A solid substrate can be any suitable solid substrate. In some embodiments, a solid substrate can be any of the solid substrates described herein. In some embodiments, the solid substrate includes processed or unprocessed grains or grain products, legumes or legume seeds, oil plants or seeds, fruits or fruit products, roots, tubers, or root or tuber products, sugar processing by-products, or other plant by-products. A solid substrate can have any suitable particle size. In some embodiments, a solid substrate has an average particle size of about 250 μm to about 1500 μm.

In some embodiments, the coffee replica is a coffee grounds replica. In some embodiments, the method can further include filling a receptacle (e.g., a bag) with the coffee grounds replica.

In some embodiments, the coffee replica is a coffee bean replica. In some such embodiments, the method can further include adding a tableting aid to the coated solid substrate. A tableting aid can be any appropriate tableting aid. In some embodiments, a tableting aid can include a starch, a sugar, a gum, or a combination thereof. In some embodiments, the method can further include forming the coated solid substrate into a coffee bean-like shape to form a coffee bean replica. Any suitable method can be used to form the coated solid substrate into a coffee bean-like shape. In some embodiments, forming the coated solid substrate into a coffee bean-like shape can include using a rotary pill press. In some embodiments, a coffee bean replica can be coated. A coffee bean replica can be coated with any appropriate coating. In some embodiments, a coffee bean replica can be coated with shellac, zein protein, or wax.

EXEMPLARY EMBODIMENTS

Embodiment 1 is a coffee replica comprising one or more VOCs and one or more non-volatile compounds, wherein (a) the one or more VOCs comprise at least one VOC that is not present in a corresponding reference coffee, (b) the one or more VOCs do not comprise at least one VOC that is present in a corresponding reference coffee, (c) the one or more VOCs are present in the coffee replica in a total amount of at least 100 mg/L, (d) the one or more non-volatile compounds comprise at least one non-volatile compound that is not present in a corresponding reference coffee, or (e) the one or more non-volatile compounds do not comprise at least one non-volatile compound that is present in a corresponding reference coffee.

Embodiment 2 is the coffee replica of embodiment 1, wherein the one or more VOCs comprise at least one VOC that is not present in a corresponding reference coffee.

Embodiment 3 is the coffee replica of embodiment 1 or embodiment 2, wherein the one or more VOCs do not comprise at least one VOC that is present in a corresponding reference coffee.

Embodiment 4 is the coffee replica of any one of embodiments 1-3, wherein the one or more VOCs are present in the coffee replica in a total amount of at least 100 mg/L.

Embodiment 5 is the coffee replica of any one of embodiments 1-3, wherein the one or more VOCs are present in the coffee replica in a total amount of at least 200 mg/L.

Embodiment 6 is the coffee replica of any one of embodiments 1-3, wherein the one or more VOCs are present in the coffee replica in a total amount of at least 300 mg/L.

Embodiment 7 is the coffee replica of any one of embodiments 1-3, wherein the one or more VOCs are present in the coffee replica in a total amount of at least 400 mg/L.

Embodiment 8 is the coffee replica of any one of embodiments 1-3, wherein the one or more VOCs are present in the coffee replica in a total amount of at least 500 mg/L.

Embodiment 9 is the coffee replica of any one of embodiments 1-3, wherein the one or more VOCs are present in the coffee replica in a total amount of at least 600 mg/L.

Embodiment 10 is the coffee replica of any one of embodiments 1-3, wherein the one or more VOCs are present in the coffee replica in a total amount of at least 700 mg/L.

Embodiment 11 is the coffee replica of any one of embodiments 1-3, wherein the one or more VOCs are present in the coffee replica in a total amount of at least 800 mg/L.

Embodiment 12 is the coffee replica of any one of embodiments 1-3, wherein the one or more non-volatile compounds comprise at least one non-volatile compound that is not present in a corresponding reference coffee.

Embodiment 13 is the coffee replica of any one of embodiments 1-12, wherein the one or more non-volatile compounds do not comprise at least one non-volatile compound that is present in a corresponding reference coffee.

Embodiment 14 is the coffee replica of any one of embodiments 1-13, wherein the one or more VOCs do not comprise at least one compound selected from the group consisting of alpha-methyl-alpha-[4-methyl-3-pentenyl]oxiranemethanol, beta-myrcene, 1-(2-furanylmethyl)-1H-pyrrole, 1-ethyl-1H-pyrrole, 1-methyl-1H-pyrrole, 1-methyl-1H-pyrrole-2-carboxaldehyde, 1-methyl-1,2,3,6-tetrahydropyridine, 2-amino-1-naphthalenol, 2,3-butanedione, 2-butanone, 2,3-dimethyl-2-cyclopenten-1-one, 2-methyl-2-cyclopenten-1-one, 3-ethyl-2-hydroxy-2-cyclopenten-1-one, 5-methyl-2-furancarboxaldehyde, 2-furanmethanol acetate, 2-furanmethanol propanoate, 1-hydroxy-2-propanone, 2-vinylfuran, dihydro-2-methyl-3 (2H)-furanone, 3-furaldehyde, 3-furanmethanol, 3-pyridinol, 5-amino-1-naphthol, acetic acid, acetic acid, 2-(dimethylamino)ethyl ester, acetic acid, methyl ester, acetone, 2-methoxy-benzenamine, 2-methyl-butanal, 3-methyl-butanal, 4-hydroxy-butanoic acid, dimethyl disulfide, N,N-dimethyl-ethanamine, 1-(1H-pyrrol-2-yl)-ethanone, 1-(2-furanyl)-ethanone, 1-(2-hydroxy-5-methylphenyl)-ethanone, furan, 2-(2-furanylmethyl)-5-methyl-furan, 2-(2-propenyl)-furan, 2-(methoxymethyl)-furan, 2,2'-methylenebis-furan, 2,5-dimethyl-furan, 2-[(methylthio)methyl]-furan, 2-methyl-furan, 3-methyl-furan, furfural, furfuryl formate, indole, N,N-dimethyl-methylamine, 2,7-dimethyl-oxepine, p-cresol, phenol, 2-methoxy-phenol, 2-methyl-phenol, 4-ethyl-2-methoxy-phenol, 1-methyl-piperidine, pyrazine, 2-(n-propyl)-pyrazine, 2,3-dimethyl-pyrazine, 2,5-dimethyl-pyrazine, 2,6-diethyl-pyrazine, 2,6-dimethyl-pyrazine, 2-ethyl-3-methyl-pyrazine, 2-ethyl-6-methyl-pyrazine, 3,5-diethyl-2-methyl-pyrazine, 3-ethyl-2,5-dimethyl-pyrazine, ethyl-pyrazine, methyl-pyrazine, pyridine, 2-methyl-pyridine, 3-ethyl-pyridine, 3-methyl-pyridine, 3-propyl-pyridine, styrene, thiophene, and toluene.

Embodiment 15 is the coffee replica of any one of embodiments 1-14, wherein the one or more VOCs do not comprise at least one compound selected from the group consisting of 1-heptanol, 1-octanol, 1-octen-3-ol, 2,3-diethyl-5-methylpyrazine, 2,3-diethylpyrazine, 2,3-pentadione, 2,5-dimethylphenol, 2,5-dimethylpyrazine, 2,6-dimethylpyrazine, 2-acetyl-1-methylpyrrole, 2-acetyl-5-methylfuran, 2-acetylpyridine, 2-acetylpyrrole, 2-ethyl-1-hexanol, 2-ethylfuran, 2-ethylpyrazine, 2-furfuryl acetate, 2-heptanol, 2-heptanone, 2-isopropyl-3-methoxypyrazine, 2-methoxy-4-methylphenol, 2-methoxy-4-vinylphenol, 2-methylbutyl isovalerate, 2-methylbutyraldehyde, 2-methylbutyric acid, 2-methylpyrazine, 2-nonanol, 2-nonanone, 2-octanone, 2-pentylfuran, 2-phenyl-2-butenal, 2-phenylethanol, 2-undecanone, 3-ethylpyridine, 3-hexanone, 3-octanol, 4-carvomenthenol, 4-ethyl guaiacol, 4-ethyl phenol, 4-methyl-2-phenyl-2-pentenal, 4'-methylacetophenone, 4-vinylphenol, 5-methyl-2-phenyl-2-hexenal, 5-methylfurfural, amyl alcohol, benzaldehyde, benzyl acetate, butyl alcohol, butyric acid, coffee furanone, damascenone, decanal, diethyl disulfide, diethyl succinate, difurfuryl ether, dimethyl sulfide, dimethyl sulfoxide, dimethyl trisulfide, ethyl 2-methylbutyrate, ethyl acetate, ethyl butanoate, ethyl decanoate, ethyl heptanoate, ethyl hexanoate, ethyl isovalerate, ethyl lactate, ethyl laurate, ethyl octanoate, ethyl phenylacetate, ethyl tiglate, furfural, furfuryl propionate, gamma-nonalactone, geraniol, guaiacol, hexanal, hexanol, hexyl acetate, isoamyl acetate, isobutyraldehyde, isobutyric acid, isovaleraldehyde, isovaleric acid, limonene, linalool, methyl benzoate, methyl hexanoate, methyl nicotinate, methyl phenylacetate, methyl salicylate, myrcene, nonanal, octanal, p-anisaldehyde, p-cresol, phenethyl acetate, pheny-lacetaldehyde, propionaldehyde, propionic acid, pyrrole, syringol, valeraldehyde, and valeric acid.

Embodiment 16 is the coffee replica of any one of embodiments 1-15, wherein the one or more VOCs do not comprise at least one compound selected from the group consisting of 1-heptanol, 1-octanol, 1-octen-3-ol, 2,3-diethylpyrazine, 2,5-dimethylpyrazine, 2-acetyl-1-methylpyrrole, 2-acetylpyridine, 2-acetylpyrrole, 2-ethyl-1-hexanol, 2-ethylfuran, 2-furfuryl acetate, 2-heptanol, 2-heptanone, 2-methylbutyl isovalerate, 2-methylbutyraldehyde, 2-methylbutyric acid, 2-nonanol, 2-nonanone, 2-octanone, 2-pentylfuran, 2-phenyl-2-butenal, 2-phenylethanol, 2-undecanone, 3-ethylpyridine, 3-hexanone, 3-octanol, 4-carvomenthenol, 4-ethyl guaiacol, 4-ethyl phenol, 4-methyl-2-phenyl-2-pentenal, 4'-methylacetophenone, 4-vinylphenol, 5-methyl-2-phenyl-2-hexenal, benzaldehyde, benzyl acetate, butyl alcohol, damascenone, decanal, diethyl disulfide, dimethyl sulfide, dimethyl sulfoxide, ethyl acetate, ethyl butanoate, ethyl heptanoate, ethyl hexanoate, ethyl lactate, ethyl octanoate, ethyl phenylacetate, ethyl tiglate, furfuryl propionate, geraniol, hexanal, hexanol, hexyl acetate, isoamyl acetate, isobutyric acid, limonene, linalool, methyl benzoate, methyl hexanoate, methyl nicotinate, methyl phenylacetate, methyl salicylate, myrcene, nonanal, octanal, p-cresol, phenethyl acetate, phenylacetaldehyde, propionaldehyde, propionic acid, and valeric acid.

Embodiment 17 is the coffee replica of any one of embodiments 1-16, wherein the one or more VOCs do not comprise 1-methyl-1,2,3,6-tetrahydropyridine.

Embodiment 18 is the coffee replica of any one of embodiments 1-17, wherein the one or more VOCs comprise at least one compound selected from the group consisting of 2,3-butanediol, 2-octanol, 2-pentanol, 2-phenylpropionaldehyde, 2-tridecanone, 3-octanone, amyl acetate, benzyl alcohol, benzyl isovalerate, beta-ionone, butyl acetate, ethyl 3-phenylpropionate, ethyl benzoate, ethyl cinnamate, ethyl isobutyrate, ethyl myristate, ethyl oleate, ethyl salicylate, ethyl valerate, gamma-decalactone, gamma-valerolactone, geranyl acetate, isoamyl alcohol, isoamyl benzoate, isoamyl butyrate, isoamyl isobutyrate, isobutyl acetate, isobutyl alcohol, maltol, massoia lactone, methional, methyl 2-methylbutyrate, methyl anthranilate, methyl cinnamate, propanol, propyl propionate, trans, and trans-2,4-decadienal.

Embodiment 19 is the coffee replica of any one of embodiments 1-18, wherein the one or more VOCs comprise at least one compound selected from the group consisting of 2-pentanol, beta-ionone, ethyl benzoate, geranyl acetate, isoamyl alcohol, maltol, massoia lactone, and methyl anthranilate.

Embodiment 20 is the coffee replica of any one of embodiments 1-19, wherein 2,3-diethyl-5-methylpyrazine is present in an amount of less than about 0.0065 mg/L.

Embodiment 21 is the coffee replica of any one of embodiments 1-20, wherein 2-ethylpyrazine is present in an amount of less than about 0.44 mg/L.

Embodiment 22 is the coffee replica of any one of embodiments 1-21, wherein 2-isopropyl-3-methoxypyrazine is present in an amount of less than about 0.0005 mg/L.

Embodiment 23 is the coffee replica of any one of embodiments 1-22, wherein 2-methoxy-4-vinylphenol is present in an amount of less than about 0.22 mg/L.

Embodiment 24 is the coffee replica of any one of embodiments 1-23, wherein 2-methylpyrazine is present in an amount of less than about 5.1 mg/L.

Embodiment 25 is the coffee replica of any one of embodiments 1-24, wherein 5-methylfurfural is present in an amount of less than about 3.2 mg/L.

Embodiment 26 is the coffee replica of any one of embodiments 1-25, wherein amyl alcohol is present in an amount of less than about 0.008 mg/L.

Embodiment 27 is the coffee replica of any one of embodiments 1-26, wherein butyric acid is present in an amount of less than about 1.2 mg/L.

Embodiment 28 is the coffee replica of any one of embodiments 1-27, wherein difurfuryl ether is present in an amount of less than about 0.027 mg/L.

Embodiment 29 is the coffee replica of any one of embodiments 1-28, wherein dimethyl trisulfide is present in an amount of less than about 0.0007 mg/L.

Embodiment 30 is the coffee replica of any one of embodiments 1-29, wherein furfural is present in an amount of less than about 6 mg/L.

Embodiment 31 is the coffee replica of any one of embodiments 1-30, wherein guaiacol is present in an amount of less than about 0.22 mg/L.

Embodiment 32 is the coffee replica of any one of embodiments 1-31, wherein isobutyraldehyde is present in an amount of less than about 0.075 mg/L.

Embodiment 33 is the coffee replica of any one of embodiments 1-32, wherein isovaleraldehyde is present in an amount of less than about 0.05 mg/L.

Embodiment 34 is the coffee replica of any one of embodiments 1-33, wherein pyrrole is present in an amount of less than about 0.005 mg/L.

Embodiment 35 is the coffee replica of any one of embodiments 1-34, wherein 2,5-dimethylphenol is present in an amount of at least about 0.004 mg/L.

Embodiment 36 is the coffee replica of any one of embodiments 1-35, wherein 2-acetyl-5-methylfuran is present in an amount of at least about 0.5 mg/L.

Embodiment 37 is the coffee replica of any one of embodiments 1-36, wherein 2-methoxy-4-methylphenol is present in an amount of at least about 0.00012 mg/L.

Embodiment 38 is the coffee replica of any one of embodiments 1-37, wherein coffee furanone is present in an amount of at least about 50 mg/L.

Embodiment 39 is the coffee replica of any one of embodiments 1-38, wherein diethyl succinate is present in an amount of at least about 0.0004 mg/L.

Embodiment 40 is the coffee replica of any one of embodiments 1-39, wherein ethyl 2-methylbutyrate is present in an amount of at least about 0.002 mg/L.

Embodiment 41 is the coffee replica of any one of embodiments 1-40, wherein ethyl decanoate is present in an amount of at least about 0.002 mg/L in the coffee replica beverage.

Embodiment 42 is the coffee replica of any one of embodiments 1-41, wherein ethyl laurate is present in an amount of at least about 0.0007 mg/L.

Embodiment 43 is the coffee replica of any one of embodiments 1-42, wherein gamma-nonalactone is present in an amount of at least about 0.005 mg/L.

Embodiment 44 is the coffee replica of any one of embodiments 1-43, wherein isovaleric acid is present in an amount of at least 1 mg/L.

Embodiment 45 is the coffee replica of any one of embodiments 1-44, wherein syringol is present in an amount of at least about 0.1 mg/L.

Embodiment 46 is the coffee replica of any one of embodiments 1-45, wherein valeraldehyde is present in an amount of at least about 0.6 mg/L.

Embodiment 47 is the coffee replica of any one of embodiments 1-46, wherein the VOCs comprise one or more of: an acid, an alcohol, an aldehyde, an amine, a benzene, an ester, a furan, a ketone, a lactone, a phenol, a pyrazine, a pyridine, a pyrrole, a sugar or sugar alcohol, a sulfur compound, a terpene, or a thiophene.

Embodiment 48 is the coffee replica of any one of embodiments 1-47, wherein the VOCs comprise one or more of: an acid, an alcohol, an aldehyde, an ester, a furan, a ketone, a lactone, a phenol, a pyrazine, a pyridine, a pyrrole, a sugar or sugar alcohol, a sulfur compound, or a terpene.

Embodiment 49 is the coffee replica of any one of embodiments 1-48, wherein the VOCs comprise one or more of: an acid, an alcohol, an aldehyde, an ester, a furan, a ketone, a lactone, a phenol, a pyrazine, a pyrrole, a sugar or sugar alcohol, or a sulfur compound.

Embodiment 50 is the coffee replica of any one of embodiments 1-49, wherein the VOCs comprise one or more acids.

Embodiment 51 is the coffee replica of embodiment 50, wherein the one or more acids comprise at least one acid selected from the group consisting of 2-methylbutyric acid, 3-methylbutyric acid, 4-hydroxy-butanoic acid, acetic acid, butyric acid, isobutyric acid, isovaleric acid, propionic acid, and valeric acid.

Embodiment 52 is the coffee replica of embodiment 50, wherein the one or more acids comprise at least one acid selected from the group consisting of 2-methylbutyric acid, 3-methylbutyric acid, butyric acid, isobutyric acid, isovaleric acid, propionic acid, and valeric acid.

Embodiment 53 is the coffee replica of embodiment 50, wherein the one or more acids comprise at least one acid selected from the group consisting of 3-methylbutyric acid, butyric acid, and isovaleric acid.

Embodiment 54 is the coffee replica of any one of embodiments 1-53, wherein the VOCs comprise one or more alcohols.

Embodiment 55 is the coffee replica of embodiment 54, wherein the one or more alcohols comprise at least one alcohol selected from the group consisting of 1-heptanol, 1-octanol, 1-octen-3-ol, 2,3-butanediol, 2-ethyl-1-hexanol, 2-heptanol, 2-nonanol, 2-octanol, 2-pentanol, 2-phenylethanol, 3-octanol, 4-carvomenthenol, amyl alcohol, benzyl alcohol, butyl alcohol, geraniol, hexanol, isoamyl alcohol, isobutyl alcohol, and propanol.

Embodiment 56 is the coffee replica of embodiment 54, wherein the one or more alcohols comprise at least one alcohol selected from the group consisting of 1-heptanol, 1-octanol, 1-octen-3-ol, 2,3-butanediol, 2-ethyl-1-hexanol, 2-heptanol, 2-nonanol, 2-octanol, 2-pentanol, 2-phenylethanol, 3-octanol, 4-carvomenthenol, amyl alcohol, benzyl alcohol, butyl alcohol, geraniol, hexanol, isoamyl alcohol, isobutyl alcohol, and propanol.

Embodiment 57 is the coffee replica of embodiment 54, wherein the one or more alcohols comprise at least one alcohol selected from the group consisting of 2-pentanol, amyl alcohol, and isoamyl alcohol.

Embodiment 58 is the coffee replica of any one of embodiments 1-57, wherein the VOCs comprise one or more aldehydes.

Embodiment 59 is the coffee replica of embodiment 58, wherein the one or more aldehydes comprise at least one aldehyde selected from the group consisting of 2-methyl-butanal, 2-methylbutyraldehyde, 2-phenyl-2-butenal, 2-phenylpropionaldehyde, 3-furaldehyde, 3-methyl-butanal, 4-methyl-2-phenyl-2-pentenal, 5-methyl-2-furancarboxaldehyde, 5-methyl-2-phenyl-2-hexenal, benzaldehyde, deca-nal, hexanal, isobutyraldehyde, isovaleraldehyde, nonanal, octanal, p-anisaldehyde, phenylacetaldehyde, propionaldehyde, trans,trans-2,4-decadienal, trans-2-nonenal, and valeraldehyde.

Embodiment 60 is the coffee replica of embodiment 58, wherein the one or more aldehydes comprise at least one aldehyde selected from the group consisting of 2-methyl-butyraldehyde, 2-phenyl-2-butenal, 2-phenylpropionaldehyde, 4-methyl-2-phenyl-2-pentenal, 5-methyl-2-phenyl-2-hexenal, benzaldehyde, decanal, hexanal, isobutyraldehyde, isovaleraldehyde, nonanal, octanal, p-anisaldehyde, phenylacetaldehyde, propionaldehyde, trans,trans-2,4-decadienal, trans-2-nonenal, and valeraldehyde.

Embodiment 61 is the coffee replica of embodiment 58, wherein the one or more aldehydes comprise at least one aldehyde selected from the group consisting of isobutyraldehyde, isovaleraldehyde, p-anisaldehyde, and valeraldehyde.

Embodiment 62 is the coffee replica of any one of embodiments 1-61, wherein the VOCs comprise one or more amines.

Embodiment 63 is the coffee replica of embodiment 62, wherein the one or more amines comprise at least one amine selected from the group consisting of 2-amino-1-naphthalenol, 2-methoxy-benzenamine, 5-amino-1-naphthol, N,N-dimethyl-ethanamine, and N,N-dimethyl-methylamine.

Embodiment 64 is the coffee replica of any one of embodiments 1-63, wherein the VOCs comprise one or more benzenes.

Embodiment 65 is the coffee replica of embodiment 64, wherein the one or more benzenes comprise at least one benzene selected from the group consisting of styrene and toluene.

Embodiment 66 is the coffee replica of any one of embodiments 1-65, wherein the VOCs comprise one or more esters.

Embodiment 67 is the coffee replica of embodiment 66, wherein the one or more esters comprise at least one ester selected from the group consisting of 2-furanmethanol acetate, 2-furanmethanol propanoate, 2-methylbutyl isovalerate, acetic acid, 2-(dimethylamino)ethyl ester, acetic acid, methyl ester, acetoin acetate, amyl acetate, benzyl acetate, benzyl isovalerate, butyl acetate, delta-decalactone, delta-octalactone, diethyl succinate, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl myristate, ethyl octanoate, ethyl oleate, ethyl phenylacetate, ethyl salicylate, ethyl tiglate, ethyl valerate, furfuryl formate, gamma-decalactone, gamma-nonalactone, gamma-valerolactone, geranyl acetate, hexyl acetate, isoamyl acetate, isoamyl benzoate, isoamyl butyrate, isoamyl isobutyrate, isobutyl acetate, methyl 2-methylbutyrate, methyl anthranilate, methyl benzoate, methyl cinnamate, methyl hexanoate, methyl phenylacetate, methyl salicylate, phenethyl acetate, and propyl propionate.

Embodiment 68 is the coffee replica of embodiment 66, wherein the one or more esters comprise at least one ester selected from the group consisting of 2-methylbutyl isovalerate, acetoin acetate, amyl acetate, benzyl acetate, benzyl isovalerate, butyl acetate, delta-decalactone, delta-octalactone, diethyl succinate, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl myristate, ethyl octanoate, ethyl oleate, ethyl phenylacetate, ethyl salicylate, ethyl tiglate, ethyl valerate, gamma-decalactone, gamma-nonalactone, gamma-valerolactone, geranyl acetate, hexyl acetate, isoamyl acetate, isoamyl benzoate, isoamyl butyrate, isoamyl isobutyrate, isobutyl acetate, methyl 2-methylbutyrate, methyl anthranilate, methyl benzoate, methyl cinnamate, methyl hexanoate, methyl phenylacetate, methyl salicylate, phenethyl acetate, and propyl propionate.

Embodiment 69 is the coffee replica of embodiment 66, wherein the one or more esters comprise at least one ester selected from the group consisting of acetoin acetate, delta-decalactone, delta-octalactone, diethyl succinate, ethyl 2-methylbutyrate, ethyl benzoate, ethyl butyrate, ethyl decanoate, ethyl isovalerate, ethyl laurate, gamma-nonalactone, geranyl acetate, and methyl anthranilate.

Embodiment 70 is the coffee replica of any one of embodiments 66-69, wherein the coffee replica comprises at least about 0.6 mg/L of esters.

Embodiment 71 is the coffee replica of any one of embodiments 1-70, wherein the VOCs comprise one or more furans.

Embodiment 72 is the coffee replica of embodiment 71, wherein the one or more furans comprise at least one furan selected from the group consisting of 1-(2-furanyl)-etha-none, 2-(2-furanylmethyl)-5-methyl-furan, 2-(2-propenyl)-furan, 2-(methoxymethyl)-furan, 2,2'-methylenebis-furan, 2,5-dimethyl-furan, 2-[(methylthio)methyl]-furan, 2-acetyl-5-methylfuran, 2-ethylfuran, 2-furfuryl acetate, 2-methyl-furan, 2-pentylfuran, 2-vinylfuran, 3-furanmethanol, 3-methyl-furan, 5-methylfurfural, difurfuryl ether, furan, furaneol, furfural, furfuryl alcohol, and furfuryl propionate.

Embodiment 73 is the coffee replica of embodiment 71, wherein the one or more furans comprise at least one furan selected from the group consisting of 2-acetyl-5-methyl-furan, 2-ethylfuran, 2-furfuryl acetate, 2-pentylfuran, 5-methylfurfural, difurfuryl ether, furaneol, furfural, furfuryl alcohol, furfuryl propionate.

Embodiment 74 is the coffee replica of embodiment 71, wherein the one or more furans comprise at least one furan selected from the group consisting of 2-acetyl-5-methyl-furan, 5-methylfurfural, difurfuryl ether, furaneol, furfural, and furfuryl alcohol.

Embodiment 75 is the coffee replica of any one of embodiments 1-74, wherein the VOCs comprise one or more ketones.

Embodiment 76 is the coffee replica of embodiment 75, wherein the one or more ketones comprise at least one ketone selected from the group consisting of 1-hydroxy-2-propanone, 2,3-butanedione, 2,3-dimethyl-2-cyclopenten-1-one, 2,3-Hexanedione, 2,3-pentadione, 2-butanone, 2-ethyl-4-hydroxy-5-methyl-3(2H)-furanone, 2-heptanone, 2-methyl-2-cyclopenten-1-one, 2-nonanone, 2-octanone, 2-tridecanone, 2-undecanone, 3-ethyl-2-hydroxy-2-cyclo-penten-1-one, 3-hexanone, 3-octanone, 4-hydroxy-5-methyl-3-furanone, 4'-methylacetophenone, acetone, beta-damascenone, beta-ionone, coffee furanone, damascenone, and dihydro-2-methyl-3(2H)-furanone.

Embodiment 77 is the coffee replica of embodiment 75, wherein the one or more ketones comprise at least one ketone selected from the group consisting of 2,3-butane-dione, 2,3-Hexanedione, 2,3-pentadione, 2-ethyl-4-hydroxy-5-methyl-3(2H)-furanone, 2-heptanone, 2-nonanone, 2-octanone, 2-tridecanone, 2-undecanone, 3-hexanone, 3-octanone, 4-hydroxy-5-methyl-3-furanone, 4'-methylac-etophenone, beta-damascenone, beta-ionone, coffee fura-none, and damascenone.

Embodiment 78 is the coffee replica of embodiment 75, wherein the one or more ketones comprise at least one ketone selected from the group consisting of 2,3-butane-dione, 2,3-Hexanedione, 2,3-pentadione, 2-ethyl-4-hy-droxy-5-methyl-3(2H)-furanone, 4-hydroxy-5-methyl-3-furanone, beta-damascenone, beta-ionone, and coffee furanone.

Embodiment 79 is the coffee replica of any one of embodiments 75-78, wherein the coffee replica comprises at least 53 mg/L of ketones.

Embodiment 80 is the coffee replica of any one of embodiments 1-79, wherein the VOCs comprise one or more lactones.

Embodiment 81 is the coffee replica of embodiment 80, wherein the one or more lactones comprise at least one lactone selected from the group consisting of 4,5-dimethyl-3-hydroxy-2,5-dihydro-furan-2-one, gamma decalactone, massoia lactone, sotolone.

Embodiment 82 is the coffee replica of embodiment 80, wherein the one or more lactones comprise at least one lactone selected from the group consisting of gamma deca-lactone, massoia lactone, and sotolone.

Embodiment 83 is the coffee replica of any one of embodiments 1-82, wherein the VOCs comprise one or more phenols.

Embodiment 84 is the coffee replica of embodiment 83, wherein the one or more phenols comprise at least one phenol selected from the group consisting of 1-(2-hydroxy-5-methylphenyl)-ethanone, 2,5-dimethylphenol, 2-methoxy-4-methylphenol, 2-methoxy-4-vinylphenol, 2-methoxy-phenol, 2-methyl-phenol, 4-ethyl guaiacol, 4-ethyl phenol, 4-ethyl-2-methoxy-phenol, 4-ethylguaiacol, 4-vinylphenol, eugenol, guaiacol, isoeugenol, p-cresol, phe-nol, syringol, syringol (2,6-dimethoxyphenol), vanillin erythro and/or threo-butan-2,3-diol acetal, and vanillyl ethyl ether.

Embodiment 85 is the coffee replica of embodiment 83, wherein the one or more phenols comprise at least one phenol selected from the group consisting of 2,5-dimeth-ylphenol, 2-methoxy-4-methylphenol, 2-methoxy-4-vi-nylphenol, 4-ethyl guaiacol, 4-ethyl phenol, 4-ethylguaiacol, 4-vinylphenol, eugenol, guaiacol, isoeugenol, p-cresol, syringol, vanillin erythro and/or threo-butan-2,3-diol acetal, and vanillyl ethyl ether.

Embodiment 86 is the coffee replica of embodiment 83, wherein the one or more phenols comprise at least one phenol selected from the group consisting of 2,5-dimeth-ylphenol, 2-methoxy-4-methylphenol, 2-methoxy-4-vi-nylphenol, 4-ethylguaiacol, eugenol, guaiacol, isoeugenol, syringol, vanillin erythro and/or threo-butan-2,3-diol acetal, and vanillyl ethyl ether.

Embodiment 87 is the coffee replica of any one of embodiments 83-86, wherein the coffee replica comprises at least 4.6 mg/L of phenols.

Embodiment 88 is the coffee replica of any one of embodiments 1-87, wherein the VOCs comprise one or more pyrazines.

Embodiment 89 is the coffee replica of embodiment 88, wherein the one or more pyrazines comprise at least one pyrazine selected from the group consisting of 2-(n-propyl)-pyrazine, 2,3-diethyl-5-methylpyrazine, 2,3-diethylpyra-zine, 2,5-dimethylpyrazine, 2,5-dimethyl-pyrazine, 2,6-di-ethyl-pyrazine, 2,6-dimethylpyrazine, 2,6-dimethyl-pyrazine, 2-ethoxy-3-methylpyrazine, 2-ethyl-3-methyl-pyrazine, 2-ethyl-6-methyl-pyrazine, 2-ethylpyrazine, 2-isobutyl-3-methoxypyrazine (IBMP), 2-isobutyl-3-methyl pyrazine, 2-isopropyl-3-methoxypyrazine, 2-methylpyrazine, 3,5-diethyl-2-methyl-pyrazine, 3-ethyl-2,5-dimethyl-pyrazine, ethyl-pyrazine, isopropenyl pyrazine, methyl-pyrazine, and pyrazine.

Embodiment 90 is the coffee replica of embodiment 88, wherein the one or more pyrazines comprise at least one pyrazine selected from the group consisting of 2,3-diethyl-5-methylpyrazine, 2,3-diethylpyrazine, 2,5-dimethylpyrazine, 2,6-dimethylpyrazine, 2-ethoxy-3-methylpyrazine, 2-ethylpyrazine, 2-isobutyl-3-methoxypyrazine (IBMP), 2-isobutyl-3-methyl pyrazine, 2-isopropyl-3-methoxypyrazine, 2-methylpyrazine, and isopropenyl pyrazine.

Embodiment 91 is the coffee replica of embodiment 88, wherein the one or more pyrazines comprise at least one pyrazine selected from the group consisting of 2,3-diethyl-5-methylpyrazine, 2,6-dimethylpyrazine, 2-ethoxy-3-meth-ylpyrazine, 2-ethylpyrazine, 2-isobutyl-3-methoxypyrazine (IBMP), 2-isobutyl-3-methyl pyrazine, 2-isopropyl-3-methoxypyrazine, 2-methylpyrazine, and isopropenyl pyra-zine.

Embodiment 92 is the coffee replica of any one of embodiments 1-91, wherein the VOCs comprise one or more pyridines.

Embodiment 93 is the coffee replica of embodiment 92, wherein the one or more pyridines comprise at least one pyridine selected from the group consisting of 1-methyl-1,2,3,6-tetrahydropyridine, 1-methyl-piperidine, 2-acetylpyri-dine, 2-methyl-pyridine, 3-ethylpyridine, 3-ethyl-pyridine, 3-methyl-pyridine, 3-propyl-pyridine, 3-pyridinol, and methyl nicotinate.

Embodiment 94 is the coffee replica of embodiment 92, wherein the one or more pyridines comprise at least one pyridine selected from the group consisting of 2-acetylpyri-dine, 3-ethylpyridine, and methyl nicotinate.

Embodiment 95 is the coffee replica of any one of embodiments 1-94, wherein the VOCs comprise one or more pyrroles.

Embodiment 96 is the coffee replica of embodiment 95, wherein the one or more pyrroles comprise at least one pyrrole selected from the group consisting of 1-(1H-pyrrol-2-yl)-ethanone, 1-(2-furanylmethyl)-1H-pyrrole, 1-ethyl-1H-pyrrole, 1-methyl-1H-pyrrole, 1-methyl-1H-pyrrole-2-carboxaldehyde, 2-acetyl-1-methylpyrrole, 2-acetylpyrrole, indole, and pyrrole.

Embodiment 97 is the coffee replica of embodiment 95, wherein the one or more pyrroles comprise at least one pyrrole selected from the group consisting of 2-acetyl-1-methylpyrrole, 2-acetylpyrrole, and pyrrole.

Embodiment 98 is the coffee replica of embodiment 95, wherein the one or more pyrroles comprise pyrrole.

Embodiment 99 is the coffee replica of any one of embodiments 1-98, wherein the VOCs comprise one or more sugars or sugar alcohols.

Embodiment 100 is the coffee replica of embodiment 99, wherein the one or more sugars or sugar alcohols comprise at least one sugars or sugar alcohol selected from the group consisting of ethyl maltol and maltol.

Embodiment 101 is the coffee replica of any one of embodiments 1-100, wherein the VOCs comprise one or more sulfur compounds.

Embodiment 102 is the coffee replica of embodiment 101, wherein the one or more sulfur compounds comprise at least one sulfur compound selected from the group consisting of diethyl disulfide, dimethyl disulfide, dimethyl sulfide, dim-ethyl sulfoxide, dimethyl trisulfide, methanethiol, and methional.

Embodiment 103 is the coffee replica of embodiment 101, wherein the one or more sulfur compounds comprise at least one sulfur compound selected from the group consisting of diethyl disulfide, dimethyl sulfide, dimethyl sulfoxide, dim-ethyl trisulfide, methanethiol, and methional.

Embodiment 104 is the coffee replica of embodiment 101, wherein the one or more sulfur compounds comprise at least one sulfur compound selected from the group consisting of dimethyl trisulfide and methanethiol.

Embodiment 105 is the coffee replica of any one of embodiments 1-104, wherein the VOCs comprise one or more terpenes.

Embodiment 106 is the coffee replica of embodiment 105, wherein the one or more terpenes comprise at least one terpene selected from the group consisting of alpha-methyl-alpha-[4-methyl-3-pentenyl]oxiranemethanol, beta-myrcene, limonene, linalool, and myrcene.

Embodiment 107 is the coffee replica of embodiment 105, wherein the one or more terpenes comprise at least one terpene selected from the group consisting of limonene, linalool, and myrcene.

Embodiment 108 is the coffee replica of any one of embodiments 1-107, wherein the VOCs comprise one or more thiophenes.

Embodiment 109 is the coffee replica of embodiment 108, wherein the one or more thiophenes comprise at least one thiophene comprises thiophene.

Embodiment 110 is the coffee replica of any one of embodiments 1-109, wherein the VOCs comprise 2,7-dim-ethyl-oxepine.

Embodiment 111 is the coffee replica of any one of embodiments 1-110, wherein the VOCs comprise at least 20 compounds selected from the group consisting of 1-hepta-nol, 1-(1H-pyrrol-2-yl)-ethanone, 1-(2-furanyl)-ethanone, 1-(2-furanylmethyl)-1H-pyrrole, 1-(2-hydroxy-5-meth-ylphenyl)-ethanone, 1-ethyl-1H-pyrrole, 1-hydroxy-2-pro-panone, 1-methyl-1,2,3,6-tetrahydropyridine, 1-methyl-1H-pyrrole, 1-methyl-1H-pyrrole-2-carboxaldehyde, 1-methyl-piperidine, 1-octanol, 1-octen-3-ol, 2-(2-furanylmethyl)-5-methyl-furan, 2-(2-propenyl)-furan, 2-(methoxymethyl)-furan, 2-(n-propyl)-pyrazine, 2,2'-methylenebis-furan, 2,3-butanediol, 2,3-butanedione, 2,3-diethyl-5-methylpyrazine, 2,3-diethylpyrazine, 2,3-dimethyl-2-cyclopenten-1-one, 2,3-dimethylpyrazine, 2,3-Hexanedione, 2,3-pentadione, 2,5-dimethyl-furan, 2,5-dimethylphenol, 2,5-dimethylpyra-zine, 2,6-diethyl-pyrazine, 2,6-dimethylpyrazine, 2,7-dim-ethyl-oxepine, 2-[(methylthio)methyl]-furan, 2-acetyl-1-methylpyrrole, 2-acetyl-5-methylfuran, 2-acetylpyridine, 2-acetylpyrrole, 2-amino-1-naphthalenol, 2-butanone, 2-ethoxy-3-methylpyrazine, 2-ethyl-1-hexanol, 2-ethyl-3-methyl-pyrazine, 2-ethyl-4-hydroxy-5-methyl-3(2H)-fura-none, 2-ethyl-6-methyl-pyrazine, 2-ethylfuran, 2-ethylpyra-zine, 2-furanmethanol acetate, 2-furanmethanol propanoate, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphe-nol, 2-methoxy-4-vinylphenol, 2-methoxy-benzenamine, 2-methoxy-phenol, 2-methyl-2-cyclopenten-1-one, 2-methyl-butanal, 2-methylbutyl isovalerate, 2-methylbu-tyraldehyde, 2-methylbutyric acid, 2-methyl-furan, 2-methyl-phenol, 2-methylpyrazine, 2-methylpyrazine, 2-methyl-pyridine, 2-nonanol, 2-nonanone, 2-octanol, 2-oc-tanone, 2-pentanol, 2-pentylfuran, 2-phenyl-2-butenal, 2-phenylethanol, 2-phenylpropionaldehyde, 2-tridecanone, 2-undecanone, 2-vinylfuran, 3,5-diethyl-2-methyl-pyrazine, 3-ethyl-2,5-dimethyl-pyrazine, 3-ethyl-2-hydroxy-2-cyclo-penten-1-one, 3-ethylpyridine, 3-ethyl-pyridine, 3-furalde-hyde, 3-furanmethanol, 3-hexanone, 3-methyl-butanal, 3-methylbutyric acid, 3-methyl-furan, 3-methyl-pyridine, 3-octanol, 3-octanone, 3-propyl-pyridine, 3-pyridinol, 4,5-dimethyl-3-hydroxy-2,5-dihydro-furan-2-one, 4-carvomenthenol, 4-ethyl guaiacol, 4-ethyl phenol, 4-ethyl-2-methoxyphenol, 4-ethylguaiacol, 4-hydroxy-5-methyl-3-furanone, 4-hydroxy-butanoic acid, 4-methyl-2-phenyl-2-pentenal, 4'-methylacetophenone, 4-vinylphenol, 5-amino-1-naphthol, 5-methyl-2-furancarboxaldehyde, 5-methyl-2-phenyl-2-hexenal, 5-methylfurfural, acetic acid, acetic acid, 2-(dimethylamino)ethyl ester, acetic acid, methyl ester, acetoin acetate, acetone, alpha-methyl-alpha-[4-methyl-3-pentenyl]oxiranemethanol, amyl acetate, amyl alcohol, benzaldehyde, benzyl acetate, benzyl alcohol, benzyl isovalerate, beta-damascenone, beta-ionone, beta-myrcene, butyl acetate, butyl alcohol, butyric acid, coffee furanone, damascenone, decanal, delta-decalactone, delta-octalactone, diethyl disulfide, diethyl succinate, difurfuryl ether, dihydro-2-methyl-3 (2H)-furanone, dimethyl disulfide, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, ethyl-pyrazine, eugenol, furan, furaneol, furfural, furfuryl alcohol, furfuryl formate, furfuryl propionate, gamma decalactone, gamma-decalactone, gamma-nonalactone, gamma-valerolactone, geraniol, geranyl acetate, guaiacol, hexanal, hexanol, hexyl acetate, indole, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, methyl-pyrazine, myrcene, N,N-dimethyl-ethanamine, N,N-dimethyl-methylamine, nonanal, octanal, p-anisaldehyde, p-cresol, phenethyl acetate, phenol, phenylacetaldehyde, propanol, propionaldehyde, propionic acid, propyl propionate, pyrazine, pyridine, pyrrole, sotolone, styrene, syringol, thiophene, toluene, trans,trans-2,4-decadienal, trans-2-nonenal, valeraldehyde, valeric acid, vanillin erythro and/or threo-butan-2,3-diol acetal, and vanillyl ethyl ether.

Embodiment 112 is the coffee replica of any one of embodiments 1-110, wherein the VOCs comprise at least 30 compounds selected from the group consisting of 1-heptanol, 1-(1H-pyrrol-2-yl)-ethanone, 1-(2-furanyl)-ethanone, 1-(2-furanylmethyl)-1H-pyrrole, 1-(2-hydroxy-5-methylphenyl)-ethanone, 1-ethyl-1H-pyrrole, 1-hydroxy-2-propanone, 1-methyl-1,2,3,6-tetrahydropyridine, 1-methyl-1H-pyrrole, 1-methyl-1H-pyrrole-2-carboxaldehyde, 1-methyl-piperidine, 1-octanol, 1-octen-3-ol, 2-(2-furanylmethyl)-5-methyl-furan, 2-(2-propenyl)-furan, 2-(methoxymethyl)-furan, 2-(n-propyl)-pyrazine, 2,2'-methylenebis-furan, 2,3-butanediol, 2,3-butanedione, 2,3-diethyl-5-methylpyrazine, 2,3-diethylpyrazine, 2,3-dimethyl-2-cyclopenten-1-one, 2,3-dimethylpyrazine, 2,3-Hexanedione, 2,3-pentadione, 2,5-dimethyl-furan, 2,5-dimethylphenol, 2,5-dimethylpyrazine, 2,6-diethyl-pyrazine, 2,6-dimethylpyrazine, 2,7-dimethyl-oxepine, 2-[(methylthio)methyl]-furan, 2-acetyl-1-methylpyrrole, 2-acetyl-5-methylfuran, 2-acetylpyridine, 2-acetylpyrrole, 2-amino-1-naphthalenol, 2-butanone, 2-ethoxy-3-methylpyrazine, 2-ethyl-1-hexanol, 2-ethyl-3-methyl-pyrazine, 2-ethyl-4-hydroxy-5-methyl-3(2H)-furanone, 2-ethyl-6-methyl-pyrazine, 2-ethylfuran, 2-ethylpyrazine, 2-furanmethanol acetate, 2-furanmethanol propanoate, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methoxy-benzenamine, 2-methoxy-phenol, 2-methyl-2-cyclopenten-1-one, 2-methyl-butanal, 2-methylbutyl isovalerate, 2-methylbutyraldehyde, 2-methylbutyric acid, 2-methyl-furan, 2-methyl-phenol, 2-methylpyrazine, 2-methylpyrazine, 2-methyl-pyridine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 2-vinylfuran, 3,5-diethyl-2-methyl-pyrazine, 3-ethyl-2,5-dimethyl-pyrazine, 3-ethyl-2-hydroxy-2-cyclopenten-1-one, 3-ethylpyridine, 3-ethyl-pyridine, 3-furaldehyde, 3-furanmethanol, 3-hexanone, 3-methyl-butanal, 3-methylbutyric acid, 3-methyl-furan, 3-methyl-pyridine, 3-octanol, 3-octanone, 3-propyl-pyridine, 3-pyridinol, 4,5-dimethyl-3-hydroxy-2,5-dihydro-furan-2-one, 4-carvomenthenol, 4-ethyl guaiacol, 4-ethyl phenol, 4-ethyl-2-methoxyphenol, 4-ethylguaiacol, 4-hydroxy-5-methyl-3-furanone, 4-hydroxy-butanoic acid, 4-methyl-2-phenyl-2-pentenal, 4'-methylacetophenone, 4-vinylphenol, 5-amino-1-naphthol, 5-methyl-2-furancarboxaldehyde, 5-methyl-2-phenyl-2-hexenal, 5-methylfurfural, acetic acid, acetic acid, 2-(dimethylamino)ethyl ester, acetic acid, methyl ester, acetoin acetate, acetone, alpha-methyl-alpha-[4-methyl-3-pentenyl]oxiranemethanol, amyl acetate, amyl alcohol, benzaldehyde, benzyl acetate, benzyl alcohol, benzyl isovalerate, beta-damascenone, beta-ionone, beta-myrcene, butyl acetate, butyl alcohol, butyric acid, coffee furanone, damascenone, decanal, delta-decalactone, delta-octalactone, diethyl disulfide, diethyl succinate, difurfuryl ether, dihydro-2-methyl-3 (2H)-furanone, dimethyl disulfide, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, ethyl-pyrazine, eugenol, furan, furaneol, furfural, furfuryl alcohol, furfuryl formate, furfuryl propionate, gamma decalactone, gamma-decalactone, gamma-nonalactone, gamma-valerolactone, geraniol, geranyl acetate, guaiacol, hexanal, hexanol, hexyl acetate, indole, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, methyl-pyrazine, myrcene, N,N-dimethyl-ethanamine, N,N-dimethyl-methylamine, nonanal, octanal, p-anisaldehyde, p-cresol, phenethyl acetate, phenol, phenylacetaldehyde, propanol, propionaldehyde, propionic acid, propyl propionate, pyrazine, pyridine, pyrrole, sotolone, styrene, syringol, thiophene, toluene, trans,trans-2,4-decadienal, trans-2-nonenal, valeraldehyde, valeric acid, vanillin erythro and/or threo-butan-2,3-diol acetal, and vanillyl ethyl ether.

Embodiment 113 is the coffee replica of any one of embodiments 1-110, wherein the VOCs comprise at least 40 compounds selected from the group consisting of 1-heptanol, 1-(1H-pyrrol-2-yl)-ethanone, 1-(2-furanyl)-ethanone, 1-(2-furanylmethyl)-1H-pyrrole, 1-(2-hydroxy-5-methylphenyl)-ethanone, 1-ethyl-1H-pyrrole, 1-hydroxy-2-propanone, 1-methyl-1,2,3,6-tetrahydropyridine, 1-methyl-1H-pyrrole, 1-methyl-1H-pyrrole-2-carboxaldehyde, 1-methyl-piperidine, 1-octanol, 1-octen-3-ol, 2-(2-furanylmethyl)-5-methyl-furan, 2-(2-propenyl)-furan, 2-(methoxymethyl)-furan, 2-(n-propyl)-pyrazine, 2,2'-methylenebis-furan, 2,3-butanediol, 2,3-butanedione, 2,3-diethyl-5-methylpyrazine, 2,3-diethylpyrazine, 2,3-dimethyl-2-cyclopenten-1-one, 2,3-dimethylpyrazine, 2,3-Hexanedione, 2,3-pentadione, 2,5-dimethyl-furan, 2,5-dimethylphenol, 2,5-dimethylpyrazine, 2,6-diethyl-pyrazine, 2,6-dimethylpyrazine, 2,7-dimethyl-oxepine, 2-[(methylthio)methyl]-furan, 2-acetyl-1-methylpyrrole, 2-acetyl-5-methylfuran, 2-acetylpyridine, 2-acetylpyrrole, 2-amino-1-naphthalenol, 2-butanone, 2-ethoxy-3-methylpyrazine, 2-ethyl-1-hexanol, 2-ethyl-3-methyl-pyrazine, 2-ethyl-4-hydroxy-5-methyl-3(2H)-furanone, 2-ethyl-6-methyl-pyrazine, 2-ethylfuran, 2-ethylpyrazine, 2-furanmethanol acetate, 2-furanmethanol propanoate, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methoxy-benzenamine, 2-methoxy-phenol, 2-methyl-2-cyclopenten-1-one, 2-methyl-butanal, 2-methylbutyl isovalerate, 2-methylbutyraldehyde, 2-methylbutyric acid, 2-methyl-furan, 2-methyl-phenol, 2-methylpyrazine, 2-methylpyrazine, 2-methyl-pyridine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 2-vinylfuran, 3,5-diethyl-2-methyl-pyrazine, 3-ethyl-2,5-dimethyl-pyrazine, 3-ethyl-2-hydroxy-2-cyclopenten-1-one, 3-ethylpyridine, 3-ethyl-pyridine, 3-furaldehyde, 3-furanmethanol, 3-hexanone, 3-methyl-butanal, 3-methylbutyric acid, 3-methyl-furan, 3-methyl-pyridine, 3-octanol, 3-octanone, 3-propyl-pyridine, 3-pyridinol, 4,5-dimethyl-3-hydroxy-2,5-dihydro-furan-2-one, 4-carvomenthenol, 4-ethyl guaiacol, 4-ethyl phenol, 4-ethyl-2-methoxy-phenol, 4-ethylguaiacol, 4-hydroxy-5-methyl-3-furanone, 4-hydroxy-butanoic acid, 4-methyl-2-phenyl-2-pentenal, 4'-methylacetophenone, 4-vinylphenol, 5-amino-1-naphthol, 5-methyl-2-furancarboxaldehyde, 5-methyl-2-phenyl-2-hexenal, 5-methylfurfural, acetic acid, acetic acid, 2-(dimethylamino)ethyl ester, acetic acid, methyl ester, acetoin acetate, acetone, alpha-methyl-alpha-[4-methyl-3-pentenyl] oxiranemethanol, amyl acetate, amyl alcohol, benzaldehyde, benzyl acetate, benzyl alcohol, benzyl isovalerate, beta-damascenone, beta-ionone, beta-myrcene, butyl acetate, butyl alcohol, butyric acid, coffee furanone, damascenone, decanal, delta-decalactone, delta-octalactone, diethyl disulfide, diethyl succinate, difurfuryl ether, dihydro-2-methyl-3 (2H)-furanone, dimethyl disulfide, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, ethyl-pyrazine, eugenol, furan, furaneol, furfural, furfuryl alcohol, furfuryl formate, furfuryl propionate, gamma decalactone, gamma-decalactone, gamma-nonalactone, gamma-valerolactone, geraniol, geranyl acetate, guaiacol, hexanal, hexanol, hexyl acetate, indole, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, methyl-pyrazine, myrcene, N,N-dimethyl-ethanamine, N,N-dimethyl-methylamine, nonanal, octanal, p-anisaldehyde, p-cresol, phenethyl acetate, phenol, phenylacetaldehyde, propanol, propionaldehyde, propionic acid, propyl propionate, pyrazine, pyridine, pyrrole, sotolone, styrene, syringol, thiophene, toluene, trans,trans-2,4-decadienal, trans-2-nonenal, valeraldehyde, valeric acid, vanillin erythro and/or threo-butan-2,3-diol acetal, and vanillyl ethyl ether.

Embodiment 114 is the coffee replica of any one of embodiments 1-110, wherein the VOCs comprise at least 50 compounds selected from the group consisting of 1-heptanol, 1-(1H-pyrrol-2-yl)-ethanone, 1-(2-furanyl)-ethanone, 1-(2-furanylmethyl)-1H-pyrrole, 1-(2-hydroxy-5-methylphenyl)-ethanone, 1-ethyl-1H-pyrrole, 1-hydroxy-2-propanone, 1-methyl-1,2,3,6-tetrahydropyridine, 1-methyl-1H-pyrrole, 1-methyl-1H-pyrrole-2-carboxaldehyde, 1-methyl-piperidine, 1-octanol, 1-octen-3-ol, 2-(2-furanylmethyl)-5-methyl-furan, 2-(2-propenyl)-furan, 2-(methoxymethyl)-furan, 2-(n-propyl)-pyrazine, 2,2'-methylenebis-furan, 2,3-butanediol, 2,3-butanedione, 2,3-diethyl-5-methylpyrazine, 2,3-diethylpyrazine, 2,3-dimethyl-2-cyclopenten-1-one, 2,3-dimethylpyrazine, 2,3-Hexanedione, 2,3-pentadione, 2,5-dimethyl-furan, 2,5-dimethylphenol, 2,5-dimethylpyrazine, 2,6-diethyl-pyrazine, 2,6-dimethylpyrazine, 2,7-dimethyl-oxepine, 2-[(methylthio)methyl]-furan, 2-acetyl-1-methylpyrrole, 2-acetyl-5-methylfuran, 2-acetylpyridine, 2-acetylpyrrole, 2-amino-1-naphthalenol, 2-butanone, 2-ethoxy-3-methylpyrazine, 2-ethyl-1-hexanol, 2-ethyl-3-methyl-pyrazine, 2-ethyl-4-hydroxy-5-methyl-3(2H)-furanone, 2-ethyl-6-methyl-pyrazine, 2-ethylfuran, 2-ethylpyrazine, 2-furanmethanol acetate, 2-furanmethanol propanoate, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methoxy-benzenamine, 2-methoxy-phenol, 2-methyl-2-cyclopenten-1-one, 2-methyl-butanal, 2-methylbutyl isovalerate, 2-methylbutyraldehyde, 2-methylbutyric acid, 2-methyl-furan, 2-methyl-phenol, 2-methylpyrazine, 2-methylpyrazine, 2-methyl-pyridine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 2-vinylfuran, 3,5-diethyl-2-methyl-pyrazine, 3-ethyl-2,5-dimethyl-pyrazine, 3-ethyl-2-hydroxy-2-cyclopenten-1-one, 3-ethylpyridine, 3-ethyl-pyridine, 3-furaldehyde, 3-furanmethanol, 3-hexanone, 3-methyl-butanal, 3-methylbutyric acid, 3-methyl-furan, 3-methyl-pyridine, 3-octanol, 3-octanone, 3-propyl-pyridine, 3-pyridinol, 4,5-dimethyl-3-hydroxy-2,5-dihydro-furan-2-one, 4-carvomenthenol, 4-ethyl guaiacol, 4-ethyl phenol, 4-ethyl-2-methoxy-phenol, 4-ethylguaiacol, 4-hydroxy-5-methyl-3-furanone, 4-hydroxy-butanoic acid, 4-methyl-2-phenyl-2-pentenal, 4'-methylacetophenone, 4-vinylphenol, 5-amino-1-naphthol, 5-methyl-2-furancarboxaldehyde, 5-methyl-2-phenyl-2-hexenal, 5-methylfurfural, acetic acid, acetic acid, 2-(dimethylamino)ethyl ester, acetic acid, methyl ester, acetoin acetate, acetone, alpha-methyl-alpha-[4-methyl-3-pentenyl] oxiranemethanol, amyl acetate, amyl alcohol, benzaldehyde, benzyl acetate, benzyl alcohol, benzyl isovalerate, beta-damascenone, beta-ionone, beta-myrcene, butyl acetate, butyl alcohol, butyric acid, coffee furanone, damascenone, decanal, delta-decalactone, delta-octalactone, diethyl disulfide, diethyl succinate, difurfuryl ether, dihydro-2-methyl-3

(2H)-furanone, dimethyl disulfide, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, ethyl-pyrazine, eugenol, furan, furaneol, furfural, furfuryl alcohol, furfuryl formate, furfuryl propionate, gamma decalactone, gamma-decalactone, gamma-nonalactone, gamma-valerolactone, geraniol, geranyl acetate, guaiacol, hexanal, hexanol, hexyl acetate, indole, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, methyl-pyrazine, myrcene, N,N-dimethyl-ethanamine, N,N-dimethyl-methylamine, nonanal, octanal, p-anisaldehyde, p-cresol, phenethyl acetate, phenol, phenylacetaldehyde, propanol, propionaldehyde, propionic acid, propyl propionate, pyrazine, pyridine, pyrrole, sotolone, styrene, syringol, thiophene, toluene, trans,trans-2,4-decadienal, trans-2-nonenal, valeraldehyde, valeric acid, vanillin erythro and/or threo-butan-2,3-diol acetal, and vanillyl ethyl ether.

Embodiment 115 is the coffee replica of any one of embodiments 1-114, wherein the VOCs comprise at least 10 compounds selected from the group consisting of 1-heptanol, 1-octanol, 1-octen-3-ol, 2,3-butanediol, 2,3-butanedione, 2,3-diethyl-5-methylpyrazine, 2,3-diethylpyrazine, 2,3-Hexanedione, 2,3-pentadione, 2,5-dimethylphenol, 2,5-dimethylpyrazine, 2,6-dimethylpyrazine, 2-acetyl-1-methylpyrrole, 2-acetyl-5-methylfuran, 2-acetylpyridine, 2-acetylpyrrole, 2-ethoxy-3-methylpyrazine, 2-ethyl-1-hexanol, 2-ethyl-4-hydroxy-5-methyl-3(2H)-furanone, 2-ethylfuran, 2-ethylpyrazine, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylbutyl isovalerate, 2-methylbutyraldehyde, 2-methylbutyric acid, 2-methylpyrazine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 3-ethylpyridine, 3-hexanone, 3-methylbutyric acid, 3-octanol, 3-octanone, 4-carvomenthenol, 4-ethyl guaiacol, 4-ethyl phenol, 4-ethylguaiacol, 4-hydroxy-5-methyl-3-furanone, 4-methyl-2-phenyl-2-pentenal, 4'-methylacetophenone, 4-vinylphenol, 5-methyl-2-phenyl-2-hexenal, 5-methylfurfural, acetoin acetate, amyl acetate, amyl alcohol, benzaldehyde, benzyl acetate, benzyl alcohol, benzyl isovalerate, beta-damascenone, beta-ionone, butyl acetate, butyl alcohol, butyric acid, coffee furanone, damascenone, decanal, delta-decalactone, delta-octalactone, diethyl disulfide, diethyl succinate, difurfuryl ether, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, eugenol, furaneol, furfural, furfuryl alcohol, furfuryl propionate, gamma decalactone, gamma-decalactone, gamma-nonalactone, gamma-valerolactone, geraniol, geranyl acetate, guaiacol, hexanal, hexanol, hexyl acetate, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, myrcene, nonanal, octanal, p-anisaldehyde, p-cresol, phenethyl acetate, phenylacetaldehyde, propanol, propionaldehyde, propionic acid, propyl propionate, pyrrole, sotolone, syringol, trans,trans-2,4-decadienal, trans-2-nonenal, valeraldehyde, valeric acid, vanillin erythro and/or threo-butan-2,3-diol acetal, and vanillyl ethyl ether.

Embodiment 116 is the coffee replica of any one of embodiments 1-114, wherein the VOCs comprise at least 20 compounds selected from the group consisting of 1-heptanol, 1-octanol, 1-octen-3-ol, 2,3-butanediol, 2,3-butanedione, 2,3-diethyl-5-methylpyrazine, 2,3-diethylpyrazine, 2,3-Hexanedione, 2,3-pentadione, 2,5-dimethylphenol, 2,5-dimethylpyrazine, 2,6-dimethylpyrazine, 2-acetyl-1-methylpyrrole, 2-acetyl-5-methylfuran, 2-acetylpyridine, 2-acetylpyrrole, 2-ethoxy-3-methylpyrazine, 2-ethyl-1-hexanol, 2-ethyl-4-hydroxy-5-methyl-3(2H)-furanone, 2-ethylfuran, 2-ethylpyrazine, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylbutyl isovalerate, 2-methylbutyraldehyde, 2-methylbutyric acid, 2-methylpyrazine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 3-ethylpyridine, 3-hexanone, 3-methylbutyric acid, 3-octanol, 3-octanone, 4-carvomenthenol, 4-ethyl guaiacol, 4-ethyl phenol, 4-ethylguaiacol, 4-hydroxy-5-methyl-3-furanone, 4-methyl-2-phenyl-2-pentenal, 4'-methylacetophenone, 4-vinylphenol, 5-methyl-2-phenyl-2-hexenal, 5-methylfurfural, acetoin acetate, amyl acetate, amyl alcohol, benzaldehyde, benzyl acetate, benzyl alcohol, benzyl isovalerate, beta-damascenone, beta-ionone, butyl acetate, butyl alcohol, butyric acid, coffee furanone, damascenone, decanal, delta-decalactone, delta-octalactone, diethyl disulfide, diethyl succinate, difurfuryl ether, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, eugenol, furaneol, furfural, furfuryl alcohol, furfuryl propionate, gamma decalactone, gamma-decalactone, gamma-nonalactone, gamma-valerolactone, geraniol, geranyl acetate, guaiacol, hexanal, hexanol, hexyl acetate, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, myrcene, nonanal, octanal, p-anisaldehyde, p-cresol, phenethyl acetate, phenylacetaldehyde, propanol, propionaldehyde, propionic acid, propyl propionate, pyrrole, sotolone, syringol, trans,trans-2,4-decadienal, trans-2-nonenal, valeraldehyde, valeric acid, vanillin erythro and/or threo-butan-2,3-diol acetal, and vanillyl ethyl ether.

Embodiment 117 is the coffee replica of any one of embodiments 1-114, wherein the VOCs comprise at least 30 compounds selected from the group consisting of 1-heptanol, 1-octanol, 1-octen-3-ol, 2,3-butanediol, 2,3-butanedione, 2,3-diethyl-5-methylpyrazine, 2,3-diethylpyrazine, 2,3-Hexanedione, 2,3-pentadione, 2,5-dimethylphenol, 2,5-dimethylpyrazine, 2,6-dimethylpyrazine, 2-acetyl-1-methylpyrrole, 2-acetyl-5-methylfuran, 2-acetylpyridine, 2-acetylpyrrole, 2-ethoxy-3-methylpyrazine, 2-ethyl-1-hexanol, 2-ethyl-4-hydroxy-5-methyl-3(2H)-furanone, 2-ethylfuran, 2-ethylpyrazine, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylbutyl isovalerate, 2-methylbutyraldehyde, 2-methylbutyric acid, 2-methylpyrazine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 3-ethylpyridine, 3-hexanone, 3-methylbutyric acid, 3-octanol, 3-octanone, 4-carvomenthenol, 4-ethyl guaiacol, 4-ethyl phenol, 4-ethylguaiacol, 4-hydroxy-5-methyl-3-furanone, 4-methyl-2-phenyl-2-pentenal, 4'-methylacetophenone, 4-vinylphenol, 5-methyl-2-phenyl-2-hexenal, 5-methylfurfural, acetoin acetate, amyl acetate, amyl alcohol, benzaldehyde, benzyl acetate, benzyl alcohol, benzyl isovalerate, beta-damascenone, beta-ionone, butyl acetate, butyl alcohol, butyric acid, coffee furanone, damascenone, decanal, delta-decalactone, delta-octalactone, diethyl disulfide, diethyl succinate, difurfuryl ether, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, eugenol, furaneol, furfural, furfuryl alcohol, furfuryl propionate, gamma decalactone, gamma-decalactone, gamma-nonalactone, gamma-valerolactone, geraniol, geranyl acetate, guaiacol, hexanal, hexanol, hexyl acetate, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, myrcene, nonanal, octanal, p-anisaldehyde, p-cresol, phenethyl acetate, phenylacetaldehyde, propanol, propionaldehyde, propionic acid, propyl propionate, pyrrole, sotolone, syringol, trans,trans-2,4-decadienal, trans-2-nonenal, valeraldehyde, valeric acid, vanillin erythro and/or threo-butan-2,3-diol acetal, and vanillyl ethyl ether.

Embodiment 118 is the coffee replica of any one of embodiments 1-114, wherein the VOCs comprise at least 40 compounds selected from the group consisting of 1-heptanol, 1-octanol, 1-octen-3-ol, 2,3-butanediol, 2,3-butanedione, 2,3-diethyl-5-methylpyrazine, 2,3-diethylpyrazine, 2,3-Hexanedione, 2,3-pentadione, 2,5-dimethylphenol, 2,5-dimethylpyrazine, 2,6-dimethylpyrazine, 2-acetyl-1-methylpyrrole, 2-acetyl-5-methylfuran, 2-acetylpyridine, 2-acetylpyrrole, 2-ethoxy-3-methylpyrazine, 2-ethyl-1-hexanol, 2-ethyl-4-hydroxy-5-methyl-3(2H)-furanone, 2-ethylfuran, 2-ethylpyrazine, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylbutyl isovalerate, 2-methylbutyraldehyde, 2-methylbutyric acid, 2-methylpyrazine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 3-ethylpyridine, 3-hexanone, 3-methylbutyric acid, 3-octanol, 3-octanone, 4-carvomenthenol, 4-ethyl guaiacol, 4-ethyl phenol, 4-ethylguaiacol, 4-hydroxy-5-methyl-3-furanone, 4-methyl-2-phenyl-2-pentenal, 4'-methylacetophenone, 4-vinylphenol, 5-methyl-2-phenyl-2-hexenal, 5-methylfurfural, acetoin acetate, amyl acetate, amyl alcohol, benzaldehyde, benzyl acetate, benzyl alcohol, benzyl isovalerate, beta-damascenone, beta-ionone, butyl acetate, butyl alcohol, butyric acid, coffee furanone, damascenone, decanal, delta-decalactone, delta-octalactone, diethyl disulfide, diethyl succinate, difurfuryl ether, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, eugenol, furaneol, furfural, furfuryl alcohol, furfuryl propionate, gamma decalactone, gamma-decalactone, gamma-nonalactone, gamma-valerolactone, geraniol, geranyl acetate, guaiacol, hexanal, hexanol, hexyl acetate, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, myrcene, nonanal, octanal, p-anisaldehyde, p-cresol, phenethyl acetate, phenylacetaldehyde, propanol, propionaldehyde, propionic acid, propyl propionate, pyrrole, sotolone, syringol, trans,trans-2,4-decadienal, trans-2-nonenal, valeraldehyde, valeric acid, vanillin erythro and/or threo-butan-2,3-diol acetal, and vanillyl ethyl ether.

Embodiment 119 is the coffee replica of any one of embodiments 1-118, wherein the VOCs comprise at least 20 compounds selected from the group consisting of 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, coffee furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether.

Embodiment 120 is the coffee replica of any one of embodiments 1-118, wherein the VOCs comprise at least 30 compounds selected from the group consisting of 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, coffee furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether.

Embodiment 121 is the coffee replica of any one of embodiments 1-118, wherein the VOCs comprise at least 40 compounds selected from the group consisting of 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, coffee furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether.

Embodiment 122 is the coffee replica of any one of embodiments 1-118, wherein the VOCs comprise at least 40 compounds selected from the group consisting of 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, coffee furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether.

Embodiment 123 is the coffee replica of any one of embodiments 1-118, wherein the VOCs comprise 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, coffee furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether.

Embodiment 124 is the coffee replica of any one of embodiments 1-123, wherein the VOCs have less than about 95% identity to the VOCs in a single reference coffee.

Embodiment 125 is the coffee replica of any one of embodiments 1-123, wherein the VOCs have less than about 85% identity to the VOCs in a single reference coffee.

Embodiment 126 is the coffee replica of any one of embodiments 1-125, wherein the coffee replica comprises at least 41 VOCs and wherein no more than 40 of the VOCs are found in a single reference coffee.

Embodiment 127 is the coffee replica of any one of embodiments 1-125, wherein the coffee replica comprises at least 51 VOCs and wherein no more than 50 of the VOCs are found in a single reference coffee.

Embodiment 128 is the coffee replica of any one of embodiments 1-127, wherein the one or more non-volatile compounds do not comprise at least one compound selected from the group consisting of 2(5H)-furanone, 2,3,5,6-tetramethylpyrazine, 2,3,5-trimethylpyrazine, 2,3-dimethylpyrazine, 2-ethyl-2-hydroxybutyric acid, 2-furoic acid, 2-isopropylmalic acid, 3,4-dihydroxybenzoic acid, 4-methoxycinnamic acid, 5-ethyl-4-hydroxy-2-methyl-3(2H)-furanone, adenine, arabitol, betaine, caffeic acid, caffeine, choline, citric acid, cytidine, D-gluconic acid, D-glucuronic acid, fructose, galactose, glucose, glutamic acid, hydroxymethylfurfural, lactic acid, malic acid, mannitol, methyl-2-pyrrolyl ketone, inositol, pyruvic acid, quinic acid, sorbitol, sotolon, succinic acid, syringic acid, tartaric acid, tryptamine, uracil, and vanillic acid.

Embodiment 129 is the coffee replica of any one of embodiments 1-128, wherein the one or more non-volatile compounds do not comprise at least one compound selected from the group consisting of 2(5H)-furanone, 2,3,5,6-tetramethylpyrazine, 2-ethyl-2-hydroxybutyric acid, 2-furoic acid, 2-isopropylmalic acid, 3,4-dihydroxybenzoic acid, 4-methoxycinnamic acid, 5-ethyl-4-hydroxy-2-methyl-3 (2H)-furanone, adenine, arabitol, betaine, caffeic acid, cytidine, D-gluconic acid, D-glucuronic acid, fructose, galactose, glucose, glutamic acid, hydroxymethylfurfural, malic acid, mannitol, methyl-2-pyrrolyl ketone, inositol, pyruvic acid, quinic acid, sorbitol, syringic acid, tartaric acid, tryptamine, and uracil.

Embodiment 130 is the coffee replica of any one of embodiments 1-129, wherein the one or more non-volatile compounds comprise at least one compound selected from the group consisting of acetovanillone, adipic acid, AMP, arginine, carnosine, cinnamic acid, citrulline, CMP, coumaric acid, cysteine, cystine, epicatechin, epicatechin gallate, GABA, glucosamine, glutamine, guanine, hesperetin, histidine, isoleucine, kynurenic acid, leucine, lysine, mannose, methionine, methyl gallate, ornithine, pantothenic acid, pipecolinic acid, piperine, polydatin, pyridoxine, quercetin, resveratrol, rutin, sinapinic acid, sorbic acid, syringaldehyde, threonine, trans-4-hydroxyproline, tryptophan, tyramine, and tyrosine.

Embodiment 131 is the coffee replica of any one of embodiments 1-130, wherein 2,3,5-trimethylpyrazine is present in an amount less than about 0.006 mg/L.

Embodiment 132 is the coffee replica of any one of embodiments 1-131, wherein 2,3-dimethylpryazine is present in an amount less than about 0.12 mg/L.

Embodiment 133 is the coffee replica of any one of embodiments 1-132, wherein sotolon is present in an amount of less than about 31 mg/L.

Embodiment 134 is the coffee replica of any one of embodiments 1-133, wherein vanillin is present in an amount of at least about 0.23 mg/L.

Embodiment 135. The coffee replica of any one of embodiments 1-134, wherein the one or more non-volatile compounds comprise one or more of: an acid, an aldehyde, an alkaloid, an amine, an amino acid, a furan, a ketone, a lactone, a nucleotide, a nucleotide monophosphate, or nucleobase, a protein or peptide, a pyrazine, a pyridine, a sugar or sugar alcohol, a tannin, phenol, polyphenol, or anthocyanin, or a xanthine.

Embodiment 136 is the coffee replica of any one of embodiments 1-135, wherein the one or more non-volatile compounds comprise one or more of: an acid, an aldehyde, an amino acid, a lactone, a pyrazine, a tannin, phenol, polyphenol, or anthocyanin, or a xanthine.

Embodiment 137 is the coffee replica of any one of embodiments 1-136, wherein the one or more non-volatile compounds comprise one or more acids.

Embodiment 138 is the coffee replica of embodiment 137, wherein the one or more acids comprise at least one acid selected from the group consisting of 2-furoic acid, 2-isopropylmalic acid, 3,4-dihydroxybenzoic acid, 4-guanidinobutyric acid, 4-methoxycinnamic acid, adipic acid, caffeic acid, cinnamic acid, citric acid, coumaric acid, D-gluconic acid, D-glucuronic acid, DL-hydroxystearic acid, fumaric acid, glutamic acid, kynurenic acid, lactic acid, malic acid, pantothenic acid, pyruvic acid, quinic acid, sorbic acid, succinic acid, and tartaric acid.

Embodiment 139 is the coffee replica of embodiment 138, wherein the one or more acids comprise at least one acid selected from the group consisting of citric acid, lactic acid, and succinic acid.

Embodiment 140 is the coffee replica of any one of embodiments 1-139, wherein the one or more non-volatile compounds comprise one or more aldehydes.

Embodiment 141 is the coffee replica of embodiment 140, wherein the one or more aldehydes comprise vanillin.

Embodiment 142 is the coffee replica of any one of embodiments 140-141, wherein the aldehydes are present in an amount of at least about 0.25 mg/L.

Embodiment 143 is the coffee replica of any one of embodiments 1-142, wherein the one or more non-volatile compounds comprise one or more alkaloids.

Embodiment 144 is the coffee replica of embodiment 143, wherein the one or more alkaloids comprise piperine.

Embodiment 145 is the coffee replica of any one of embodiments 1-144, wherein the one or more non-volatile compounds comprise one or more amines.

Embodiment 146 is the coffee replica of embodiment 145, wherein the one or more amines comprise tryptamine.

Embodiment 147 is the coffee replica of any one of embodiments 1-146, wherein the one or more non-volatile compounds comprise one or more amino acids.

Embodiment 148 is the coffee replica of embodiment 147, wherein the one or more amino acids comprise at least one amino acid selected from the group consisting of arginine, asparagine, aspartic acid, beta-alanine, betaine, carnitine, choline, citrulline, cysteine, cystine, GABA, glutamine, glycine, histidine, homoserine, isoleucine, leucine, lysine, methionine, ornithine, phenylalanine, pipecolinic acid, proline, serine, threonine, trans-4-hydroxyproline, tryptophan, tyrosine, and valine.

Embodiment 149 is the coffee replica of embodiment 148, wherein the one or more amino acids comprise at least one amino acid selected from the group consisting of aspartic acid and choline.

Embodiment 150 is the coffee replica of any one of embodiments 1-149, wherein the one or more non-volatile compounds comprise one or more furans.

Embodiment 151 is the coffee replica of embodiment 150, wherein the one or more furans comprise hydroxymethylfurfural.

Embodiment 152 is the coffee replica of any one of embodiments 1-151, wherein the one or more non-volatile compounds comprise one or more ketones.

Embodiment 153 is the coffee replica of embodiment 152, wherein the one or more ketones comprise at least one ketone selected from the group consisting of 2(5H)-furanone, 5-ethyl-4-hydroxy-2-methyl-3(2H)-furanone, acetovanillone, and methyl-2-pyrrolyl ketone.

Embodiment 154 is the coffee replica of any one of embodiments 1-153, wherein the one or more non-volatile compounds comprise one or more lactones.

Embodiment 155 is the coffee replica of embodiment 154, wherein the one or more lactones comprise sotolon.

Embodiment 156 is the coffee replica of any one of embodiments 1-155, wherein the one or more non-volatile compounds comprise one or more nucleotides, nucleotide monophosphates, or nucleobases.

Embodiment 157 is the coffee replica of embodiment 156, wherein the one or more nucleotides, nucleotide monophosphates, or nucleobases comprise at least one nucleotides, nucleotide monophosphates, or nucleobase selected from the group consisting of adenine, AMP, CMP, cytidine, cytosine, guanine, and uracil.

Embodiment 158 is the coffee replica of any one of embodiments 1-157, wherein the one or more non-volatile compounds comprise one or more proteins or peptides.

Embodiment 159 is the coffee replica of embodiment 158, wherein the one or more proteins or peptides comprise carnosine.

Embodiment 160 is the coffee replica of any one of embodiments 1-159, wherein the one or more non-volatile compounds comprise one or more pyrazines.

Embodiment 161 is the coffee replica of embodiment 160, wherein the one or more pyrazines comprise at least one pyrazine selected from the group consisting of 2,3,5,6-tetramethylpyrazine, 2,3,5-trimethylpyrazine, and 2,3-dimethylpyrazine.

Embodiment 162 is the coffee replica of embodiment 160, wherein the one or more pyrazines comprise at least one pyrazine selected from the group consisting of 2,3,5-trimethylpyrazine and 2,3-dimethylpyrazine.

Embodiment 163 is the coffee replica of any one of embodiments 1-162, wherein the one or more non-volatile compounds comprise one or more pyridines.

Embodiment 164 is the coffee replica of embodiment 163, wherein the one or more pyridines comprise at least one pyridine selected from the group consisting of pyridine and pyroxidine.

Embodiment 165 is the coffee replica of any one of embodiments 1-164, wherein the one or more non-volatile compounds comprise one or more sugars or sugar alcohols.

Embodiment 166 is the coffee replica of embodiment 165, wherein the one or more sugars or sugar alcohols comprise at least one sugar or sugar alcohol selected from the group consisting of arabitol, fructose, galactose, glucosamine, glucose, mannitol, mannose, inositol, rhamnose, ribose, sorbitol, xylose.

Embodiment 167 is the coffee replica of any one of embodiments 1-166, wherein the one or more non-volatile compounds comprise one or more tannins, phenols, polyphenols, or anthocyanins.

Embodiment 168 is the coffee replica of embodiment 167, wherein the one or more tannins, phenols, polyphenols, or anthocyanins comprise at least one tannin, phenol, polyphenol, or anthocyanin selected from the group consisting of catechin, ellagic acid, epicatechin, epicatechin gallate, gallic acid, hesperetin, methyl gallate, polydatin, propyl gallate, quercetin, resveratrol, rutin, salicylic acid, sinapinic acid, syringaldehyde, syringic acid, trans-ferulic acid, tyramine, and vanillic acid.

Embodiment 169 is the coffee replica of embodiment 167, wherein the one or more tannins, phenols, polyphenols, or anthocyanins comprise at least one tannin, phenol, polyphenol, or anthocyanin selected from the group consisting of trans-ferulic acid and vanillic acid.

Embodiment 170 is the coffee replica of any one of embodiments 1-169, wherein the one or more non-volatile compounds comprise one or more xanthines.

Embodiment 171 is the coffee replica of embodiment 170, wherein the one or more xanthines comprise caffeine.

Embodiment 172 is the coffee replica of any one of embodiments 1-171, wherein the one or more nonvolatile compounds comprise at least 10 compounds selected from the group consisting of 2(5H)-furanone, 2,3,5,6-tetramethylpyrazine, 2,3,5-trimethylpyrazine, 2,3-dimethylpyrazine, 2-ethyl-2-hydroxybutyric acid, 2-furoic acid, 2-isopropylmalic acid, 3,4-dihydroxybenzoic acid, 4-guanidinobutyric acid, 4-methoxycinnamic acid, 5-ethyl-4-hydroxy-2-methyl-3(2H)-furanone, acetovanillone, adenine, adipic acid, AMP, arabitol, arginine, asparagine, aspartic acid, beta-alanine, betaine, caffeic acid, caffeine, carnitine, carnosine, catechin, choline, cinnamic acid, citric acid, citrulline, CMP, coumaric acid, cysteine, cystine, cytidine, cytosine, D-gluconic acid, D-glucuronic acid, DL-hydroxystearic acid, ellagic acid, epicatechin, epicatechin gallate, fructose, fumaric acid, GABA, galactose, gallic acid, glucosamine, glucose, glutamic acid, glutamine, glycine, guanine, hesperetin, histidine, homoserine, hydroxymethylfurfural, isoleucine, kynurenic acid, lactic acid, leucine, lysine, malic acid, mannitol, mannose, methionine, methyl gallate, methyl-2-pyrrolyl ketone, inositol, ornithine, pantothenic acid, phenylalanine, pipecolinic acid, piperine, polydatin, proline, propyl gallate, pyridine, pyridoxine, pyruvic acid, quercetin, quinic acid, resveratrol, rhamnose, ribose, rutin, salicylic acid, serine, sinapinic acid, sorbic acid, sorbitol, sotolon, succinic acid, syringaldehyde, syringic acid, tartaric acid, threonine, trans-4-hydroxyproline, trans-ferulic acid, tryptamine, tryptophan, tyramine, tyrosine, uracil, valine, vanillic acid, vanillin, and xylose.

Embodiment 173 is the coffee replica of any one of embodiments 1-172, wherein the one or more non-volatile compounds comprise at least 5 compounds selected from the group consisting of 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin.

Embodiment 174 is the coffee replica of any one of embodiments 1-173, wherein the one or more non-volatile compounds comprise at least 10 compounds selected from the group consisting of 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin.

Embodiment 175 is the coffee replica of any one of embodiments 1-172, wherein the one or more non-volatile compounds comprise 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin.

Embodiment 176 is the coffee replica of any one of embodiments 1-175, wherein the one or more non-volatile compounds have less than about 95% identity to the non-volatile compounds in a single reference coffee.

Embodiment 177 is the coffee replica of any one of embodiments 1-176, wherein the one or more non-volatile compounds have less than about 85% identity to the non-volatile compounds in a single reference coffee.

Embodiment 178 is the coffee replica of any one of embodiments 1-177, wherein the coffee replica comprises at least 11 non-volatile compounds and wherein no more than 10 of the non-volatile compounds are found in a single reference coffee.

Embodiment 179 is the coffee replica of any one of embodiments 1-178, wherein the coffee replica does not comprise one or more of *E. coli*, *Salmonella* sp., *Brettanomyces* sp., *Lactobacillales*, *Saccharomyces* sp., *Acremonium strictum*, *Chrysonilia sitophila*, *Cladosporium oxysporum*, *Fusarium oxysporum*, *Mortierella alpina*, *Mucor plumbeus*, *Paecilomyces viridis*, *Penicillium chrysogenum*, *Penicillium citreonigrum*, *Penicillium decumbens*, *Penicillium purpurogenum*, *Trichoderma longibrachiatum*, *Trichoderma viride*, *Verticillium psalliotae*, mold, mildew, rot, insects, insect eggs, insect filth, rodent filth, mammalian excreta, insect lecithins, hydrogen sulfide, hydrogen disulfide, 2,4,6-trichloranisole, 2,4,6,-tribromoanisole, aflatoxin, aldrin, dieldrin, benzene hexachloride, chlordane, dichlorodiphenyltrichloroethane (DDT), dichlorodiphenyldichloroethylene (DDE), dichlorodiphenyldichloroethane (TDE), dimethylnitrosamine (nitrosodimethylamine), ethylene dibromide (EDB), heptachlor, heptachlor epoxide, lindane, mercury, methanol, ethylene glycol, dichloromethane, and heavy metals.

Embodiment 180 is the coffee replica of any one of embodiments 1-179, wherein the coffee replica is a solution, suspension, or emulsion.

Embodiment 181 is the coffee replica of embodiment 180, wherein the solution, suspension, or emulsion is a ready-to-drink beverage.

Embodiment 182 is the coffee replica of embodiment 180, wherein the solution, suspension, or emulsion is a coffee concentrate.

Embodiment 183 is the coffee replica of embodiment 182, wherein the coffee concentrate is about 2-fold to about 2000-fold concentrated.

Embodiment 184 is the coffee replica of embodiment 182, wherein the coffee concentrate is about 5-fold to about 20-fold concentrated.

Embodiment 185 is the coffee replica of any one of embodiments 1-179, wherein the coffee replica is a solid.

Embodiment 186 is the coffee replica of embodiment 185, wherein the coffee replica is a coffee granule replica.

Embodiment 187 is the coffee replica of embodiment 186, wherein the coffee granule replica is soluble in water.

Embodiment 188 is the coffee replica of embodiment 185, wherein the coffee replica is a coffee grounds replica.

Embodiment 189 is the coffee replica of embodiment 188, wherein the coffee grounds replica comprises a solid substrate.

Embodiment 190 is the coffee replica of embodiment 189, wherein the solid substrate comprises processed or unprocessed grains or grain products, legumes or legume seeds, oil plants or seeds, fruits or fruit products, roots, tubers, or root or tuber products, sugar processing by-products, or other plant by-products.

Embodiment 191 is the coffee replica of any one of embodiments 189-190, wherein the solid substrate comprises grape seeds.

Embodiment 192 is a coffee replica comprising one or more VOCs and one or more non-volatile compounds, wherein (a) the VOCs comprise at least 50 compounds selected from the group consisting of 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, coffee furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether, and (b) the non-volatile compounds comprise at least 10 compounds selected from the group consisting of 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin.

Embodiment 193 is the coffee replica of embodiment 192, wherein the VOCs comprise at least 60 compounds selected from the group consisting of 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, coffee furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether.

Embodiment 194 is the coffee replica of embodiment 192, wherein the VOCs comprise 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, coffee furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether.

Embodiment 195 is the coffee replica of any one of embodiments 192-194, wherein the non-volatile compounds comprise 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin.

Embodiment 196 is the coffee replica of any one of embodiments 192-195, wherein the coffee replica is a coffee beverage replica.

Embodiment 197 is the coffee replica of embodiments 196, wherein the coffee replica comprises the following components in the indicated amounts:

| | Range (mg/L) |
| --- | --- |
| 2,3,5-trimethylpyrazine | 1.75E−06-3.25E−06 |
| 2,3-butanedione | 2.80E−04-5.20E−04 |
| 2,3-diethyl-5-methyl pyrazine | 1.58E−03-2.93E−03 |
| 2,3-dimethylpyrazine | 5.25E−06-9.75E−06 |
| 2,3-Hexanedione | 7.54E+00-1.40E+01 |
| 2,3-pentadione | 9.05E−01-1.68E+00 |

-continued

| | Range (mg/L) |
|---|---|
| 2,5-dimethylphenol | 5.25E−03-9.75E−03 |
| 2,6-dimethylpyrazine | 1.66E+00-3.08E+00 |
| 2-acetyl-5-methylfuran | 1.51E+00-2.80E+00 |
| 2-ethoxy-3-methylpyrazine | 4.53E−01-8.41E−01 |
| 2-ethyl-4-hydroxy-5-methyl-3(2H)-furanone | 6.03E−01-1.12E+00 |
| 2-ethylpyrazine | 3.68E−02-6.83E−02 |
| 2-isobutyl-3-methoxypyrazine (IBMP) | 5.25E−04-9.75E−04 |
| 2-isobutyl-3-methyl pyrazine | 2.63E−04-4.88E−04 |
| 2-isopropyl-3-methoxypyrazine | 1.58E−04-2.93E−04 |
| 2-methoxy-4-methylphenol | 2.30E−04-4.27E−04 |
| 2-methoxy-4-vinylphenol | 7.33E−04-1.36E−03 |
| 2-methylpyrazine | 6.71E−03-1.25E−02 |
| 2-pentanol | 5.25E−03-9.75E−03 |
| 3-methylbutyric acid | 1.23E−02-2.28E−02 |
| 4,5-dimethyl-3-hydroxy-2,5-dihydro-furan-2-one (sotolon) | 1.51E−01-2.80E−01 |
| 4-ethylguaiacol | 1.05E−03-1.95E−03 |
| 4-hydroxy-5-methyl-3-furanone | 3.02E+00-5.60E+00 |
| 5-methylfurfural | 1.10E−02-2.05E−02 |
| acetoin acetate | 7.54E+01-1.40E+02 |
| amyl alcohol | 3.50E−03-6.50E−03 |
| vanillin erythro and/or threo-butan-2,3-diol | 6.03E+01-1.12E+02 |
| Aspartic_Acid | 1.34E+01-2.49E+01 |
| beta-damascenone | 3.68E−05-6.83E−05 |
| beta-ionone | 1.73E+00-3.21E+00 |
| butyric acid | 2.80E−03-5.20E−03 |
| Caffeine | 1.20E+02-2.23E+02 |
| Choline | 1.74E+01-3.23E+01 |
| Citric_Acid | 4.47E+02-8.30E+02 |
| coffee furanone | 7.24E+01-1.34E+02 |
| delta-decalactone | 1.20E+00-2.23E+00 |
| delta-octalactone | 4.81E+00-8.93E+01 |
| diethyl succinate | 1.51E+02-2.80E+02 |
| difurfuryl ether | 1.75E−04-3.25E−04 |
| dimethyl trisulfide | 3.50E−08-6.50E−08 |
| ethyl 2-methylbutyrate | 2.76E+00-5.13E+00 |
| ethyl benzoate | 1.75E−03-3.25E−03 |
| ethyl butyrate | 4.61E−01-8.56E−01 |
| ethyl decanoate | 3.15E−02-5.85E−02 |
| ethyl isovalerate | 2.10E−03-3.90E−03 |
| ethyl laurate | 3.50E−03-6.50E−03 |
| ethyl maltol | 3.02E+01-5.60E+01 |
| eugenol | 1.10E−02-2.05E−02 |
| furaneol | 6.03E+00-1.12E+01 |
| furfural | 3.50E−03-6.50E−03 |
| furfuryl alcohol | 3.50E−09-6.50E−09 |
| gamma decalactone | 1.44E+00-2.68E+00 |
| gamma-nonalactone | 4.81E+00-8.93E+00 |
| geranyl acetate | 5.25E−02-9.75E−02 |
| guaiacol | 7.00E−04-1.30E−03 |
| isoamyl alcohol | 1.40E−02-2.60E−02 |
| isobutyraldehyde | 3.15E−05-5.85E−05 |
| isoeugenol | 1.10E−02-2.05E−02 |
| isopropenyl pyrazine | 3.02E+00-5.61E+00 |
| Isovaleraldehyde | 2.10E−04-3.90E−04 |
| isovaleric acid | 3.69E+00-6.85E+00 |
| Lactic_Acid | 2.91E+01-5.40E+01 |
| maltol | 5.66E+01-1.05E+02 |
| massoia lactone | 2.41E+01-4.47E+01 |
| methanethiol | 7.00E−07-1.30E−06 |
| methyl anthranilate | 2.22E−02-4.11E−02 |
| p-anisaldehyde | 1.10E−02-2.05E−02 |
| pyrrole | 1.75E−04-3.25E−04 |
| sotolone | 3.15E−06-5.85E−06 |
| Succinic_Acid | 7.34E+00-1.36E+01 |
| syringol (2,6-dimethoxyphenol) | 2.85E+00-5.30E+00 |
| Trans-Ferulic_Acid | 1.08E+01-2.00E+01 |
| valeraldehyde | 3.46E+00-6.42E+00 |
| Vanillic_Acid | 1.52E+01-2.82E+01 |
| vanillin | 2.14E+01-3.97E+01 |
| vanillyl ethyl ether | 1.43E+01-2.65E+01 |
| grapeseed | 2.50E+04-7.50E+04 |
| Water | 1 L |

Embodiment 198 is the coffee replica of any one of embodiments 192-195, wherein the coffee replica is a coffee granule replica.

Embodiment 199 is the coffee replica of embodiment 198, wherein the coffee replica comprises the following components in the indicated amounts:

| | Range (Percent by weight) |
|---|---|
| 2,3,5-trimethylpyrazine | 1.44E−07 ± 4.31E−08 |
| 2,3-butanedione | 2.30E−05 ± 6.89E−06 |
| 2,3-diethyl-5-methyl pyrazine | 1.29E−04 ± 3.88E−05 |
| 2,3-dimethylpyrazine | 4.31E−07 ± 1.29E−07 |
| 2,3-Hexanedione | 6.19E−01 ± 1.86E−01 |
| 2,3-pentadione | 7.43E−02 ± 2.23E−02 |
| 2,5-dimethylphenol | 4.31E−04 ± 1.29E−04 |
| 2,6-dimethylpyrazine | 1.36E−01 ± 4.09E−02 |
| 2-acetyl-5-methylfuran | 1.24E−01 ± 3.72E−02 |
| 2-ethoxy-3-methylpyrazine | 3.72E−02 ± 1.12E−02 |
| 2-ethyl-4-hydroxy-5-methyl-3(2H)-furanone | 4.95E−02 ± 1.49E−02 |
| 2-ethylpyrazine | 3.02E−03 ± 9.05E−04 |
| 2-isobutyl-3-methoxypyrazine (IBMP) | 4.31E−05 ± 1.29E−05 |
| 2-isobutyl-3-methyl pyrazine | 2.15E−05 ± 6.46E−06 |
| 2-isopropyl-3-methoxypyrazine | 1.29E−05 ± 3.88E−06 |
| 2-methoxy-4-methylphenol | 1.89E−05 ± 5.66E−06 |
| 2-methoxy-4-vinylphenol | 6.02E−05 ± 1.81E−05 |
| 2-methylpyrazine | 5.51E−04 ± 1.65E−04 |
| 2-pentanol | 4.31E−04 ± 1.29E−04 |
| 3-methylbutyric acid | 1.01E−03 ± 3.02E−04 |
| 4,5-dimethyl-3-hydroxy-2,5-dihydro-furan-2-one (sotolon) | 1.24E−02 ± 3.71E−03 |
| 4-ethylguaiacol | 8.62E−05 ± 2.59E−05 |
| 4-hydroxy-5-methyl-3-furanone | 2.48E−01 ± 7.43E−02 |
| 5-methylfurfural | 9.05E−04 ± 2.71E−04 |
| acetoin acetate | 6.19E+00 ± 1.86E+00 |
| amyl alcohol | 2.87E−04 ± 8.62E−05 |
| vanillin erythro and/or threo-butan-2,3-diol | 4.95E+00 ± 1.49E+00 |
| aspartic acid | 1.10E+00 ± 3.30E−01 |
| beta-damascenone | 3.02E−06 ± 9.05E−07 |
| beta-ionone | 1.42E−01 ± 4.25E−02 |
| butyric acid | 2.30E−04 ± 6.89E−05 |
| caffeine | 9.87E+00 ± 2.96E+00 |
| choline | 1.43E+00 ± 4.29E−01 |
| citric acid | 3.67E+01 ± 1.10E+01 |
| coffee furanone | 5.94E+00 ± 1.78E+00 |
| delta-decalactone | 9.87E−02 ± 2.96E−02 |
| delta-octalactone | 3.95E−01 ± 1.18E−01 |
| diethyl succinate | 1.24E+01 ± 3.72E+00 |
| difurfuryl ether | 1.44E−05 ± 4.31E−06 |
| dimethyl trisulfide | 2.87E−09 ± 8.62E−10 |
| ethyl 2-methylbutyrate | 2.27E−01 ± 6.81E−02 |
| ethyl benzoate | 1.44E−04 ± 4.31E−05 |
| ethyl butyrate | 3.78E−02 ± 1.13E−02 |
| ethyl decanoate | 2.59E−03 ± 7.76E−04 |
| ethyl isovalerate | 1.72E−04 ± 5.17E−05 |
| ethyl laurate | 2.87E−04 ± 8.62E−05 |
| ethyl maltol | 2.48E+00 ± 7.43E−01 |
| eugenol | 9.05E−04 ± 2.71E−04 |
| furaneol | 4.95E−01 ± 1.49E−01 |
| furfural | 2.87E−04 ± 8.62E−05 |
| furfuryl alcohol | 2.87E−10 ± 8.62E−11 |
| gamma decalactone | 1.18E−01 ± 3.55E−02 |
| gamma-nonalactone | 3.95E−01 ± 1.18E−01 |
| geranyl acetate | 4.31E−03 ± 1.29E−03 |
| guaiacol | 5.75E−05 ± 1.72E−05 |
| isoamyl alcohol | 1.15E−03 ± 3.45E−04 |
| isobutyraldehyde | 2.59E−06 ± 7.76E−07 |
| isoeugenol | 9.05E−04 ± 2.71E−04 |
| isopropenyl pyrazine | 2.48E−01 ± 7.43E−02 |
| Isovaleraldehyde | 1.72E−05 ± 5.17E−06 |
| isovaleric acid | 3.03E−01 ± 9.08E−02 |
| Lactic_Acid | 2.39E+00 ± 7.16E−01 |
| maltol | 4.64E+00 ± 1.39E+00 |
| massoia lactone | 1.97E+00 ± 5.92E−01 |
| methanethiol | 5.75E−08 ± 1.72E−08 |
| methyl anthranilate | 1.82E−03 ± 5.45E−04 |
| p-anisaldehyde | 9.05E−04 ± 2.71E−04 |
| pyrrole | 1.44E−05 ± 4.31E−06 |
| sotolone | 2.59E−07 ± 7.76E−08 |
| Succinic_Acid | 6.02E−01 ± 1.81E−01 |
| syringol (2,6-dimethoxyphenol) | 2.34E−01 ± 7.03E−02 |
| Trans-Ferulic_Acid | 8.84E−01 ± 2.65E−01 |
| valeraldehyde | 2.84E−01 ± 8.51E−02 |

-continued

| | Range (Percent by weight) |
|---|---|
| Vanillic_Acid | 1.25E+00 ± 3.74E−01 |
| vanillin | 1.76E+00 ± 5.27E−01 |
| vanillyl ethyl ether | 1.17E+00 ± 3.51E−01 |

Embodiment 200 is the coffee replica of any one of embodiments 192-195, wherein the coffee replica is a coffee grounds replica or a coffee bean replica and comprises a solid substrate.

Embodiment 201 is the coffee replica of embodiment 200, wherein the solid substrate comprises grape seeds.

Embodiment 202 is a method of preparing a coffee replica comprising two or more VOCs and two or more non-volatile compounds, the method comprising:

forming an aqueous solution comprising water, at least one VOC that is water-soluble, and at least one non-volatile compound that is water-soluble;

forming an emulsion comprising an oil, at least one VOC that is fat-soluble, and at least one non-volatile compound that is fat-soluble; and mixing the aqueous solution and the emulsion to form a flavor mixture.

Embodiment 203 is the method of embodiment 202, wherein forming an emulsion comprises homogenizing.

Embodiment 204 is the method of any one of embodiments 202-203, wherein the oil comprises corn oil, sunflower oil, or coconut oil.

Embodiment 205 is the method of any one of embodiments 202-204, wherein the method further comprises processing the flavor mixture to commercial sterility.

Embodiment 206 is the method of embodiment 205, wherein processing the flavor mixture to commercial sterility comprises (a) ultra clean processing, (b) UHT aseptic processing, (c) HTST inline processing with sterile filling, (d) hot fill packaging, or (e) cold fill tunnel pasteurization.

Embodiment 207 is the method of embodiment 205, wherein processing the flavor mixture to commercial sterility comprises (a) ultra clean processing, (b) UHT aseptic processing, (c) fill and retort processing, (d) fill then Ohmic sterilization, or (e) UV/PEF inline sterilization and aseptic filling.

Embodiment 208 is the method of any one of embodiments 202-207, wherein the coffee replica is a coffee concentrate replica or a coffee beverage replica.

Embodiment 209 is the method of any one of embodiments 202-207, wherein the coffee replica is a coffee granule replica.

Embodiment 210 is the method of embodiment 209, wherein the method further comprises agglomerating the flavor mixture.

Embodiment 211 is the method of embodiment 210, wherein agglomerating the flavor mixture comprises pneumatic mixing, steam-jet, fluid-bed, pan, or spray drying, drum, mixer, roller, or extrusion agglomeration.

Embodiment 212 is the method of any one of embodiments 202-207, wherein the coffee replica is a coffee bean replica or a coffee grounds replica and comprises a solid substrate.

Embodiment 213 is the method of embodiment 212, wherein the method further comprises applying the flavor mixture to the solid substrate to form a coated solid substrate.

Embodiment 214 is the method the method of embodiment 213, wherein applying the flavor mixture comprises spray applying the flavor mixture.

Embodiment 215 is the method of any one of embodiments 212-214, wherein the solid substrate comprises processed or unprocessed grains or grain products, legumes or legume seeds, oil plants or seeds, fruits or fruit products, roots, tubers, or root or tuber products, sugar processing by-products, or other plant by-products.

Embodiment 216 is the method of any one of embodiments 212-215, wherein the solid substrate comprises grape seeds.

Embodiment 217 is the method of any one of embodiments 212-216, wherein the coffee replica is a coffee bean replica.

Embodiment 218 is the method of embodiment 217, wherein the method further comprises adding a tableting aid to the coated solid substrate.

Embodiment 219 is the method of embodiment 218, wherein the tableting aid comprises a starch, a sugar, a gum, or a combination thereof.

Embodiment 220 is the method of any one of embodiments 213-219, wherein the method further comprises forming the coated solid substrate into a coffee bean-like shape to form a coffee bean replica.

Embodiment 221 is the method of embodiment 220, wherein forming the coated solid substrate into a coffee bean-like shape comprises using a rotary pill press.

Embodiment 222 is the method of any one of embodiments 217-221, wherein the method further comprises coating the coffee bean replica.

Embodiment 223 is the method of embodiment 222, wherein coating the coffee bean replica comprises coating the coffee bean replica with shellac, zein protein, or wax.

Embodiment 224 is the method of any one of embodiments 202-223, wherein (a) the one or more VOCs comprise at least one VOC that is not present in a corresponding reference coffee, (b) the one or more VOCs do not comprise at least one VOC that is present in a corresponding reference coffee, (c) the one or more VOCs are present in the coffee replica in a total amount of at least 100 mg/L, (d) the one or more non-volatile compounds comprise at least one non-volatile compound that is not present in a corresponding reference coffee, or (e) the one or more non-volatile compounds do not comprise at least one non-volatile compound that is present in a corresponding reference coffee.

Embodiment 225 is the method of any one of embodiments 202-224, wherein the one or more VOCs comprise at least one VOC that is not present in a corresponding reference coffee.

Embodiment 226 is the method of any one of embodiments 202-225, wherein the one or more VOCs do not comprise at least one VOC that is present in a corresponding reference coffee.

Embodiment 227 is the method of any one of embodiments 202-226, wherein the one or more VOCs are present in the coffee replica in a total amount of at least 100 mg/L.

Embodiment 228 is the method of any one of embodiments 202-226, wherein the one or more VOCs are present in the coffee replica in a total amount of at least 200 mg/L.

Embodiment 229 is the method of any one of embodiments 202-226, wherein the one or more VOCs are present in the coffee replica in a total amount of at least 300 mg/L.

Embodiment 230 is the method of any one of embodiments 202-226, wherein the one or more VOCs are present in the coffee replica in a total amount of at least 400 mg/L.

Embodiment 231 is the method of any one of embodiments 202-226, wherein the one or more VOCs are present in the coffee replica in a total amount of at least 500 mg/L.

Embodiment 232 is the method of any one of embodiments 202-226, wherein the one or more VOCs are present in the coffee replica in a total amount of at least 600 mg/L.

Embodiment 233 is the method of any one of embodiments 202-226, wherein the one or more VOCs are present in the coffee replica in a total amount of at least 700 mg/L.

Embodiment 234 is the method of any one of embodiments 202-226, wherein the one or more VOCs are present in the coffee replica in a total amount of at least 800 mg/L.

Embodiment 235 is the method of any one of embodiments 202-226, wherein the one or more non-volatile compounds comprise at least one non-volatile compound that is not present in a corresponding reference coffee.

Embodiment 236 is the method of any one of embodiments 202-235, wherein the one or more non-volatile compounds do not comprise at least one non-volatile compound that is present in a corresponding reference coffee.

Embodiment 237 is the method of any one of embodiments 202-236, wherein the one or more VOCs do not comprise at least one compound selected from the group consisting of alpha-methyl-alpha-[4-methyl-3-pentenyl]oxiranemethanol, beta-myrcene, 1-(2-furanylmethyl)-1H-pyrrole, 1-ethyl-1H-pyrrole, 1-methyl-1H-pyrrole, 1-methyl-1H-pyrrole-2-carboxaldehyde, 1-methyl-1,2,3,6-tetrahydropyridine, 2-amino-1-naphthalenol, 2,3-butanedione, 2-butanone, 2,3-dimethyl-2-cyclopenten-1-one, 2-methyl-2-cyclopenten-1-one, 3-ethyl-2-hydroxy-2-cyclopenten-1-one, 5-methyl-2-furancarboxaldehyde, 2-furanmethanol acetate, 2-furanmethanol propanoate, 1-hydroxy-2-propanone, 2-vinylfuran, dihydro-2-methyl-3(2H)-furanone, 3-furaldehyde, 3-furanmethanol, 3-pyridinol, 5-amino-1-naphthol, acetic acid, acetic acid, 2-(dimethylamino)ethyl ester, acetic acid, methyl ester, acetone, 2-methoxy-benzenamine, 2-methyl-butanal, 3-methyl-butanal, 4-hydroxy-butanoic acid, dimethyl disulfide, N,N-dimethyl-ethanamine, 1-(1H-pyrrol-2-yl)-ethanone, 1-(2-furanyl)-ethanone, 1-(2-hydroxy-5-methylphenyl)-ethanone, furan, 2-(2-furanylmethyl)-5-methyl-furan, 2-(2-propenyl)-furan, 2-(methoxymethyl)-furan, 2,2'-methylenebis-furan, 2,5-dimethyl-furan, 2-[(methylthio)methyl]-furan, 2-methyl-furan, 3-methyl-furan, furfural, furfuryl formate, indole, N,N-dimethyl-methylamine, 2,7-dimethyl-oxepine, p-cresol, phenol, 2-methoxy-phenol, 2-methyl-phenol, 4-ethyl-2-methoxy-phenol, 1-methyl-piperidine, pyrazine, 2-(n-propyl)-pyrazine, 2,3-dimethyl-pyrazine, 2,5-dimethyl-pyrazine, 2,6-diethyl-pyrazine, 2,6-dimethyl-pyrazine, 2-ethyl-3-methyl-pyrazine, 2-ethyl-6-methyl-pyrazine, 3,5-diethyl-2-methyl-pyrazine, 3-ethyl-2,5-dimethyl-pyrazine, ethyl-pyrazine, methyl-pyrazine, pyridine, 2-methyl-pyridine, 3-ethyl-pyridine, 3-methyl-pyridine, 3-propyl-pyridine, styrene, thiophene, and toluene.

Embodiment 238 is the method of any one of embodiments 202-237, wherein the one or more VOCs do not comprise at least one compound selected from the group consisting of 1-heptanol, 1-octanol, 1-octen-3-ol, 2,3-diethyl-5-methylpyrazine, 2,3-diethylpyrazine, 2,3-pentadione, 2,5-dimethylphenol, 2,5-dimethylpyrazine, 2,6-dimethylpyrazine, 2-acetyl-1-methylpyrrole, 2-acetyl-5-methylfuran, 2-acetylpyridine, 2-acetylpyrrole, 2-ethyl-1-hexanol, 2-ethylfuran, 2-ethylpyrazine, 2-furfuryl acetate, 2-heptanol, 2-heptanone, 2-isopropyl-3-methoxypyrazine, 2-methoxy-4-methylphenol, 2-methoxy-4-vinylphenol, 2-methylbutyl isovalerate, 2-methylbutyraldehyde, 2-methylbutyric acid, 2-methylpyrazine, 2-nonanol, 2-nonanone, 2-octanone, 2-pentylfuran, 2-phenyl-2-butenal, 2-phenylethanol, 2-undecanone, 3-ethylpyridine, 3-hexanone, 3-octanol, 4-carvomenthenol, 4-ethyl guaiacol, 4-ethyl phenol, 4-methyl-2-phenyl-2-pentenal, 4'-methylacetophenone, 4-vinylphenol, 5-methyl-2-phenyl-2-hexenal, 5-methylfurfural, amyl alcohol, benzaldehyde, benzyl acetate, butyl alcohol, butyric acid, coffee furanone, damascenone, decanal, diethyl disulfide, diethyl succinate, difurfuryl ether, dimethyl sulfide, dimethyl sulfoxide, dimethyl trisulfide, ethyl 2-methylbutyrate, ethyl acetate, ethyl butanoate, ethyl decanoate, ethyl heptanoate, ethyl hexanoate, ethyl isovalerate, ethyl lactate, ethyl laurate, ethyl octanoate, ethyl phenylacetate, ethyl tiglate, furfural, furfuryl propionate, gamma-nonalactone, geraniol, guaiacol, hexanal, hexanol, hexyl acetate, isoamyl acetate, isobutyraldehyde, isobutyric acid, isovaleraldehyde, isovaleric acid, limonene, linalool, methyl benzoate, methyl hexanoate, methyl nicotinate, methyl phenylacetate, methyl salicylate, myrcene, nonanal, octanal, p-anisaldehyde, p-cresol, phenethyl acetate, phenylacetaldehyde, propionaldehyde, propionic acid, pyrrole, syringol, valeraldehyde, and valeric acid.

Embodiment 239 is the method of any one of embodiments 202-238, wherein the one or more VOCs do not comprise at least one compound selected from the group consisting of 1-heptanol, 1-octanol, 1-octen-3-ol, 2,3-diethylpyrazine, 2,5-dimethylpyrazine, 2-acetyl-1-methylpyrrole, 2-acetylpyridine, 2-acetylpyrrole, 2-ethyl-1-hexanol, 2-ethylfuran, 2-furfuryl acetate, 2-heptanol, 2-heptanone, 2-methylbutyl isovalerate, 2-methylbutyraldehyde, 2-methylbutyric acid, 2-nonanol, 2-nonanone, 2-octanone, 2-pentylfuran, 2-phenyl-2-butenal, 2-phenylethanol, 2-undecanone, 3-ethylpyridine, 3-hexanone, 3-octanol, 4-carvomenthenol, 4-ethyl guaiacol, 4-ethyl phenol, 4-methyl-2-phenyl-2-pentenal, 4'-methylacetophenone, 4-vinylphenol, 5-methyl-2-phenyl-2-hexenal, benzaldehyde, benzyl acetate, butyl alcohol, damascenone, decanal, diethyl disulfide, dimethyl sulfide, dimethyl sulfoxide, ethyl acetate, ethyl butanoate, ethyl heptanoate, ethyl hexanoate, ethyl lactate, ethyl octanoate, ethyl phenylacetate, ethyl tiglate, furfuryl propionate, geraniol, hexanal, hexanol, hexyl acetate, isoamyl acetate, isobutyric acid, limonene, linalool, methyl benzoate, methyl hexanoate, methyl nicotinate, methyl phenylacetate, methyl salicylate, myrcene, nonanal, octanal, p-cresol, phenethyl acetate, phenylacetaldehyde, propionaldehyde, propionic acid, and valeric acid.

Embodiment 240 is the method of any one of embodiments 202-239, wherein the one or more VOCs do not comprise 1-methyl-1,2,3,6-tetrahydropyridine.

Embodiment 241 is the method of any one of embodiments 202-240, wherein the one or more VOCs comprise at least one compound selected from the group consisting of 2,3-butanediol, 2-octanol, 2-pentanol, 2-phenylpropionaldehyde, 2-tridecanone, 3-octanone, amyl acetate, benzyl alcohol, benzyl isovalerate, beta-ionone, butyl acetate, ethyl 3-phenylpropionate, ethyl benzoate, ethyl cinnamate, ethyl isobutyrate, ethyl myristate, ethyl oleate, ethyl salicylate, ethyl valerate, gamma-decalactone, gamma-valerolactone, geranyl acetate, isoamyl alcohol, isoamyl benzoate, isoamyl butyrate, isoamyl isobutyrate, isobutyl acetate, isobutyl alcohol, maltol, massoia lactone, methional, methyl 2-methylbutyrate, methyl anthranilate, methyl cinnamate, propanol, propyl propionate, trans, and trans-2,4-decadienal.

Embodiment 242 is the method of any one of embodiments 202-241, wherein the one or more VOCs comprise at least one compound selected from the group consisting of 2-pentanol, beta-ionone, ethyl benzoate, geranyl acetate, isoamyl alcohol, maltol, massoia lactone, and methyl anthranilate.

Embodiment 243 is the method of any one of embodiments 202-242, wherein 2,3-diethyl-5-methylpyrazine is present in an amount of less than about 0.0065 mg/L.

Embodiment 244 is the method of any one of embodiments 202-243, wherein 2-ethylpyrazine is present in an amount of less than about 0.44 mg/L.

Embodiment 245 is the method of any one of embodiments 202-244, wherein 2-isopropyl-3-methoxypyrazine is present in an amount of less than about 0.0005 mg/L.

Embodiment 246 is the method of any one of embodiments 202-245, wherein 2-methoxy-4-vinylphenol is present in an amount of less than about 0.22 mg/L.

Embodiment 247 is the method of any one of embodiments 202-246, wherein 2-methylpyrazine is present in an amount of less than about 5.1 mg/L.

Embodiment 248 is the method of any one of embodiments 202-247, wherein 5-methylfurfural is present in an amount of less than about 3.2 mg/L.

Embodiment 249 is the method of any one of embodiments 202-248, wherein amyl alcohol is present in an amount of less than about 0.008 mg/L.

Embodiment 250 is the method of any one of embodiments 202-249, wherein butyric acid is present in an amount of less than about 1.2 mg/L.

Embodiment 251 is the method of any one of embodiments 202-250, wherein difurfuryl ether is present in an amount of less than about 0.027 mg/L.

Embodiment 252 is the method of any one of embodiments 202-251, wherein dimethyl trisulfide is present in an amount of less than about 0.0007 mg/L.

Embodiment 253 is the method of any one of embodiments 202-252, wherein furfural is present in an amount of less than about 6 mg/L.

Embodiment 254 is the method of any one of embodiments 202-253, wherein guaiacol is present in an amount of less than about 0.22 mg/L.

Embodiment 255 is the method of any one of embodiments 202-254, wherein isobutyraldehyde is present in an amount of less than about 0.075 mg/L.

Embodiment 256 is the method of any one of embodiments 202-255, wherein isovaleraldehyde is present in an amount of less than about 0.05 mg/L.

Embodiment 257 is the method of any one of embodiments 202-256, wherein pyrrole is present in an amount of less than about 0.005 mg/L.

Embodiment 258 is the method of any one of embodiments 202-257, wherein 2,5-dimethylphenol is present in an amount of at least about 0.004 mg/L.

Embodiment 259 is the method of any one of embodiments 202-258, wherein 2-acetyl-5-methylfuran is present in an amount of at least about 0.5 mg/L.

Embodiment 260 is the method of any one of embodiments 202-259, wherein 2-methoxy-4-methylphenol is present in an amount of at least about 0.00012 mg/L.

Embodiment 261 is the method of any one of embodiments 202-260, wherein coffee furanone is present in an amount of at least about 50 mg/L.

Embodiment 262 is the method of any one of embodiments 202-261, wherein diethyl succinate is present in an amount of at least about 0.0004 mg/L.

Embodiment 263 is the method of any one of embodiments 202-262, wherein ethyl 2-methylbutyrate is present in an amount of at least about 0.002 mg/L.

Embodiment 264 is the method of any one of embodiments 202-263, wherein ethyl decanoate is present in an amount of at least about 0.002 mg/L in the coffee replica beverage.

Embodiment 265 is the method of any one of embodiments 202-264, wherein ethyl laurate is present in an amount of at least about 0.0007 mg/L.

Embodiment 266 is the method of any one of embodiments 202-265, wherein gamma-nonalactone is present in an amount of at least about 0.005 mg/L.

Embodiment 267 is the method of any one of embodiments 202-266, wherein isovaleric acid is present in an amount of at least 1 mg/L.

Embodiment 268 is the method of any one of embodiments 202-267, wherein syringol is present in an amount of at least about 0.1 mg/L.

Embodiment 269 is the method of any one of embodiments 202-268, wherein valeraldehyde is present in an amount of at least about 0.6 mg/L.

Embodiment 270 is the method of any one of embodiments 202-269, wherein the VOCs comprise one or more of: an acid, an alcohol, an aldehyde, an amine, a benzene, an ester, a furan, a ketone, a lactone, a phenol, a pyrazine, a pyridine, a pyrrole, a sugar or sugar alcohol, a sulfur compound, a terpene, or a thiophene.

Embodiment 271 is the method of any one of embodiments 202-270, wherein the VOCs comprise one or more of: an acid, an alcohol, an aldehyde, an ester, a furan, a ketone, a lactone, a phenol, a pyrazine, a pyridine, a pyrrole, a sugar or sugar alcohol, a sulfur compound, or a terpene.

Embodiment 272 is the method of any one of embodiments 202-271, wherein the VOCs comprise one or more of: an acid, an alcohol, an aldehyde, an ester, a furan, a ketone, a lactone, a phenol, a pyrazine, a pyrrole, a sugar or sugar alcohol, or a sulfur compound.

Embodiment 273 is the method of any one of embodiments 202-272, wherein the VOCs comprise one or more acids.

Embodiment 274 is the method of embodiment 273, wherein the one or more acids comprise at least one acid selected from the group consisting of 2-methylbutyric acid, 3-methylbutyric acid, 4-hydroxy-butanoic acid, acetic acid, butyric acid, isobutyric acid, isovaleric acid, propionic acid, and valeric acid.

Embodiment 275 is the method of embodiment 273, wherein the one or more acids comprise at least one acid selected from the group consisting of 2-methylbutyric acid, 3-methylbutyric acid, butyric acid, isobutyric acid, isovaleric acid, propionic acid, and valeric acid.

Embodiment 276 is the method of embodiment 273, wherein the one or more acids comprise at least one acid selected from the group consisting of 3-methylbutyric acid, butyric acid, and isovaleric acid.

Embodiment 277 is the method of any one of embodiments 202-276, wherein the VOCs comprise one or more alcohols.

Embodiment 278 is the method of embodiment 277, wherein the one or more alcohols comprise at least one alcohol selected from the group consisting of 1-heptanol, 1-octanol, 1-octen-3-ol, 2,3-butanediol, 2-ethyl-1-hexanol, 2-heptanol, 2-nonanol, 2-octanol, 2-pentanol, 2-phenylethanol, 3-octanol, 4-carvomenthenol, amyl alcohol, benzyl alcohol, butyl alcohol, geraniol, hexanol, isoamyl alcohol, isobutyl alcohol, and propanol.

Embodiment 279 is the method of embodiment 277, wherein the one or more alcohols comprise at least one alcohol selected from the group consisting of 1-heptanol, 1-octanol, 1-octen-3-ol, 2,3-butanediol, 2-ethyl-1-hexanol, 2-heptanol, 2-nonanol, 2-octanol, 2-pentanol, 2-phenylethanol, 3-octanol, 4-carvomenthenol, amyl alcohol, benzyl alcohol, butyl alcohol, geraniol, hexanol, isoamyl alcohol, isobutyl alcohol, and propanol.

Embodiment 280 is the method of embodiment 277, wherein the one or more alcohols comprise at least one alcohol selected from the group consisting of 2-pentanol, amyl alcohol, and isoamyl alcohol.

Embodiment 281 is the method of any one of embodiments 202-280, wherein the VOCs comprise one or more aldehydes.

Embodiment 282 is the method of embodiment 281, wherein the one or more aldehydes comprise at least one aldehyde selected from the group consisting of 2-methyl-butanal, 2-methylbutyraldehyde, 2-phenyl-2-butenal, 2-phenylpropionaldehyde, 3-furaldehyde, 3-methyl-butanal, 4-methyl-2-phenyl-2-pentenal, 5-methyl-2-furancarboxaldehyde, 5-methyl-2-phenyl-2-hexenal, benzaldehyde, decanal, hexanal, isobutyraldehyde, isovaleraldehyde, nonanal, octanal, p-anisaldehyde, phenylacetaldehyde, propionaldehyde, trans,trans-2,4-decadienal, trans-2-nonenal, and valeraldehyde.

Embodiment 283 is the method of embodiment 281, wherein the one or more aldehydes comprise at least one aldehyde selected from the group consisting of 2-methyl-butyraldehyde, 2-phenyl-2-butenal, 2-phenylpropionaldehyde, 4-methyl-2-phenyl-2-pentenal, 5-methyl-2-phenyl-2-hexenal, benzaldehyde, decanal, hexanal, isobutyraldehyde, isovaleraldehyde, nonanal, octanal, p-anisaldehyde, phenylacetaldehyde, propionaldehyde, trans,trans-2,4-decadienal, trans-2-nonenal, and valeraldehyde.

Embodiment 284 is the method of embodiment 281, wherein the one or more aldehydes comprise at least one aldehyde selected from the group consisting of isobutyraldehyde, isovaleraldehyde, p-anisaldehyde, and valeraldehyde.

Embodiment 285 is the method of any one of embodiments 202-284, wherein the VOCs comprise one or more amines.

Embodiment 286 is the method of embodiment 285, wherein the one or more amines comprise at least one amine selected from the group consisting of 2-amino-1-naphthalenol, 2-methoxy-benzenamine, 5-amino-1-naphthol, N,N-dimethyl-ethanamine, and N,N-dimethyl-methylamine.

Embodiment 287 is the method of any one of embodiments 202-286, wherein the VOCs comprise one or more benzenes.

Embodiment 288 is the method of embodiment 287, wherein the one or more benzenes comprise at least one benzene selected from the group consisting of styrene and toluene.

Embodiment 289 is the method of any one of embodiments 202-288, wherein the VOCs comprise one or more esters.

Embodiment 290 is the method of embodiment 289, wherein the one or more esters comprise at least one ester selected from the group consisting of 2-furanmethanol acetate, 2-furanmethanol propanoate, 2-methylbutyl isovalerate, acetic acid, 2-(dimethylamino)ethyl ester, acetic acid, methyl ester, acetoin acetate, amyl acetate, benzyl acetate, benzyl isovalerate, butyl acetate, delta-decalactone, delta-octalactone, diethyl succinate, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl myristate, ethyl octanoate, ethyl oleate, ethyl phenylacetate, ethyl salicylate, ethyl tiglate, ethyl valerate, furfuryl formate, gamma-decalactone, gamma-nonalactone, gamma-valerolactone, geranyl acetate, hexyl acetate, isoamyl acetate, isoamyl benzoate, isoamyl butyrate, isoamyl isobutyrate, isobutyl acetate, methyl 2-methylbutyrate, methyl anthranilate, methyl benzoate, methyl cinnamate, methyl hexanoate, methyl phenylacetate, methyl salicylate, phenethyl acetate, and propyl propionate.

Embodiment 291 is the method of embodiment 289, wherein the one or more esters comprise at least one ester selected from the group consisting of 2-methylbutyl isovalerate, acetoin acetate, amyl acetate, benzyl acetate, benzyl isovalerate, butyl acetate, delta-decalactone, delta-octalactone, diethyl succinate, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl myristate, ethyl octanoate, ethyl oleate, ethyl phenylacetate, ethyl salicylate, ethyl tiglate, ethyl valerate, gamma-decalactone, gamma-nonalactone, gamma-valerolactone, geranyl acetate, hexyl acetate, isoamyl acetate, isoamyl benzoate, isoamyl butyrate, isoamyl isobutyrate, isobutyl acetate, methyl 2-methylbutyrate, methyl anthranilate, methyl benzoate, methyl cinnamate, methyl hexanoate, methyl phenylacetate, methyl salicylate, phenethyl acetate, and propyl propionate.

Embodiment 292 is the method of embodiment 289, wherein the one or more esters comprise at least one ester selected from the group consisting of acetoin acetate, delta-decalactone, delta-octalactone, diethyl succinate, ethyl 2-methylbutyrate, ethyl benzoate, ethyl butyrate, ethyl decanoate, ethyl isovalerate, ethyl laurate, gamma-nonalactone, geranyl acetate, and methyl anthranilate.

Embodiment 293 is the method of any one of embodiments 289-292, wherein the coffee replica comprises at least about 0.6 mg/L of esters.

Embodiment 294 is the method of any one of embodiments 202-293, wherein the VOCs comprise one or more furans.

Embodiment 295 is the method of embodiment 294, wherein the one or more furans comprise at least one furan selected from the group consisting of 1-(2-furanyl)-ethanone, 2-(2-furanylmethyl)-5-methyl-furan, 2-(2-propenyl)-furan, 2-(methoxymethyl)-furan, 2,2'-methylenebis-furan, 2,5-dimethyl-furan, 2-[(methylthio)methyl]-furan, 2-acetyl-5-methylfuran, 2-ethylfuran, 2-furfuryl acetate, 2-methyl-furan, 2-pentylfuran, 2-vinylfuran, 3-furanmethanol, 3-methyl-furan, 5-methylfurfural, difurfuryl ether, furan, furaneol, furfural, furfuryl alcohol, and furfuryl propionate.

Embodiment 296 is the method of embodiment 294, wherein the one or more furans comprise at least one furan selected from the group consisting of 2-acetyl-5-methyl-furan, 2-ethylfuran, 2-furfuryl acetate, 2-pentylfuran, 5-methylfurfural, difurfuryl ether, furaneol, furfural, furfuryl alcohol, furfuryl propionate.

Embodiment 297 is the method of embodiment 294, wherein the one or more furans comprise at least one furan selected from the group consisting of 2-acetyl-5-methyl-furan, 5-methylfurfural, difurfuryl ether, furaneol, furfural, and furfuryl alcohol.

Embodiment 298 is the method of any one of embodiments 202-297, wherein the VOCs comprise one or more ketones.

Embodiment 299 is the method of embodiment 298, wherein the one or more ketones comprise at least one ketone selected from the group consisting of 1-hydroxy-2- propanone, 2,3-butanedione, 2,3-dimethyl-2-cyclopenten-1-one, 2,3-Hexanedione, 2,3-pentadione, 2-butanone, 2-ethyl-4-hydroxy-5-methyl-3(2H)-furanone, 2-heptanone, 2-methyl-2-cyclopenten-1-one, 2-nonanone, 2-octanone, 2-tridecanone, 2-undecanone, 3-ethyl-2-hydroxy-2-cyclopenten-1-one, 3-hexanone, 3-octanone, 4-hydroxy-5-methyl-3-furanone, 4'-methylacetophenone, acetone, beta-damascenone, beta-ionone, coffee furanone, damascenone, and dihydro-2-methyl-3(2H)-furanone.

Embodiment 300 is the method of embodiment 298, wherein the one or more ketones comprise at least one ketone selected from the group consisting of 2,3-butanedione, 2,3-Hexanedione, 2,3-pentadione, 2-ethyl-4-hydroxy-5-methyl-3(2H)-furanone, 2-heptanone, 2-nonanone, 2-octanone, 2-tridecanone, 2-undecanone, 3-hexanone, 3-octanone, 4-hydroxy-5-methyl-3-furanone, 4'-methylacetophenone, beta-damascenone, beta-ionone, coffee furanone, and damascenone.

Embodiment 301 is the method of embodiment 298, wherein the one or more ketones comprise at least one ketone selected from the group consisting of 2,3-butanedione, 2,3-Hexanedione, 2,3-pentadione, 2-ethyl-4-hydroxy-5-methyl-3(2H)-furanone, 4-hydroxy-5-methyl-3-furanone, beta-damascenone, beta-ionone, and coffee furanone.

Embodiment 302 is the method of any one of embodiments 298-301, wherein the coffee replica comprises at least 53 mg/L of ketones.

Embodiment 303 is the method of any one of embodiments 202-302, wherein the VOCs comprise one or more lactones.

Embodiment 304 is the method of embodiment 303, wherein the one or more lactones comprise at least one lactone selected from the group consisting of 4,5-dimethyl-3-hydroxy-2,5-dihydro-furan-2-one, gamma decalactone, massoia lactone, sotolone.

Embodiment 305 is the method of embodiment 303, wherein the one or more lactones comprise at least one lactone selected from the group consisting of gamma decalactone, massoia lactone, and sotolone.

Embodiment 306 is the method of any one of embodiments 202-305, wherein the VOCs comprise one or more phenols.

Embodiment 307 is the method of embodiment 306, wherein the one or more phenols comprise at least one phenol selected from the group consisting of 1-(2-hydroxy-5-methylphenyl)-ethanone, 2,5-dimethylphenol, 2-methoxy-4-methylphenol, 2-methoxy-4-vinylphenol, 2-methoxy-phenol, 2-methyl-phenol, 4-ethyl guaiacol, 4-ethyl phenol, 4-ethyl-2-methoxy-phenol, 4-ethylguaiacol, 4-vinylphenol, eugenol, guaiacol, isoeugenol, p-cresol, phenol, syringol, syringol (2,6-dimethoxyphenol), vanillin erythro and/or threo-butan-2,3-diol acetal, and vanillyl ethyl ether.

Embodiment 308 is the method of embodiment 306, wherein the one or more phenols comprise at least one phenol selected from the group consisting of 2,5-dimethylphenol, 2-methoxy-4-methylphenol, 2-methoxy-4-vinylphenol, 4-ethyl guaiacol, 4-ethyl phenol, 4-ethylguaiacol, 4-vinylphenol, eugenol, guaiacol, isoeugenol, p-cresol, syringol, vanillin erythro and/or threo-butan-2,3-diol acetal, and vanillyl ethyl ether.

Embodiment 309 is the method of embodiment 306, wherein the one or more phenols comprise at least one phenol selected from the group consisting of 2,5-dimethylphenol, 2-methoxy-4-methylphenol, 2-methoxy-4-vinylphenol, 4-ethylguaiacol, eugenol, guaiacol, isoeugenol, syringol, vanillin erythro and/or threo-butan-2,3-diol acetal, and vanillyl ethyl ether.

Embodiment 310 is the method of any one of embodiments 303-306, wherein the coffee replica comprises at least 4.6 mg/L of phenols.

Embodiment 311 is the method of any one of embodiments 202-310, wherein the VOCs comprise one or more pyrazines.

Embodiment 312 is the method of embodiment 311, wherein the one or more pyrazines comprise at least one pyrazine selected from the group consisting of 2-(n-propyl)-pyrazine, 2,3-diethyl-5-methylpyrazine, 2,3-diethylpyrazine, 2,5-dimethylpyrazine, 2,5-dimethyl-pyrazine, 2,6-diethyl-pyrazine, 2,6-dimethylpyrazine, 2,6-dimethyl-pyrazine, 2-ethoxy-3-methylpyrazine, 2-ethyl-3-methyl-pyrazine, 2-ethyl-6-methyl-pyrazine, 2-ethylpyrazine, 2-isobutyl-3-methoxypyrazine (IBMP), 2-isobutyl-3-methyl pyrazine, 2-isopropyl-3-methoxypyrazine, 2-methylpyrazine, 3,5-diethyl-2-methyl-pyrazine, 3-ethyl-2,5-dimethyl-pyrazine, ethyl-pyrazine, isopropenyl pyrazine, methyl-pyrazine, and pyrazine.

Embodiment 313 is the method of embodiment 311, wherein the one or more pyrazines comprise at least one pyrazine selected from the group consisting of 2,3-diethyl-5-methylpyrazine, 2,3-diethylpyrazine, 2,5-dimethylpyrazine, 2,6-dimethylpyrazine, 2-ethoxy-3-methylpyrazine, 2-ethylpyrazine, 2-isobutyl-3-methoxypyrazine (IBMP), 2-isobutyl-3-methyl pyrazine, 2-isopropyl-3-methoxypyrazine, 2-methylpyrazine, and isopropenyl pyrazine.

Embodiment 314 is the method of embodiment 311, wherein the one or more pyrazines comprise at least one pyrazine selected from the group consisting of 2,3-diethyl-5-methylpyrazine, 2,6-dimethylpyrazine, 2-ethoxy-3-methylpyrazine, 2-ethylpyrazine, 2-isobutyl-3-methoxypyrazine (IBMP), 2-isobutyl-3-methyl pyrazine, 2-isopropyl-3-methoxypyrazine, 2-methylpyrazine, and isopropenyl pyrazine.

Embodiment 315 is the method of any one of embodiments 202-314, wherein the VOCs comprise one or more pyridines.

Embodiment 316 is the method of embodiment 315, wherein the one or more pyridines comprise at least one pyridine selected from the group consisting of 1-methyl-1,2,3,6-tetrahydropyridine, 1-methyl-piperidine, 2-acetylpyridine, 2-methyl-pyridine, 3-ethylpyridine, 3-ethyl-pyridine, 3-methyl-pyridine, 3-propyl-pyridine, 3-pyridinol, and methyl nicotinate.

Embodiment 317 is the method of embodiment 315, wherein the one or more pyridines comprise at least one pyridine selected from the group consisting of 2-acetylpyridine, 3-ethylpyridine, and methyl nicotinate.

Embodiment 318 is the method of any one of embodiments 202-317, wherein the VOCs comprise one or more pyrroles.

Embodiment 319 is the method of embodiment 318, wherein the one or more pyrroles comprise at least one pyrrole selected from the group consisting of 1-(1H-pyrrol-2-yl)-ethanone, 1-(2-furanylmethyl)-1H-pyrrole, 1-ethyl-1H-pyrrole, 1-methyl-1H-pyrrole, 1-methyl-1H-pyrrole-2-carboxaldehyde, 2-acetyl-1-methylpyrrole, 2-acetylpyrrole, indole, and pyrrole.

Embodiment 320 is the method of embodiment 318, wherein the one or more pyrroles comprise at least one pyrrole selected from the group consisting of 2-acetyl-1-methylpyrrole, 2-acetylpyrrole, and pyrrole.

Embodiment 321 is the method of embodiment 318, wherein the one or more pyrroles comprise pyrrole.

Embodiment 322 is the method of any one of embodiments 202-321, wherein the VOCs comprise one or more sugars or sugar alcohols.

Embodiment 323 is the method of embodiment 322, wherein the one or more sugars or sugar alcohols comprise at least one sugars or sugar alcohol selected from the group consisting of ethyl maltol and maltol.

Embodiment 324 is the method of any one of embodiments 202-323, wherein the VOCs comprise one or more sulfur compounds.

Embodiment 325 is the method of embodiment 324, wherein the one or more sulfur compounds comprise at least one sulfur compound selected from the group consisting of diethyl disulfide, dimethyl disulfide, dimethyl sulfide, dimethyl sulfoxide, dimethyl trisulfide, methanethiol, and methional.

Embodiment 326 is the method of embodiment 324, wherein the one or more sulfur compounds comprise at least one sulfur compound selected from the group consisting of diethyl disulfide, dimethyl sulfide, dimethyl sulfoxide, dimethyl trisulfide, methanethiol, and methional.

Embodiment 327 is the method of embodiment 324, wherein the one or more sulfur compounds comprise at least one sulfur compound selected from the group consisting of dimethyl trisulfide and methanethiol.

Embodiment 328 is the method of any one of embodiments 202-327, wherein the VOCs comprise one or more terpenes.

Embodiment 329 is the method of embodiment 328, wherein the one or more terpenes comprise at least one terpene selected from the group consisting of alpha-methyl-alpha-[4-methyl-3-pentenyl]oxiranemethanol, beta-myrcene, limonene, linalool, and myrcene.

Embodiment 330 is the method of embodiment 328, wherein the one or more terpenes comprise at least one terpene selected from the group consisting of limonene, linalool, and myrcene.

Embodiment 331 is the method of any one of embodiments 202-330, wherein the VOCs comprise one or more thiophenes.

Embodiment 332 is the method of embodiment 331, wherein the one or more thiophenes comprise at least one thiophene comprises thiophene.

Embodiment 333 is the method of any one of embodiments 202-332, wherein the VOCs comprise 2,7-dimethyl-oxepine.

Embodiment 334 is the method of any one of embodiments 202-333, wherein the VOCs comprise at least 20 compounds selected from the group consisting of 1-heptanol, 1-(1H-pyrrol-2-yl)-ethanone, 1-(2-furanyl)-ethanone, 1-(2-furanylmethyl)-1H-pyrrole, 1-(2-hydroxy-5-methylphenyl)-ethanone, 1-ethyl-1H-pyrrole, 1-hydroxy-2-propanone, 1-methyl-1,2,3,6-tetrahydropyridine, 1-methyl-1H-pyrrole, 1-methyl-1H-pyrrole-2-carboxaldehyde, 1-methyl-piperidine, 1-octanol, 1-octen-3-ol, 2-(2-furanylmethyl)-5-methyl-furan, 2-(2-propenyl)-furan, 2-(methoxymethyl)-furan, 2-(n-propyl)-pyrazine, 2,2'-methylenebis-furan, 2,3-butanediol, 2,3-butanedione, 2,3-diethyl-5-methylpyrazine, 2,3-diethylpyrazine, 2,3-dimethyl-2-cyclopenten-1-one, 2,3-dimethylpyrazine, 2,3-Hexanedione, 2,3-pentadione, 2,5-dimethyl-furan, 2,5-dimethylphenol, 2,5-dimethylpyrazine, 2,6-diethyl-pyrazine, 2,6-dimethylpyrazine, 2,7-dimethyl-oxepine, 2-[(methylthio)methyl]-furan, 2-acetyl-1-methylpyrrole, 2-acetyl-5-methylfuran, 2-acetylpyridine, 2-acetylpyrrole, 2-amino-1-naphthalenol, 2-butanone, 2-ethoxy-3-methylpyrazine, 2-ethyl-1-hexanol, 2-ethyl-3-methyl-pyrazine, 2-ethyl-4-hydroxy-5-methyl-3(2H)-furanone, 2-ethyl-6-methyl-pyrazine, 2-ethylfuran, 2-ethylpyrazine, 2-furanmethanol acetate, 2-furanmethanol propanoate, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methoxy-benzenamine, 2-methoxy-phenol, 2-methyl-2-cyclopenten-1-one, 2-methyl-butanal, 2-methylbutyl isovalerate, 2-methylbutyraldehyde, 2-methylbutyric acid, 2-methyl-furan, 2-methyl-phenol, 2-methylpyrazine, 2-methylpyrazine, 2-methyl-pyridine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 2-vinylfuran, 3,5-diethyl-2-methyl-pyrazine, 3-ethyl-2,5-dimethyl-pyrazine, 3-ethyl-2-hydroxy-2-cyclopenten-1-one, 3-ethylpyridine, 3-ethyl-pyridine, 3-furaldehyde, 3-furanmethanol, 3-hexanone, 3-methyl-butanal, 3-methylbutyric acid, 3-methyl-furan, 3-methyl-pyridine, 3-octanol, 3-octanone, 3-propyl-pyridine, 3-pyridinol, 4,5-dimethyl-3-hydroxy-2,5-dihydro-furan-2-one, 4-carvomenthenol, 4-ethyl guaiacol, 4-ethyl phenol, 4-ethyl-2-methoxyphenol, 4-ethylguaiacol, 4-hydroxy-5-methyl-3-furanone, 4-hydroxy-butanoic acid, 4-methyl-2-phenyl-2-pentenal, 4'-methylacetophenone, 4-vinylphenol, 5-amino-1-naphthol, 5-methyl-2-furancarboxaldehyde, 5-methyl-2-phenyl-2-hexenal, 5-methylfurfural, acetic acid, acetic acid, 2-(dimethylamino)ethyl ester, acetic acid, methyl ester, acetoin acetate, acetone, alpha-methyl-alpha-[4-methyl-3-pentenyl] oxiranemethanol, amyl acetate, amyl alcohol, benzaldehyde, benzyl acetate, benzyl alcohol, benzyl isovalerate, beta-damascenone, beta-ionone, beta-myrcene, butyl acetate, butyl alcohol, butyric acid, coffee furanone, damascenone, decanal, delta-decalactone, delta-octalactone, diethyl disulfide, diethyl succinate, difurfuryl ether, dihydro-2-methyl-3 (2H)-furanone, dimethyl disulfide, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, ethyl-pyrazine, eugenol, furan, furaneol, furfural, furfuryl alcohol, furfuryl formate, furfuryl propionate, gamma decalactone, gamma-decalactone, gamma-nonalactone, gamma-valerolactone, geraniol, geranyl acetate, guaiacol, hexanal, hexanol, hexyl acetate, indole, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, methyl-pyrazine, myrcene, N,N-dimethyl-ethanamine, N,N-dimethyl-methylamine, nonanal, octanal, p-anisaldehyde, p-cresol, phenethyl acetate, phenol, phenylacetaldehyde, propanol, propionaldehyde, propionic acid, propyl propionate, pyrazine, pyridine, pyrrole, sotolone, styrene, syringol, thiophene, toluene, trans,trans-2,4-decadienal, trans-2-nonenal, valeraldehyde, valeric acid, vanillin erythro and/or threo-butan-2,3-diol acetal, and vanillyl ethyl ether.

Embodiment 335 is the method of any one of embodiments 202-333, wherein the VOCs comprise at least 30 compounds selected from the group consisting of 1-heptanol, 1-(1H-pyrrol-2-yl)-ethanone, 1-(2-furanyl)-ethanone, 1-(2-furanylmethyl)-1H-pyrrole, 1-(2-hydroxy-5-methylphenyl)-ethanone, 1-ethyl-1H-pyrrole, 1-hydroxy-2-propanone, 1-methyl-1,2,3,6-tetrahydropyridine, 1-methyl-1H-pyrrole, 1-methyl-1H-pyrrole-2-carboxaldehyde, 1-methylpiperidine, 1-octanol, 1-octen-3-ol, 2-(2-furanylmethyl)-5-methyl-furan, 2-(2-propenyl)-furan, 2-(methoxymethyl)-furan, 2-(n-propyl)-pyrazine, 2,2'-methylenebis-furan, 2,3-butanediol, 2,3-butanedione, 2,3-diethyl-5-methylpyrazine, 2,3-diethylpyrazine, 2,3-dimethyl-2-cyclopenten-1-one, 2,3-dimethylpyrazine, 2,3-Hexanedione, 2,3-pentadione, 2,5-dimethyl-furan, 2,5-dimethylphenol, 2,5-dimethylpyrazine, 2,6-diethyl-pyrazine, 2,6-dimethylpyrazine, 2,7-dimethyl-oxepine, 2-[(methylthio)methyl]-furan, 2-acetyl-1-methylpyrrole, 2-acetyl-5-methylfuran, 2-acetylpyridine, 2-acetylpyrrole, 2-amino-1-naphthalenol, 2-butanone, 2-ethoxy-3-methylpyrazine, 2-ethyl-1-hexanol, 2-ethyl-3-methyl-pyrazine, 2-ethyl-4-hydroxy-5-methyl-3(2H)-furanone, 2-ethyl-6-methyl-pyrazine, 2-ethylfuran, 2-ethylpyrazine, 2-furanmethanol acetate, 2-furanmethanol propanoate, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methoxy-benzenamine, 2-methoxy-phenol, 2-methyl-2-cyclopenten-1-one, 2-methyl-butanal, 2-methylbutyl isovalerate, 2-methylbutyraldehyde, 2-methylbutyric acid, 2-methyl-furan, 2-methyl-phenol, 2-methylpyrazine, 2-methylpyrazine, 2-methyl-pyridine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 2-vinylfuran, 3,5-diethyl-2-methyl-pyrazine, 3-ethyl-2,5-dimethyl-pyrazine, 3-ethyl-2-hydroxy-2-cyclopenten-1-one, 3-ethylpyridine, 3-ethyl-pyridine, 3-furaldehyde, 3-furanmethanol, 3-hexanone, 3-methyl-butanal, 3-methylbutyric acid, 3-methyl-furan, 3-methyl-pyridine, 3-octanol, 3-octanone, 3-propyl-pyridine, 3-pyridinol, 4,5-dimethyl-3-hydroxy-2,5-dihydro-furan-2-one, 4-carvomenthenol, 4-ethyl guaiacol, 4-ethyl phenol, 4-ethyl-2-methoxy-phenol, 4-ethylguaiacol, 4-hydroxy-5-methyl-3-furanone, 4-hydroxy-butanoic acid, 4-methyl-2-phenyl-2-pentenal, 4'-methylacetophenone, 4-vinylphenol, 5-amino-1-naphthol, 5-methyl-2-furancarboxaldehyde, 5-methyl-2-phenyl-2-hexenal, 5-methylfurfural, acetic acid, acetic acid, 2-(di-methylamino)ethyl ester, acetic acid, methyl ester, acetoin acetate, acetone, alpha-methyl-alpha-[4-methyl-3-pentenyl] oxiranemethanol, amyl acetate, amyl alcohol, benzaldehyde, benzyl acetate, benzyl alcohol, benzyl isovalerate, beta-damascenone, beta-ionone, beta-myrcene, butyl acetate, butyl alcohol, butyric acid, coffee furanone, damascenone, decanal, delta-decalactone, delta-octalactone, diethyl disulfide, diethyl succinate, difurfuryl ether, dihydro-2-methyl-3(2H)-furanone, dimethyl disulfide, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, ethyl-pyrazine, eugenol, furan, furaneol, furfural, furfuryl alcohol, furfuryl formate, furfuryl propionate, gamma decalactone, gamma-decalactone, gamma-nonalactone, gamma-valerolactone, geraniol, geranyl acetate, guaiacol, hexanal, hexanol, hexyl acetate, indole, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, methyl-pyrazine, myrcene, N,N-dimethyl-ethanamine, N,N-dimethyl-methylamine, nonanal, octanal, p-anisaldehyde, p-cresol, phenethyl acetate, phenol, phenylacetaldehyde, propanol, propionaldehyde, propionic acid, propyl propionate, pyrazine, pyridine, pyrrole, sotolone, styrene, syringol, thiophene, toluene, trans,trans-2,4-decadienal, trans-2-nonenal, valeraldehyde, valeric acid, vanillin erythro and/or threo-butan-2,3-diol acetal, and vanillyl ethyl ether.

Embodiment 336 is the method of any one of embodiments 202-333, wherein the VOCs comprise at least 40 compounds selected from the group consisting of 1-heptanol, 1-(1H-pyrrol-2-yl)-ethanone, 1-(2-furanyl)-ethanone, 1-(2-furanylmethyl)-1H-pyrrole, 1-(2-hydroxy-5-methylphenyl)-ethanone, 1-ethyl-1H-pyrrole, 1-hydroxy-2-propanone, 1-methyl-1,2,3,6-tetrahydropyridine, 1-methyl-1H-pyrrole, 1-methyl-1H-pyrrole-2-carboxaldehyde, 1-methylpiperidine, 1-octanol, 1-octen-3-ol, 2-(2-furanylmethyl)-5-methyl-furan, 2-(2-propenyl)-furan, 2-(methoxymethyl)-furan, 2-(n-propyl)-pyrazine, 2,2'-methylenebis-furan, 2,3-butanediol, 2,3-butanedione, 2,3-diethyl-5-methylpyrazine, 2,3-diethylpyrazine, 2,3-dimethyl-2-cyclopenten-1-one, 2,3-dimethylpyrazine, 2,3-Hexanedione, 2,3-pentadione, 2,5-dimethyl-furan, 2,5-dimethylphenol, 2,5-dimethylpyrazine, 2,6-diethyl-pyrazine, 2,6-dimethylpyrazine, 2,7-dimethyl-oxepine, 2-[(methylthio)methyl]-furan, 2-acetyl-1-methylpyrrole, 2-acetyl-5-methylfuran, 2-acetylpyridine, 2-acetylpyrrole, 2-amino-1-naphthalenol, 2-butanone, 2-ethoxy-3-methylpyrazine, 2-ethyl-1-hexanol, 2-ethyl-3-methyl-pyrazine, 2-ethyl-4-hydroxy-5-methyl-3(2H)-furanone, 2-ethyl-6-methyl-pyrazine, 2-ethylfuran, 2-ethylpyrazine, 2-furanmethanol acetate, 2-furanmethanol propanoate, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methoxy-benzenamine, 2-methoxy-phenol, 2-methyl-2-cyclopenten-1-one, 2-methyl-butanal, 2-methylbutyl isovalerate, 2-methylbutyraldehyde, 2-methylbutyric acid, 2-methyl-furan, 2-methyl-phenol, 2-methylpyrazine, 2-methylpyrazine, 2-methyl-pyridine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 2-vinylfuran, 3,5-diethyl-2-methyl-pyrazine, 3-ethyl-2,5-dimethyl-pyrazine, 3-ethyl-2-hydroxy-2-cyclopenten-1-one, 3-ethylpyridine, 3-ethyl-pyridine, 3-furaldehyde, 3-furanmethanol, 3-hexanone, 3-methyl-butanal, 3-methylbutyric acid, 3-methyl-furan, 3-methyl-pyridine, 3-octanol, 3-octanone, 3-propyl-pyridine, 3-pyridinol, 4,5-dimethyl-3-hydroxy-2,5-dihydro-furan-2-one, 4-carvomenthenol, 4-ethyl guaiacol, 4-ethyl phenol, 4-ethyl-2-methoxy-phenol, 4-ethylguaiacol, 4-hydroxy-5-methyl-3-furanone, 4-hydroxy-butanoic acid, 4-methyl-2-phenyl-2-pentenal, 4'-methylacetophenone, 4-vinylphenol, 5-amino-1-naphthol, 5-methyl-2-furancarboxaldehyde, 5-methyl-2-phenyl-2-hexenal, 5-methylfurfural, acetic acid, acetic acid, 2-(dimethylamino)ethyl ester, acetic acid, methyl ester, acetoin acetate, acetone, alpha-methyl-alpha-[4-methyl-3-pentenyl] oxiranemethanol, amyl acetate, amyl alcohol, benzaldehyde, benzyl acetate, benzyl alcohol, benzyl isovalerate, beta-damascenone, beta-ionone, beta-myrcene, butyl acetate, butyl alcohol, butyric acid, coffee furanone, damascenone, decanal, delta-decalactone, delta-octalactone, diethyl disulfide, diethyl succinate, difurfuryl ether, dihydro-2-methyl-3 (2H)-furanone, dimethyl disulfide, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, ethyl-pyrazine, eugenol, furan, furaneol, furfural, furfuryl alcohol, furfuryl formate, furfuryl propionate, gamma decalactone, gamma-decalactone, gamma-nonalactone, gamma-valerolactone, geraniol, geranyl acetate, guaiacol, hexanal, hexanol, hexyl acetate, indole, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, methyl-pyrazine, myrcene, N,N-dimethyl-ethanamine, N,N-dimethyl-methylamine, nonanal, octanal, p-anisaldehyde, p-cresol, phenethyl acetate, phenol, phenylacetaldehyde, propanol, propionaldehyde, propionic acid, propyl propionate, pyrazine, pyridine, pyrrole, sotolone, styrene, syringol, thiophene, toluene, trans,trans-2,4-decadienal, trans-2-nonenal, valeraldehyde, valeric acid, vanillin erythro and/or threo-butan-2,3-diol acetal, and vanillyl ethyl ether.

Embodiment 337 is the method of any one of embodiments 202-333, wherein the VOCs comprise at least 50 compounds selected from the group consisting of 1-heptanol, 1-(1H-pyrrol-2-yl)-ethanone, 1-(2-furanyl)-ethanone, 1-(2-furanylmethyl)-1H-pyrrole, 1-(2-hydroxy-5-methylphenyl)-ethanone, 1-ethyl-1H-pyrrole, 1-hydroxy-2-propanone, 1-methyl-1,2,3,6-tetrahydropyridine, 1-methyl-1H-pyrrole, 1-methyl-1H-pyrrole-2-carboxaldehyde, 1-methyl-piperidine, 1-octanol, 1-octen-3-ol, 2-(2-furanylmethyl)-5-methyl-furan, 2-(2-propenyl)-furan, 2-(methoxymethyl)-furan, 2-(n-propyl)-pyrazine, 2,2'-methylenebis-furan, 2,3-butanediol, 2,3-butanedione, 2,3-diethyl-5-methylpyrazine, 2,3-diethylpyrazine, 2,3-dimethyl-2-cyclopenten-1-one, 2,3-dimethylpyrazine, 2,3-Hexanedione, 2,3-pentadione, 2,5-dimethyl-furan, 2,5-dimethylphenol, 2,5-dimethylpyrazine, 2,6-diethyl-pyrazine, 2,6-dimethylpyrazine, 2,7-dimethyl-oxepine, 2-[(methylthio)methyl]-furan, 2-acetyl-1-methylpyrrole, 2-acetyl-5-methylfuran, 2-acetylpyridine, 2-acetylpyrrole, 2-amino-1-naphthalenol, 2-butanone, 2-ethoxy-3-methylpyrazine, 2-ethyl-1-hexanol, 2-ethyl-3-methyl-pyrazine, 2-ethyl-4-hydroxy-5-methyl-3(2H)-furanone, 2-ethyl-6-methyl-pyrazine, 2-ethylfuran, 2-ethylpyrazine, 2-furanmethanol acetate, 2-furanmethanol propanoate, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methoxy-benzenamine, 2-methoxy-phenol, 2-methyl-2-cyclopenten-1-one, 2-methyl-butanal, 2-methylbutyl isovalerate, 2-methylbutyraldehyde, 2-methylbutyric acid, 2-methyl-furan, 2-methyl-phenol, 2-methylpyrazine, 2-methylpyrazine, 2-methyl-pyridine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 2-vinylfuran, 3,5-diethyl-2-methyl-pyrazine, 3-ethyl-2,5-dimethyl-pyrazine, 3-ethyl-2-hydroxy-2-cyclopenten-1-one, 3-ethylpyridine, 3-ethyl-pyridine, 3-furaldehyde, 3-furanmethanol, 3-hexanone, 3-methyl-butanal, 3-methylbutyric acid, 3-methyl-furan, 3-methyl-pyridine, 3-octanol, 3-octanone, 3-propyl-pyridine, 3-pyridinol, 4,5-dimethyl-3-hydroxy-2,5-dihydro-furan-2-one, 4-carvomenthenol, 4-ethyl guaiacol, 4-ethyl phenol, 4-ethyl-2-methoxy-phenol, 4-ethylguaiacol, 4-hydroxy-5-methyl-3-furanone, 4-hydroxy-butanoic acid, 4-methyl-2-phenyl-2-pentenal, 4'-methylacetophenone, 4-vinylphenol, 5-amino-1-naphthol, 5-methyl-2-furancarboxaldehyde, 5-methyl-2-phenyl-2-hexenal, 5-methylfurfural, acetic acid, acetic acid, 2-(dimethylamino)ethyl ester, acetic acid, methyl ester, acetoin acetate, acetone, alpha-methyl-alpha-[4-methyl-3-pentenyl] oxiranemethanol, amyl acetate, amyl alcohol, benzaldehyde, benzyl acetate, benzyl alcohol, benzyl isovalerate, beta-damascenone, beta-ionone, beta-myrcene, butyl acetate, butyl alcohol, butyric acid, coffee furanone, damascenone, decanal, delta-decalactone, delta-octalactone, diethyl disulfide, diethyl succinate, difurfuryl ether, dihydro-2-methyl-3 (2H)-furanone, dimethyl disulfide, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, ethyl-pyrazine, eugenol, furan, furaneol, furfural, furfuryl alcohol, furfuryl formate, furfuryl propionate, gamma decalactone, gamma-decalactone, gamma-nonalactone, gamma-valerolactone, geraniol, geranyl acetate, guaiacol, hexanal, hexanol, hexyl acetate, indole, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, methyl-pyrazine, myrcene, N,N-dimethyl-ethanamine, N,N-dimethyl-methylamine, nonanal, octanal, p-anisaldehyde, p-cresol, phenethyl acetate, phenol, phenylacetaldehyde, propanol, propionaldehyde, propionic acid, propyl propionate, pyrazine, pyridine, pyrrole, sotolone, styrene, syringol, thiophene, toluene, trans,trans-2,4-decadienal, trans-2-nonenal, valeraldehyde, valeric acid, vanillin erythro and/or threo-butan-2,3-diol acetal, and vanillyl ethyl ether.

Embodiment 338 is the method of any one of embodiments 202-337, wherein the VOCs comprise at least 10 compounds selected from the group consisting of 1-heptanol, 1-octanol, 1-octen-3-ol, 2,3-butanediol, 2,3-butanedione, 2,3-diethyl-5-methylpyrazine, 2,3-diethylpyrazine, 2,3-Hexanedione, 2,3-pentadione, 2,5-dimethylphenol, 2,5-dimethylpyrazine, 2,6-dimethylpyrazine, 2-acetyl-1-methylpyrrole, 2-acetyl-5-methylfuran, 2-acetylpyridine, 2-acetylpyrrole, 2-ethoxy-3-methylpyrazine, 2-ethyl-1-hexanol, 2-ethyl-4-hydroxy-5-methyl-3(2H)-furanone, 2-ethylfuran, 2-ethylpyrazine, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylbutyl isovalerate, 2-methylbutyraldehyde, 2-methylbutyric acid, 2-methylpyrazine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 3-ethylpyridine, 3-hexanone, 3-methylbutyric acid, 3-octanol, 3-octanone, 4-carvomenthenol, 4-ethyl guaiacol, 4-ethyl phenol, 4-ethylguaiacol, 4-hydroxy-5-methyl-3-furanone, 4-methyl-2-phenyl-2-pentenal, 4'-methylacetophenone, 4-vinylphenol, 5-methyl-2-phenyl-2-hexenal, 5-methylfurfural, acetoin acetate, amyl acetate, amyl alcohol, benzaldehyde, benzyl acetate, benzyl alcohol, benzyl isovalerate, beta-damascenone, beta-ionone, butyl acetate, butyl alcohol, butyric acid, coffee furanone, damascenone, decanal, delta-decalactone, delta-octalactone, diethyl disulfide, diethyl succinate, difurfuryl ether, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, eugenol, furaneol, furfural, furfuryl alcohol, furfuryl propionate, gamma decalactone, gamma-decalactone, gamma-nonalactone, gamma-valerolactone, geraniol, geranyl acetate, guaiacol, hexanal, hexanol, hexyl acetate, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, myrcene, nonanal, octanal, p-anisaldehyde, p-cresol, phenethyl acetate, phenylacetaldehyde, propanol, propionaldehyde, propionic acid, propyl propionate, pyrrole, sotolone, syringol, trans,trans-2,4-decadienal, trans-2-nonenal, valeraldehyde, valeric acid, vanillin erythro and/or threo-butan-2,3-diol acetal, and vanillyl ethyl ether.

Embodiment 339 is the method of any one of embodiments 202-337, wherein the VOCs comprise at least 20 compounds selected from the group consisting of 1-heptanol, 1-octanol, 1-octen-3-ol, 2,3-butanediol, 2,3-butanedione, 2,3-diethyl-5-methylpyrazine, 2,3-diethylpyrazine, 2,3-Hexanedione, 2,3-pentadione, 2,5-dimethylphenol, 2,5-dimethylpyrazine, 2,6-dimethylpyrazine, 2-acetyl-1-methylpyrrole, 2-acetyl-5-methylfuran, 2-acetylpyridine, 2-acetylpyrrole, 2-ethoxy-3-methylpyrazine, 2-ethyl-1-hexanol, 2-ethyl-4-hydroxy-5-methyl-3(2H)-furanone, 2-ethylfuran, 2-ethylpyrazine, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylbutyl isovalerate, 2-methylbutyraldehyde, 2-methylbutyric acid, 2-methylpyrazine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 3-ethylpyridine, 3-hexanone, 3-methylbutyric acid, 3-octanol, 3-octanone, 4-carvomenthenol, 4-ethyl guaiacol, 4-ethyl phenol, 4-ethylguaiacol, 4-hydroxy-5-methyl-3-furanone, 4-methyl-2-phenyl-2-pentenal, 4'-methylacetophenone, 4-vinylphenol, 5-methyl-2-phenyl-2-hexenal, 5-methylfurfural, acetoin acetate, amyl acetate, amyl alcohol, benzaldehyde, benzyl acetate, benzyl alcohol, benzyl isovalerate, beta-damascenone, beta-ionone, butyl acetate, butyl alcohol, butyric acid, coffee furanone, damascenone, decanal, delta-decalactone, delta-octalactone, diethyl disulfide, diethyl succinate, difurfuryl ether, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, eugenol, furaneol, furfural, furfuryl alcohol, furfuryl propionate, gamma decalactone, gamma-decalactone, gamma-nonalactone, gamma-valerolactone, geraniol, geranyl acetate, guaiacol, hexanal, hexanol, hexyl acetate, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, myrcene, nonanal, octanal, p-anisaldehyde, p-cresol, phenethyl acetate, phenylacetaldehyde, propanol, propionaldehyde, propionic acid, propyl propionate, pyrrole, sotolone, syringol, trans,trans-2,4-decadienal, trans-2-nonenal, valeraldehyde, valeric acid, vanillin erythro and/or threo-butan-2,3-diol acetal, and vanillyl ethyl ether.

Embodiment 340 is the method of any one of embodiments 202-337, wherein the VOCs comprise at least 30 compounds selected from the group consisting of 1-heptanol, 1-octanol, 1-octen-3-ol, 2,3-butanediol, 2,3-butanedione, 2,3-diethyl-5-methylpyrazine, 2,3-diethylpyrazine, 2,3-Hexanedione, 2,3-pentadione, 2,5-dimethylphenol, 2,5-dimethylpyrazine, 2,6-dimethylpyrazine, 2-acetyl-1-methylpyrrole, 2-acetyl-5-methylfuran, 2-acetylpyridine, 2-acetylpyrrole, 2-ethoxy-3-methylpyrazine, 2-ethyl-1-hexanol, 2-ethyl-4-hydroxy-5-methyl-3(2H)-furanone, 2-ethylfuran, 2-ethylpyrazine, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylbutyl isovalerate, 2-methylbutyraldehyde, 2-methylbutyric acid, 2-methylpyrazine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 3-ethylpyridine, 3-hexanone, 3-methylbutyric acid, 3-octanol, 3-octanone, 4-carvomenthenol, 4-ethyl guaiacol, 4-ethyl phenol, 4-ethylguaiacol, 4-hydroxy-5-methyl-3-furanone, 4-methyl-2-phenyl-2-pentenal, 4'-methylacetophenone, 4-vinylphenol, 5-methyl-2-phenyl-2-hexenal, 5-methylfurfural, acetoin acetate, amyl acetate, amyl alcohol, benzaldehyde, benzyl acetate, benzyl alcohol, benzyl isovalerate, beta-damascenone, beta-ionone, butyl acetate, butyl alcohol, butyric acid, coffee furanone, damascenone, decanal, delta-decalactone, delta-octalactone, diethyl disulfide, diethyl succinate, difurfuryl ether, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, eugenol, furaneol, furfural, furfuryl alcohol, furfuryl propionate, gamma decalactone, gamma-decalactone, gamma-nonalactone, gamma-valerolactone, geraniol, geranyl acetate, guaiacol, hexanal, hexanol, hexyl acetate, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, myrcene, nonanal, octanal, p-anisaldehyde, p-cresol, phenethyl acetate, phenylacetaldehyde, propanol, propionaldehyde, propionic acid, propyl propionate, pyrrole, sotolone, syringol, trans,trans-2,4-decadienal, trans-2-nonenal, valeraldehyde, valeric acid, vanillin erythro and/or threo-butan-2,3-diol acetal, and vanillyl ethyl ether.

Embodiment 341 is the method of any one of embodiments 202-337, wherein the VOCs comprise at least 40 compounds selected from the group consisting of 1-heptanol, 1-octanol, 1-octen-3-ol, 2,3-butanediol, 2,3-butanedione, 2,3-diethyl-5-methylpyrazine, 2,3-diethylpyrazine, 2,3-Hexanedione, 2,3-pentadione, 2,5-dimethylphenol, 2,5-dimethylpyrazine, 2,6-dimethylpyrazine, 2-acetyl-1-methylpyrrole, 2-acetyl-5-methylfuran, 2-acetylpyridine, 2-acetylpyrrole, 2-ethoxy-3-methylpyrazine, 2-ethyl-1-hexanol, 2-ethyl-4-hydroxy-5-methyl-3(2H)-furanone, 2-ethylfuran, 2-ethylpyrazine, 2-furfuryl acetate, 2-heptanol, 2-heptanone, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylbutyl isovalerate, 2-methylbutyraldehyde, 2-methylbutyric acid, 2-methylpyrazine, 2-nonanol, 2-nonanone, 2-octanol, 2-octanone, 2-pentanol, 2-pentylfuran, 2-phenyl-2-butenal, 2-phenylethanol, 2-phenylpropionaldehyde, 2-tridecanone, 2-undecanone, 3-ethylpyridine, 3-hexanone, 3-methylbutyric acid, 3-octanol, 3-octanone, 4-carvomenthenol, 4-ethyl guaiacol, 4-ethyl phenol, 4-ethylguaiacol, 4-hydroxy-5-methyl-3-furanone, 4-methyl-2-phenyl-2-pentenal, 4'-methylacetophenone, 4-vinylphenol, 5-methyl-2-phenyl-2-hexenal, 5-methylfurfural, acetoin acetate, amyl acetate, amyl alcohol, benzaldehyde, benzyl acetate, benzyl alcohol, benzyl isovalerate, beta-damascenone, beta-ionone, butyl acetate, butyl alcohol, butyric acid, coffee furanone, damascenone, decanal, delta-decalactone, delta-octalactone, diethyl disulfide, diethyl succinate, difurfuryl ether, dimethyl sulfide, dimethyl sulfoxide, dimethyl trisulfide, ethyl 2-methylbutyrate, ethyl 3-phenylpropionate, ethyl acetate, ethyl benzoate, ethyl butanoate, ethyl butyrate, ethyl cinnamate, ethyl decanoate, ethyl heptanoate, ethyl hexanoate, ethyl isobutyrate, ethyl isovalerate, ethyl lactate, ethyl laurate, ethyl maltol, ethyl myristate, ethyl octanoate, ethyl oleate, ethyl phenylacetate, ethyl salicylate, ethyl tiglate, ethyl valerate, eugenol, furaneol, furfural, furfuryl alcohol, furfuryl propionate, gamma decalactone, gamma-decalactone, gamma-nonalactone, gamma-valerolactone, geraniol, geranyl acetate, guaiacol, hexanal, hexanol, hexyl acetate, isoamyl acetate, isoamyl alcohol, isoamyl benzoate, isoamyl butyrate, isoamyl isobutyrate, isobutyl acetate, isobutyl alcohol, isobutyraldehyde, isobutyric acid, isoeugenol, isopropenyl pyrazine, isovaleraldehyde, isovaleric acid, limonene, linalool, maltol, massoia lactone, methanethiol, methional, methyl 2-methylbutyrate, methyl anthranilate, methyl benzoate, methyl cinnamate, methyl hexanoate, methyl nicotinate, methyl phenylacetate, methyl salicylate, myrcene, nonanal, octanal, p-anisaldehyde, p-cresol, phenethyl acetate, phenylacetaldehyde, propanol, propionaldehyde, propionic acid, propyl propionate, pyrrole, sotolone, syringol, trans,trans-2,4-decadienal, trans-2-nonenal, valeraldehyde, valeric acid, vanillin erythro and/or threo-butan-2,3-diol acetal, and vanillyl ethyl ether.

Embodiment 342 is the method of any one of embodiments 202-341, wherein the VOCs comprise at least 20 compounds selected from the group consisting of 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, coffee furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether.

Embodiment 343 is the method of any one of embodiments 202-341, wherein the VOCs comprise at least 30 compounds selected from the group consisting of 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, coffee furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether.

Embodiment 344 is the method of any one of embodiments 202-341, wherein the VOCs comprise at least 40 compounds selected from the group consisting of 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, coffee furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether.

Embodiment 345 is the method of any one of embodiments 202-341, wherein the VOCs comprise at least 40 compounds selected from the group consisting of 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, coffee furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether.

Embodiment 346 is the method of any one of embodiments 202-341, wherein the VOCs comprise 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3(2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, coffee furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether.

Embodiment 347 is the method of any one of embodiments 202-346, wherein the VOCs have less than about 95% identity to the VOCs in a single reference coffee.

Embodiment 348 is the method of any one of embodiments 202-346, wherein the VOCs have less than about 85% identity to the VOCs in a single reference coffee.

Embodiment 349 is the method of any one of embodiments 202-348, wherein the coffee replica comprises at least 41 VOCs and wherein no more than 40 of the VOCs are found in a single reference coffee.

Embodiment 350 is the method of any one of embodiments 202-348, wherein the coffee replica comprises at least 51 VOCs and wherein no more than 50 of the VOCs are found in a single reference coffee.

Embodiment 351 is the method of any one of embodiments 202-350, wherein the one or more non-volatile compounds do not comprise at least one compound selected from the group consisting of 2(5H)-furanone, 2,3,5,6-tetramethylpyrazine, 2,3,5-trimethylpyrazine, 2,3-dimethylpyrazine, 2-ethyl-2-hydroxybutyric acid, 2-furoic acid, 2-isopropylmalic acid, 3,4-dihydroxybenzoic acid, 4-methoxycinnamic acid, 5-ethyl-4-hydroxy-2-methyl-3 (2H)-furanone, adenine, arabitol, betaine, caffeic acid, caffeine, choline, citric acid, cytidine, D-gluconic acid, D-glucuronic acid, fructose, galactose, glucose, glutamic acid, hydroxymethylfurfural, lactic acid, malic acid, mannitol, methyl-2-pyrrolyl ketone, inositol, pyruvic acid, quinic acid, sorbitol, sotolon, succinic acid, syringic acid, tartaric acid, tryptamine, uracil, and vanillic acid.

Embodiment 352 is the method of any one of embodiments 202-351, wherein the one or more non-volatile compounds do not comprise at least one compound selected from the group consisting of 2(5H)-furanone, 2,3,5,6-tetramethylpyrazine, 2-ethyl-2-hydroxybutyric acid, 2-furoic acid, 2-isopropylmalic acid, 3,4-dihydroxybenzoic acid, 4-methoxycinnamic acid, 5-ethyl-4-hydroxy-2-methyl-3 (2H)-furanone, adenine, arabitol, betaine, caffeic acid, cytidine, D-gluconic acid, D-glucuronic acid, fructose, galactose, glucose, glutamic acid, hydroxymethylfurfural, malic acid, mannitol, methyl-2-pyrrolyl ketone, inositol, pyruvic acid, quinic acid, sorbitol, syringic acid, tartaric acid, tryptamine, and uracil.

Embodiment 353 is the method of any one of embodiments 202-352, wherein the one or more non-volatile compounds comprise at least one compound selected from the group consisting of acetovanillone, adipic acid, AMP, arginine, carnosine, cinnamic acid, citrulline, CMP, coumaric acid, cysteine, cystine, epicatechin, epicatechin gallate, GABA, glucosamine, glutamine, guanine, hesperetin, histidine, isoleucine, kynurenic acid, leucine, lysine, mannose, methionine, methyl gallate, ornithine, pantothenic acid, pipecolinic acid, piperine, polydatin, pyridoxine, quercetin, resveratrol, rutin, sinapinic acid, sorbic acid, syringaldehyde, threonine, trans-4-hydroxyproline, tryptophan, tyramine, and tyrosine.

Embodiment 354 is the method of any one of embodiments 202-353, wherein 2,3,5-trimethylpyrazine is present in an amount less than about 0.006 mg/L.

Embodiment 355 is the method of any one of embodiments 202-354, wherein 2,3-dimethylpryazine is present in an amount less than about 0.12 mg/L.

Embodiment 356 is the method of any one of embodiments 202-355, wherein sotolon is present in an amount of less than about 31 mg/L.

Embodiment 357 is the method of any one of embodiments 202-356, wherein vanillin is present in an amount of at least about 0.23 mg/L.

Embodiment 358 is the method of any one of embodiments 202-357, wherein the one or more non-volatile compounds comprise one or more of: an acid, an aldehyde, an alkaloid, an amine, an amino acid, a furan, a ketone, a lactone, a nucleotide, a nucleotide monophosphate, or nucleobase, a protein or peptide, a pyrazine, a pyridine, a sugar or sugar alcohol, a tannin, phenol, polyphenol, or anthocyanin, or a xanthine.

Embodiment 359 is the method of any one of embodiments 202-358, wherein the one or more non-volatile compounds comprise one or more of: an acid, an aldehyde, an amino acid, a lactone, a pyrazine, a tannin, phenol, polyphenol, or anthocyanin, or a xanthine.

Embodiment 360 is the method of any one of embodiments 202-359, wherein the one or more non-volatile compounds comprise one or more acids.

Embodiment 361 is the method of embodiment 360, wherein the one or more acids comprise at least one acid selected from the group consisting of 2-furoic acid, 2-isopropylmalic acid, 3,4-dihydroxybenzoic acid, 4-guanidinobutyric acid, 4-methoxycinnamic acid, adipic acid, caffeic acid, cinnamic acid, citric acid, coumaric acid, D-gluconic acid, D-glucuronic acid, DL-hydroxystearic acid, fumaric acid, glutamic acid, kynurenic acid, lactic acid, malic acid, pantothenic acid, pyruvic acid, quinic acid, sorbic acid, succinic acid, and tartaric acid.

Embodiment 362 is the method of embodiment 361, wherein the one or more acids comprise at least one acid selected from the group consisting of citric acid, lactic acid, and succinic acid.

Embodiment 363 is the method of any one of embodiments 202-362, wherein the one or more non-volatile compounds comprise one or more aldehydes.

Embodiment 364 is the method of embodiment 363, wherein the one or more aldehydes comprise vanillin.

Embodiment 365 is the method of embodiment 363 or embodiment 364, wherein the aldehydes are present in an amount of at least about 0.25 mg/L.

Embodiment 366 is the method of any one of embodiments 202-365, wherein the one or more non-volatile compounds comprise one or more alkaloids.

Embodiment 367 is the method of embodiment 366, wherein the one or more alkaloids comprise piperine.

Embodiment 368 is the method of any one of embodiments 202-367, wherein the one or more non-volatile compounds comprise one or more amines.

Embodiment 369 is the method of embodiment 368, wherein the one or more amines comprise tryptamine.

Embodiment 370 is the method of any one of embodiments 202-369, wherein the one or more non-volatile compounds comprise one or more amino acids.

Embodiment 371 is the method of embodiment 370, wherein the one or more amino acids comprise at least one amino acid selected from the group consisting of arginine, asparagine, aspartic acid, beta-alanine, betaine, carnitine, choline, citrulline, cysteine, cystine, GABA, glutamine, glycine, histidine, homoserine, isoleucine, leucine, lysine, methionine, ornithine, phenylalanine, pipecolinic acid, proline, serine, threonine, trans-4-hydroxyproline, tryptophan, tyrosine, and valine.

Embodiment 372 is the method of embodiment 371, wherein the one or more amino acids comprise at least one amino acid selected from the group consisting of aspartic acid and choline.

Embodiment 373 is the method of any one of embodiments 202-372, wherein the one or more non-volatile compounds comprise one or more furans.

Embodiment 374 is the method of embodiment 373, wherein the one or more furans comprise hydroxymethylfurfural.

Embodiment 375 is the method of any one of embodiments 202-374, wherein the one or more non-volatile compounds comprise one or more ketones.

Embodiment 376 is the method of embodiment 375, wherein the one or more ketones comprise at least one ketone selected from the group consisting of 2(5H)-furanone, 5-ethyl-4-hydroxy-2-methyl-3(2H)-furanone, acetovanillone, and methyl-2-pyrrolyl ketone.

Embodiment 377 is the method of any one of embodiments 202-276, wherein the one or more non-volatile compounds comprise one or more lactones.

Embodiment 378 is the method of embodiment 377, wherein the one or more lactones comprise sotolon.

Embodiment 379 is the method of any one of embodiments 202-378, wherein the one or more non-volatile compounds comprise one or more nucleotides, nucleotide monophosphates, or nucleobases.

Embodiment 380 is the method of embodiment 379, wherein the one or more nucleotides, nucleotide monophosphates, or nucleobases comprise at least one nucleotides, nucleotide monophosphates, or nucleobase selected from the group consisting of adenine, AMP, CMP, cytidine, cytosine, guanine, and uracil.

Embodiment 381 is the method of any one of embodiments 202-380, wherein the one or more non-volatile compounds comprise one or more proteins or peptides.

Embodiment 382 is the method of embodiment 381, wherein the one or more proteins or peptides comprise carnosine.

Embodiment 383 is the method of any one of embodiments 202-382, wherein the one or more non-volatile compounds comprise one or more pyrazines.

Embodiment 384 is the method of embodiment 383, wherein the one or more pyrazines comprise at least one pyrazine selected from the group consisting of 2,3,5,6-tetramethylpyrazine, 2,3,5-trimethylpyrazine, and 2,3-dimethylpyrazine.

Embodiment 385 is the method of embodiment 383, wherein the one or more pyrazines comprise at least one pyrazine selected from the group consisting of 2,3,5-trimethylpyrazine and 2,3-dimethylpyrazine.

Embodiment 386 is the method of any one of embodiments 202-385, wherein the one or more non-volatile compounds comprise one or more pyridines.

Embodiment 387 is the method of embodiment 386, wherein the one or more pyridines comprise at least one pyridine selected from the group consisting of pyridine and pyroxidine.

Embodiment 388 is the method of any one of embodiments 202-387, wherein the one or more non-volatile compounds comprise one or more sugars or sugar alcohols.

Embodiment 389 is the method of embodiment 388, wherein the one or more sugars or sugar alcohols comprise at least one sugar or sugar alcohol selected from the group consisting of arabitol, fructose, galactose, glucosamine, glucose, mannitol, mannose, inositol, rhamnose, ribose, sorbitol, xylose.

Embodiment 390 is the method of any one of embodiments 202-389, wherein the one or more non-volatile compounds comprise one or more tannins, phenols, polyphenols, or anthocyanins.

Embodiment 391 is the method of embodiment 390, wherein the one or more tannins, phenols, polyphenols, or anthocyanins comprise at least one tannin, phenol, polyphenol, or anthocyanin selected from the group consisting of catechin, ellagic acid, epicatechin, epicatechin gallate, gallic acid, hesperetin, methyl gallate, polydatin, propyl gallate, quercetin, resveratrol, rutin, salicylic acid, sinapinic acid, syringaldehyde, syringic acid, trans-ferulic acid, tyramine, and vanillic acid.

Embodiment 392 is the method of embodiment 390, wherein the one or more tannins, phenols, polyphenols, or anthocyanins comprise at least one tannin, phenol, polyphenol, or anthocyanin selected from the group consisting of trans-ferulic acid and vanillic acid.

Embodiment 393 is the method of any one of embodiments 202-392, wherein the one or more non-volatile compounds comprise one or more xanthines.

Embodiment 394 is the method of embodiment 393, wherein the one or more xanthines comprise caffeine.

Embodiment 395 is the method of any one of embodiments 202-394, wherein the one or more nonvolatile compounds comprise at least 10 compounds selected from the group consisting of 2(5H)-furanone, 2,3,5,6-tetramethylpyrazine, 2,3,5-trimethylpyrazine, 2,3-dimethylpyrazine, 2-ethyl-2-hydroxybutyric acid, 2-furoic acid, 2-isopropylmalic acid, 3,4-dihydroxybenzoic acid, 4-guanidinobutyric acid, 4-methoxycinnamic acid, 5-ethyl-4-hydroxy-2-methyl-3(2H)-furanone, acetovanillone, adenine, adipic acid, AMP, arabitol, arginine, asparagine, aspartic acid, beta-alanine, betaine, caffeic acid, caffeine, carnitine, carnosine, catechin, choline, cinnamic acid, citric acid, citrulline, CMP, coumaric acid, cysteine, cystine, cytidine, cytosine, D-gluconic acid, D-glucuronic acid, DL-hydroxystearic acid, ellagic acid, epicatechin, epicatechin gallate, fructose, fumaric acid, GABA, galactose, gallic acid, glucosamine, glucose, glutamic acid, glutamine, glycine, guanine, hesperetin, histidine, homoserine, hydroxymethylfurfural, isoleucine, kynurenic acid, lactic acid, leucine, lysine, malic acid, mannitol, mannose, methionine, methyl gallate, methyl-2-pyrrolyl ketone, inositol, ornithine, pantothenic acid, phenylalanine, pipecolinic acid, piperine, polydatin, proline, propyl gallate, pyridine, pyridoxine, pyruvic acid, quercetin, quinic acid, resveratrol, rhamnose, ribose, rutin, salicylic acid, serine, sinapinic acid, sorbic acid, sorbitol, sotolon, succinic acid, syringaldehyde, syringic acid, tartaric acid, threonine, trans-4-hydroxyproline, trans-ferulic acid, tryptamine, tryptophan, tyramine, tyrosine, uracil, valine, vanillic acid, vanillin, and xylose.

Embodiment 396 is the method of any one of embodiments 202-395, wherein the one or more non-volatile compounds comprise at least 5 compounds selected from the group consisting of 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin.

Embodiment 397 is the method of any one of embodiments 202-396, wherein the one or more non-volatile compounds comprise at least 10 compounds selected from the group consisting of 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin.

Embodiment 398 is the method of any one of embodiments 202-395, wherein the one or more non-volatile compounds comprise 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin.

Embodiment 399 is the method of any one of embodiments 202-398, wherein the one or more non-volatile compounds have less than about 95% identity to the non-volatile compounds in a single reference coffee.

Embodiment 400 is the method of any one of embodiments 202-399, wherein the one or more non-volatile compounds have less than about 85% identity to the non-volatile compounds in a single reference coffee.

Embodiment 401 is the method of any one of embodiments 202-400, wherein the coffee replica comprises at least 11 non-volatile compounds and wherein no more than 10 of the non-volatile compounds are found in a single reference coffee.

Embodiment 402 is the method of any one of embodiments 202-401, wherein the coffee replica does not comprise one or more of *E. coli, Salmonella* sp., *Brettanomyces* sp., *Lactobacillales, Saccharomyces* sp., *Acremonium strictum, Chrysonilia sitophila, Cladosporium oxysporum, Fusarium oxysporum, Mortierella alpina, Mucor plumbeus, Paecilomyces viridis, Penicillium chrysogenum, Penicillium citreonigrum, Penicillium decumbens, Penicillium purpurogenum, Trichoderma longibrachiatum, Trichoderma viride, Verticillium psalliotae,* mold, mildew, rot, insects, insect eggs, insect filth, rodent filth, mammalian excreta, insect lecithins, hydrogen sulfide, hydrogen disulfide, 2,4,6-trichloranisole, 2,4,6,-tribromoanisole, aflatoxin, aldrin, dieldrin, benzene hexachloride, chlordane, dichlorodiphenyltrichloroethane (DDT), dichlorodiphenyldichloroethylene (DDE), dichlorodiphenyldichloroethane (TDE), dimethylnitrosamine (nitrosodimethylamine), ethylene dibromide (EDB), heptachlor, heptachlor epoxide, lindane, mercury, methanol, ethylene glycol, dichloromethane, and heavy metals.

Embodiment 403 is the method of any one of embodiments 202-402, wherein the coffee replica is a solution, suspension, or emulsion.

Embodiment 404 is the method of embodiment 403, wherein the solution, suspension, or emulsion is a ready-to-drink beverage.

Embodiment 405 is the method of embodiment 403, wherein the solution, suspension, or emulsion is a coffee concentrate.

Embodiment 406 is the method of embodiment 405, wherein the coffee concentrate is about 2-fold to about 2000-fold concentrated.

Embodiment 407 is the method of embodiment 405, wherein the coffee concentrate is about 5-fold to about 20-fold concentrated.

Embodiment 408 is the method of embodiment 405, wherein the coffee concentrate is about 500-fold to about 1500-fold concentrated.

Embodiment 409 is the method of any one of embodiments 202-402, wherein the coffee replica is a solid.

Embodiment 410 is the method of embodiment 409, wherein the coffee replica is a coffee granule replica.

Embodiment 411 is the method of embodiment 410, wherein the coffee granule replica is soluble in water.

Embodiment 412 is the method of embodiment 409, wherein the coffee replica is a coffee grounds replica.

Embodiment 413 is the method of embodiment 412, wherein the coffee grounds replica comprises a solid substrate.

Embodiment 414 is the method of embodiment 413, wherein the solid substrate comprises processed or unprocessed grains or grain products, legumes or legume seeds, oil plants or seeds, fruits or fruit products, roots, tubers, or root or tuber products, sugar processing by-products, or other plant by-products.

Embodiment 415 is the method of embodiment 413 or embodiment 414, wherein the solid substrate comprises grape seeds.

Embodiment 416 is a coffee replica comprising one or more VOCs and one or more non-volatile compounds, wherein (a) the one or more VOCs comprise at least one VOC that is not present in a corresponding reference coffee, (b) the one or more VOCs do not comprise at least one VOC that is present in a corresponding reference coffee, (c) the one or more non-volatile compounds comprise at least one non-volatile compound that is not present in a corresponding reference coffee, or (d) the one or more non-volatile compounds do not comprise at least one non-volatile compound that is present in a corresponding reference coffee.

Embodiment 417 is the coffee replica of embodiment 416, wherein the one or more VOCs comprise at least one VOC that is not present in a corresponding reference coffee.

Embodiment 418 is the coffee replica of embodiment 416 or embodiment 417, wherein the one or more VOCs do not comprise at least one VOC that is present in a corresponding reference coffee.

Embodiment 419 is the coffee replica of any one of embodiments 416-418, wherein the one or more non-volatile compounds comprise at least one non-volatile compound that is not present in a corresponding reference coffee.

Embodiment 420 is the coffee replica of any one of embodiments 416-419, wherein the one or more non-volatile compounds do not comprise at least one non-volatile compound that is present in a corresponding reference coffee.

Embodiment 421 is the coffee replica of any one of embodiments 416-420, wherein the one or more VOCs do not comprise at least one compound selected from the group consisting of alpha-methyl-alpha-[4-methyl-3-pentenyl]oxiranemethanol; beta-myrcene; 1-(2-furanylmethyl)-1H-pyrrole; 1-ethyl-1H-pyrrole; 1-methyl-1H-pyrrole; 1-methyl-1H-pyrrole-2-carboxaldehyde; 1-methyl-1,2,3,6-tetrahydropyridine; 2-amino-1-naphthalenol; 2,3-butanedione; 2-butanone; 2,3-dimethyl-2-cyclopenten-1-one; 2-methyl-2-cyclopenten-1-one; 3-ethyl-2-hydroxy-2-cyclopenten-1-one; 5-methyl-2-furancarboxaldehyde; 2-furanmethanol acetate; 2-furanmethanol propanoate; 1-hydroxy-2-propanone; 2-vinylfuran; dihydro-2-methyl-3(2H)-furanone; 3-furaldehyde; 3-furanmethanol; 3-pyridinol; 5-amino-1-naphthol; acetic acid; acetic acid, 2-(dimethylamino)ethyl ester; acetic acid, methyl ester; acetone; 2-methoxy-benzenamine; 2-methyl-butanal; 3-methyl-butanal; 4-hydroxy-butanoic acid; dimethyl disulfide; N,N-dimethyl-ethanamine; 1-(1H-pyrrol-2-yl)-ethanone; 1-(2-furanyl)-ethanone; 1-(2-hydroxy-5-methylphenyl)-ethanone; furan; 2-(2-furanylmethyl)-5-methyl-furan; 2-(2-propenyl)-furan; 2-(methoxymethyl)-furan; 2,2'-methylenebis-furan; 2,5-dimethyl-furan; 2-[(methylthio)methyl]-furan; 2-methyl-furan; 3-methyl-furan; furfural; furfuryl formate; indole; N,N-dimethyl-methylamine; 2,7-dimethyl-oxepine; p-cresol; phenol; 2-methoxy-phenol; 2-methyl-phenol; 4-ethyl-2-methoxy-phenol; 1-methyl-piperidine; pyrazine; 2-(n-propyl)-pyrazine; 2,3-dimethyl-pyrazine; 2,5-dimethyl-pyrazine; 2,6-diethyl-pyrazine; 2,6-dimethyl-pyrazine; 2-ethyl-3-methyl-pyrazine; 2-ethyl-6-methyl-pyrazine; 3,5-diethyl-2-methyl-pyrazine; 3-ethyl-2,5-dimethyl-pyrazine; ethyl-pyrazine; methyl-pyrazine; pyridine; 2-methyl-pyridine; 3-ethyl-pyridine; 3-methyl-pyridine; 3-propyl-pyridine; styrene; thiophene; and toluene.

Embodiment 422 is the coffee replica of any one of embodiments 416-421, wherein the one or more VOCs do not comprise 1-methyl-1,2,3,6-tetrahydropyridine.

Embodiment 423 is the coffee replica of any one of embodiments 416-422, wherein the VOCs comprise one or more of: a hydrocarbon, an alcohol, an aldehyde, a ketone, an acid, an ester, a lactone, a phenol, a furan, a thiophene, a pyrrole, an oxazole, a thiazole, a pyridine, a pyrazine, an amine, and a sulfur compound.

Embodiment 424 is the coffee replica of any one of embodiments 416-423, wherein the VOCs comprise one or more of: a hydrocarbon, an alcohol, an aldehyde, a ketone, an acid, an ester, a phenol, a furan, a thiophene, a pyrrole, a pyridine, a pyrazine, an amine, and a sulfur compound.

Embodiment 425 is the coffee replica of any one of embodiments 416-424, wherein the VOCs comprise a hydrocarbon.

Embodiment 426 is the coffee replica of embodiment 425, wherein the hydrocarbon is selected from the group consisting of beta-myrcene, styrene, toluene, and combinations thereof Embodiment 427 is the coffee replica of any one of embodiments 416-426, wherein the VOCs comprise an alcohol.

Embodiment 428 is the coffee replica of embodiment 427, wherein the alcohol is alpha-methyl-alpha-[4-methyl-3-pentenyl]oxiranemethanol.

Embodiment 429 is the coffee replica of any one of embodiments 416-428, wherein the VOCs comprise an aldehyde.

Embodiment 430 is the coffee replica of embodiment 429, wherein the aldehyde is selected from the group consisting of 5-methyl-2-furancarboxaldehyde, 3-furaldehyde, 2-methyl-butanal, 3-methyl-butanal, furfural, and combinations thereof.

Embodiment 431 is the coffee replica of any one of embodiments 416-430, wherein the VOCs comprise a ketone.

Embodiment 432 is the coffee replica of embodiment 431, wherein the ketone is selected from the group consisting of 2,3-butanedione, 2-butanone, 2,3-dimethyl-2-cyclopenten-1-one, 2-methyl-2-cyclopenten-1-one, 3-ethyl-2-hydroxy-2-cyclopenten-1-one, 1-hydroxy-2-propanone, dihydro-2-methyl-3(2H)-furanone, acetone, and combinations thereof.

Embodiment 433 is the coffee replica of any one of embodiments 416-432, wherein the VOCs comprise an acid.

Embodiment 434 is the coffee replica of embodiment 433, wherein the acid is selected from the group consisting of 4-hydroxy-butanoic acid, acetic acid, and combinations thereof.

Embodiment 435 is the coffee replica of any one of embodiments 416-434, wherein the VOCs comprise an ester.

Embodiment 436 is the coffee replica of embodiment 435, wherein the ester is selected from the group consisting of 2-furanmethanol acetate; 2-furanmethanol propanoate; acetic acid, 2-(dimethylamino)ethyl ester; acetic acid, methyl ester; furfuryl formate; and combinations thereof.

Embodiment 437 is the coffee replica of any one of embodiments 416-436, wherein the VOCs comprise a lactone.

Embodiment 438 is the coffee replica of any one of embodiments 416-437, wherein the VOCs comprise a phenol.

Embodiment 439 is the coffee replica of embodiment 438, wherein the phenol is selected from the group consisting of 1-(2-hydroxy-5-methylphenyl)-ethanone, p-cresol, phenol, 2-methoxy-phenol, 2-methyl-phenol, 4-ethyl-2-methoxy-phenol, and combinations thereof.

Embodiment 440 is the coffee replica of any one of embodiments 416-439, wherein the VOCs comprise a furan.

Embodiment 441 is the coffee replica of embodiment 440, wherein the furan is selected from the group consisting of 2-vinylfuran, 3-furanmethanol, 1-(2-furanyl)-ethanone, furan, 2-(2-furanylmethyl)-5-methyl-furan, 2-(2-propenyl)-furan, 2-(methoxymethyl)-furan, 2,2'-methylenebis-furan, 2,5-dimethyl-furan, 2-[(methylthio)methyl]-furan, 2-methyl-furan, 3-methyl-furan, and combinations thereof.

Embodiment 442 is the coffee replica of any one of embodiments 416-441, wherein the VOCs comprise a thiophene.

Embodiment 443 is the coffee replica of embodiment 442, wherein the thiophene is thiophene.

Embodiment 444 is the coffee replica of any one of embodiments 416-443, wherein the VOCs comprise a pyrrole.

Embodiment 445 is the coffee replica of embodiment 444, wherein the pyrrole is selected from the group consisting of 1-(2-furanylmethyl)-1H-pyrrole, 1-ethyl-1H-pyrrole, 1-methyl-1H-pyrrole, 1-methyl-1H-pyrrole-2-carboxaldehyde, 1-(1H-pyrrol-2-yl)-ethanone, indole, and combinations thereof.

Embodiment 446 is the coffee replica of any one of embodiments 416-445, wherein the VOCs comprise a pyridine.

Embodiment 447 is the coffee replica of embodiment 446, wherein the pyridine is selected from the group consisting of 1-methyl-1,2,3,6-tetrahydropyridine, 3-pyridinol, 1-methyl-piperidine, pyridine, 2-methyl-pyridine, 3-ethyl-pyridine, 3-methyl-pyridine, 3-propyl-pyridine, and combinations thereof.

Embodiment 448 is the coffee replica of any one of embodiments 416-447, wherein the VOCs comprise a pyrazine.

Embodiment 449 is the coffee replica of embodiment 448, wherein the pyrazine is selected from the group consisting of pyrazine, 2-(n-propyl)-pyrazine, 2,3-dimethyl-pyrazine, 2,5-dimethyl-pyrazine, 2,6-diethyl-pyrazine, 2,6-dimethyl-pyrazine, 2-ethyl-3-methyl-pyrazine, 2-ethyl-6-methyl-pyrazine, 3,5-diethyl-2-methyl-pyrazine, 3-ethyl-2,5-dimethyl-pyrazine, ethyl-pyrazine, methyl-pyrazine, and combinations thereof.

Embodiment 450 is the coffee replica of embodiment 448 or embodiment 449, wherein the pyrazine is present in an amount of at least 2-fold the amount of pyrazines in a corresponding reference coffee.

Embodiment 451 is the coffee replica of any one of embodiments 416-450, wherein the VOCs comprise an amine.

Embodiment 452 is the coffee replica of embodiment 451, wherein the amine is selected from the group consisting of 2-amino-1-naphthalenol, 5-amino-1-naphthol, and combinations thereof.

Embodiment 453 is the coffee replica of any one of embodiments 416-452, wherein the VOCs comprise a sulfur compound.

Embodiment 454 is the coffee replica of embodiment 453, wherein the sulfur compound is dimethyl disulfide.

Embodiment 455 is the coffee replica of any one of embodiments 416-454, wherein the VOCs comprise 2,7-dimethyl-oxepine.

Embodiment 456 is the coffee replica of any one of embodiments 416-455, wherein the non-volatile compounds comprise one or more compounds selected from the group consisting of arginine, asparagine, beta-alanine, carnitine, carnosine, citrulline, cystine, fumaric acid, GABA, glucosamine, glutamine, glycine, histidine, homoserine, isoleucine, kynurenic acid, leucine, lysine, mannose, methionine, ornithine, pipecolinic acid, proline, serine, threonine, trans-4-hydroxyproline, tryptophan, and tyrosine.

Embodiment 457 is the coffee replica of any one of embodiments 416-456, wherein the non-volatile compounds do not comprise one or more compounds selected from the group consisting of 2-furoic acid, 2-isopropylmalic acid, 3,4-dihydroxybenzoic acid, arabitol, aspartic acid, betaine, citric acid, D-glucuronic acid, fructose, galactose, gallic acid, glucose, glutamic acid, lactic acid, malic acid, mannitol, inositol, phenylalanine, pyruvic acid, quinic acid, sorbitol, succinic acid, tartaric acid, and valine.

Embodiment 458 is the coffee replica of any one of embodiments 416-457, wherein the non-volatile compounds include one or more of the following: an acid; an amino acid or derivative thereof, a sugar or a sugar alcohol; a xanthine; a fat or a wax; a starch, a fiber, a gums or a polysaccharide; a tannin, a polyphenol, or an anthocyanin; a pH modifier; a coloring agent; a surfactant or an emulsifier; a mineral or a metal; a preservative; an antioxidant; or a proteins or a peptide.

Embodiment 459 is the coffee replica of any one of embodiments 416-458, wherein the non-volatile compounds comprise an amino acid or a derivative thereof.

Embodiment 460 is the coffee replica of embodiment 459, wherein the amino acid or derivative thereof is selected from the group consisting of arginine, asparagine, aspartic acid, beta-alanine, betaine, carnitine, citrulline, cystine, gamma-aminobutyric acid (GABA), glutamine, glutamic acid, glycine, histidine, homoserine, isoleucine, leucine, lysine, methionine, ornithine, phenylalanine, pipecolinic acid, proline, serine, threonine, trans-4-hydroxyproline, tryptophan, tyrosine, valine, and combinations thereof.

Embodiment 461 is the coffee replica of embodiment 460, wherein the non-volatile compounds comprise an acid.

Embodiment 462 is the coffee replica of embodiment 461, wherein the acid is selected from the group consisting of 2-furoic acid, 2-isopropylmalic acid, 3,4-dihydroxybenzoic acid, citric acid, D-glucuronic acid, fumaric acid, kynurenic acid, lactic acid, malic acid, pyruvic acid, quinic acid, succinic acid, tartaric acid, and combinations thereof.

Embodiment 463 is the coffee replica of any one of embodiments 416-462, wherein the non-volatile compounds comprise a sugar or a sugar alcohol.

Embodiment 464 is the coffee replica of embodiment 463, wherein the sugar or sugar alcohol is selected from the group consisting of arabitol, fructose, galactose, glucosamine, glucose, mannitol, mannose, inositol, rhamnose, ribose, sorbitol, xylose, and combinations thereof.

Embodiment 465 is the coffee replica of any one of embodiments 416-464, wherein the non-volatile compounds comprise a tannin, polyphenol, or anthocyanin.

Embodiment 466 is the coffee replica of embodiment 465, wherein the tannin, polyphenol, or anthocyanin is gallic acid.

Embodiment 467 is the coffee replica of any one of embodiments 416-466, wherein the non-volatile compounds comprise a protein or a peptide.

Embodiment 468 is the coffee replica of embodiment 467, wherein the protein or polypeptide is carnosine.

Embodiment 469 is the coffee replica of any one of embodiments 416-468, wherein the coffee replica is a liquid.

Embodiment 470 is the coffee replica of embodiment 469, further comprising water.

Embodiment 471 is the coffee replica of any one of embodiments 416-468, wherein the coffee replica is a solid.

Embodiment 472 is the coffee replica of embodiment 471, wherein the coffee replica is a coffee granule replica.

Embodiment 473 is the coffee replica of embodiment 471, wherein the coffee replica comprises a solid substrate.

Embodiment 474 is the coffee replica of embodiment 473, wherein the solid substrate comprises processed or unprocessed grains or grain products, legumes or legume seeds, oil plants or seeds, fruits or fruit products, roots, tubers, or root or tuber products, sugar processing by-products, or other plant by-products.

Embodiment 475 is a method of preparing a coffee replica comprising two or more VOCs and two or more non-volatile compounds, the method comprising:

forming an aqueous solution comprising water, at least one VOC that is water-soluble, and at least one non-volatile compound that is water-soluble;

forming an emulsion comprising an oil, at least one VOC that is fat-soluble, and at least one non-volatile compound that is fat-soluble; and mixing the aqueous solution and the emulsion to form a flavor mixture.

Embodiment 476 is the method of embodiment 475, wherein forming an emulsion comprises homogenizing.

Embodiment 477 is the method embodiment 475 or embodiment 476, wherein the oil comprises corn oil, sunflower oil, or coconut oil.

Embodiment 478 is the method of any one of embodiments 475-477, wherein the coffee replica is a coffee concentrate replica or a coffee beverage replica.

Embodiment 479 is the method of embodiment 478, wherein the method further comprises processing the flavor mixture to commercial sterility.

Embodiment 480 is the method of embodiment 479, wherein processing the flavor mixture to commercial sterility comprises (a) ultra clean processing, (b) UHT aseptic processing, (c) HTST inline processing with sterile filling, (d) hot fill packaging, or (e) cold fill tunnel pasteurization.

Embodiment 481 is the method of embodiment 479, wherein processing the flavor mixture to commercial sterility comprises (a) ultra clean processing, (b) UHT aseptic processing, (c) fill and retort processing, (d) fill then Ohmic sterilization, or (e) UV/PEF inline sterilization and aseptic filling.

Embodiment 482 is the method of any one of embodiments 475-477, wherein the coffee replica is a coffee granule replica.

Embodiment 483 is the method of embodiment 482, wherein the method further comprises agglomerating the flavor mixture.

Embodiment 484 is the method of embodiment 483, wherein agglomerating the flavor mixture comprises pneumatic mixing, steam-jet, fluid-bed, pan, or spray drying, drum, mixer, roller, or extrusion agglomeration.

Embodiment 485 is the method of any one of embodiments 475-477, wherein the coffee replica is a coffee bean replica or a coffee grounds replica.

Embodiment 486 is the method of embodiment 485, wherein the method further comprises applying the flavor mixture to a solid substrate to form a coated solid substrate.

Embodiment 487 is the method the method of embodiment 485, wherein applying the flavor mixture comprises spray applying the flavor mixture.

Embodiment 488 is the method of embodiment 486 or embodiment 487, wherein the solid substrate comprises processed or unprocessed grains or grain products, legumes or legume seeds, oil plants or seeds, fruits or fruit products, roots, tubers, or root or tuber products, sugar processing by-products, or other plant by-products.

Embodiment 489 is the method of any one of embodiments 486-488, wherein the coffee replica is a coffee bean replica.

Embodiment 490 is the method of embodiment 489, wherein the method further comprises adding a tableting aid to the coated solid substrate.

Embodiment 491 is the method of embodiment 490, wherein the tableting aid comprises a starch, a sugar, a gum, or a combination thereof.

Embodiment 492 is the method of any one of embodiments 489-491, wherein the method further comprises forming the coated solid substrate into a coffee bean-like shape to form a coffee bean replica.

Embodiment 493 is the method of embodiment 492, wherein forming the coated solid substrate material into a coffee bean-like shape comprises using a rotary pill press.

Embodiment 494 is the method of embodiment 492 or embodiment 493, wherein the method further comprises coating the coffee bean replica.

Embodiment 495 is the method of embodiment 494, wherein coating the coffee bean replica comprises coating the coffee bean replica with shellac, zein protein, or wax.

Embodiment 496 is the method of any one of embodiments 475-495, wherein the two or more VOCs comprise at least one VOC that is not present in a corresponding reference coffee.

Embodiment 497 is the method of any one of embodiments 475-496, wherein the two or more VOCs do not comprise at least one VOC that is present in a corresponding reference coffee.

Embodiment 498 is the method of any one of embodiments 475-497, wherein the two or more non-volatile compounds comprise at least one non-volatile compound that is not present in a corresponding reference coffee.

Embodiment 499 is the method of any one of embodiments 475-498, wherein the two or more non-volatile compounds do not comprise at least one non-volatile compound that is present in a corresponding reference coffee.

Embodiment 500 is the method of any one of embodiments 475-499, wherein the two or more VOCs do not comprise at least one compound selected from the group consisting of alpha-methyl-alpha-[4-methyl-3-pentenyl]oxiranemethanol; beta-myrcene; 1-(2-furanylmethyl)-1H-pyrrole; 1-ethyl-1H-pyrrole; 1-methyl-1H-pyrrole; 1-methyl-1H-pyrrole-2-carboxaldehyde; 1-methyl-1,2,3,6-tetrahydropyridine; 2-amino-1-naphthalenol; 2,3-butanedione; 2-butanone; 2,3-dimethyl-2-cyclopenten-1-one; 2-methyl-2-cyclopenten-1-one; 3-ethyl-2-hydroxy-2-cyclopenten-1-one; 5-methyl-2-furancarboxaldehyde; 2-furanmethanol acetate; 2-furanmethanol propanoate; 1-hydroxy-2-propanone; 2-vinylfuran; dihydro-2-methyl-3 (2H)-furanone; 3-furaldehyde; 3-furanmethanol; 3-pyridinol; 5-amino-1-naphthol; acetic acid; acetic acid, 2-(dimethylamino)ethyl ester; acetic acid, methyl ester; acetone; 2-methoxy-benzenamine; 2-methyl-butanal; 3-methyl-butanal; 4-hydroxy-butanoic acid; dimethyl disulfide; N,N-dimethyl-ethanamine; 1-(1H-pyrrol-2-yl)-ethanone; 1-(2-furanyl)-ethanone; 1-(2-hydroxy-5-methylphenyl)-ethanone; furan; 2-(2-furanylmethyl)-5-methyl-furan; 2-(2-propenyl)-furan; 2-(methoxymethyl)-furan; 2,2'-methylenebis-furan; 2,5-dimethyl-furan; 2-[(methylthio)methyl]-furan; 2-methyl-furan; 3-methyl-furan; furfural; furfuryl formate; indole; N,N-dimethyl-methylamine; 2,7-dimethyl-oxepine; p-cresol; phenol; 2-methoxy-phenol; 2-methyl-phenol; 4-ethyl-2-methoxy-phenol; 1-methyl-piperidine; pyrazine; 2-(n-propyl)-pyrazine; 2,3-dimethyl-pyrazine; 2,5-dimethyl-pyrazine; 2,6-diethyl-pyrazine; 2,6-dimethyl-pyrazine; 2-ethyl-3-methyl-pyrazine; 2-ethyl-6-methyl-pyrazine; 3,5-diethyl-2-methyl-pyrazine; 3-ethyl-2,5-dimethyl-pyrazine; ethyl-pyrazine; methyl-pyrazine; pyridine; 2-methyl-pyridine; 3-ethyl-pyridine; 3-methyl-pyridine; 3-propyl-pyridine; styrene; thiophene; and toluene.

Embodiment 501 is the method of any one of embodiments 475-500, wherein the two or more VOCs do not comprise 1-methyl-1,2,3,6-tetrahydropyridine.

Embodiment 502 is the method of any one of embodiments 475-501, wherein the two or more VOCs comprise one or more of: a hydrocarbon, an alcohol, an aldehyde, a ketone, an acid, an ester, a lactone, a phenol, a furan, a thiophene, a pyrrole, an oxazole, a thiazole, a pyridine, a pyrazine, an amine, and a sulfur compound.

Embodiment 503 is the method of any one of embodiments 475-502, wherein the two or more VOCs comprise one or more of: a hydrocarbon, an alcohol, an aldehyde, a ketone, an acid, an ester, a phenol, a furan, a thiophene, a pyrrole, a pyridine, a pyrazine, an amine, and a sulfur compound.

Embodiment 504 is the method of any one of embodiments 475-503, wherein the two or more VOCs comprise a hydrocarbon.

Embodiment 505 is the method of embodiment 504, wherein the hydrocarbon is selected from the group consisting of beta-myrcene, styrene, toluene, and combinations thereof Embodiment 506 is the method of any one of embodiments 475-505, wherein the two or more VOCs comprise an alcohol.

Embodiment 507 is the method of embodiment 506, wherein the alcohol is alpha-methyl-alpha-[4-methyl-3-pentenyl]oxiranemethanol.

Embodiment 508 is the method of any one of embodiments 475-506, wherein the two or more VOCs comprise an aldehyde.

Embodiment 509 is the method of embodiment 508, wherein the aldehyde is selected from the group consisting of 5-methyl-2-furancarboxaldehyde, 3-furaldehyde, 2-methyl-butanal, 3-methyl-butanal, furfural, and combinations thereof.

Embodiment 510 is the method of any one of embodiments 475-509, wherein the two or more VOCs comprise a ketone.

Embodiment 511 is the method of embodiment 510, wherein the ketone is selected from the group consisting of 2,3-butanedione, 2-butanone, 2,3-dimethyl-2-cyclopenten-1-one, 2-methyl-2-cyclopenten-1-one, 3-ethyl-2-hydroxy-2-cyclopenten-1-one, 1-hydroxy-2-propanone, dihydro-2-methyl-3(2H)-furanone, acetone, and combinations thereof.

Embodiment 512 is the method of any one of embodiments 475-511, wherein the two or more comprise an acid.

Embodiment 513 is the method of embodiment 512, wherein the acid is selected from the group consisting of 4-hydroxy-butanoic acid, acetic acid, and combinations thereof.

Embodiment 514 is the method of any one of embodiments 475-513, wherein the two or more VOCs comprise an ester.

Embodiment 515 is the method of embodiment 514, wherein the ester is selected from the group consisting of 2-furanmethanol acetate; 2-furanmethanol propanoate; acetic acid, 2-(dimethylamino)ethyl ester; acetic acid, methyl ester; furfuryl formate; and combinations thereof.

Embodiment 516 is the method of any one of embodiments 475-515, wherein the two or more VOCs comprise a lactone.

Embodiment 517 is the method of any one of embodiments 475-516, wherein the VOCs comprise a phenol.

Embodiment 518 is the method of embodiment 517, wherein the phenol is selected from the group consisting of 1-(2-hydroxy-5-methylphenyl)-ethanone, p-cresol, phenol, 2-methoxy-phenol, 2-methyl-phenol, 4-ethyl-2-methoxy-phenol, and combinations thereof.

Embodiment 519 is the method of any one of embodiments 475-518, wherein the two or more VOCs comprise a furan.

Embodiment 520 is the method of embodiment 519, wherein the furan is selected from the group consisting of 2-vinylfuran, 3-furanmethanol, 1-(2-furanyl)-ethanone, furan, 2-(2-furanylmethyl)-5-methyl-furan, 2-(2-propenyl)-furan, 2-(methoxymethyl)-furan, 2,2'-methylenebis-furan, 2,5-dimethyl-furan, 2-[(methylthio)methyl]-furan, 2-methyl-furan, 3-methyl-furan, and combinations thereof.

Embodiment 521 is the method of any one of embodiments 475-520, wherein the two or more VOCs comprise a thiophene.

Embodiment 522 is the method of embodiment 521, wherein the thiophene is thiophene.

Embodiment 523 is the method of any one of embodiments 475-522, wherein the two or more VOCs comprise a pyrrole.

Embodiment 524 is the method of embodiment 523, wherein the pyrrole is selected from the group consisting of 1-(2-furanylmethyl)-1H-pyrrole, 1-ethyl-1H-pyrrole, 1-methyl-1H-pyrrole, 1-methyl-1H-pyrrole-2-carboxaldehyde, 1-(1H-pyrrol-2-yl)-ethanone, indole, and combinations thereof.

Embodiment 525 is the method of any one of embodiments 475-524, wherein the two or more VOCs comprise a pyridine.

Embodiment 526 is the method of embodiment 525, wherein the pyridine is selected from the group consisting of 1-methyl-1,2,3,6-tetrahydropyridine, 3-pyridinol, 1-methyl-piperidine, pyridine, 2-methyl-pyridine, 3-ethyl-pyridine, 3-methyl-pyridine, 3-propyl-pyridine, and combinations thereof.

Embodiment 527 is the method of any one of embodiments 475-526, wherein the two or more VOCs comprise a pyrazine.

Embodiment 528 is the method of embodiment 527, wherein the pyrazine is selected from the group consisting of pyrazine, 2-(n-propyl)-pyrazine, 2,3-dimethyl-pyrazine, 2,5-dimethyl-pyrazine, 2,6-diethyl-pyrazine, 2,6-dimethyl-pyrazine, 2-ethyl-3-methyl-pyrazine, 2-ethyl-6-methyl-pyrazine, 3,5-diethyl-2-methyl-pyrazine, 3-ethyl-2,5-dimethyl-pyrazine, ethyl-pyrazine, methyl-pyrazine, and combinations thereof.

Embodiment 529 is the method of embodiment 527 or embodiment 528, wherein the pyrazine is present in an amount of at least 2-fold the amount of pyrazines in a corresponding reference coffee.

Embodiment 530 is the method of any one of embodiments 475-529, wherein the two or more VOCs comprise an amine.

Embodiment 531 is the method of embodiment 530, wherein the amine is selected from the group consisting of 2-amino-1-naphthalenol, 5-amino-1-naphthol, and combinations thereof.

Embodiment 532 is the method of any one of embodiments 475-531, wherein the two or more VOCs comprise a sulfur compound.

Embodiment 533 is the method of embodiment 532, wherein the sulfur compound is dimethyl disulfide.

Embodiment 534 is the method of any one of embodiments 475-533, wherein the two or more VOCs comprise 2,7-dimethyl-oxepine.

Embodiment 535 is the method of any one of embodiments 475-534, wherein the two or more non-volatile compounds comprise one or more compounds selected from the group consisting of arginine, asparagine, beta-alanine, carnitine, carnosine, citrulline, cystine, fumaric acid, GABA, glucosamine, glutamine, glycine, histidine, homoserine, isoleucine, kynurenic acid, leucine, lysine, mannose, methionine, ornithine, pipecolinic acid, proline, serine, threonine, trans-4-hydroxyproline, tryptophan, and tyrosine.

Embodiment 536 is the method of any one of embodiments 475-535, wherein the two or more non-volatile compounds do not comprise one or more compounds selected from the group consisting of 2-furoic acid, 2-isopropylmalic acid, 3,4-dihydroxybenzoic acid, arabitol, aspartic acid, betaine, citric acid, D-glucuronic acid, fructose, galactose, gallic acid, glucose, glutamic acid, lactic acid, malic acid, mannitol, inositol, phenylalanine, pyruvic acid, quinic acid, sorbitol, succinic acid, tartaric acid, and valine.

Embodiment 537 is the method of any one of embodiments 475-536, wherein the two or more non-volatile compounds include one or more of the following: an acid; an amino acid or derivative thereof, a sugar or a sugar alcohol; a xanthine; a fat or a wax; a starch, a fiber, a gums or a polysaccharide; a tannin, a polyphenol, or an anthocyanin; a pH modifier; a coloring agent; a surfactant or an emulsifier; a mineral or a metal; a preservative; an antioxidant; or a proteins or a peptide.

Embodiment 538 is the method of any one of embodiments 475-537, wherein the two or more non-volatile compounds comprise an amino acid or a derivative thereof.

Embodiment 539 is the method of embodiment 538, wherein the amino acid or derivative thereof is selected from the group consisting of arginine, asparagine, aspartic acid, beta-alanine, betaine, carnitine, citrulline, cystine, gamma-aminobutyric acid (GABA), glutamine, glutamic acid, glycine, histidine, homoserine, isoleucine, leucine, lysine, methionine, ornithine, phenylalanine, pipecolinic acid, proline, serine, threonine, trans-4-hydroxyproline, tryptophan, tyrosine, valine, and combinations thereof.

Embodiment 540 is the method of embodiment 539, wherein the two or more non-volatile compounds comprise an acid.

Embodiment 541 is the method of embodiment 540, wherein the acid is selected from the group consisting of 2-furoic acid, 2-isopropylmalic acid, 3,4-dihydroxybenzoic acid, citric acid, D-glucuronic acid, fumaric acid, kynurenic acid, lactic acid, malic acid, pyruvic acid, quinic acid, succinic acid, tartaric acid, and combinations thereof.

Embodiment 542 is the method of any one of embodiments 475-541, wherein the two or more non-volatile compounds comprise a sugar or a sugar alcohol.

Embodiment 543 is the method of embodiment 542, wherein the sugar or sugar alcohol is selected from the group consisting of arabitol, fructose, galactose, glucosamine, glucose, mannitol, mannose, inositol, rhamnose, ribose, sorbitol, xylose, and combinations thereof.

Embodiment 544 is the method of any one of embodiments 475-543, wherein the two or more non-volatile compounds comprise a tannin, polyphenol, or anthocyanin.

Embodiment 545 is the method of embodiment 544, wherein the tannin, polyphenol, or anthocyanin is gallic acid.

Embodiment 546 is the method of any one of embodiments 475-545, wherein the two or more non-volatile compounds comprise a protein or a peptide.

Embodiment 547 is the method of embodiment 546, wherein the protein or polypeptide is carnosine.

The invention will be further described in the following examples, which do not limit the scope of the invention described in the claims.

EXAMPLES

Example 1—LCMS of Reference Coffees

LC-MS was used to measure the levels of various non-volatile compounds in several reference coffee samples, according to the following method. Amounts of non-volatile compounds as described herein are based on coffee (or a coffee beverage replica) made from 75±10 g of beans (subsequently ground; or coffee bean replicas, subsequently ground; or 75±10 g coffee ground replicas), made to a total volume of 1740 mL with water. Amounts of VOCs and non-volatile compounds as described in the Round 2 assays in Example 1 and Example 7 are based on coffee made from 80 g of beans (ground), and 1120 g (1120 mL) of water.

In Round 1, nine replicates of a single commercial coffee were assayed. In Round 2, five commercial coffees were assayed, and data is presented as an average of triplicate measurements.

All analyses were performed on a Thermo Ultimate 3000 Ultra-Performance Liquid Chromatograph (UPLC) coupled with a Thermo Scientific Q-Exactive high resolution mass spectrometer (MS). XCalibur software was used for data acquisition, and the mass spectrometer instrument parameters were as follows for all methods:

Polarity: positive or negative mode, as indicated for each method

Resolution: 70,000

Scan range: 60-900 m/z for all methods with the exception of the lipid method, which is 134-2000 m/z Isolation window: 1.5 m/z MS/MS collision energy: 30

Preparation of analytical standards: Stock solutions at a concentration of 1 mg/mL were made for each compound in 50% methanol. Serial dilutions were then made of each compound to create a 15-point standard curve, ranging from 10 ng/mL to 20 µg/mL. Standard curves were run in combinations of 7-12 compounds from each category per set, so long as there were no overlaps in retention time, which would have hindered quantitation.

Retention times were pre-determined for each compound by running the analytical standard at a 20 µg/mL dilution, and identifying the compound based on its accurate mass.

In all cases, five µL of each standard mix was injected through the autosampler and LC to the MS. Separation took place on a chromatographic column that was specific to each class of compounds. The conditions for each chromatographic method are described below, including the column, mobile phase and gradient used for each method.

Several types of columns were used for the different compounds, and different limits of detection (LODs) as indicated in TABLES 1A-1C for Round 1 assays. Similar data are shown in TABLE ID for Round 2 Assays.

TABLE 1A

List of compounds quantified by each method in Round 1 assays

| HILIC positive | HILIC negative | Omega negative | C18 positive |
|---|---|---|---|
| methionine | rhamnose | tartaric acid | quinic acid |
| histidine | glucose | citric acid | trans-4-hydroxy proline |
| lysine | mannitol | lactic acid | L-citrulline |
| serine | fructose | 3,4-dihydroxybenzoic acid | kynurenic acid |
| leucine | ribose | gallic acid | |
| isoleucine | arabitol | glucuronic acid | |
| phenylalanine | inositol | fumaric acid | |
| aspartic acid | mannose | malic acid | |
| tyrosine | xylose | 2-isopropylmalic acid | |
| glycine | sorbitol | 2-furoic acid | |
| γ-aminobutyric acid | galactose | pyruvic acid | |
| glucosamine | beta-alanine | succinic acid | |
| arginine | citrulline | | |
| valine | | | |
| proline | | | |
| cystine | | | |
| asparagine | | | |
| glutamic acid | | | |
| tryptophan | | | |
| ornithine | | | |
| glutamine | | | |
| threonine | | | |
| carnitine | | | |
| betaine | | | |
| carnosine | | | |
| homoserine | | | |
| pipecolinic acid | | | |

TABLE 1B

LODs for standards being quantified
(in pg/mL, ng/mL, or ug/mL) in Round 1 assays

| Cassette | Compound | LOD |
|---|---|---|
| 10 | Methionine | 500 pg |
| 10 | Histidine | 10 ng |
| 10 | Lysine | 10 ng |
| 10 | Serine | 2 ng |
| 10 | Leucine | 500 pg |
| 10 | Phenylalanine | 500 pg |
| 10 | Aspartic Acid | 5 ug |
| 10 | Tyrosine | 2 ng |
| 10 | GABA | 2 ng |
| 10 | Glucosamine | 50 ng |
| 11 | Arginine | 10 ng |
| 11 | Valine | 100 ng |
| 11 | Proline | 2 ng |
| 11 | Isoleucine | 10 ng |
| 11 | Cysteine | 1 ug |
| 11 | Asparagine | 10 ng |
| 11 | Glutamic Acid | 10 ng |
| 11 | Tryptophan | 2 ng |
| 11 | Ornithine | 10 ng |
| 11 | Glutamine | 10 ng |
| 11 | Threonine | 10 ng |
| 11 | Carnitine | 500 pg |
| 12 | Tartaric Acid | 100 pg |
| 12 | Citric Acid | 10 ng |
| 12 | 2-Isopropylmalic Acid | 100 pg |
| 12 | Lactic Acid | 2 ng |
| 12 | 3,4-dihydroxybenzoic Acid | 100 pg |
| 12 | Gallic Acid | 500 pg |
| 12 | D-Glucuronic Acid | 100 pg |
| 12 | Fumaric Acid | 500 pg |
| 12 | malic Acid | 100 pg |
| 12 | 2-Furoic Acid | 10 ng |
| 12 | Pyruvic Acid | 100 pg |
| 12 | Succinic Acid | 500 pg |
| 13 | Rhamnose | 10 ng |
| 13 | Glucose | 100 ng |
| 13 | Mannitol | 2 ng |

TABLE 1B-continued

LODs for standards being quantified
(in pg/mL, ng/mL, or ug/mL) in Round 1 assays

| Cassette | Compound | LOD |
|---|---|---|
| 13 | Fructose | 2 ng |
| 13 | Ribose | 10 ng |
| 13 | Arabitol | 2 ng |
| 15 | Inositol | 10 ng |
| 15 | Mannose | 10 ng |
| 15 | Xylose | 100 ng |
| 15 | Sorbitol | 2 ng |
| 15 | Galactose | 10 ng |
| 16 | Quinic Acid | 1 ng |
| 17 | Trans-4-hydroxy proline | 200 pg |
| 17 | L-citrulline | 200 pg |
| 17 | Kynurenic Acid | 200 pg |

TABLE 1C

Additional LODs for standards being
quantified (by parts) in Round 1 assays

| Compound | LOD |
|---|---|
| beta alanine | 100 ppb |
| citrulline | 100 ppb |
| betaine | <10 ppb |
| carnosine | <10 ppb |
| cystine | <100 ppb |
| D-glucuronic acid | 500 ppt |
| homoserine | <10 ppb |
| myo-inositol | 50 ppb |
| pipecolinic acid | <10 ppb |
| glycine | 50 ppb |

TABLE 1D

Methods and LODs for compounds detected in Round 2 assays

| Compound Name | Method | LOD |
|---|---|---|
| 2(5H)-furanone | C18 Positive | 50 ppb |
| 2,3,5,6-Tetramethylpyrazine | C18 Positive | <1 ppb |
| 2,3,5-trimethylpyrazine | C18 Positive | <1 ppb |
| 2,3-dimethylpyrazine | C18 Positive | <1 ppb |
| 2-ethyl-2-hydroxybutyric acid | Synergi Neg | <10 ppb |
| 2-furoic acid | Synergi Neg | 10 ng |
| 2-isopropylmalic acid | Synergi Neg | 100 pg |
| 3,4-dihydroxybenzoic acid | Synergi Neg | 100 pg |
| 4-Guanidinobutyric acid | C18 Positive | 100 pg |
| 4-methoxycinnamic acid | Synergi Neg | 1.75 ppm |
| 5-ethyl-4-hydroxy-2-methyl-3(2H)-furanone | C18 Positive | |
| Acetovanillone | C18 Positive | 1 ng |
| Adenine | C18 Positive | 200 pg |
| Adipic acid | C18 Negative | <10 ppb |
| AMP | C18 Positive | 10 ppb |
| arabitol | HILIC neg | 2 ng |
| arginine | HILIC Pos | 10 ng |
| asparagine | HILIC Pos | 10 ng |
| aspartic acid | HILIC Pos | 5 ug |
| beta-alanine | HILIC neg | 100 ppb |
| betaine | HILIC Pos | <10 ppb |
| Caffeic acid | C18 Positive | 20 ng |
| Caffeine | C18 Positive | <10 ppb |
| carnitine | HILIC Pos | 500 ng |
| carnosine | HILIC Pos | <10 ppb |
| Catechin | C18 Negative | 1 ng |
| Choline | HILIC Positive | 2 ng |
| Cinnamic acid | C18 Positive | 500 ng |
| citric acid | Omega Neg | 10 ng |
| citrulline | C18 pos | 100 ppb |
| CMP | C18 Positive | <10 ppb |
| Coumaric acid | C18 Positive | 4 ng |
| Cysteine | HILIC Pos | 1 ug |
| cystine | HILIC Pos | <100 ppb |
| Cytidine | C18 Positive | 5 ppb |
| Cytosine | C18 Positive | 100 ppt |
| D-Gluconic acid | Synergi Neg | <10 ppb |
| DL-hydroxystearic acid | Synergi Neg | 1.75 ppm |
| Ellagic acid | C18 Negative | 1 ng |
| Epicatechin | C18 Negative | 1 ng |
| Epicatechin_Gallate | C18 Positive | <10 ppb |
| fructose | HILIC neg | 2 ng |
| fumaric acid | Synergi Neg | 500 pg |
| galactose | HILIC neg | 10 ng |
| gallic acid | Synergi Neg | 500 pg |
| glucosamine | HILIC Pos | 50 ng |
| glucose | HILIC neg | 100 ng |
| glucuronic acid | Synergi Neg | 500 ppt |
| glutamic acid | HILIC Pos | 10 ng |
| glutamine | HILIC Pos | 10 ng |
| glycine | HILIC Pos | 50 ppb |
| Guanine | C18 Positive | 200 pg |
| Hesperetin | C18 Negative | 200 pg |
| histidine | HILIC Pos | 10 ng |
| homoserine | HILIC Pos | <10 ppb |
| inositol | HILIC neg | 50 ppb |
| isoleucine | HILIC Pos | 10 ng |
| kynurenic acid | C18 pos | 200 pg |
| lactic acid | Synergi Neg | 2 ng |
| leucine | HILIC Pos | 500 pg |
| lysine | HILIC Pos | 10 ng |
| malic acid | Synergi Neg | 100 pg |
| mannitol | HILIC neg | 2 ng |
| mannose | HILIC neg | 10 ng |
| methionine | HILIC Pos | 500 pg |
| Methyl_Gallate | C18 Negative | <10 ppb |
| Methyl2-pyrrolyl_ketone | C18 Positive | <5 ppb |
| ornithine | HILIC Pos | 10 ng |
| Pantothenic acid | C18 Positive | 0.2 ng |
| phenylalanine | HILIC Pos | 500 pg |
| pipecolinic acid | HILIC Pos | <10 ppb |
| Piperine | C18 Positive | <1 ppb |
| Polydatin | C18 Positive | 4 ng |
| proline | HILIC Pos | 2 ng |
| Propyl_Gallate | C18 Negative | <10 ppb |

TABLE 1D-continued

Methods and LODs for compounds detected in Round 2 assays

| Compound Name | Method | LOD |
|---|---|---|
| Pyridine | C18 Positive | <1 ppb |
| Pyridoxine | HILIC Positive | 100 pg |
| pyruvic acid | Synergi Neg | 100 pg |
| Quercetin | C18 Negative | 1 ng |
| quinic acid | C18 pos | 1 ng |
| Resveratrol | C18 Negative | 4 ng |
| rhamnose | HILIC neg | 10 ng |
| ribose | HILIC neg | 10 ng |
| Rutin | C18 Negative | 1 ng |
| Salicylic acid | C18 Negative | 200 pg |
| serine | HILIC Pos | 2 ng |
| Sinapinic acid | C18 Negative | 200 pg |
| Sorbic acid | C18 Positive | 100 ng |
| sorbitol | HILIC neg | 2 ng |
| Sotolon | C18 Positive | 25 ppb |
| succinic acid | Synergi Neg | 500 pg |
| Syringaldehyde | C18 Positive | 1 ng |
| Syringic acid | C18 Positive | 50 ng |
| tartaric acid | Synergi Neg | 100 pg |
| threonine | HILIC Pos | 10 ng |
| trans-4-hydroxy proline | C18 pos | 200 pg |
| Trans-4-hydroxyproline | HILIC Positive | <10 ppb |
| Trans-Ferulic acid | C18 Negative | 1 ng |
| Tryptamine | C18 Positive | 200 pg |
| tryptophan | HILIC Pos | 2 ng |
| Tyramine | C18 Positive | 1 ng |
| tyrosine | HILIC Pos | 2 ng |
| Uracil | C18 Positive | 5 ppb |
| valine | HILIC Pos | 100 ng |
| Vanillic acid | C18 Positive | 10 ng |
| Vanillin | C18 Positive | 200 pg |
| xylose | HILIC neg | 100 ng |
| γ-aminobutyric acid | HILIC Pos | 2 ng |

Quantitation of Amino Acids and Similar Polar Compounds: A HILIC (hydrophilic interaction liquid chromatography) column was used to assess polar compounds that can retain a positive charge. The mobile phase used with this column included A: $H_2O+5$ mM Ammonium Acetate+0.1% TFA (trifluoroacetic acid), and B: 90/10 ACN (Acetonitrile)/ $H_2O+5$ mM Ammonium Acetate+0.1% TFA. Each chromatographic run was 27.5 minutes long, and the column temperature was maintained at 40° C. The column used was a Phenomenex Luna, 3 μm NH2, 100 Å, 150×2 mm (Product #00F-4377-B0), and the guard column was a Phenomenex Security Guard Cartridges, NH2, 4×2 mm (#PRD-196870).

TABLE 2

HILIC positive mode gradient conditions

| Time | Flow Rate (mL/min) | % A | % B |
|---|---|---|---|
| 0 | 0.5 | 5 | 95 |
| 6 | 0.5 | 5 | 95 |
| 18 | 0.5 | 60 | 40 |
| 20 | 0.5 | 80 | 20 |
| 22 | 0.5 | 5 | 95 |
| 27 | 0.5 | 5 | 95 |

Quantitation of Sugars and Sugar Alcohols: The same HILIC column used for quantitation of the amino acids was used for quantitation of sugars, but the polarity of the MS was run in negative mode. While the same mobile phases were used, the gradient was slightly modified to help with retention. The temperature of the column also was held at 50° C. for better peak shape and separation of the isobaric sugars.

TABLE 3

| | | HILIC negative mode gradient conditions | |
|---|---|---|---|
| Time | Flow Rate (mL/min) | % A | % B |
| 0 | 0.5 | 0 | 100 |
| 3 | 0.5 | 0 | 100 |
| 18 | 0.5 | 18 | 82 |
| 19 | 0.5 | 26 | 74 |
| 20 | 0.5 | 60 | 40 |
| 21 | 0.4 | 80 | 20 |
| 23 | 0.4 | 0 | 100 |
| 28 | 0.4 | 0 | 100 |

Quantitation of Non-Polar Compounds: A C18 column was used to assess non-polar compounds, as they are retained in the long carbon chains under polar conditions. This method was run in both positive and negative modes, depending on each compound and whether it ionizes better with a positive or negative charge, respectively. The mobile phases used for this method were A: $H_2O+0.1\%$ FA, and B: Methanol, and the temperature of the column was held at 50° C. The column used was an Agilent Poroshell 120, EC-C18 2.7 μm, 3.0×100 mm (Product #695975-302).

TABLE 4

| | | C18 positive/negative mode gradient conditions | |
|---|---|---|---|
| Time | Flow Rate (mL/min) | % A | % B |
| 0 | 0.6 | 100 | 0 |
| 1.5 | 0.6 | 100 | 0 |
| 4 | 0.6 | 0 | 100 |
| 6 | 0.6 | 0 | 100 |
| 6.1 | 0.6 | 100 | 0 |
| 9 | 0.6 | 100 | 0 |

Quantitation of Organic Acids and Similarly Charged Polar Compounds: To look at organic acids, a charged C18 column was used. The gradient used for the organic method was the same as for the C18 non-polar methods, as shown in TABLE 8. There was a modification to mobile phase B for this method, in that B: ACN+0.1% FA. The column used was a Phenomenex Luna Omega, 1.6 μm, PS C18 100 Å, 100×2.1 mm (Product #00D-4752-AN).

Data analysis: Data analysis methods were developed with the XCalibur Processing Setup program, where methods were made for each standard cassette for each LC method. The compound mass and retention time was added for each standard, and calibration levels were applied for each standard. To calculate concentrations in samples, the samples and standards for each run were processed together using XCalibur Quan software, and concentrations calculated based on the respective compound calibration curve. Limits of detection were determined for each standard by running each standard curve at low levels until nothing was detected.

Quantitation of Organic Acids: A Synergi Hydro reversed phase column was used to assess organic acids, as they are retained in charged stationary phase under polar conditions. This method was run in negative ionization mode. The mobile phases used for this method were A: $H_2O+0.1\%$ FA, and B: Acetonitrile+0.1% FA, and the temperature of the column was held at 50° C. The column used was a Phenomenex Synergi 2.5 μm Hydro RP, 100 Å, 100×2 mm (Product #00D-4387-B0).

TABLE 5

| | | Synergi Hydro negative mode gradient conditions | |
|---|---|---|---|
| Time | Flow Rate (mL/min) | % A | % B |
| 0 | 0.2 | 100 | 0 |
| 1.3 | 0.2 | 100 | 0 |
| 4 | 0.2 | 0 | 100 |
| 6 | 0.4 | 0 | 100 |
| 6.1 | 0.4 | 100 | 0 |
| 8.5 | 0.4 | 100 | 0 |

The levels of the non-volatile compounds measured in the reference coffee samples are shown in TABLES 6A (Round 1) and 6B (Round 2).

TABLE 6A

| | | | | LCMS of reference coffees (Round 1) | | | | | |
|---|---|---|---|---|---|---|---|---|---|
| Compound (mg/L) | 1 | 2 | 3 | 4 | 5 | 6 | 7 | 8 | 9 |
| 2-Furoic acid | 3.64E+00 | 3.87E+00 | 2.81E+00 | 7.74E−01 | 9.87E−01 | 8.81E−01 | 1.87E+00 | 2.45E+00 | 2.13E+00 |
| 2-Isopropylmalic acid | 1.87E−01 | 1.90E−01 | 1.87E−01 | 7.74E−02 | 7.95E−02 | 7.93E−02 | 1.24E−01 | 1.23E−01 | 1.17E−01 |
| 3,4-dihydroxybenzoic acid | OC | OC | OC | 6.64E−03 | 7.26E−03 | 9.24E−03 | 8.10E−04 | 4.58E−04 | 5.39E−03 |
| Arabitol | 1.80E+00 | 2.92E+00 | 2.68E+00 | 4.21E+00 | 6.99E+00 | 6.03E+00 | 3.86E+00 | 7.07E+00 | 6.17E+00 |
| arginine | NF | NF | NF | NF | NF | NF | NF | NF | NF |
| asparagine | NF | NF | NF | NF | NF | NF | NF | NF | NF |
| Aspartic acid | OC | OC | OC | OC | OC | OC | OC | OC | OC |
| B-Alanine-2 | NF | NF | NF | NF | NF | NF | NF | NF | NF |
| Betaine | OC | OC | OC | OC | OC | OC | OC | OC | OC |
| Carnitine | NF | NF | NF | NF | NF | NF | NF | NF | NF |
| Carnosine | NF | NF | NF | NF | NF | NF | NF | NF | NF |
| Citric acid | 6.54E+01 | 5.97E+01 | 4.96E+01 | OC | OC | OC | 3.88E+01 | 3.79E+01 | 4.20E+01 |
| Citrulline | NF | NF | NF | NF | NF | NF | NF | NF | NF |
| Cystine | NF | NF | NF | NF | NF | NF | NF | NF | NF |
| D-Glucuronic acid | OC | OC | OC | OC | OC | OC | OC | OC | OC |
| Fructose | 1.47E+01 | 1.30E+02 | 1.61E+02 | 9.85E+00 | 1.42E+01 | 1.31E+01 | 6.62E+00 | 1.84E+01 | 1.52E+01 |
| Fumaric acid | NF | NF | NF | NF | NF | NF | NF | NF | NF |
| GABA | NF | NF | NF | NF | NF | NF | NF | NF | NF |
| Galactose | 1.31E+01 | 9.21E+01 | 6.71E+01 | 2.86E+00 | 5.50E+00 | 4.91E+00 | 1.82E+00 | 4.91E+00 | 4.17E+00 |
| Gallic acid | OC | OC | OC | OC | OC | OC | OC | OC | OC |
| Glucosamine | NF | NF | NF | NF | NF | NF | NF | NF | NF |
| Glucose | 1.48E+01 | 1.30E+02 | 9.62E+01 | 9.85E+00 | 1.42E+01 | 1.31E+01 | 7.66E+00 | 1.84E+01 | 1.53E+01 |
| Glutamic acid | OC | OC | OC | OC | OC | OC | OC | OC | OC |
| Glutamine | NF | NF | NF | NF | NF | NF | NF | NF | NF |
| Glycine | NF | NF | NF | NF | NF | NF | NF | NF | NF |

TABLE 6A-continued

| | | | | | LCMS of reference coffees (Round 1) | | | | |
|---|---|---|---|---|---|---|---|---|---|
| Compound (mg/L) | 1 | 2 | 3 | 4 | 5 | 6 | 7 | 8 | 9 |
| Histidine | NF | NF | NF | NF | NF | NF | NF | NF | NF |
| Homoserine | NF | NF | NF | NF | NF | NF | NF | NF | NF |
| isoleucine | NF | NF | NF | NF | NF | NF | NF | NF | NF |
| Kynurenic acid | NF | NF | NF | NF | NF | NF | NF | NF | NF |
| Lactic acid | 1.97E+01 | 1.99E+01 | 1.95E+01 | 8.66E+00 | 8.59E+00 | 8.92E+00 | 1.42E+01 | 1.42E+01 | 1.34E+01 |
| Leucine | NF | NF | NF | NF | NF | NF | NF | NF | NF |
| Lysine | NF | NF | NF | NF | NF | NF | NF | NF | NF |
| Malic acid | 6.54E+01 | 7.25E+01 | 6.81E+01 | OC | OC | OC | 4.53E+01 | 4.37E+01 | 4.47E+01 |
| Mannitol | 6.72E+00 | 1.45E+01 | 1.30E+01 | 8.34E+00 | 1.19E+01 | 1.03E+01 | 8.24E+00 | 1.31E+01 | 1.08E+01 |
| Mannose | NF | NF | NF | NF | NF | NF | NF | NF | NF |
| Methionine | NF | NF | NF | NF | NF | NF | NF | NF | NF |
| Inositol | 4.21E+01 | 4.21E+01 | 3.62E+01 | OC | 3.79E+01 | OC | 3.92E+01 | 3.49E+01 | 3.17E+01 |
| Ornithine | NF | NF | NF | NF | NF | NF | NF | NF | NF |
| Phenylalanine | 2.33E+01 | 2.15E+01 | 2.06E+01 | 1.52E+01 | 1.40E+01 | 1.33E+01 | 1.96E+01 | 1.84E+01 | 1.74E+01 |
| Pipecolinic acid | NF | NF | NF | NF | NF | NF | NF | NF | NF |
| proline | NF | NF | NF | NF | NF | NF | NF | NF | NF |
| Pyruvic acid | 2.56E+00 | 2.68E+00 | 2.75E+00 | OC | OC | OC | 1.64E+00 | 1.68E+00 | 1.66E+00 |
| Quinic acid | oc | OC | OC | OC | OC | OC | OC | OC | OC |
| Rhamnose | NF | NF | NF | 2.20E+01 | 2.05E+01 | 1.83E+01 | NF | NF | NF |
| Ribose | 6.23E+00 | NF | NF | 2.45E+00 | 6.71E−01 | 2.86E+00 | 2.59E+00 | NF | NF |
| Serine | NF | NF | NF | NF | NF | NF | NF | NF | NF |
| Sorbitol | 1.02E+01 | 1.41E+01 | 1.24E+01 | 1.18E+01 | 2.00E+01 | 1.62E+01 | 1.15E+01 | 1.44E+01 | 1.20E+01 |
| Succinic acid | 3.19E+00 | 3.54E+00 | 3.63E+00 | 2.61E+00 | 2.76E+00 | 2.87E+00 | 3.43E+00 | 3.50E+00 | 3.57E+00 |
| Tartaric acid | OC | OC | OC | OC | OC | OC | OC | OC | OC |
| Threonine | NF | NF | NF | NF | NF | NF | NF | NF | NF |
| Trans-4-hydroxyproline | NF | NF | NF | NF | NF | NF | NF | NF | NF |
| tryptophan | NF | NF | NF | NF | NF | NF | NF | NF | NF |
| Tyrosine | NF | NF | NF | NF | NF | NF | NF | NF | NF |
| valine | 4.60E+01 | 4.55E+01 | 4.51E+01 | 2.56E+01 | 2.54E+01 | 2.53E+01 | 3.47E+01 | 3.73E+01 | 3.74E+01 |
| Xylose | NF | NF | NF | 5.57E+00 | 7.99E+00 | 6.79E+00 | NF | NF | NF |

OC = outside of standard curve

NF = not found

TABLE 6B

| | | | LCMS of reference coffees (Round 2) | | |
|---|---|---|---|---|---|
| Compound (mg/L) | 2A | 2B | 2C | 2D | 2E |
| 2(5H)-furanone | NR | NR | NR | NR | 1.57E−01 |
| 2,3,5,6-Tetramethylpyrazine | OC | OC | OC | OC | 1.34E−03 |
| 2,3,5-trimethylpyrazine | 2.88E−01 | 7.46E−02 | 3.02E−02 | OC | 1.26E−02 |
| 2,3-dimethylpyrazine | 1.75E+01 | 1.04E+01 | 9.04E+00 | 7.76E+00 | 2.58E−01 |
| 2-ethyl-2-hydroxybutyric acid | NR | OC | OC | OC | NR |
| 2-Furoic acid | 3.17E+01 | 2.36E+01 | 1.96E+01 | 1.79E+01 | NR |
| 2-Isopropylmalic acid | OC | OC | OC | OC | NR |
| 3,4-dihydroxybenzoic acid | 3.95E−01 | 3.36E−01 | OC | OC | NR |
| 4-Guanidinobutyric acid | OC | NF | OC | OC | NR |
| 4-methoxycinnamic acid | NR | 1.33E+01 | 1.34E+01 | 1.32E+01 | NR |
| 5-ethyl-4-hydroxy-2-methyl-3(2H)-furanone | NR | NR | NR | NR | 4.74E+01 |
| Acetovanillone | NF | NF | NF | NF | NR |
| Adenine | 1.71E+00 | 6.43E−01 | 5.46E−01 | 5.12E−01 | NR |
| Adipic acid | NF | NF | NF | NF | NR |
| AMP | NF | NF | NF | NF | NR |
| Arabitol | NR | NR | NR | NR | NR |
| arginine | NF | NF | NF | NF | NR |
| asparagine | OC | NF | NF | NF | NR |
| Aspartic acid | NF | NF | OC | 1.91E+01 | NR |
| B-Alanine-2 | OC | OC | OC | OC | NR |
| Betaine | 2.08E+00 | 1.22E+00 | 5.47E−01 | 6.17E−01 | NR |
| Caffeic acid | 5.75E+00 | 4.20E+00 | 4.09E+00 | 4.24E+00 | NR |
| Caffeine | 2.16E+02 | 1.62E+02 | 1.57E+02 | 1.52E+02 | NR |
| Carnitine | 1.92E−01 | OC | OC | OC | NR |
| Carnosine | NF | NF | NF | NF | NR |
| Catechin | NF | NF | OC | OC | NR |
| Choline | 3.60E+01 | 2.06E+01 | 2.23E+01 | 2.06E+01 | 2.86E+00 |
| Cinnamic acid | NF | NF | NF | NF | NR |
| Citric acid | 9.47E+02 | 5.76E+02 | 5.82E+02 | 4.50E+02 | NR |
| Citrulline | NF | NF | NF | NF | NR |
| CMP | NF | NF | NF | NF | NR |
| Coumaric acid | NF | NF | NF | NF | NR |
| cysteine | NF | NF | NF | NF | NR |

TABLE 6B-continued

| LCMS of reference coffees (Round 2) | | | | |
|---|---|---|---|---|
| Compound (mg/L) | 2A | 2B | 2C | 2D | 2E |
| Cystine | NF | NF | NF | NF | NR |
| Cytidine | 1.34E+00 | 5.25E−01 | 4.69E−01 | 4.44E−01 | NR |
| Cytosine | OC | NF | OC | OC | NR |
| D-Gluconic acid | NR | 5.20E−01 | 7.38E−01 | 8.50E−01 | NR |
| D-Glucuronic acid | 1.37E+00 | 9.83E−01 | 9.00E−01 | 9.31E−01 | NR |
| DL-hydroxystearic acid | NR | OC | NF | NF | NR |
| Ellagic acid | OC | OC | NF | OC | NR |
| Epicatechin | NF | NF | NF | NF | NR |
| Epicatechin gallate | NF | NF | NF | NF | NR |
| Fructose | NR | NR | NR | NR | NR |
| Fumaric acid | 1.09E+01 | 6.06E+00 | 4.05E+00 | 3.09E+00 | NR |
| GABA | NF | NF | NF | NF | NR |
| Galactose | NR | NR | NR | NR | NR |
| Gallic acid | NF | NF | NF | NF | NR |
| Glucosamine | NF | NF | NF | NF | NR |
| Glucose | NR | NR | NR | NR | NR |
| Glutamic acid | 8.76E−01 | 2.72E−01 | 1.90E−01 | 1.66E−01 | NR |
| Glutamine | NF | NF | NF | NF | NR |
| Glycine | OC | NF | NF | NF | NR |
| Guanine | NF | NF | NF | NF | NR |
| Hesperetin | NF | NF | NF | NF | NR |
| Histidine | NF | NF | NF | NF | NR |
| Homoserine | OC | NF | NF | NF | NR |
| Hydroxymethylfurfural | NR | NR | NR | NR | 1.43E+01 |
| isoleucine | NF | NF | NF | NF | NR |
| Kynurenic acid | NF | NF | NF | NF | NR |
| Lactic acid | 9.81E+01 | 2.54E+01 | 2.15E+01 | 2.12E+01 | NR |
| Leucine | NF | NF | NF | NF | NR |
| Lysine | NF | NF | NF | NF | NR |
| Malic acid | 3.17E+02 | 1.70E+02 | 1.77E+02 | 1.53E+02 | NR |
| Mannitol | NR | NR | NR | NR | NR |
| Mannose | NR | NR | NR | NR | NR |
| Methionine | NF | NF | NF | NF | NR |
| Methyl gallate | NF | NF | NF | NF | NR |
| Methyl-2-pyrrolyl ketone | 9.48E−01 | 2.82E−01 | 1.28E−02 | OC | 2.34E−02 |
| Myo-Inositol | NR | NR | NR | NR | NR |
| Ornithine | NF | NF | NF | NF | NR |
| Pantothenic acid | NF | NF | NF | NF | NR |
| Phenylalanine | NF | NF | NF | NF | NR |
| Pipecolinic acid | NF | NF | NF | NF | NR |
| Piperine | NF | NF | NF | NF | NR |
| Polydatin | NF | NF | NF | NF | NR |
| proline | OC | OC | OC | OC | NR |
| Propyl gallate | NF | NF | OC | NF | NR |
| Pyridine | OC | NF | OC | 4.60E+01 | 5.63E−01 |
| Pyridoxine | NF | NF | NF | NF | NR |
| Pyruvic acid | 2.26E+00 | 1.04E+01 | 1.30E+01 | 1.19E+01 | NR |
| Quercetin | NF | NF | NF | NF | NR |
| Quinic acid | 2.25E+02 | 1.36E+02 | 1.16E+02 | 1.02E+02 | NR |
| Resveratrol | NF | NF | NF | NF | NR |
| Rhamnose | NR | NR | NR | NR | NR |
| Ribose | NR | NR | NR | NR | NR |
| Rutin | NF | NF | NF | NF | NR |
| Salicylic acid | OC | OC | OC | NF | NR |
| Serine | OC | NF | NF | NF | NR |
| Sinapinic acid | NF | NF | NF | NF | NR |
| Sorbic acid | NF | NF | NF | NF | NR |
| Sorbitol | NR | NR | NR | NR | NR |
| Sotolon | NR | NR | NR | NR | 6.37E+01 |
| Succinic acid | 2.73E+01 | 5.92E+00 | 4.73E+00 | 4.02E+00 | NR |
| Syringaldehyde | NF | NF | NF | NF | NR |
| Syringic acid | 7.96E+00 | 4.50E+00 | 4.53E+00 | 4.37E+00 | NR |
| Tartaric acid | OC | OC | OC | OC | NR |
| Threonine | NF | NF | NF | NF | NR |
| Trans-4-hydroxyproline | NF | NF | NF | NF | NR |
| Trans-Ferulic acid | NF | NF | 1.54E+01 | OC | NR |
| Tryptamine | 7.86E−02 | 8.74E−02 | 7.64E−02 | OC | NR |
| tryptophan | NF | NF | NF | NF | NR |
| Tyramine | NF | NF | NF | NF | NR |
| Tyrosine | NF | NF | NF | NF | NR |
| Uracil | 5.40E−01 | 2.35E−01 | 1.68E−01 | 1.77E−01 | NR |
| valine | NF | NF | NF | NF | NR |
| Vanillic acid | 2.69E+01 | 2.09E+01 | 2.07E+01 | 1.83E+01 | NR |

TABLE 6B-continued

| LCMS of reference coffees (Round 2) | | | | | |
|---|---|---|---|---|---|
| Compound (mg/L) | 2A | 2B | 2C | 2D | 2E |
| Vanillin | NF | NF | NF | NF | 1.16E−01 |
| Xylose | NR | NR | NR | NR | NR |

OC = outside of standard curve
NF = not found
NR = not run

Example 2—Generating a Coffee Bean Replica

To generate a coffee bean replica, the following procedure is used:
1. Dissolve water-soluble material into water with low shear blending. Some of the VOCs and some of the non-volatile compounds are water-soluble.
2. Form an emulsion of fat-soluble material, using a neutral oil (e.g., fully deodorized oil, such as corn, sunflower, or coconut oil), and using a rotor stator high shear homogenizer or a high pressure inline recirculating homogenizer. Forming an emulsion may also require the addition of emulsifiers, starches, gums, and/or polyscaccharides. Some of the VOCs and some of the non-volatile compounds are fat-soluble.
3. Blend soluble and emulsion fractions, for example, in a mix tank with high shear blending capabilities.
4. Mix all large particle solid substrate (e.g., cellulotic) material (e.g., particle size 250-1500 μm) in a mixer (e.g., a V blender)
5. Spray applicate liquid mixture from step 3 to the solid substrate whilst mixing
6. Optionally, add a tableting aid (e.g., grain or non-grain ingredients that will aid in tableting, for example, binding agents such as starches, sugars, and/or gums)
7. Tablet in a rotary pill press or similar machine to form coffee bean replicas
8. Optionally, add coffee bean replicas to a coating pan and coat with, for example, shellac, zein protein, or wax
9. Fill receptacle (e.g., a bag) with the coffee bean replicas Example 3—Generating a Coffee Grounds Replica To generate a coffee grounds replica, the following procedure is used:
1. Dissolve water-soluble material into water, with low shear blending. Some of the VOCs and some of the non-volatile compounds are water-soluble.
2. Form an emulsion of fat-soluble material, using a neutral oil (e.g., fully deodorized oil, such as corn, sunflower, or coconut oil), and using a rotor stator high shear homogenizer, or a high pressure inline recirculating homogenizer. Forming an emulsion may also require the addition of emulsifiers, starches, gums, and/or polyscaccharides. Some of the VOCs and some of the non-volatile compounds are fat-soluble.
3. Blend soluble and emulsion fractions, for example, in a mix tank with high shear blending capabilities.
4. Mix all large particle solid substrate (e.g., cellulotic) material (e.g., particle size 250-1500 μm) in a mixer (e.g., a V blender)
5. Spray applicate liquid mixture from step 3 to the solid substrate whilst mixing 6. Fill receptacle (e.g., a bag) with the coffee grounds replica Example 4—Generating a Coffee Granule Replica To generate a coffee granule replica, the following procedures are used:
1. Dissolve water-soluble material into water, with low shear blending. Some of the VOCs and some of the non-volatile compounds are water-soluble.
2. Form an emulsion of fat-soluble material, using a neutral oil (e.g., fully deodorized oil, such as corn, sunflower, or coconut oil), and using a rotor stator high shear homogenizer, or a high pressure inline recirculating homogenizer. Forming an emulsion may also require the addition of emulsifiers, starches, gums, and/or polyscaccharides. Some of the VOCs and some of the non-volatile compounds are fat-soluble.
3. Blend soluble and emulsion fractions, for example, in a mix tank with high shear blending capabilities.
4. Agglomeration of particles (e.g., by pneumatic mixing, steam-jet, fluid-bed, pan, spray drying, drum, mixer, roller, or extrusion agglomeration) and/or foam mat drying Example 5—Generating a Coffee Concentrate Replica To generate a coffee concentrate replica, the following procedure is used:
1. Dissolve water-soluble material into water, with low shear blending. Some of the VOCs and some of the non-volatile compounds are water-soluble.
2. Form an emulsion of fat soluble material, using a neutral oil (e.g., fully deodorized oil, such as corn, sunflower, or coconut oil), and using a rotor stator high shear homogenizer, or a high pressure inline recirculating homogenizer. Forming an emulsion may also require the addition of emulsifiers, starches, gums, and/or polyscaccharides. Some of the VOCs and some of the non-volatile compounds are fat-soluble.
3. Blend of soluble and emulsion fractions, for example, in a mix tank with high shear blending capabilities.
4. Process to reach commercial sterility using one of the following:
   a. Ultra clean processing
   b. UHT aseptic processing
   c. If pH low enough (<4.6), HTST inline processing with sterile filling
   d. If pH low enough (<4.6), hot fill
   e. If pH low enough (<4.6), cold fill tunnel pasteurize
   f. Other applicable method Example 6—Generating a Coffee Beverage Replica To generate a coffee beverage replica, the following procedure is used:

1. Dissolve water-soluble material into water, with low shear blending. Some of the VOCs and some of the non-volatile compounds are water-soluble.
2. Form an emulsion of fat-soluble material, using a neutral oil (e.g., fully deodorized oil, such as corn, sunflower, or coconut oil), and using a rotor stator high shear homogenizer, or a high pressure inline recirculating homogenizer. Forming an emulsion may also require the addition of emulsifiers, starches, gums, and/or polyscaccharides. Some of the VOCs and some of the non-volatile compounds are fat-soluble.
3. Blending of soluble and emulsion fractions, for example in a mix tank with high shear blending capabilities.
4. Process to reach commercial sterility using one of the following:
   a. Ultra clean processing
   b. UHT aseptic processing
   c. Fill and retort
   d. Fill then Ohmic sterilization
   e. UV/PEF inline sterilization and aseptic filling
   f. Other applicable method Example 7—GCMS of Reference Coffees GC-MS/MS was used to assess the amounts of various VOCs in traditional coffees.

GC-MS/MS Conditions: All analyses were performed using an Agilent 7890B GC interfaced with a 7000D Triple Quadrupole mass spectrometer, and equipped with a PAL RSI 85 autosampler with HS-SPME attachment. For Headspace (HS) Solid Phase Microextraction (SPME) experiments, the SPME fiber was a 1 cm, 50/30 μm DVB/CAR/PDMS fiber (Supelco; Bellefonte, PA). HS-SPME autosampler conditions were as follows: pre-incubation time of 5 minutes, incubation temperature of 60° C., extraction time of 15 minutes, and desorption time of 10 minutes. Post-desorption fiber conditioning time was 30 minutes. For liquid injection experiments, the injection volume was 0.5 μL. SPME injections were run in splitless mode, while liquid injections were run with a split ratio of 1:20 or 1:10, with a desorption temperature of 250° C. The column was a 30 m×0.25 mm×0.25 Agilent DBHeavyWax (ultra inert). Helium was used as the carrier gas at a constant flow rate of 1 mL/min. The MS ion source temperature and interface temperature were 250° C. The temperature program was as follows: initial temperature of 40° C., held for 0.5 minutes, then increased to 240° C. at a rate of 10° C./min, and held for 10 minutes, for a total run time of 30 minutes.

Selection of target compounds and MRM method development: An outline of the general workflow for GC-MS analyses is as follows. Real samples were first analyzed by HS-SPME-GC/MS in full scan mode (m/z 30-300) to identify potential target compounds. Collected data were analyzed manually using Agilent MassHunter Qualitative Analysis Version B.07.00, or using Agilent MassHunter Unknowns Analysis Version B.08.00. Additional compounds may have been targeted based on literature research. Multiple Reaction Monitoring (MRM) optimization was performed using commercially available standards. First, full scan experiments were repeated with liquid injection (5 mg/L in pure EtOH) to verify retention time and potential precursor ions. Product ion scans were performed using liquid injection and varying collision energies across a range of 5-25 V. Optimized MRM transitions and collision energies were selected, and are displayed in TABLE 7. A dynamic MRM (dMRM) method was developed for the generation of calibration curves, as described below. Compounds were divided into multiple methods to minimize simultaneous transitions (no greater than 6).

Quantification. Calibration for all compounds was performed using the method of standard additions. Solutions were prepared for SPME as 10 mL sample, or as 1 mL sample diluted with 9 mL milliQ water, or as 0.1 mL sample diluted with 9.9 mL milliQ water, in 20-mL amber vials. Concentration range of spiked standards was varied by compound based on the expected range in real samples. Spiking solutions were prepared in EtOH for standard addition of analytes, except in the case of acids, which were prepared in milliQ water. Spiking solutions were spiked into samples at 10, 20, 30, and 40 uL Data were analyzed using Agilent Quantitative Analysis (for QQQ). Values reported as not detected (nd, zero) may be considered to be below the limits of detection (LODs) listed in TABLE 7. LODs were approximated based on S/N ratios as generated by the MassHunter software.

Various reference coffee samples were assayed by GC-MS; the levels of VOCs therein are shown in TABLE 8.

TABLE 7

GCMS Transitions and Figures of Merit

| Compound | Transition 1 | Collision Energy 1 | Transition 2 | Collision Energy 2 | LOD (ug/L) | LOD (mg/L) |
|---|---|---|---|---|---|---|
| 1-heptanol | 70 -> 55 | 5 | 69 -> 41 | 10 | 0.1 | 0.0001 |
| 1-octanol | 56.0 -> 41.0 | 15 | 70.0 -> 55.0 | 15 | 0.01 | 0.00001 |
| 1-octen-3-ol | 57.0 -> 31.0 | 25 | 72.0 -> 43.0 | 15 | 0.01 | 0.00001 |
| 2,3,5,6-tetramethylpyrazine | 136 -> 54 | 15 | 136 -> 95 | 5 | 0.01 | 0.00001 |
| 2,3,5-trimethylpyrazine | 122 -> 81 | 5 | 122 -> 42 | 20 | 1 | 0.001 |
| 2,3-butanediol | 45 -> 29 | 15 | 45 -> 27 | 15 | 10 | 0.01 |
| 2,3-butanedione | 86 -> 43 | 5 | 43 -> 42 | 15 | | |
| 2,3-diethyl-5-methylpyrazine | 150 -> 135 | 10 | 149 -> 133 | 20 | 1 | 0.001 |
| 2,3-diethylpyrazine | 136 -> 121 | 10 | 121 -> 120 | 15 | 0.1 | 0.0001 |
| 2,3-dimethylpyrazine | 108 -> 67 | 15 | 67 -> 26 | 20 | 1 | 0.001 |
| 2,3-Hexanedione | 71 -> 43 | 5 | 114 -> 71 | 5 | | |
| 2,3-pentadione | 100.0 -> 57.0 | 5 | 57.0 -> 42.0 | 30 | 100 | 0.1 |
| 2,5-dimethylphenol | 122 -> 107 | 15 | 108 -> 78 | 10 | 0.1 | 0.0001 |
| 2,5-dimethylpyrazine | 108 -> 42 | 15 | 108 -> 81 | 10 | 10 | 0.01 |
| 2,6-dimethylpyrazine | 108 -> 42 | 20 | 108 -> 107 | 15 | 1 | 0.001 |
| 2-acetyl-1-methylpyrrole | 123 -> 108 | 10 | 108 -> 53 | 20 | 0.001 | 0.000001 |
| 2-acetyl-5-methylfuran | 124 -> 109 | 5 | 109 -> 53 | 15 | 0.1 | 0.0001 |
| 2-acetylpyridine | 121 -> 93 | 5 | 79 -> 52 | 10 | 1 | 0.001 |
| 2-acetylpyrrole | 109 -> 94 | 10 | 94 -> 66 | 5 | 100 | 0.1 |

TABLE 7-continued

GCMS Transitions and Figures of Merit

| Compound | Transition 1 | Collision Energy 1 | Transition 2 | Collision Energy 2 | LOD (ug/L) | LOD (mg/L) |
|---|---|---|---|---|---|---|
| 2-ethyl-1-hexanol | 83 -> 55 | 5 | 70 -> 55 | 10 | 0.1 | 0.0001 |
| 2-ethyl-3-methylpyrazine | 122 -> 121 | 10 | 121 -> 93 | 15 | | |
| 2-ethylfuran | 96 -> 81 | 10 | 81 -> 53 | 10 | 0.1 | 0.0001 |
| 2-ethylpyrazine | 108 -> 107 | 10 | 107 -> 79 | 15 | 1 | 0.001 |
| 2-furfuryl acetate | 140 -> 98 | 5 | 98 -> 70 | 5 | 1 | 0.001 |
| 2-heptanol | 83 -> 55 | 5 | 70 -> 55 | 10 | 1 | 0.001 |
| 2-heptanone | 58.0 -> 43.0 | 15 | 71.0 -> 43.0 | 15 | 0.01 | 0.00001 |
| 2-isopropyl-3-methoxypyrazine | 152 -> 137 | 5 | 137 -> 109 | 10 | 0.01 | 0.00001 |
| 2-methoxy-4-methylphenol | 123 -> 95 | 5 | 138 -> 123 | 5 | 0.001 | 0.000001 |
| 2-methoxy-4-vinylphenol | 135 -> 107 | 5 | 150 -> 135 | 10 | 0 | 0 |
| 2-methylbutyl isovalerate | 85.0 -> 57.0 | 10 | 70.0 -> 55.0 | 10 | 0.1 | 0.0001 |
| 2-methylbutyraldehyde | 58 -> 31 | 25 | 57 -> 39 | 25 | 1 | 0.001 |
| 2-methylbutyric acid | 74 -> 73 | 10 | 87 -> 59 | 10 | 1 | 0.001 |
| 2-methylpyrazine | 94 -> 67 | 15 | 67 -> 26 | 15 | 100 | 0.1 |
| 2-nonanol | 83.0 -> 55.0 | 10 | 98.0 -> 56.0 | 10 | 0.1 | 0.0001 |
| 2-nonanone | 71.0 -> 43.0 | 15 | 58.0 -> 43.0 | 15 | 0.01 | 0.00001 |
| 2-octanol | 97 -> 55 | 5 | 45 -> 27 | 20 | 0.001 | 0.000001 |
| 2-octanone | 71 -> 43 | 20 | 58 -> 43 | 10 | 0.01 | 0.00001 |
| 2-pentanol | 73 -> 55 | 5 | 55 -> 29 | 5 | 1 | 0.001 |
| 2-pentylfuran | 138 -> 81 | 10 | 81 -> 53 | 10 | 0.01 | 0.00001 |
| 2-phenyl-2-butenal | 146 -> 117 | 10 | 117 -> 115 | 10 | 0.01 | 0.00001 |
| 2-phenylethanol | 122.0 -> 91.0 | 15 | 92.0 -> 65.0 | 25 | 1 | 0.001 |
| 2-phenylpropionaldehyde | 105 -> 77 | 20 | 105 -> 78 | 15 | 0.1 | 0.0001 |
| 2-tridecanone | 71 -> 43 | 5 | 58 -> 43 | 10 | 0.1 | 0.0001 |
| 2-undecanone | 58.0 -> 43.0 | 25 | 71.0 -> 43.0 | 25 | 0.1 | 0.0001 |
| 3-ethylpyridine | 107 -> 106 | 10 | 96 -> 65 | 10 | 1 | 0.001 |
| 3-hexanone | 100 -> 43 | 10 | 71 -> 43 | 10 | 1 | 0.001 |
| 3-octanol | 83 -> 55 | 5 | 59 -> 31 | 5 | 0.01 | 0.00001 |
| 3-octanone | 99 -> 43 | 5 | 72 -> 43 | 5 | 0.001 | 0.000001 |
| 4-carvomenthenol | 111.0 -> 77.0 | 25 | 71.0 -> 43.0 | 25 | 0.1 | 0.0001 |
| 4-ethyl guaiacol | 137.0 -> 66.0 | 35 | 152.0 -> 94.0 | 35 | 1 | 0.001 |
| 4-ethylphenol | 108.0 -> 78.0 | 25 | 121.0 -> 77.0 | 25 | | |
| 4-methyl-2-phenyl-2-pentenal | 174 -> 103 | 15 | 103 -> 77 | 15 | 0.01 | 0.00001 |
| 4'-methylacetophenone | 119 -> 91 | 10 | 134 -> 119 | 10 | 0.1 | 0.0001 |
| 4-vinylphenol | 120 -> 91 | 15 | 91 -> 65 | 15 | 1 | 0.001 |
| 5-methyl-2-phenyl-2-hexenal | 117 -> 115 | 15 | 104 -> 78 | 10 | 0.01 | 0.00001 |
| 5-methylfurfural | 110 -> 109 | 10 | 109 -> 53 | 10 | 10 | 0.01 |
| amyl acetate | 70 -> 29 | 15 | 70 -> 55 | 5 | 0.001 | 0.000001 |
| amyl alcohol | 70.0 -> 55.0 | 5 | 55.0 -> 53.0 | 35 | 1 | 0.001 |
| benzaldehyde | 105 -> 51 | 35 | 106 -> 77 | 35 | 0.1 | 0.0001 |
| benzyl acetate | 108.0 -> 79.0 | 15 | 91.0 -> 56.0 | 35 | 0.1 | 0.0001 |
| benzyl alcohol | 108 -> 79 | 15 | 79 -> 51 | 25 | 0 | 0 |
| benzyl isovalerate | 108 -> 107 | 10 | 108 -> 79 | 15 | 0.01 | 0.00001 |
| beta-damascenone | 121 -> 77 | 20 | 69 -> 41 | 20 | | |
| beta-ionone | 177.0 -> 147.0 | 35 | 135.0 -> 43.0 | 35 | 0 | 0 |
| butyl acetate | 56.0 -> 41.0 | 15 | 73.0 -> 43.0 | 5 | 0.01 | 0.00001 |
| butyl alcohol | 56.0 -> 41.0 | 10 | 56.0 -> 39.0 | 15 | 0 | 0 |
| butyric acid | 73 -> 55 | 10 | 60 -> 42 | 10 | 1 | 0.001 |
| coffee furanone | 100 -> 73 | 5 | 72 -> 43 | 5 | 100 | 0.1 |
| damascenone | 121 -> 77 | 20 | 69 -> 41 | 20 | 0.01 | 0.00001 |
| decanal | 82 -> 67 | 15 | 57 -> 41 | 25 | 0.1 | 0.0001 |
| delta-decalactone | 99 -> 43 | 10 | 71 -> 41 | 25 | | |
| diethyl disulfide | 122 -> 94 | 5 | 94 -> 66 | 5 | 0.1 | 0.0001 |
| diethyl succinate | 129 -> 101 | 5 | 101 -> 73 | 5 | 0.01 | 0.00001 |
| difurfuryl ether | 82 -> 54 | 10 | 81 -> 53 | 10 | 1 | 0.001 |
| dimethyl sulfide | 62 -> 47 | 15 | 61 -> 35 | 5 | 1 | 0.001 |
| dimethyl sulfoxide | 78 -> 63 | 10 | 63 -> 45 | 10 | 0.1 | 0.0001 |
| dimethyl trisulfide | 126 -> 79 | 15 | 126 -> 61 | 5 | 0.01 | 0.00001 |
| ethyl 2-methylbutyrate | 102.0 -> 74.0 | 10 | 85.0 -> 57.0 | 5 | 0.1 | 0.0001 |
| ethyl 3-phenylpropionate | 178 -> 104 | 5 | 107 -> 79 | 10 | 0.001 | 0.000001 |
| ethyl acetate | 61.0 -> 43.0 | 15 | 45.0 -> 43.0 | 35 | 1 | 0.001 |
| ethyl benzoate | 105.0 -> 77.0 | 10 | 150.0 -> 77.0 | 10 | 0.01 | 0.00001 |
| ethyl butanoate | 71.0 -> 43.0 | 10 | 88.0 -> 61.0 | 10 | 0.1 | 0.0001 |
| ethyl cinnamate | 131.0 -> 103.0 | 10 | 131.0 -> 77.0 | 25 | 0.1 | 0.0001 |
| ethyl decanoate | 88.0 -> 43.0 | 20 | 61.0 -> 43.0 | 20 | 0.01 | 0.00001 |
| ethyl heptanoate | 88.0 -> 61.0 | 15 | 113.0 -> 57.0 | 10 | 0.1 | 0.0001 |
| ethyl hexanoate | 88.0 -> 61.0 | 5 | 99.0 -> 43.0 | 5 | 0.01 | 0.00001 |
| ethyl isobutyrate | 71.0 -> 43.0 | 10 | 43.0 -> 27.0 | 20 | 0.1 | 0.0001 |
| ethyl isovalerate | 88.0 -> 61.0 | 5 | 70.0 -> 55.0 | 5 | 0.001 | 0.000001 |
| ethyl lactate | 45.0 -> 27.0 | 15 | 45.0 -> 29.0 | 15 | 10 | 0.01 |
| ethyl laurate | 88.0 -> 61.0 | 15 | 101.0 -> 55.0 | 25 | 0.01 | 0.00001 |
| ethyl myristate | 101.0 -> 73.0 | 5 | 88.0 -> 61.0 | 5 | 5 | 0.005 |
| ethyl octanoate | 88.0 -> 43.0 | 25 | 101.0 -> 55.0 | 25 | 0.1 | 0.0001 |
| ethyl oleate | 97 -> 55 | 10 | 101 -> 73 | 10 | 15 | 0.015 |

TABLE 7-continued

GCMS Transitions and Figures of Merit

| Compound | Transition 1 | Collision Energy 1 | Transition 2 | Collision Energy 2 | LOD (ug/L) | LOD (mg/L) |
|---|---|---|---|---|---|---|
| ethyl phenylacetate | 164.0 -> 91.0 | 10 | 91.0 -> 65.0 | 35 | 0.0001 | 0.0000001 |
| ethyl salicylate | 120.0 -> 92.0 | 10 | 166.0 -> 120.0 | 10 | 0.001 | 0.000001 |
| ethyl tiglate | 83 -> 55 | 5 | 100 -> 82 | 5 | 0.1 | 0.0001 |
| ethyl valerate | 88.0 -> 61.0 | 10 | 57.0 -> 41.0 | 10 | 0.001 | 0.000001 |
| eugenol | 164.0 -> 149.0 | 10 | 164.0 -> 104.0 | 15 | | |
| furfural | 96 -> 95 | 25 | 95 -> 53 | 35 | 1 | 0.001 |
| furfuryl propionate | 154 -> 98 | 5 | 81 -> 53 | 10 | 0.1 | 0.0001 |
| gamma-decalactone | 99.0 -> 43.0 | 25 | 71.0 -> 41.0 | 25 | 5 | 0.005 |
| gamma-nonalactone | 85.0 -> 57.0 | 25 | 114.0 -> 70.0 | 25 | 0 | 0 |
| gamma-valerolactone | 85 -> 57 | 5 | 56 -> 41 | 5 | 5 | 0.005 |
| geraniol | 69.0 -> 41.0 | 30 | 93.0 -> 51.0 | 15 | 0.1 | 0.0001 |
| geranyl acetate | 136 -> 121 | 5 | 121 -> 93 | 5 | 0.001 | 0.000001 |
| guaiacol | 109.0 -> 81.0 | 15 | 124.0 -> 109.0 | 15 | 0.01 | 0.00001 |
| hexanal | 56 -> 39 | 15 | 57 -> 31 | 25 | 1 | 0.001 |
| hexanol | 56.0 -> 41.0 | 15 | 69.0 -> 41.0 | 15 | 1 | 0.001 |
| hexyl acetate | 69.0 -> 41.0 | 15 | 84.0 -> 69.0 | 5 | 0.01 | 0.00001 |
| indole | 117 -> 90 | 10 | 90 -> 89 | 10 | | |
| isoamyl acetate | 70.0 -> 55.0 | 10 | 55.0 -> 29.0 | 10 | 0 | 0 |
| isoamyl alcohol | 70.0 -> 55.0 | 15 | 55.0 -> 39.0 | 15 | 0 | 0 |
| isoamyl benzoate | 105 -> 77 | 10 | 123 -> 79 | 10 | 0 | 0 |
| isoamyl butyrate | 70 -> 55 | 10 | 71 -> 43 | 5 | 0.001 | 0.000001 |
| isoamyl isobutyrate | 70.0 -> 55.0 | 10 | 115.0 -> 71.0 | 5 | 5 | 0.005 |
| isobutyl acetate | 73.0 -> 43.0 | 5 | 56.0 -> 41.0 | 15 | 0 | 0 |
| isobutyl alcohol | 43.0 -> 39.0 | 35 | 74.0 -> 41.0 | 25 | 100 | 0.1 |
| isobutyraldehyde | 72.0 -> 43.0 | 5 | 72.0 -> 57.0 | 5 | 5 | 0.005 |
| isobutyric acid | 88 -> 73 | 5 | 73 -> 55 | 20 | 1 | 0.001 |
| isoeugenol | 164 -> 104 | 15 | 164 -> 149 | 10 | | |
| isovaleraldehyde | 58 -> 31 | 25 | 71 -> 41 | 25 | 0.01 | 0.00001 |
| isovaleric acid | 87 -> 41 | 15 | 60 -> 42 | 25 | 1 | 0.001 |
| limonene | 93.0 -> 77.0 | 15 | 68.0 -> 53.0 | 15 | 0 | 0 |
| linalool | 71.0 -> 43.0 | 15 | 55.0 -> 39.0 | 25 | 0.001 | 0.000001 |
| maltol | 126 -> 71 | 20 | 71 -> 43 | 10 | 1 | 0.001 |
| massoia lactone | 97 -> 69 | 5 | 68 -> 41 | 10 | 0.1 | 0.0001 |
| methional | 76 -> 61 | 5 | 104 -> 48 | 10 | 1 | 0.001 |
| methyl 2-methylbutyrate | 101 -> 69 | 5 | 88 -> 57 | 5 | 5 | 0.005 |
| methyl anthranilate | 151 -> 119 | 10 | 119 -> 92 | 5 | 1 | 0.001 |
| methyl benzoate | 105 -> 77 | 5 | 136 -> 105 | 5 | 0.01 | 0.00001 |
| methyl cinnamate | 103 -> 77 | 10 | 131 -> 103 | 10 | 0 | 0 |
| methyl hexanoate | 74.0 -> 43.0 | 15 | 87.0 -> 55.0 | 15 | 0.01 | 0.00001 |
| methyl nicotinate | 137 -> 106 | 10 | 106 -> 78 | 10 | 0.1 | 0.0001 |
| methyl phenylacetate | 150 -> 91 | 5 | 91 -> 65 | 20 | 0.001 | 0.000001 |
| methyl salicylate | 92.0 -> 63.0 | 25 | 120.0 -> 64.0 | 15 | 0 | 0 |
| myrcene | 69.0 -> 41.0 | 10 | 93.0 -> 77.0 | 25 | 0 | 0 |
| nonanal | 98 -> 56 | 5 | 57 -> 39 | 15 | 0.01 | 0.00001 |
| octanal | 84 -> 55 | 10 | 84 -> 69 | 5 | 0 | 0 |
| p-anisaldehyde | 135 -> 77 | 25 | 77 -> 51 | 25 | 1 | 0.001 |
| p-cresol | 107 -> 77 | 20 | 108 -> 107 | 15 | 0 | 0 |
| phenethyl acetate | 104.0 -> 78.0 | 25 | 91.0 -> 65.0 | 35 | 0.01 | 0.00001 |
| phenylacetaldehyde | 120 -> 91 | 10 | 91 -> 65 | 15 | 1 | 0.001 |
| propanol | 59.0 -> 31.0 | 10 | 42.0 -> 39.0 | 35 | 5 | 0.005 |
| propionaldehyde | 58 -> 57 | 5 | 57 -> 29 | 10 | 100 | 0.1 |
| propionic acid | 73 -> 55 | 10 | 74 -> 45 | 35 | 1 | 0.001 |
| propyl propionate | 87 -> 57 | 5 | 75 -> 57 | 5 | 0.1 | 0.0001 |
| pyridine | 52 -> 51 | 10 | 52 -> 50 | 10 | 10 | 0.01 |
| pyrrole | 67 -> 41 | 20 | 67 -> 28 | 20 | 0.1 | 0.0001 |
| sotolon | 128 -> 83 | 5 | 83 -> 55 | 5 | 10 | 0.01 |
| syringol | 154 -> 139 | 15 | 139 -> 93 | 5 | 1 | 0.001 |
| trans,trans-2,4-decadienal | 152 -> 81 | 5 | 81 -> 53 | 15 | 0.01 | 0.00001 |
| trans-2-nonenal | 83 -> 55 | 5 | 70 -> 69 | 5 | 0.1 | 0.0001 |
| valeraldehyde | 58 -> 57 | 10 | 57 -> 29 | 5 | 10 | 0.01 |
| valeric acid | 73 -> 55 | 15 | 60 -> 42 | 15 | 1 | 0.001 |
| vanillin | 152 -> 151 | 10 | 151 -> 123 | 5 | 1 | 0.001 |
| vanillyl ethyl ether | 137.0 -> 94.0 | 20 | 182.0 -> 138.0 | 5 | | |

TABLE 8

GCMS of reference coffees

| Compound (mg/L) | 2A | 2B |
|---|---|---|
| 1-heptanol | NR | 0.000677 |
| 1-octanol | 0.000467 | NR |

TABLE 8-continued

GCMS of reference coffees

| Compound (mg/L) | 2A | 2B |
|---|---|---|
| 1-octen-3-ol | 0.002683 | NR |
| 2,3-butanediol | NR | NF |

TABLE 8-continued

GCMS of reference coffees

| Compound (mg/L) | 2A | 2B |
|---|---|---|
| 2,3-diethyl-5-methylpyrazine | NR | 0.013233 |
| 2,3-diethylpyrazine | NR | 0.001581 |
| 2,3-pentadione | NR | 1.10461 |
| 2,5-dimethylphenol | NR | 0.002127 |
| 2,5-dimethylpyrazine | NR | 6.515817 |
| 2,6-dimethylpyrazine | 3.202829 | NR |
| 2-acetyl-1-methylpyrrole | NR | 1.029943 |
| 2-acetyl-5-methylfuran | 0.235167 | NR |
| 2-acetylpyridine | NR | 0.079626 |
| 2-acetylpyrrole | NR | 1.306704 |
| 2-ethyl-1-hexanol | NR | 0.001931 |
| 2-ethylfuran | NR | 0.010571 |
| 2-ethylpyrazine | 0.880967 | NR |
| 2-furfuryl acetate | 0.962053 | NR |
| 2-heptanol | 0.012006 | NR |
| 2-heptanone | 0.003067 | NR |
| 2-isopropyl-3-methoxypyrazine | NR | 0.000957 |
| 2-methoxy-4-methylphenol | NR | 6.39E−05 |
| 2-methoxy-4-vinylphenol | NR | 0.448897 |
| 2-methylbutyl isovalerate | 0.00172 | NR |
| 2-methylbutyraldehyde | 1.779628 | NR |
| 2-methylbutyric acid | NR | 0.152868 |
| 2-methylpyrazine | NR | 10.34919 |
| 2-nonanol | 0.000537 | NR |
| 2-nonanone | 0.00054 | NR |
| 2-octanol | NR | NF |
| 2-octanone | 0.000844 | NR |
| 2-pentanol | NF | NR |
| 2-pentylfuran | 0.001743 | NR |
| 2-phenyl-2-butenal | NR | 0.016506 |
| 2-phenylethanol | 0.138162 | NR |
| 2-phenylpropionaldehyde | NR | NF |
| 2-tridecanone | NR | NF |
| 2-undecanone | 0.000364 | NR |
| 3-ethylpyridine | NR | 0.023253 |
| 3-hexanone | NR | 0.028916 |
| 3-octanol | NR | 0.000625 |
| 3-octanone | NR | NF |
| 4-carvomenthenol | 0.000492 | NR |
| 4-ethyl guaiacol | 0.027597 | NR |
| 4-ethyl phenol | NR | 0.016259 |
| 4-methyl-2-phenyl-2-pentenal | NR | 0.000354 |
| 4'-methylacetophenone | NR | 0.007515 |
| 4-vinylphenol | NR | 0.169072 |
| 5-methyl-2-phenyl-2-hexenal | 0.000203 | NR |
| 5-methylfurfural | NR | 6.396633 |
| amyl acetate | NR | NF |
| amyl alcohol | 0.015875 | NR |
| benzaldehyde | 0.044522 | NR |
| benzyl acetate | 0.000336 | NR |
| benzyl alcohol | NF | NR |
| benzyl isovalerate | NR | NF |
| beta-ionone | NF | NR |
| butyl acetate | NF | NR |
| butyl alcohol | 0.234207 | NR |
| butyric acid | NR | 2.455016 |
| coffee furanone | NR | 25.1183 |
| damascenone | 0.001987 | NR |
| decanal | 0.00066 | NR |
| diethyl disulfide | NR | 0.00038 |
| diethyl succinate | 0.000207 | NR |
| difurfuryl ether | NR | 0.055644 |
| dimethyl sulfide | NR | 0.010043 |
| dimethyl sulfoxide | NR | 0.0094 |
| dimethyl trisulfide | 0.001556 | NR |
| ethyl 2-methylbutyrate | 0.000987 | NR |
| ethyl 3-phenylpropionate | NR | NF |
| ethyl acetate | 0.087586 | NR |
| ethyl benzoate | NF | NR |
| ethyl butanoate | 0.003628 | NR |
| ethyl cinnamate | NF | NR |
| ethyl decanoate | 0.000885 | NR |
| ethyl heptanoate | 0.001199 | NR |
| ethyl hexanoate | 0.000841 | NR |
| ethyl isobutyrate | NF | NR |
| ethyl isovalerate | 0.004048 | NR |

TABLE 8-continued

GCMS of reference coffees

| Compound (mg/L) | 2A | 2B |
|---|---|---|
| ethyl lactate | 0.184011 | NR |
| ethyl laurate | 0.000354 | NR |
| ethyl myristate | NF | NR |
| ethyl octanoate | 0.001118 | NR |
| ethyl oleate | NR | NF |
| ethyl phenylacetate | 4.96E−05 | NR |
| ethyl salicylate | NR | NF |
| ethyl tiglate | NR | 0.001168 |
| ethyl valerate | NR | NF |
| furfural | 12.3289 | NR |
| furfuryl propionate | NR | 0.047996 |
| gamma-decalactone | NF | NR |
| gamma-nonalactone | 0.002375 | NR |
| gamma-valerolactone | NF | NR |
| geraniol | 0.011104 | NR |
| geranyl acetate | NR | NF |
| guaiacol | 0.44331 | NR |
| hexanal | 0.012008 | NR |
| hexanol | 0.164694 | NR |
| hexyl acetate | 0.00081 | NR |
| isoamyl acetate | 0.001267 | NR |
| isoamyl alcohol | NF | NR |
| isoamyl benzoate | NR | NF |
| isoamyl butyrate | NF | NR |
| isoamyl isobutyrate | NF | NR |
| isobutyl acetate | NF | NR |
| isobutyl alcohol | NR | NF |
| isobutyraldehyde | 0.150133 | NR |
| isobutyric acid | NR | 0.038209 |
| isovaleraldehyde | 0.101602 | NR |
| isovaleric acid | NR | 0.481961 |
| limonene | 0.001607 | NR |
| linalool | 0.020093 | NR |
| maltol | NF | NR |
| massoia lactone | NF | NR |
| methional | NR | NF |
| methyl 2-methylbutyrate | NF | NR |
| methyl anthranilate | NR | NF |
| methyl benzoate | NR | 0.000396 |
| methyl cinnamate | NR | NF |
| methyl hexanoate | NR | 0.001282 |
| methyl nicotinate | NR | 0.013467 |
| methyl phenylacetate | 0.001198 | NR |
| methyl salicylate | 0.007396 | NR |
| myrcene | 0.001998 | NR |
| nonanal | 0.001658 | NR |
| octanal | 0.000648 | NR |
| p-anisaldehyde | NR | 0.021536 |
| p-cresol | NR | 1.623658 |
| phenethyl acetate | 0.000122 | NR |
| phenylacetaldehyde | 0.454779 | NR |
| propanol | NF | NR |
| propionaldehyde | NR | 1.516456 |
| propionic acid | NR | 1.417946 |
| propyl propionate | NR | NF |
| pyrrole | NR | 0.011707 |
| syringol | NR | 0.046659 |
| trans,trans-2,4-decadienal | NF | NR |
| trans-2-nonenal | NR | NF |
| valeraldehyde | 0.292701 | NR |
| valeric acid | NR | 0.126781 |

OC = outside of standard curve
NF = Not found
NR = Not run

Example 8—Exemplary Coffee Formulations

Exemplary coffee formulations, as a liquid coffee replica (mg/L), a coffee grounds coffee replica (mg/g substrate), or a coffee concentrate or granule replica (percent by weight of total VOCs and non-volatile compounds) are shown in TABLE 9

TABLE 9

| | Range (mg/L) | Range (Percent by weight of total VOCs and non-volatile compounds) |
|---|---|---|
| Exemplary Coffee formulations | | |
| 2,3,5-trimethylpyrazine | 1.75E−06-3.25E−06 | 1.44E−07 ± 4.31E−08 |
| 2,3-butanedione | 2.80E−04-5.20E−04 | 2.30E−05 ± 6.89E−06 |
| 2,3-diethyl-5-methyl pyrazine | 1.58E−03-2.93E−03 | 1.29E−04 ± 3.88E−05 |
| 2,3-dimethylpyrazine | 5.25E−06-9.75E−06 | 4.31E−07 ± 1.29E−07 |
| 2,3-Hexanedione | 7.54E+00-1.40E+01 | 6.19E−01 ± 1.86E−01 |
| 2,3-pentadione | 9.05E−01-1.68E+00 | 7.43E−02 ± 2.23E−02 |
| 2,5-dimethylphenol | 5.25E−03-9.75E−03 | 4.31E−04 ± 1.29E−04 |
| 2,6-dimethylpyrazine | 1.66E+00-3.08E+00 | 1.36E−01 ± 4.09E−02 |
| 2-acetyl-5-methylfuran | 1.51E+00-2.80E+00 | 1.24E−01 ± 3.72E−02 |
| 2-ethoxy-3-methylpyrazine | 4.53E−01-8.41E−01 | 3.72E−02 ± 1.12E−02 |
| 2-ethyl-4-hydroxy-5-methyl-3(2H)-furanone | 6.03E−01-1.12E+00 | 4.95E−02 ± 1.49E−02 |
| 2-ethylpyrazine | 3.68E−02-6.83E−02 | 3.02E−03 ± 9.05E−04 |
| 2-isobutyl-3-methoxypyrazine (IBMP) | 5.25E−04-9.75E−04 | 4.31E−05 ± 1.29E−05 |
| 2-isobutyl-3-methyl pyrazine | 2.63E−04-4.88E−04 | 2.15E−05 ± 6.46E−06 |
| 2-isopropyl-3-methoxypyrazine | 1.58E−04-2.93E−04 | 1.29E−05 ± 3.88E−06 |
| 2-methoxy-4-methylphenol | 2.30E−04-4.27E−04 | 1.89E−05 ± 5.66E−06 |
| 2-methoxy-4-vinylphenol | 7.33E−04-1.36E−03 | 6.02E−05 ± 1.81E−05 |
| 2-methylpyrazine | 6.71E−03-1.25E−02 | 5.51E−04 ± 1.65E−04 |
| 2-pentanol | 5.25E−03-9.75E−03 | 4.31E−04 ± 1.29E−04 |
| 3-methylbutyric acid | 1.23E−02-2.28E−02 | 1.01E−03 ± 3.02E−04 |
| 4,5-dimethyl-3-hydroxy-2,5-dihydro-furan-2-one (sotolon) | 1.51E−01-2.80E−01 | 1.24E−02 ± 3.71E−03 |
| 4-ethylguaiacol | 1.05E−03-1.95E−03 | 8.62E−05 ± 2.59E−05 |
| 4-hydroxy-5-methyl-3-furanone | 3.02E+00-5.60E+00 | 2.48E−01 ± 7.43E−02 |
| 5-methylfurfural | 1.10E−02-2.05E−02 | 9.05E−04 ± 2.71E−04 |
| acetoin acetate | 7.54E+01-1.40E+02 | 6.19E+00 ± 1.86E+00 |
| amyl alcohol | 3.50E−03-6.50E−03 | 2.87E−04 ± 8.62E−05 |
| vanillin erythro and/or threo-butan-2,3-diol | 6.03E+01-1.12E+02 | 4.95E+00 ± 1.49E+00 |
| Aspartic_Acid | 1.34E+01-2.49E+01 | 1.10E+00 ± 3.30E−01 |
| beta-damascenone | 3.68E−05-6.83E−05 | 3.02E−06 ± 9.05E−07 |
| beta-ionone | 1.73E+00-3.21E+00 | 1.42E−01 ± 4.25E−02 |
| butyric acid | 2.80E−03-5.20E−03 | 2.30E−04 ± 6.89E−05 |
| Caffeine | 1.20E+02-2.23E+02 | 9.87E+00 ± 2.96E+00 |
| Choline | 1.74E+01-3.23E+01 | 1.43E+00 ± 4.29E−01 |
| Citric_Acid | 4.47E+02-8.30E+02 | 3.67E+01 ± 1.10E+01 |
| coffee furanone | 7.24E+01-1.34E+02 | 5.94E+00 ± 1.78E+00 |
| delta-decalactone | 1.20E+00-2.23E+00 | 9.87E−02 ± 2.96E−02 |
| delta-octalactone | 4.81E+00-8.93E+00 | 3.95E−01 ± 1.18E−01 |
| diethyl succinate | 1.51E+02-2.80E+02 | 1.24E+01 ± 3.72E+00 |
| difurfuryl ether | 1.75E−04-3.25E−04 | 1.44E−05 ± 4.31E−06 |
| dimethyl trisulfide | 3.50E−08-6.50E−08 | 2.87E−09 ± 8.62E−10 |
| ethyl 2-methylbutyrate | 2.76E+00-5.13E+00 | 2.27E−01 ± 6.81E−02 |
| ethyl benzoate | 1.75E−03-3.25E−03 | 1.44E−04 ± 4.31E−05 |
| ethyl butyrate | 4.61E−01-8.56E−01 | 3.78E−02 ± 1.13E−02 |
| ethyl decanoate | 3.15E−02-5.85E−02 | 2.59E−03 ± 7.76E−04 |
| ethyl isovalerate | 2.10E−03-3.90E−03 | 1.72E−04 ± 5.17E−05 |
| ethyl laurate | 3.50E−03-6.50E−03 | 2.87E−04 ± 8.62E−05 |
| ethyl maltol | 3.02E+01-5.60E+01 | 2.48E+00 ± 7.43E−01 |
| eugenol | 1.10E−02-2.05E−02 | 9.05E−04 ± 2.71E−04 |
| furaneol | 6.03E+00-1.12E+01 | 4.95E−01 ± 1.49E−01 |
| furfural | 3.50E−03-6.50E−03 | 2.87E−04 ± 8.62E−05 |
| furfuryl alcohol | 3.50E−09-6.50E−09 | 2.87E−10 ± 8.62E−11 |
| gamma decalactone | 1.44E+00-2.68E+00 | 1.18E−01 ± 3.55E−02 |
| gamma-nonalactone | 4.81E+00-8.93E+00 | 3.95E−01 ± 1.18E−01 |
| geranyl acetate | 5.25E−02-9.75E−02 | 4.31E−03 ± 1.29E−03 |
| guaiacol | 7.00E−04-1.30E−03 | 5.75E−05 ± 1.72E−05 |
| isoamyl alcohol | 1.40E−02-2.60E−02 | 1.15E−03 ± 3.45E−04 |
| isobutyraldehyde | 3.15E−05-5.85E−05 | 2.59E−06 ± 7.76E−07 |
| isoeugenol | 1.10E−02-2.05E−02 | 9.05E−04 ± 2.71E−04 |
| isopropenyl pyrazine | 3.02E+00-5.61E+00 | 2.48E−01 ± 7.43E−02 |
| Isovaleraldehyde | 2.10E−04-3.90E−04 | 1.72E−05 ± 5.17E−06 |
| isovaleric acid | 3.69E+00-6.85E+00 | 3.03E−01 ± 9.08E−02 |
| Lactic_Acid | 2.91E+01-5.40E+01 | 2.39E+00 ± 7.16E−01 |
| maltol | 5.66E+01-1.05E+02 | 4.64E+00 ± 1.39E+00 |
| massoia lactone | 2.41E+01-4.47E+01 | 1.97E+00 ± 5.92E−01 |
| methanethiol | 7.00E−07-1.30E−06 | 5.75E−08 ± 1.72E−08 |
| methyl anthranilate | 2.22E−02-4.11E−02 | 1.82E−03 ± 5.45E−04 |
| p-anisaldehyde | 1.10E−02-2.05E−02 | 9.05E−04 ± 2.71E−04 |
| pyrrole | 1.75E−04-3.25E−04 | 1.44E−05 ± 4.31E−06 |
| sotolone | 3.15E−06-5.85E−06 | 2.59E−07 ± 7.76E−08 |
| Succinic_Acid | 7.34E+00-1.36E+01 | 6.02E−01 ± 1.81E−01 |
| syringol (2,6-dimethoxyphenol) | 2.85E+00-5.30E+00 | 2.34E−01 ± 7.03E−02 |

TABLE 9-continued

| | | Range (Percent by weight of total VOCs and non- |
| | Range (mg/L) | volatile compounds) |
| --- | --- | --- |
| Trans-Ferulic_Acid | 1.08E+01-2.00E+01 | 8.84E−01 ± 2.65E−01 |
| valeraldehyde | 3.46E+00-6.42E+00 | 2.84E−01 ± 8.51E−02 |
| Vanillic_Acid | 1.52E+01-2.82E+01 | 1.25E+00 ± 3.74E−01 |
| vanillin | 2.14E+01-3.97E+01 | 1.76E+00 ± 5.27E−01 |
| vanillyl ethyl ether | 1.43E+01-2.65E+01 | 1.17E+00 ± 3.51E−01 |
| grapeseed | 02.50E+04-7.50E+04 | 2.87E+03 ± 8.62E+02 |
| Water | 1 L | 0 |

*Exemplary Coffee formulations*

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of preparing a coffee replica, the method comprising:

forming an aqueous solution comprising:

water, one or more volatile organic compounds (VOCs) that are water-soluble, and one or more non-volatile compounds that are water-soluble;

forming an emulsion comprising:

an oil, one or more VOCs that are fat-soluble, and one or more non-volatile compounds that are fat-soluble; and mixing the aqueous solution and the emulsion to form a flavor mixture, wherein the flavor mixture comprises 2-methylpyra-zine, 2,3-pentadione, 2,6-dimethylpyrazine, and at least 5 VOCs selected from the group consisting of 2,3-butanedione, 2,3-diethyl-5-methylpyrazine, 2,3-hexanedione, 2,5-dimethylphenol, 2-acetyl-5-meth-ylfuran, 2-ethoxy-3-methylpyrazine, 2-ethyl-4-hy-droxy-5-methyl-3 (2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphe-nol, 2-pentanol, 3-methylbutyric acid, 4-ethylguai-acol, 4-hydroxy-5-methyl-3-furanone, 5-methylfur-fural, acetoin acetate, amyl alcohol, beta-damascenone, beta-ionone, butyric acid, coffee furanone, delta-decalactone, delta-octalactone, diethyl succinate, difurfuryl ether, dimethyl trisul-fide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nona-lactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisal-dehyde, pyrrole, sotolone, syringol, valeraldehyde, vanillin erythro and/or threo-butan-2,3-diol acetal, and vanillyl ethyl ether, and wherein the flavor mixture comprises at least 3 non-volatile compounds selected from the group consist-ing of 2,3,5-trimethylpyrazine, 2,3-dimethylpyra-zine, aspartic acid, caffeine, choline, citric acid, lactic acid, sotolon, succinic acid, trans-ferulic acid, vanillic acid, and vanillin;

wherein the coffee replica comprises one or more of grape seeds, chickpeas, dates, brown rice, beans, lentils, pea seeds, and pea protein concentrate; and wherein the coffee replica is a coffee concentrate replica, a coffee beverage replica, a coffee granule replica, a coffee bean replica, or a coffee grounds replica.

2. The method of claim 1, wherein the method further comprises processing the flavor mixture to commercial sterility.

3. The method of claim 1, wherein the coffee replica is a coffee granule replica.

4. The method of claim 3, wherein the method further comprises agglomerating the flavor mixture.

5. The method of claim 1, wherein the coffee replica is a coffee bean replica or a coffee grounds replica.

6. The method of claim 5, wherein the method further comprises applying the flavor mixture to the solid substrate to form a coated solid substrate.

7. The method of claim 1, wherein the VOCs do not comprise at least one compound selected from the group consisting of 1-heptanol, 1-octanol, 1-octen-3-ol, 2,3-dieth-ylpyrazine, 2,5-dimethylpyrazine, 2-acetyl-1-methylpyrrole, 2-acetylpyridine, 2-acetylpyrrole, 2-ethyl-1-hexanol, 2-eth-ylfuran, 2-furfuryl acetate, 2-heptanol, 2-heptanone, 2-meth-ylbutyl isovalerate, 2-methylbutyraldehyde, 2-methylbu-tyric acid, 2-nonanol, 2-nonanone, 2-octanone, 2-pentylfuran, 2-phenyl-2-butenal, 2-phenylethanol, 2-un-decanone, 3-ethylpyridine, 3-hexanone, 3-octanol, 4-car-vomenthenol, 4-ethyl guaiacol, 4-ethyl phenol, 4-methyl-2-phenyl-2-pentenal, 4'-methylacetophenone, 4-vinylphenol, 5-methyl-2-phenyl-2-hexenal, benzaldehyde, benzyl acetate, butyl alcohol, damascenone, decanal, diethyl disul-fide, dimethyl sulfide, dimethyl sulfoxide, ethyl acetate, ethyl butanoate, ethyl heptanoate, ethyl hexanoate, ethyl lactate, ethyl octanoate, ethyl phenylacetate, ethyl tiglate, furfuryl propionate, geraniol, hexanal, hexanol, hexyl acetate, isoamyl acetate, isobutyric acid, limonene, linalool, methyl benzoate, methyl hexanoate, methyl nicotinate, methyl phenylacetate, methyl salicylate, myrcene, nonanal, octanal, p-cresol, phenethyl acetate, phenylacetaldehyde, propionaldehyde, propionic acid, and valeric acid.

8. The method of claim 1, wherein the one or more VOCs comprise at least one compound selected from the group consisting of 2-pentanol, beta-ionone, ethyl benzoate, gera-nyl acetate, isoamyl alcohol, maltol, massoia lactone, and methyl anthranilate.

9. The method of claim 1, wherein the VOCs comprise at least 30 compounds selected from the group consisting of 2,3-butanedione, 2,3-diethyl-5-methylpyrazine, 2,3-hexanedione, 2,3-pentadione, 2,5-dimethylphenol, 2,6-dimethylpyrazine, 2-acetyl-5-methylfuran, 2-ethoxy-3-methylpyrazine, 2-ethyl-4-hydroxy-5-methyl-3 (2H)-furanone, 2-ethylpyrazine, 2-isobutyl-3-methoxypyrazine (IBMP), 2-isobutyl-3-methyl pyrazine, 2-isopropyl-3-methoxypyrazine, 2-methoxy-4-methylphenol, 2-methoxy-4-vinylphenol, 2-methylpyrazine, 2-pentanol, 3-methylbutyric acid, 4-ethylguaiacol, 4-hydroxy-5-methyl-3-furanone, 5-methylfurfural, acetoin acetate, amyl alcohol, beta-damascenone, beta-ionone, butyric acid, coffee furanone, delta-decalactone, delta-octalactone, diethyl succinate, difurfuryl ether, dimethyl trisulfide, ethyl 2-methylbutyrate, ethyl benzoate, ethyl butyrate, ethyl decanoate, ethyl isovalerate, ethyl laurate, ethyl maltol, eugenol, furaneol, furfural, furfuryl alcohol, gamma decalactone, gamma-nonalactone, geranyl acetate, guaiacol, isoamyl alcohol, isobutyraldehyde, isoeugenol, isopropenyl pyrazine, isovaleraldehyde, isovaleric acid, maltol, massoia lactone, methanethiol, methyl anthranilate, p-anisaldehyde, pyrrole, sotolone, syringol, valeraldehyde, vanillin erythro and/or threo-butan-2,3-diol acetal, and vanillyl ethyl ether.

10. The method of claim 1, wherein the non-volatile compounds do not comprise at least one compound selected from the group consisting of 2 (5H)-furanone, 2,3,5,6-tetramethylpyrazine, 2-ethyl-2-hydroxybutyric acid, 2-furoic acid, 2-isopropylmalic acid, 3,4-dihydroxybenzoic acid, 4-methoxycinnamic acid, 5-ethyl-4-hydroxy-2-methyl-3 (2H)-furanone, adenine, arabitol, betaine, caffeic acid, cytidine, D-gluconic acid, D-glucuronic acid, fructose, galactose, glucose, glutamic acid, hydroxymethylfurfural, malic acid, mannitol, methyl-2-pyrrolyl ketone, inositol, pyruvic acid, quinic acid, sorbitol, syringic acid, tartaric acid, tryptamine, and uracil.

11. The method of claim 1, wherein the one or more non-volatile compounds comprise at least 5 compounds selected from the group consisting of 2,3,5-trimethylpyrazine, 2,3-dimethylpyrazine, aspartic acid, caffeine, choline, citric acid, lactic acid, sotolon, succinic acid, trans-ferulic acid, vanillic acid, and vanillin.

* * * * *